(12) United States Patent
Ishiguro et al.

(10) Patent No.: US 6,341,201 B1
(45) Date of Patent: Jan. 22, 2002

(54) REMOTELY CONTROLLABLE CAMERA SYSTEM

(75) Inventors: Minoru Ishiguro; Yasuhiko Tanaka; Fumio Iwai; Yasuhiro Nishitani; Kazuhisa Horikiri, all of Saitama (JP)

(73) Assignees: Fuji Photo Optical Co., Ltd., Saitama (JP); Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/162,756

(22) Filed: Sep. 30, 1998

(30) Foreign Application Priority Data

Sep. 30, 1997 (JP) ............................... 9-267266
Dec. 11, 1997 (JP) ............................... 9-341746

(51) Int. Cl.[7] ..................... G03B 17/38; G03B 17/02; G03B 11/04
(52) U.S. Cl. .................. 396/56; 396/311; 396/448; 396/57; 396/319; 396/300
(58) Field of Search ............... 396/56, 57, 58, 396/59, 297, 300, 311, 448, 535, 319, 207

(56) References Cited

U.S. PATENT DOCUMENTS

| 4,998,125 | A | * | 3/1991 | Watanabe et al. | ............. | 396/56 |
|---|---|---|---|---|---|---|
| 5,119,123 | A | * | 6/1992 | Tominaga et al. | ............. | 396/56 |
| 5,128,700 | A | | 7/1992 | Inoue et al. | | |
| 5,159,375 | A | | 10/1992 | Taniguchi et al. | | |
| 5,173,729 | A | | 12/1992 | Kaneko | | |
| 5,270,764 | A | | 12/1993 | Ichihara | | |
| 5,353,082 | A | * | 10/1994 | Suzuka | ........................ | 396/56 |
| 5,389,986 | A | | 2/1995 | Tsuji et al. | | |
| 5,450,149 | A | | 9/1995 | Cocca | | |
| 5,483,320 | A | | 1/1996 | Aoki et al. | | |
| 5,500,701 | A | | 3/1996 | Itoh | | |
| 5,640,629 | A | | 6/1997 | Hibino et al. | | |
| 5,682,557 | A | * | 10/1997 | Harada et al. | ................ | 396/59 |

FOREIGN PATENT DOCUMENTS

| EP | 0 905 554 | 3/1999 |
|---|---|---|
| JP | 6-186628 | 7/1994 |
| JP | 6-222442 | 8/1994 |
| JP | 7-244330 | 9/1995 |
| JP | 8-054676 | 2/1996 |
| JP | 8-129222 | 5/1996 |
| JP | 8-334820 | 12/1996 |

* cited by examiner

Primary Examiner—Alan A. Mathews
(74) Attorney, Agent, or Firm—Young & Thompson

(57) ABSTRACT

A camera system includes a taking lens and a lens cover type of operation card. The operation card incorporates a function of operating the camera system and covers the taking lens when attached to a front of the camera. The operation card may also be attached to another surface of the camera, and may be entirely detached from the camera and used as a remote control device.

36 Claims, 108 Drawing Sheets

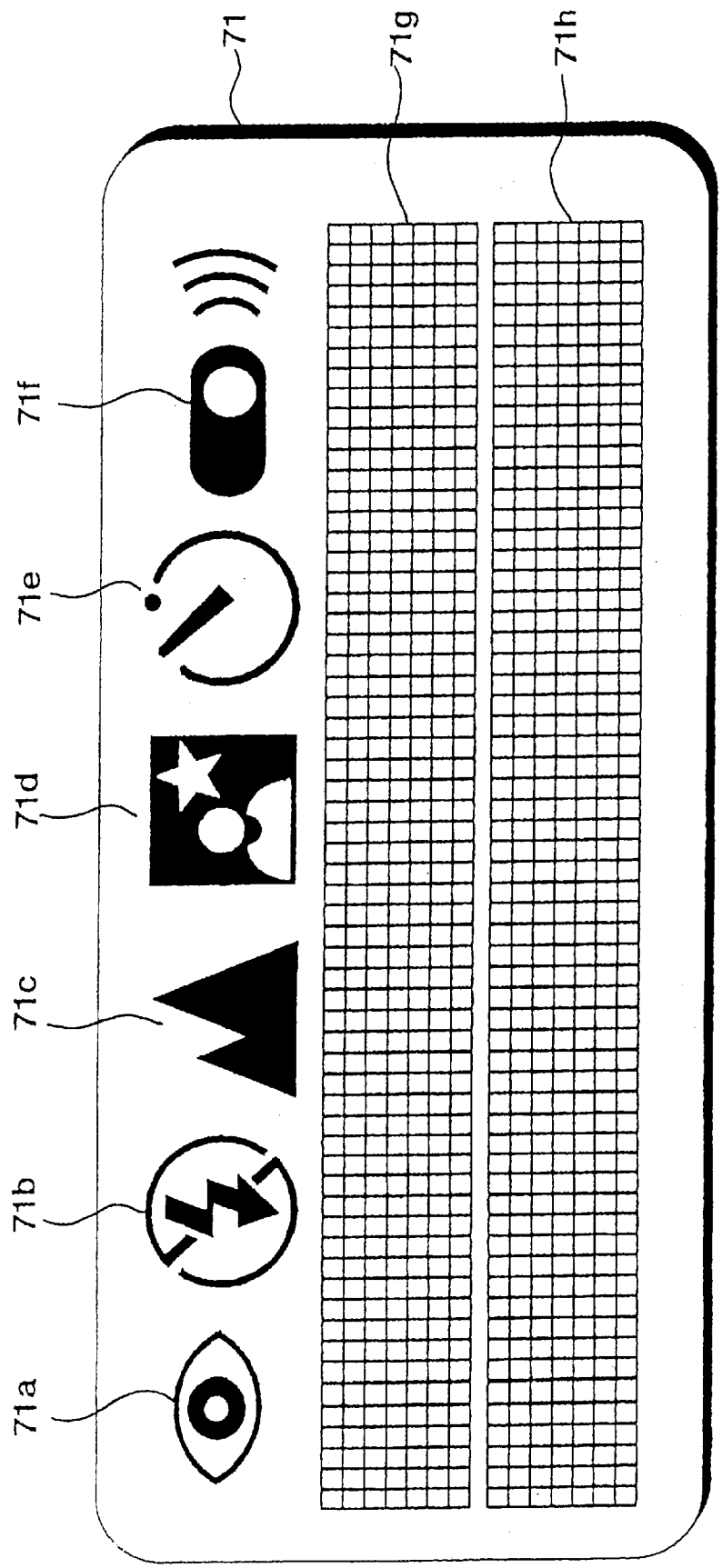

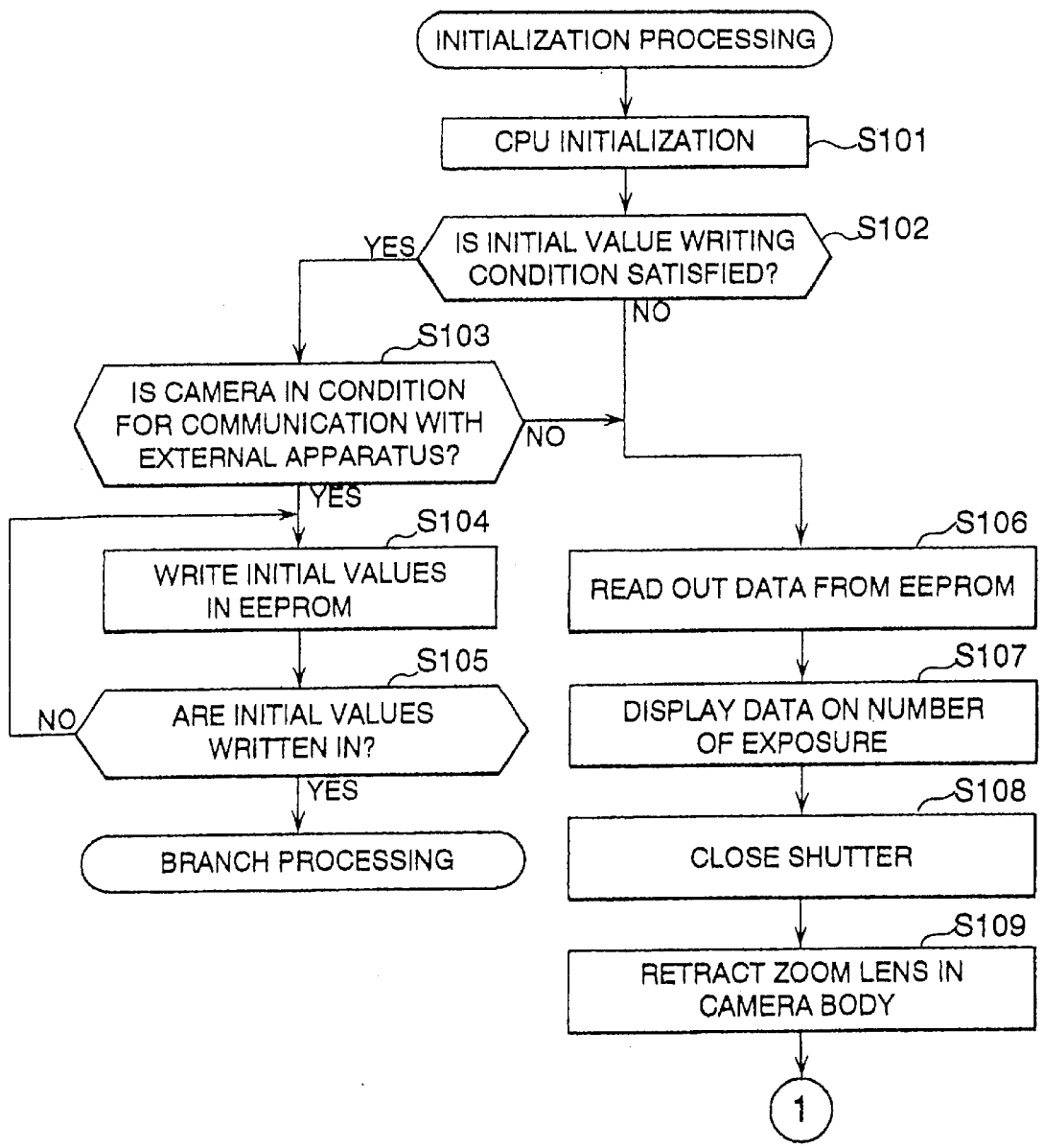

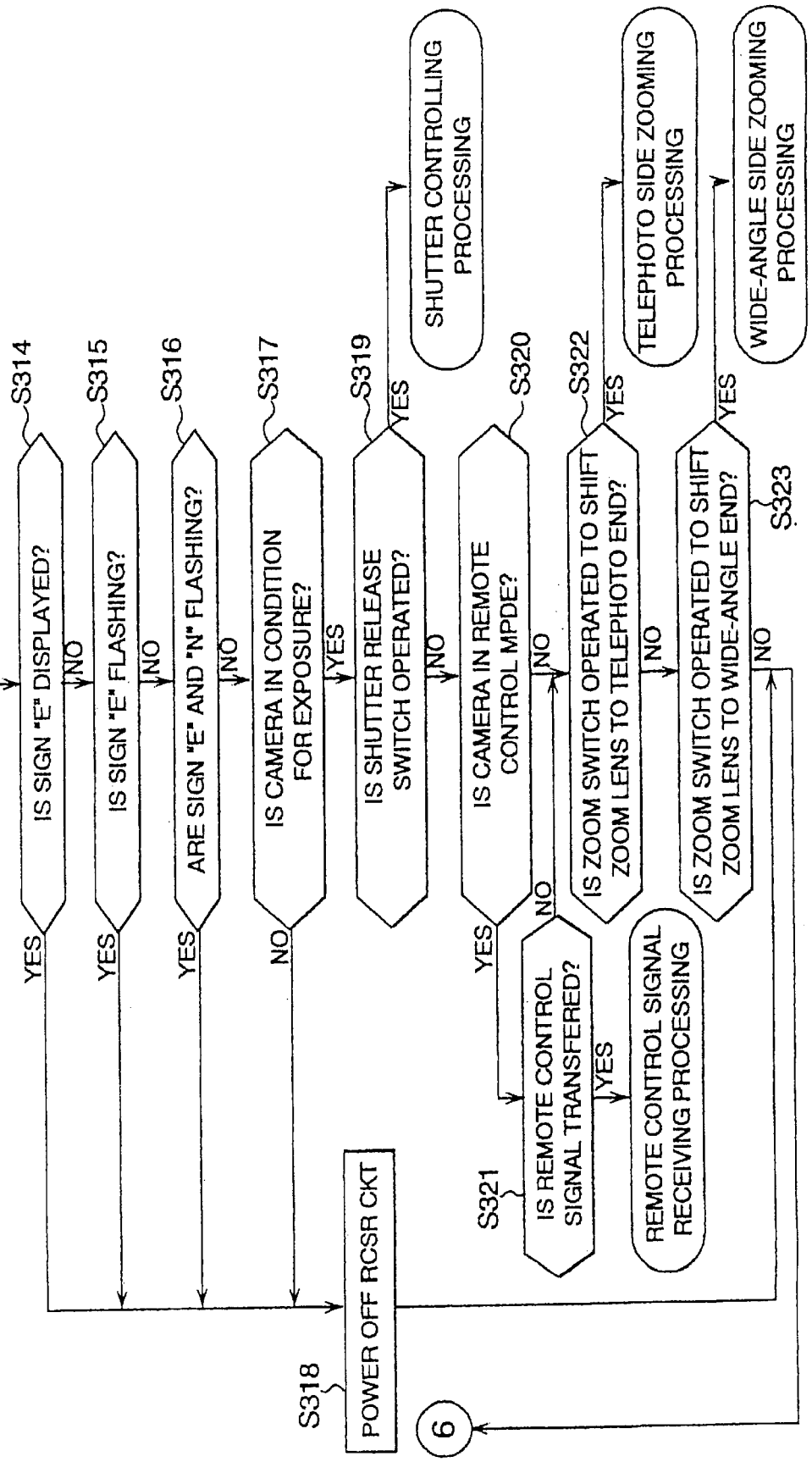

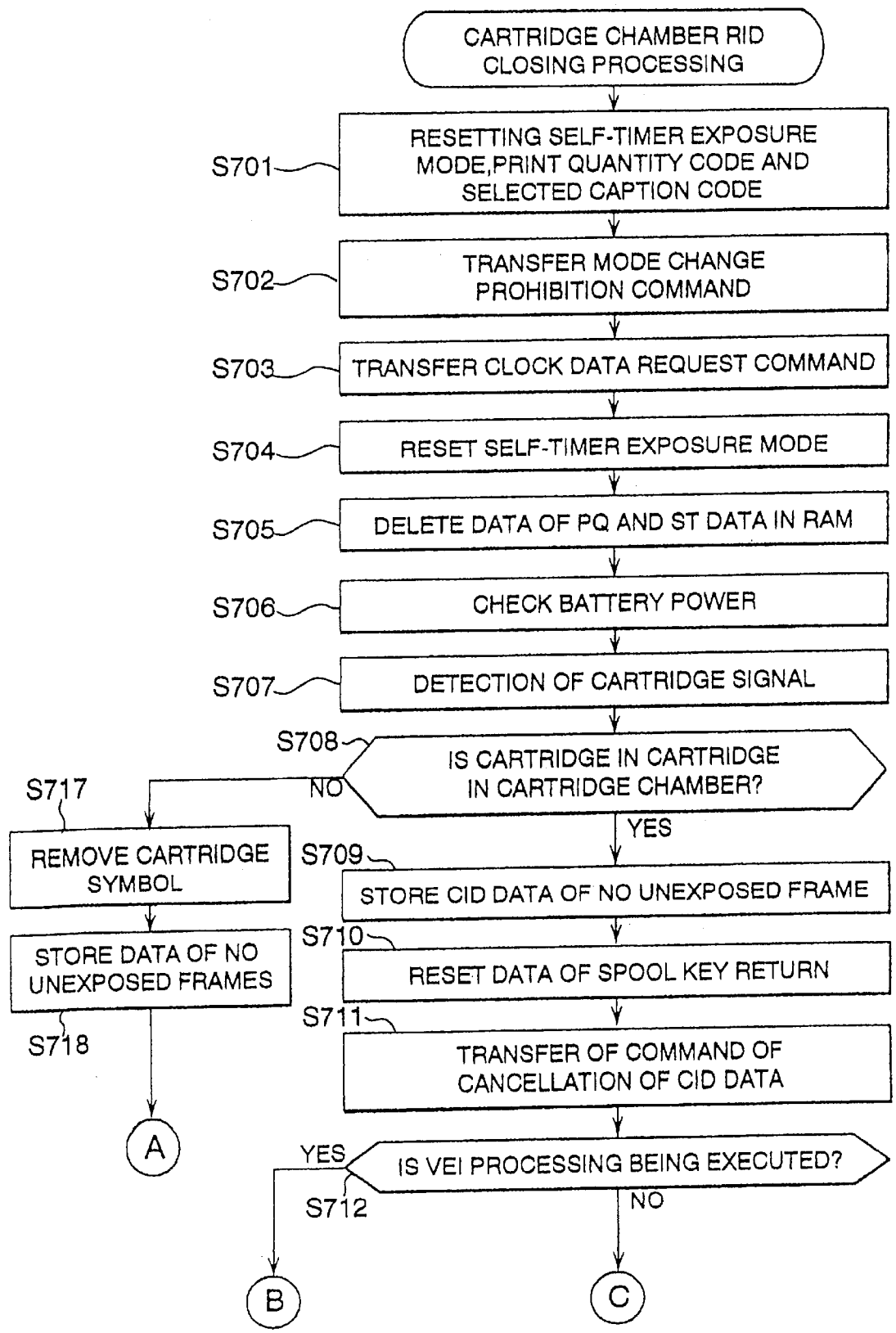

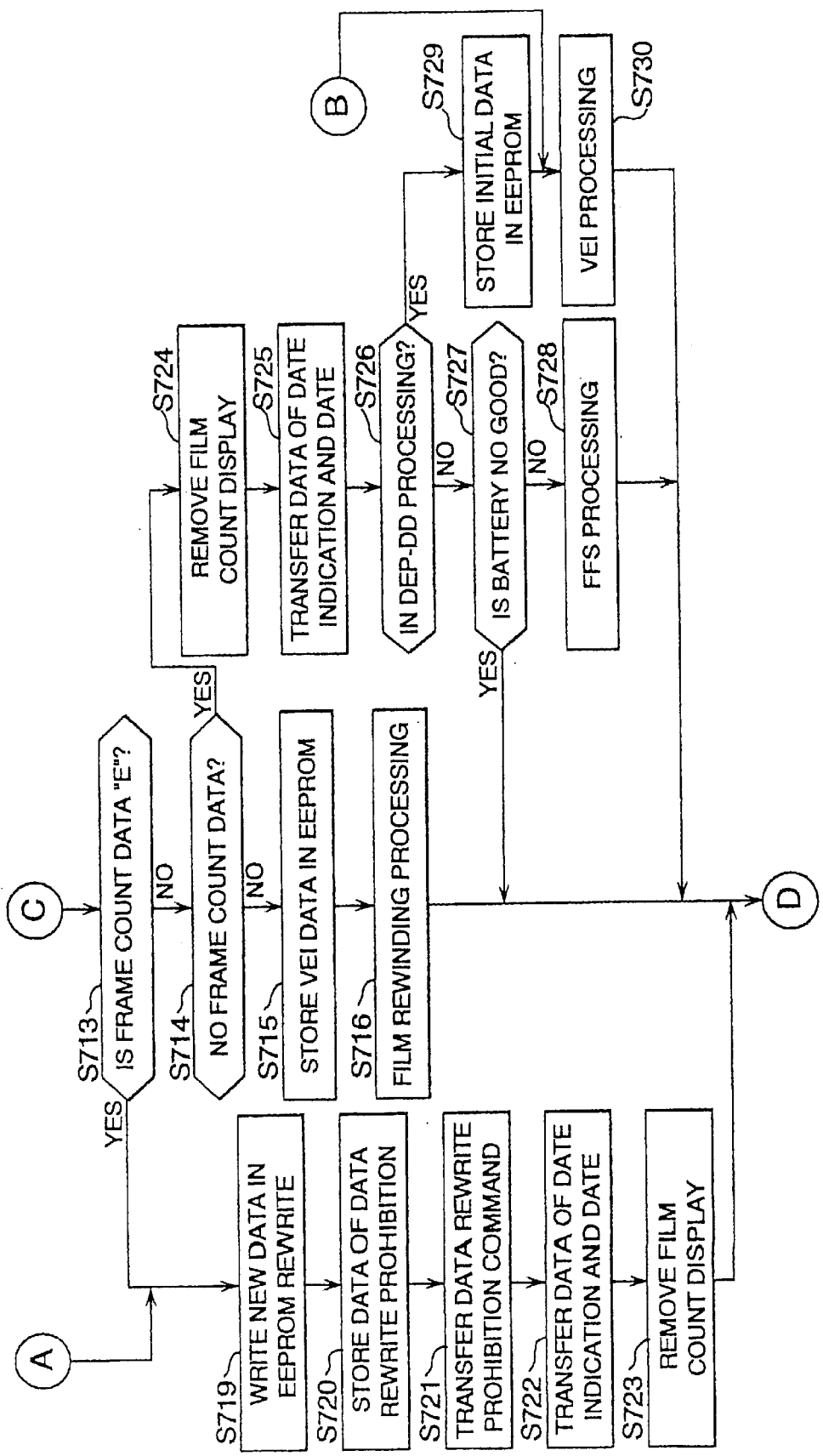

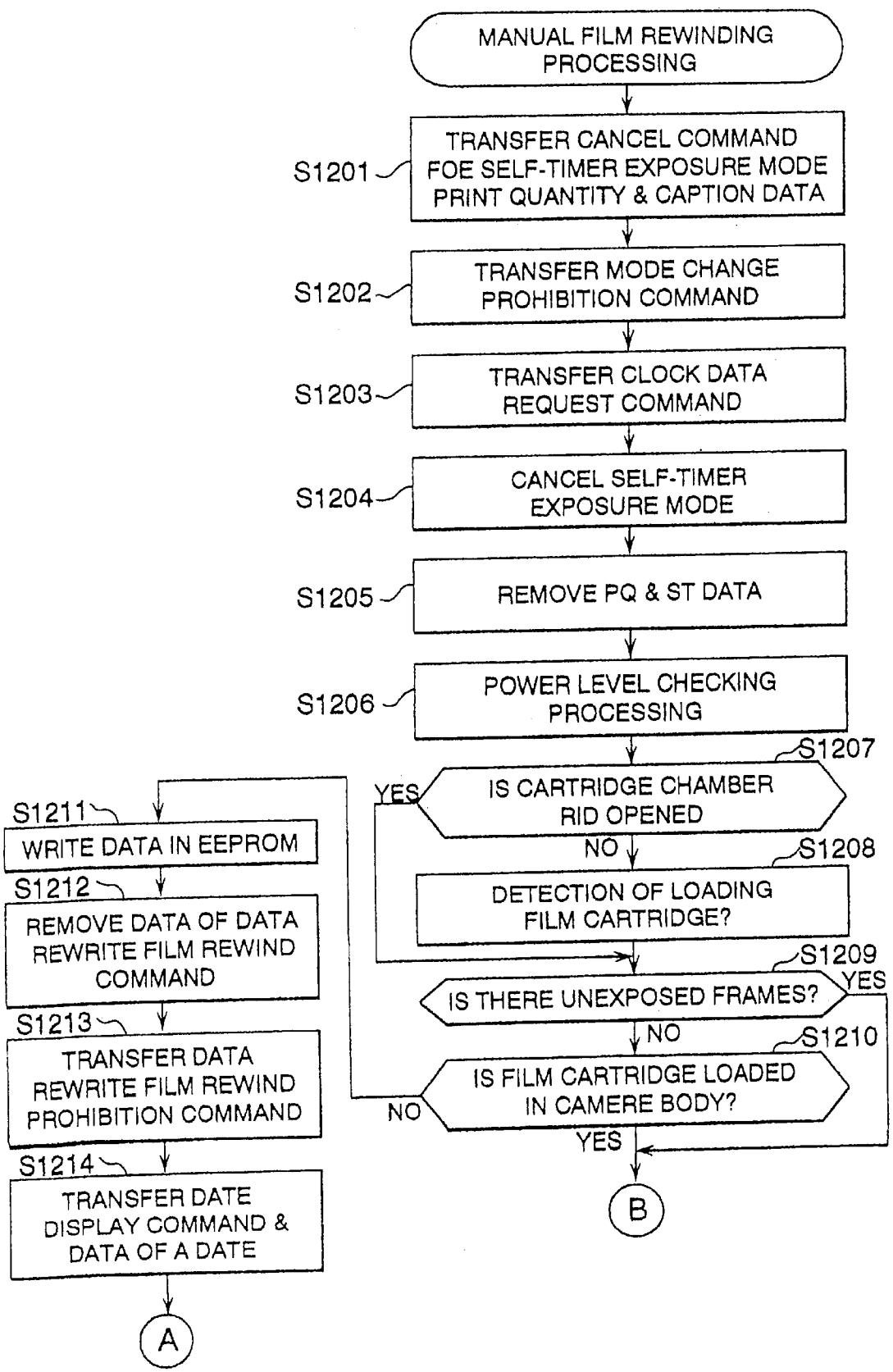

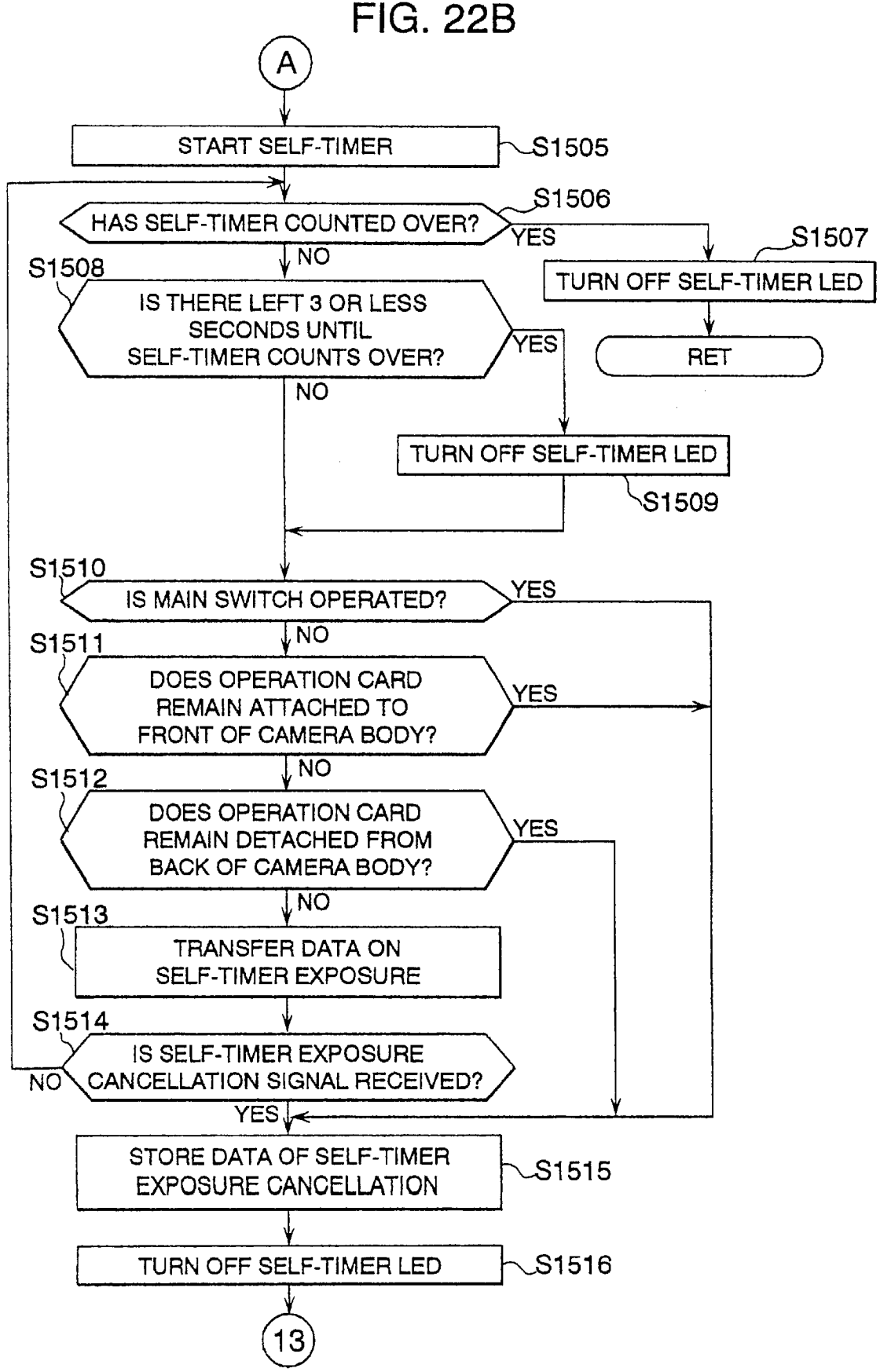

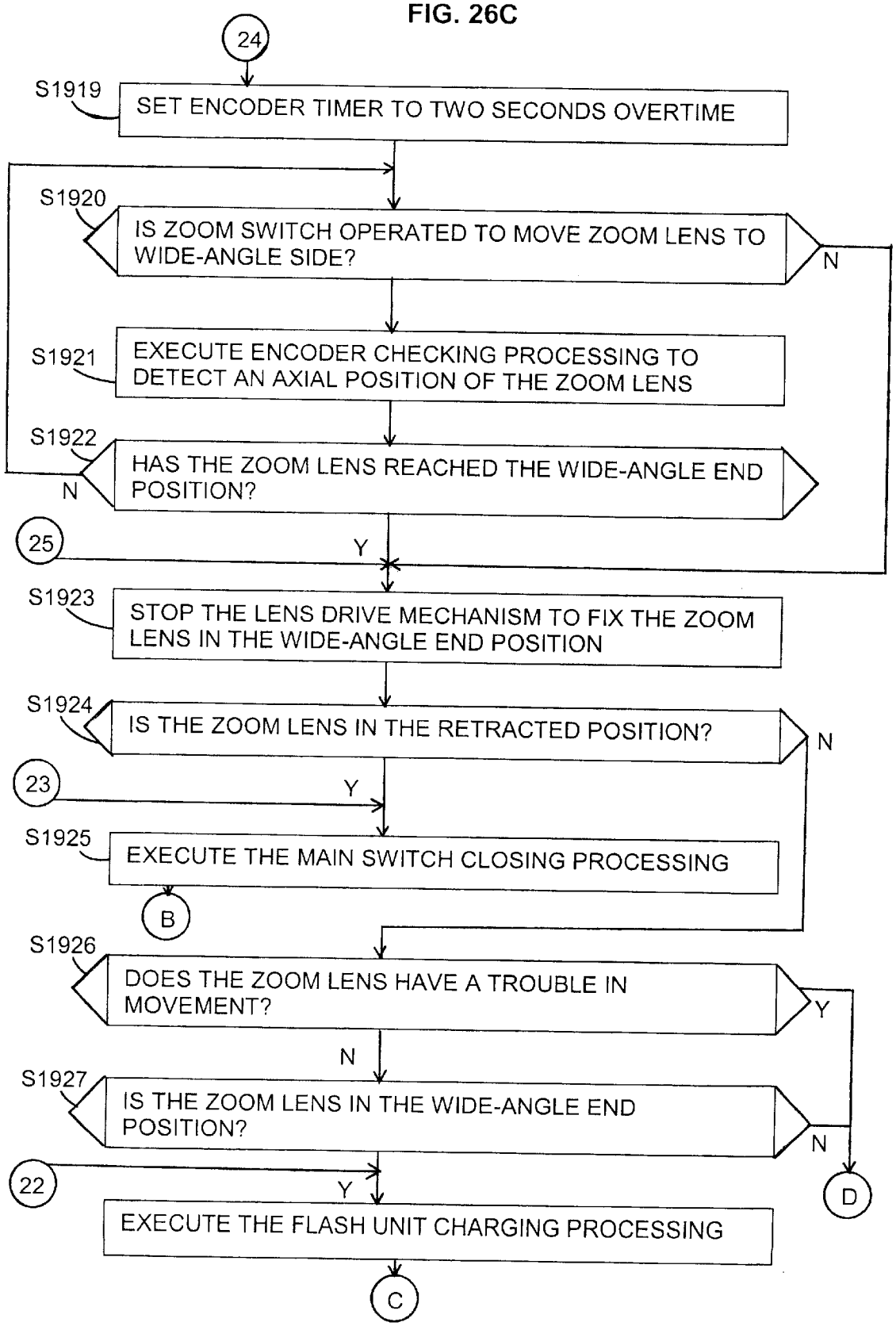

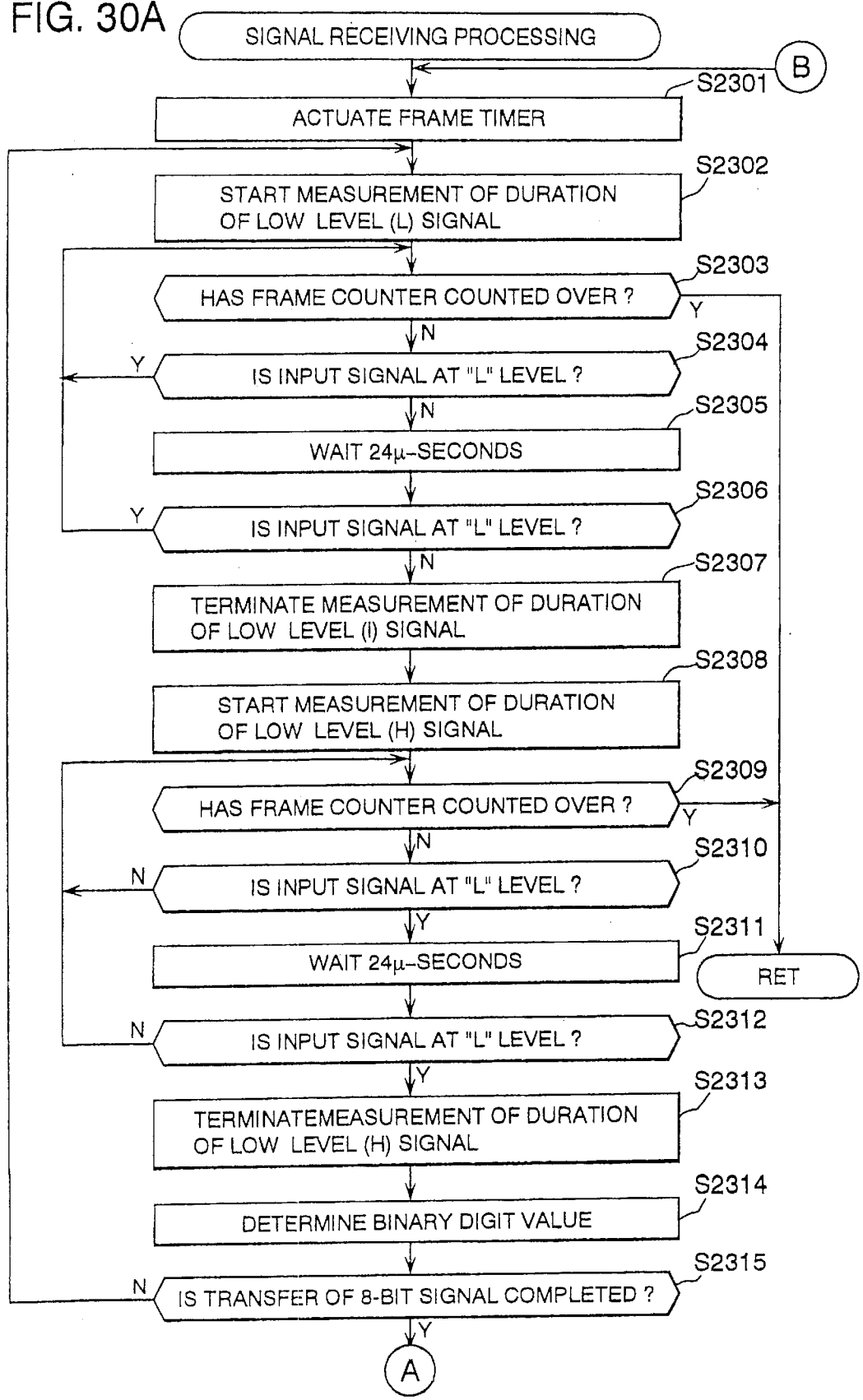

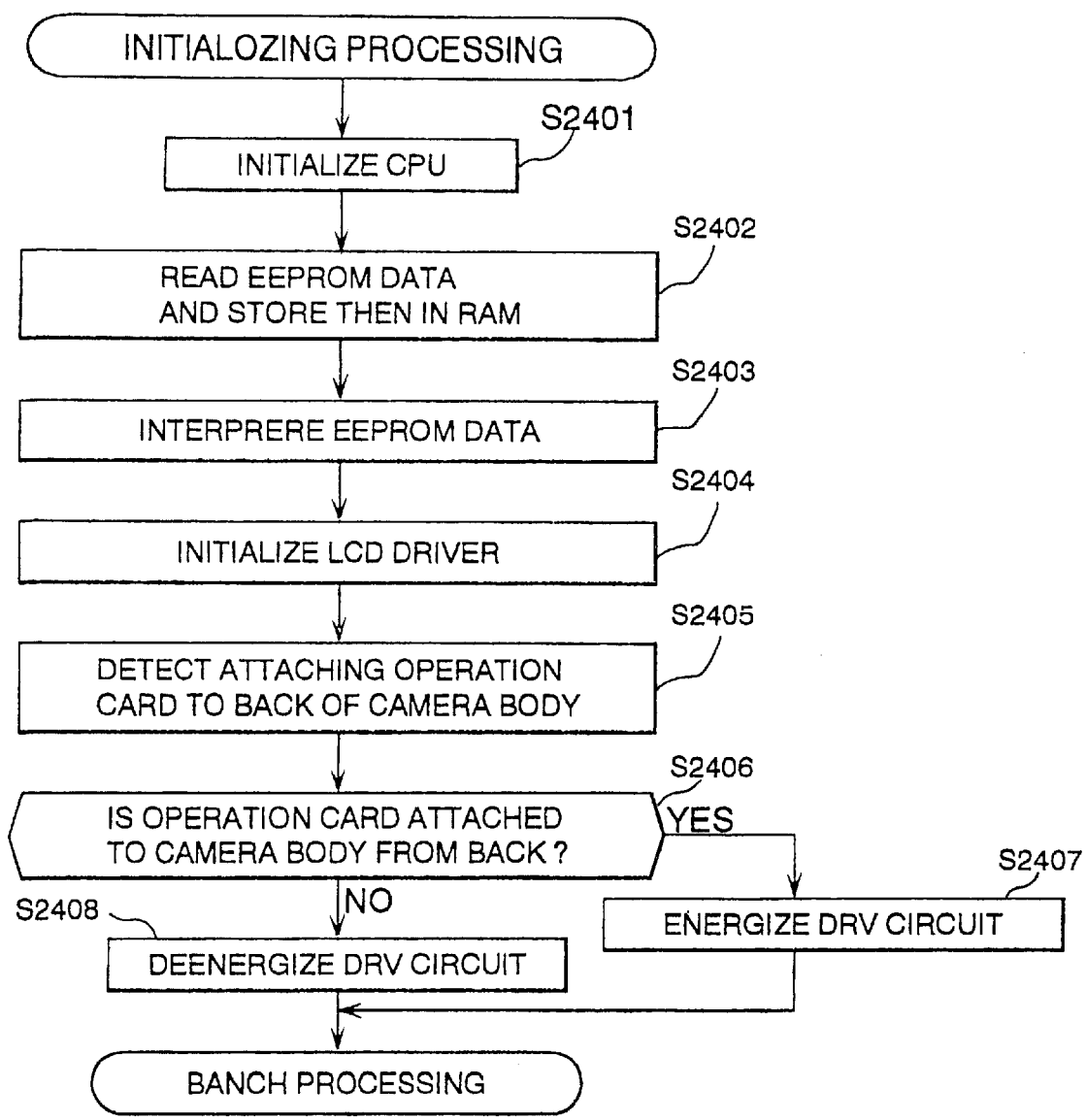

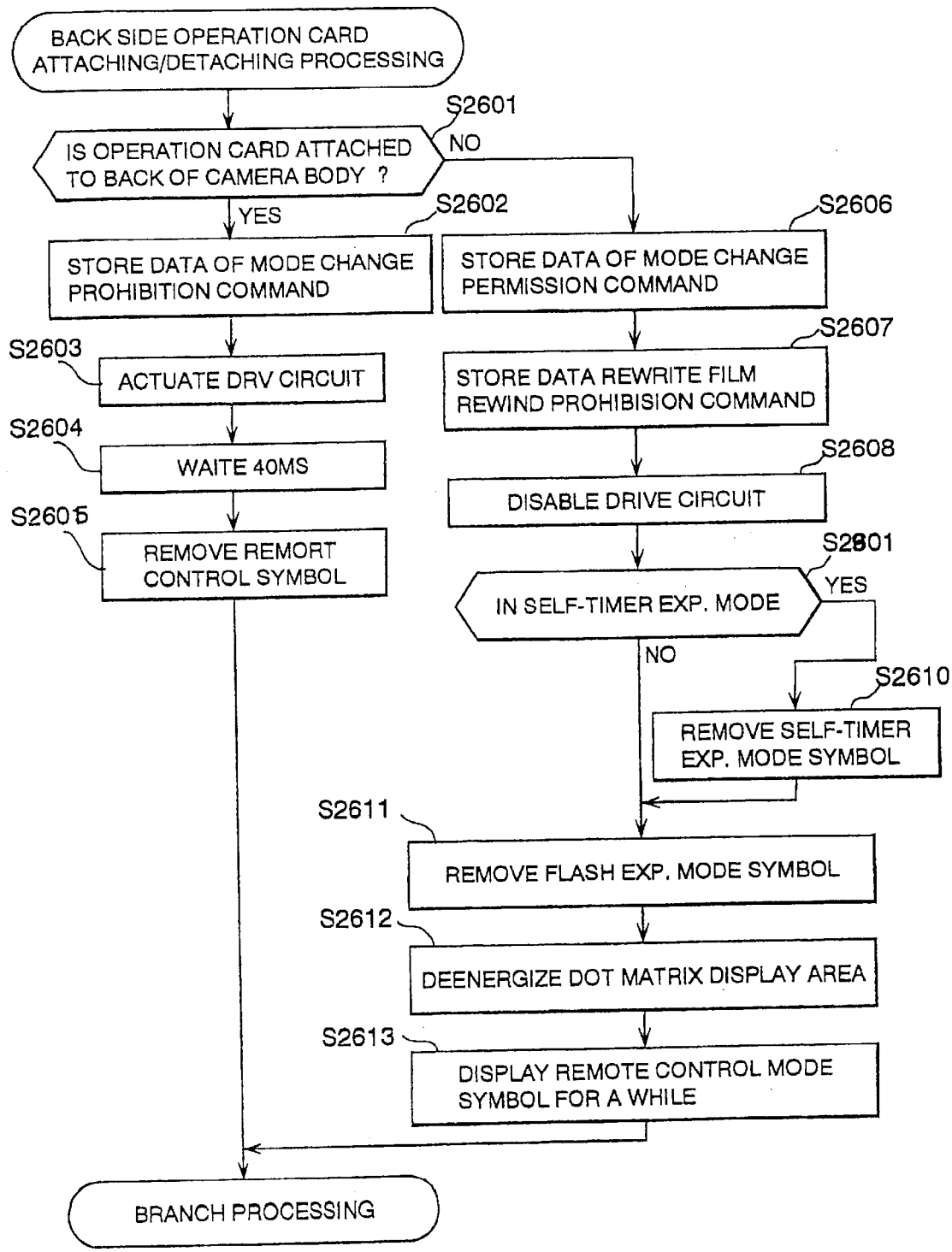

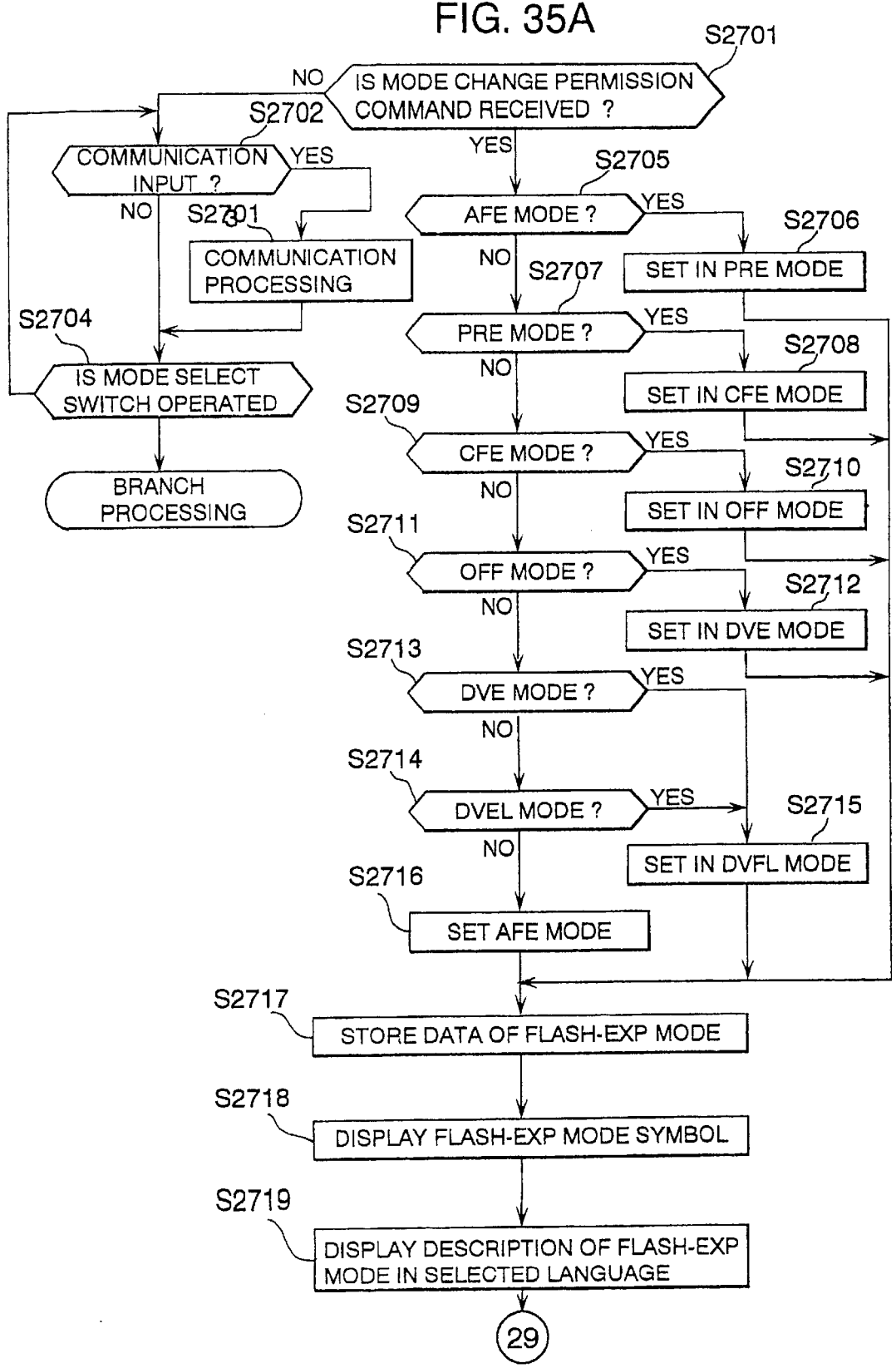

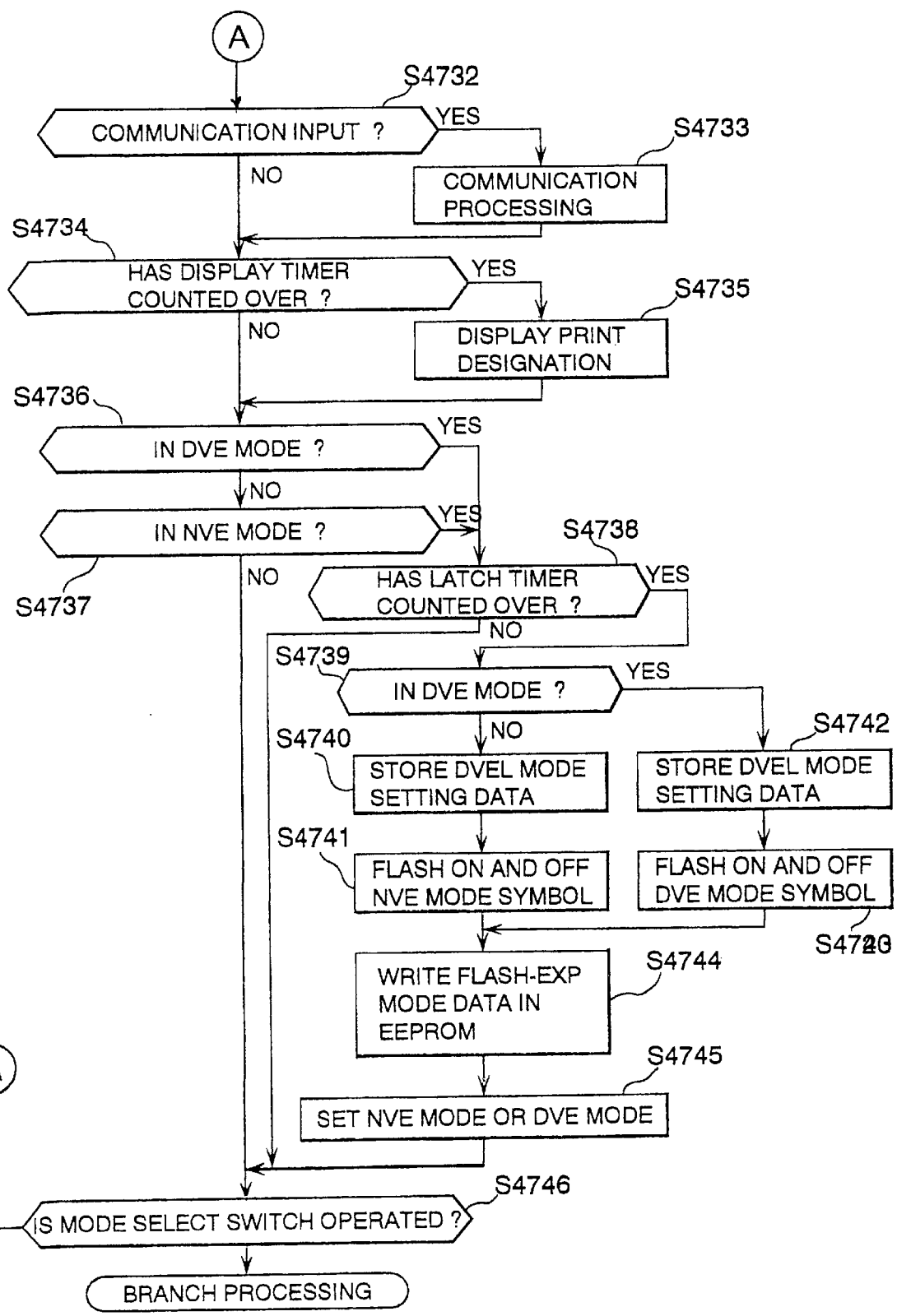

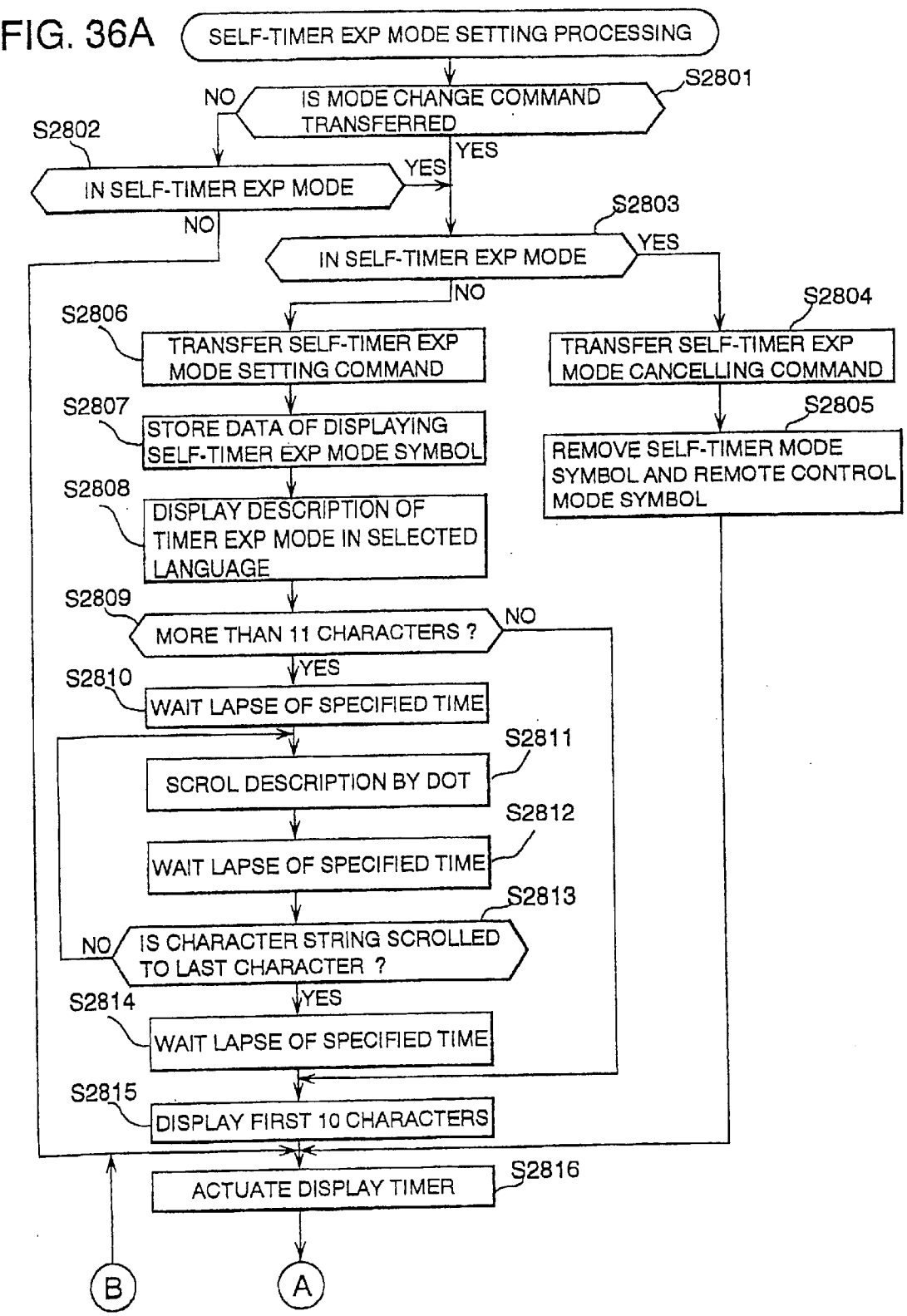

FIG. 42A
FIG. 42B
FIG. 42C
FIG. 42D
FIG. 42E
FIG. 42F

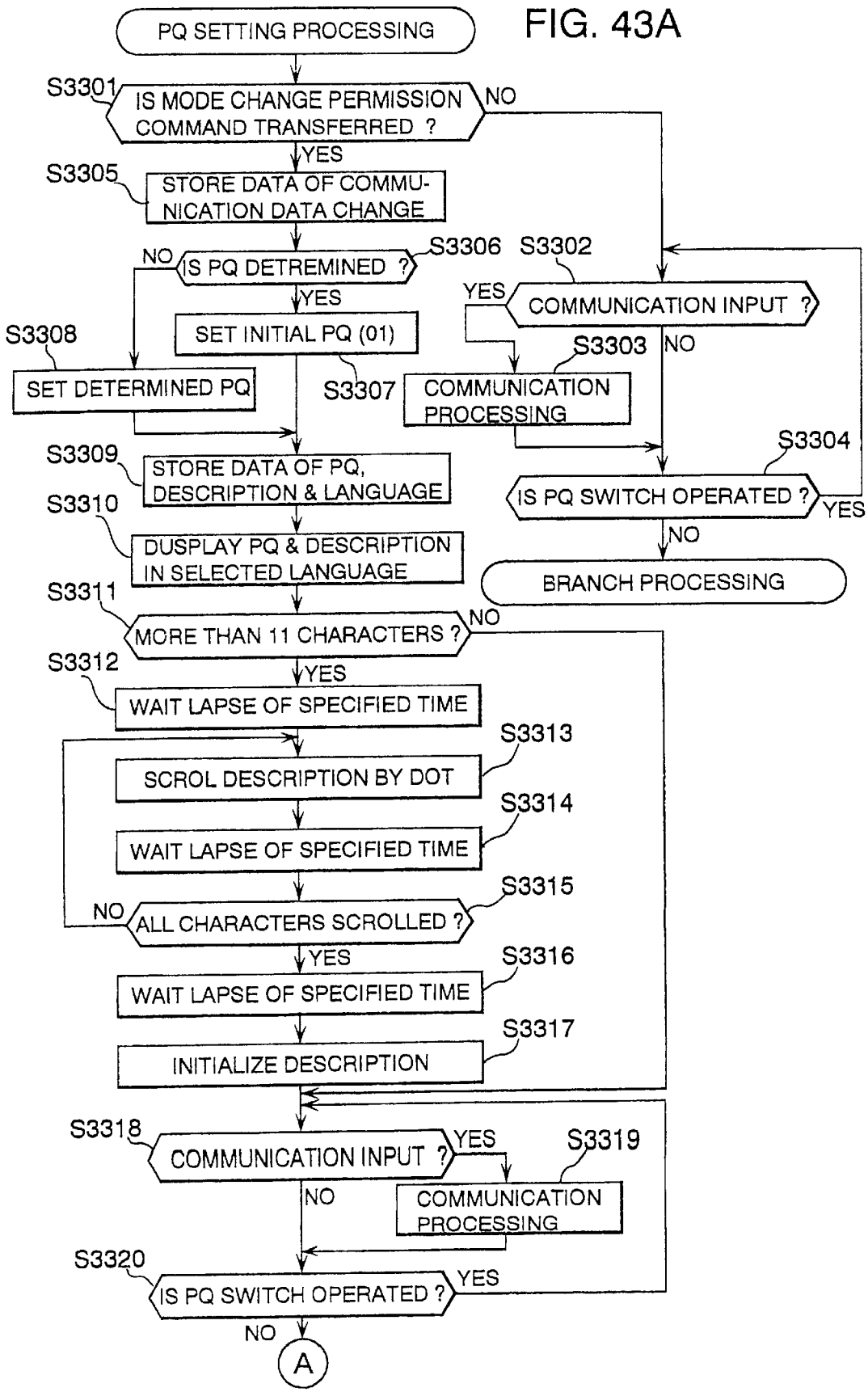

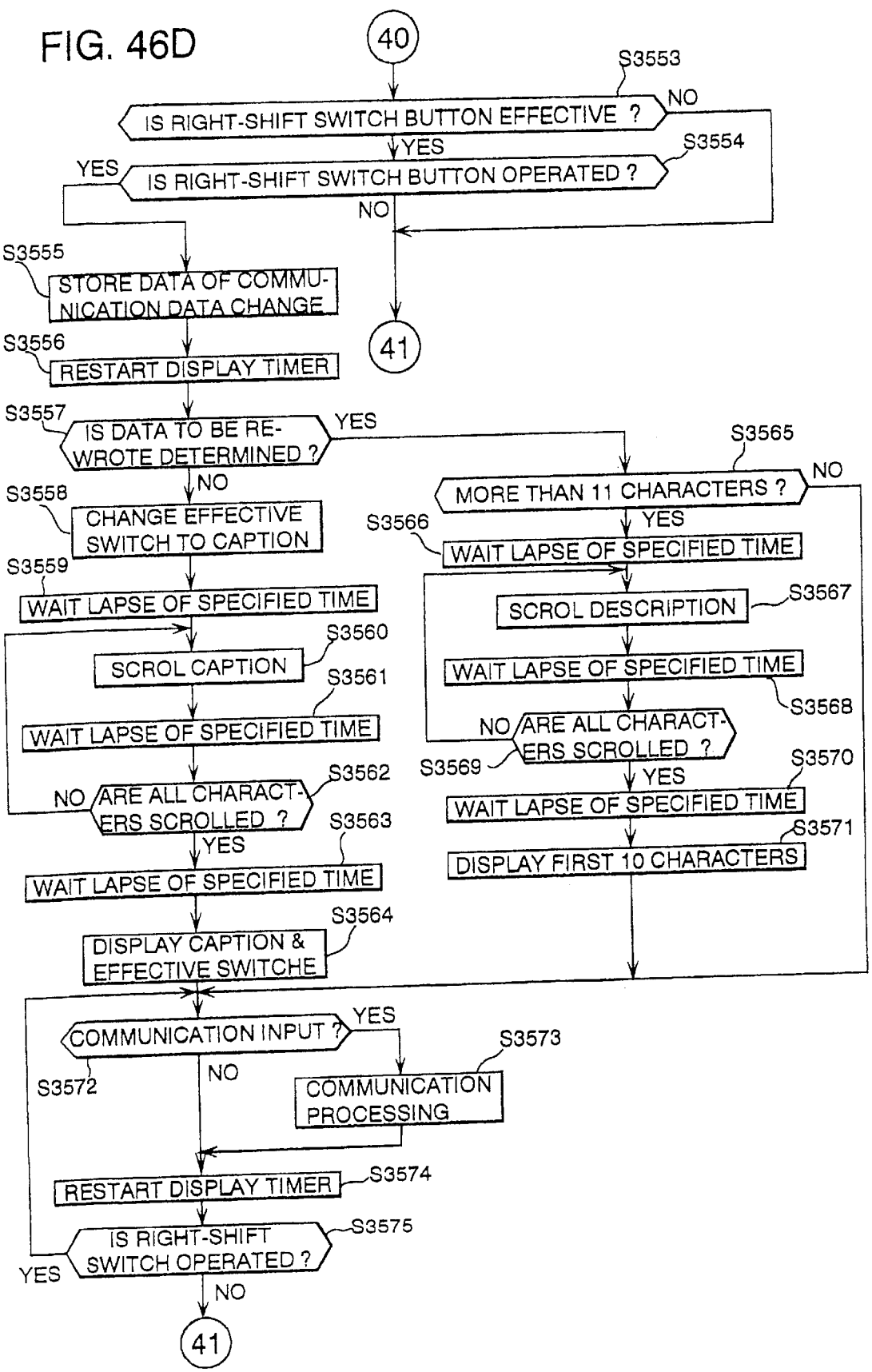

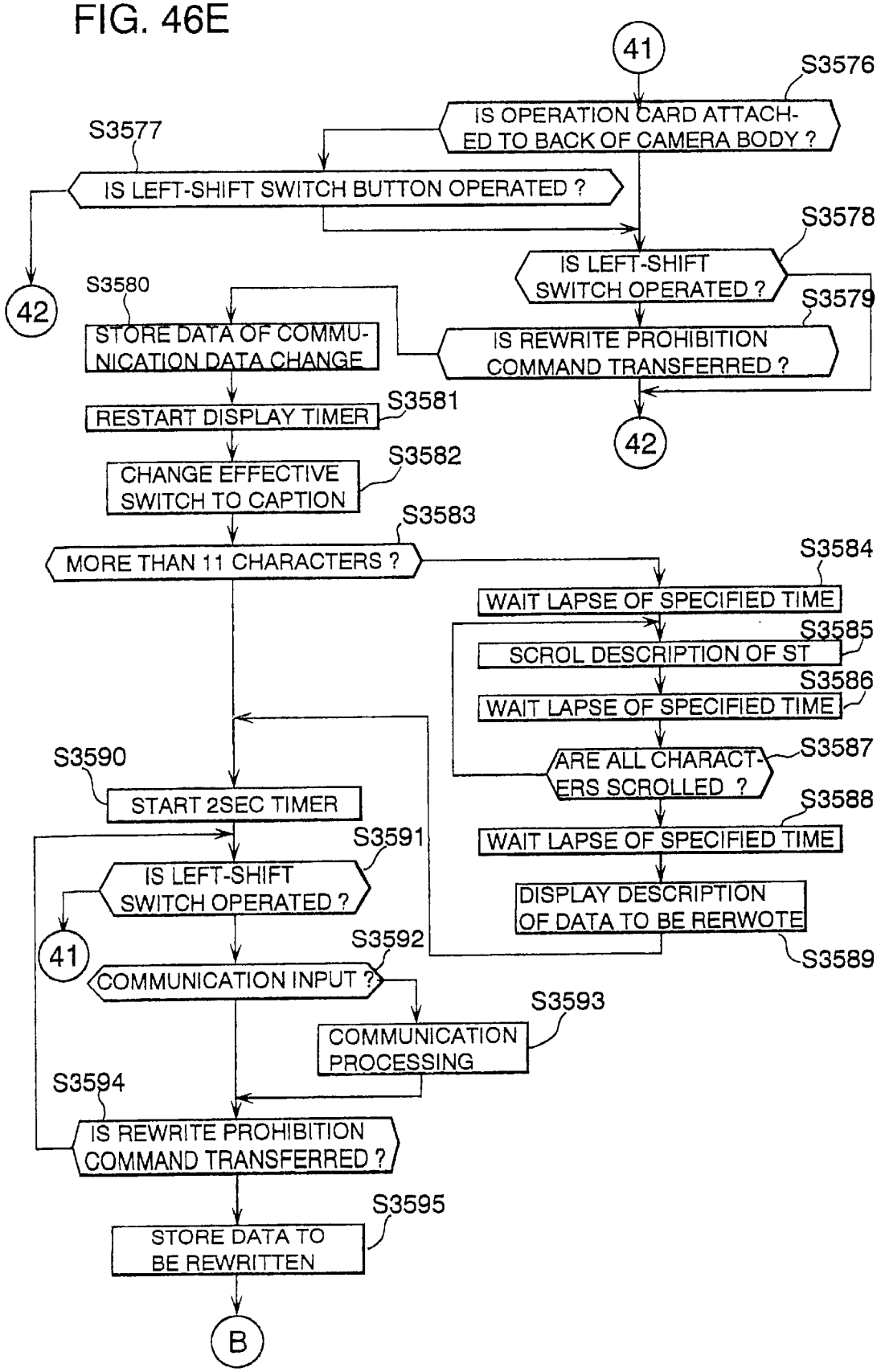

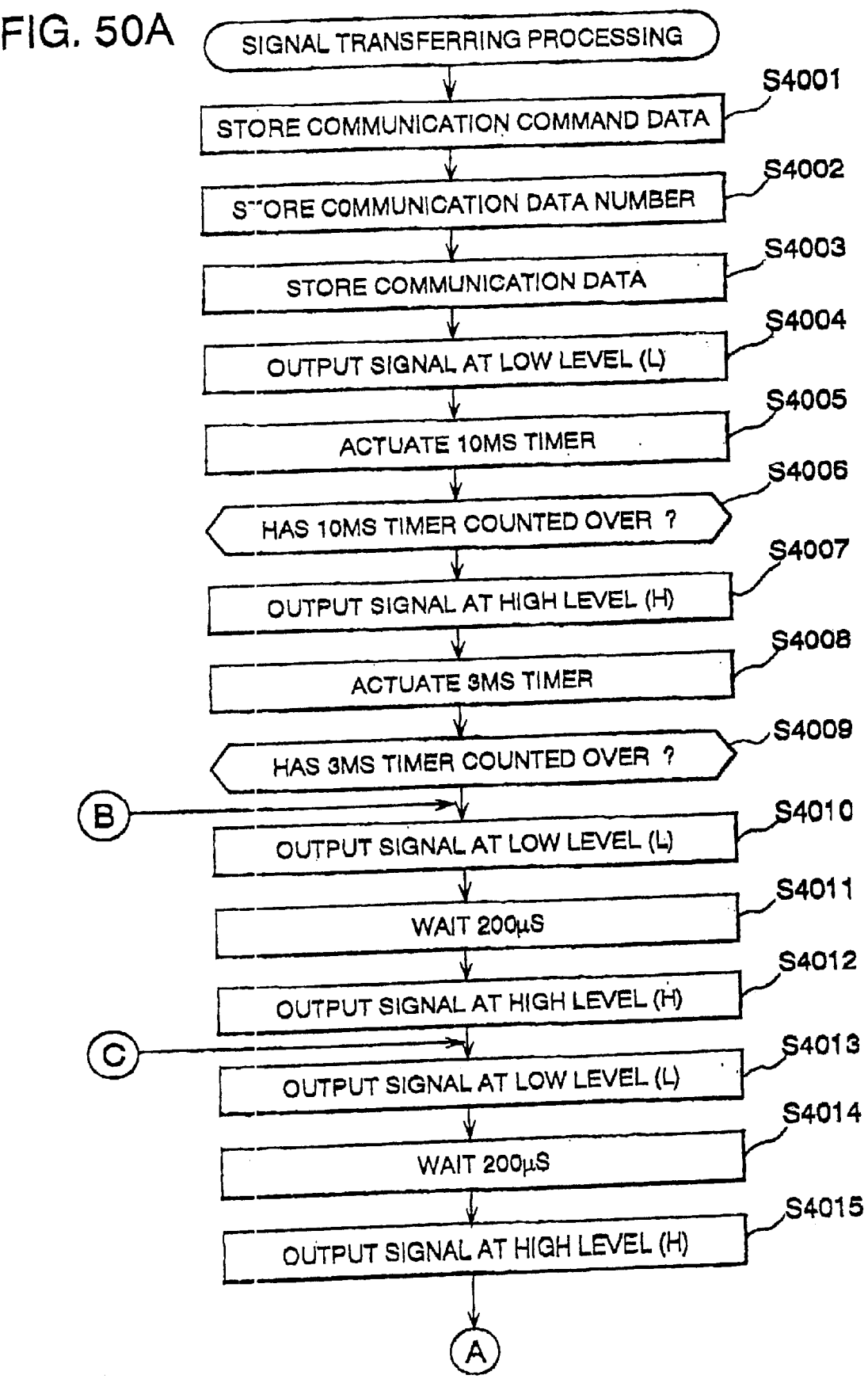

REMOTELY CONTROLLABLE CAMERA SYSTEM

BACKGROUND OF THE INVENTION

1. Field of the Invention

This invention relates to a photographic camera system and, in particular, to a remotely controllable camera system comprising a camera body and an operation card functioning as a lens cover.

2. Description of Related Art

One of conventional types of cameras comprises a camera body equipped with all photographic functions and a camera cover or operation card attached to and detached from the camera body. Such a camera is known from, for example, Japanese Unexamined Patent Publication No. 7-244330. This camera cover incorporates a remote control system through which various types of exposures are made. Incorporating a remote control system into the camera cover enables the camera body to be structured small in overall size and provides improved portability of the camera.

However, there is a problem that the camera cover is possibly often lost. For example, in the event where the camera is not remotely operated through the camera cover but directly operated by operating a shutter release switch button equipped on the camera body, the camera cover remains detached from the camera body. In such an event, the camera cover is possibly lost, which leads to aggravation of portability.

SUMMARY OF THE INVENTION

It is accordingly an object of the invention to provide a camera equipped with a remote control system incorporated in a operation card which is conveniently used even in the event the camera is not remotely controlled.

It is another object of the invention to provide a camera equipped with a remote control system incorporated in a operation card which is extremely easy to be handled.

The foregoing objects of the invention are accomplished by providing a camera system which comprises a camera body having at least an exposure means for making exposure and a lens cover type of operation card incorporating a function of operating the camera system which covers the taking lens when attached to the front of the camera body and is remotely operable to manipulate the camera system while remaining detached from the camera body. The operation card is attachable to one of exteriors of the camera body other than the front, for example the back most desirably, and enables the camera system to be operated through the operation card even while it is attached to the one exterior of the camera body. The camera system has an optical communication means provided between the camera body and the operation card which is enabled to operate when the operation card is attached to the one exterior of the camera body, for example, the back of the camera body. Further the camera system may have a display means such as a LCD panel installed to the operation card to display exposure data and/or operation data as a visual image thereon. The data may include a number of prints, a date, a time and a caption to be printed on a picture, data of exposure and camera operation, descriptions and directions relating to camera operation in different languages.

According to the camera system, because the operation card as a lens or camera cover remains attached to the camera body during operating the camera system to take pictures, there is there is no fears that the operation card is lost. Further, even while the operation card functions as a remote control device even while it is detached from the camera, the camera body has no necessity to be equipped with various operation members but only necessity to have an essential operation element such as a main switch for powering on the camera system, which is always desirable to make the camera body simple in structure. The optical communication means avoids electrical parts such as electric contacts necessary to operationally couple the operation card and the camera body, in other words to provide intercommunication of information between the operation card and the camera body, which is always desirable to prevent the camera system from encountering operational errors even if the operation card is frequently attached to and detached from the camera body and ensures reliable intercommunication of information between them. Further the display means, which is preferred to be installed to the operation card at one side which faces the taking lens of the camera body while attached to the front of the camera body, is advantageous to making the camera body small in size.

BRIEF DESCRIPTION OF THE DRAWINGS

The above and other objects and features of the present invention will be understood from the following description of a specific embodiment thereof when considering in conjunction with the accompanying drawings wherein like numerals have been employed in the different figures to denote the same or similar parts or elements and in which:

FIG. 7 is an illustration showing a liquid crystal display panel of the operation card;

FIGS. 8A and 8B are a flow chart illustrating an initialization processing general sequence routine;

FIGS. 10A–10C are a flow chart illustrating a branch processing general sequence routine;

FIGS. 14A–14C are a flow chart illustrating a cartridge rid handling processing control sequence routine;

FIGS. 19A–19C are a flow chart illustrating a manual rewind processing sequence routine;

FIGS. 22A and 22B are a flow chart illustrating a self-timer shutter release processing sequence routine;

FIGS. 30A and 30B are a flow chart illustrating a signal reception processing sequence routine;

FIG. 32 is a flow chart illustrating a card initialization processing sequence routine;

FIG. 34 is a flow chart illustrating an operation card attaching/detaching processing sequence routine;

FIGS. 35A through 35C are a flow chart illustrating an operation card flash mode processing sequence routine;

FIGS. 36A and 36B are a flow chart illustrating an operation card self-timer mode processing sequence routine;

FIGS. 42A through 42F are illustrations showing an indication of date mode change on the liquid crystal display (LCD) panel;

FIGS. 43A through 43I are a flow chart illustrating a print quantity (PQ) setting processing sequence routine;

FIGS. 46A through 46I are a flow chart illustrating a caption selection processing sequence routine;

FIGS. 50A and 50B are a flow chart illustrating a signal transferring processing sequence routine.

DETAILED DESCRIPTION OF THE SPECIFIC EMBODIMENT

Figure 1:
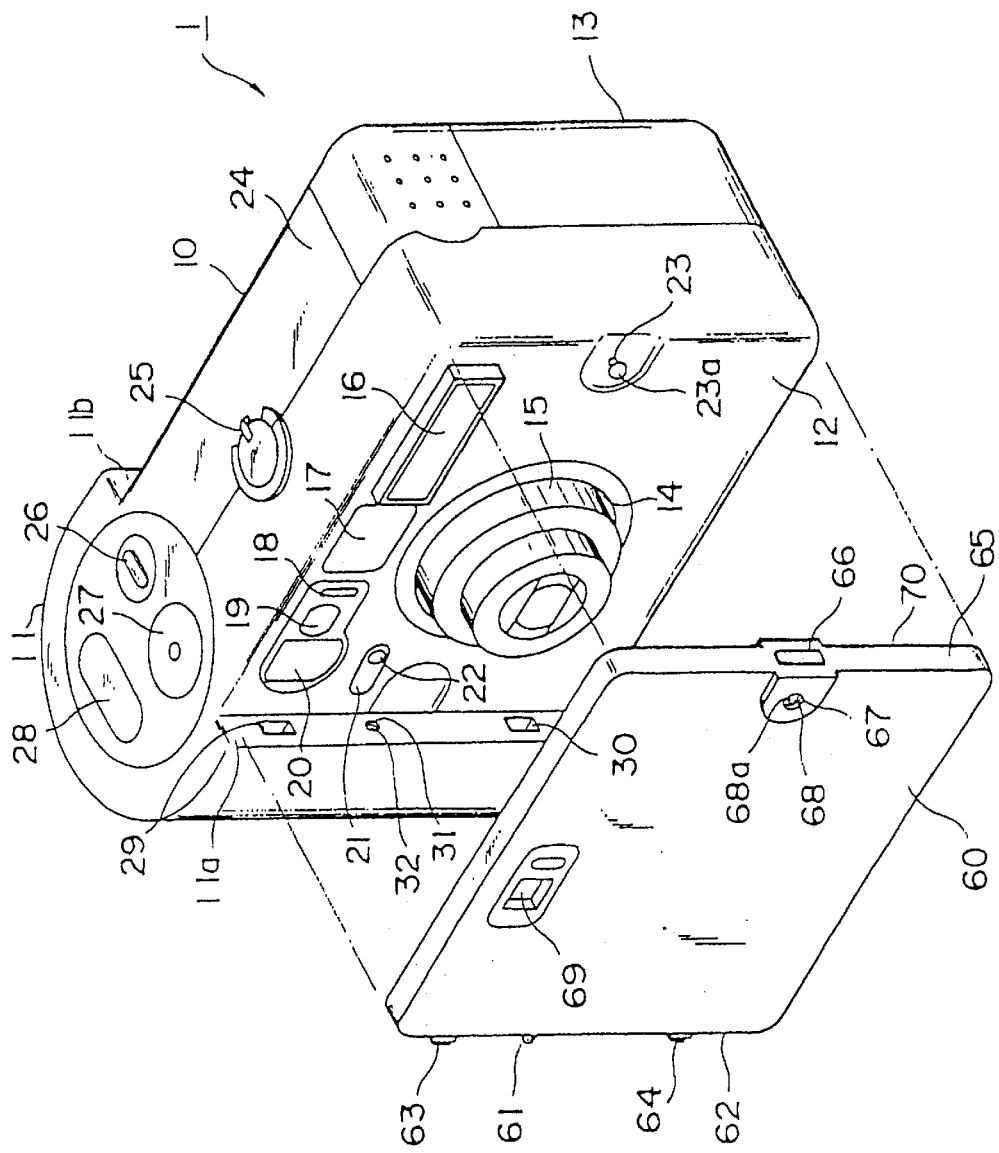
FIG. 1 is a perspective view of a photographic camera in accordance with an embodiment of the invention.

Although the following description will be directed to a photographic camera for use with a film with an electromagnetic recording area by way of example, the invention may be applied to a photographic camera which is designed and adapted to use a conventional type of film contained in, for example, a cartridge having what is called a DX code.

Parts which are not of direct importance to the invention and parts which are purely of conventional will not be described in detail. For example, details of the exposure mechanism including a shutter and a diaphragm, the film advancing mechanism, the focusing mechanism, the finder system, etc. which are necessary to the camera will not be set out in detail since their construction and operation can easily be arrived at by those skilled in the art.

Referring to the drawings in detail, in particular, to FIGS. 1 through 4 showing a camera system 1 equipped with a remote control feature in accordance with an embodiment of the invention, the camera comprises a camera body 10 and a lens cover type operation card 60 detachably fixed to the camera body 10. The operation card 60 incorporates a function of remotely operating the camera body 10 therein as will be described in detail later. Further the operation card 60 is designed and adapted as a lens cover to protect a taking lens and other element on the front of the camera body 10 while attached to the camera body 10 from the back. The operation card 60 is attached to the front of camera body 10 to cover the zoom lens 15 and also attached to one of camera exteriors such as the back 13 of camera body 10. The operation card 60 attached to the back of the camera body 10 enables the photographer to operate and manipulate the camera system 1. The camera body 10, which has a generally rectangularly-shaped outer appearance, is integrally formed with a semi-circular grip section 11 at one of its sides within which a cartridge chamber 54 is formed to receive a film cartridge 200 and other cartridges having special purposes such as cleaning magnetic read/write head. The semi-circular grip section 11 is swelled out from the remaining section and has front and back vertical shoulders 11a and 11b rising approximately perpendicularly from front and back walls 12 and 13 of the camera body, respectively. The vertical shoulders 11a and 11b catch finger tips of a hand which grasps the grip section 11, so as to hold the camera body 10 tightly. The camera system 1 is equipped with a retractable taking lens such as a zoom lens 15. Specifically, the camera body 10 has a lens mount 14 defined by a circular opening 14 formed in the front wall 12 in which the retractable zoom lens 15 slides to protrude outward from and retract into the camera body 10. The camera body 10 is provided with a flash emission window 16 for a built-in electronic flash unit, a window 17 behind which a light emitting element such as an LED and a projection lens of an automatic focusing system are placed, a self-timer window 18, a viewfinder objective 19 and a window 20 behind which a photo-electric element and a lens of the automatic focusing system is placed. These windows are arranged in a approximately straight line above the lens mount 14. The built-in electronic flash unit has a xenon tube disposed behind the flash emission window 16. The automatic focusing system is of an active type, which comprises the light emitting element capable of projecting a light beam to a subject through the window 17 and the photo-electric element capable of receiving a reflected beam from the subject through the window 20. A subject distance from the camera system 1 is found based on the received light. A light emitting element such as a light emitting diode (LED) is placed behind the self-timer window 18 to flush on and off while the camera system 1 is a self-timer exposure mode.

The camera body 10 is further provided with a remote control window 21 and a light metering window 22 on one side of the lens mount 14. A photo-electric element such as an infrared photo-diode forming part of a remote camera control system is placed behind the remote control window 21 to receive an infrared light beam from the operation card 60. A photo-electric element such as a CdS is placed behind the light metering window 22 to receive light from the subject and detect the brightness of the subject. An automatic exposure system including a shutter mechanism automatically makes an exposure according to the brightness. The camera body 10 is further provided with a three-way print-type select switch 25, a main switch 26, a shutter release switch 27 and a display panel 28 in the top wall 24. The three-way print type select switch 25 has three select positions for selecting and recording information concerning print types such as normal, high-vision and panoramic prints. The main switch 26 is of a push on-push off type which is pushed once to actuate the camera and pushed again to bring the camera into a standstill. The shutter release switch 27 has a two step stroke, namely a first half stroke for light metering and focusing and a second half stroke for actually making shutter release. The display panel 28, which is comprised of, for example, a liquid crystal display (LCD) element, for displaying information and/or marks or signs concerning camera operation, exposure, a battery and a cartridge. The camera body 10 has a fixing pin 23 which has a hemispheric head 23a and extends forward from the front wall 12 at one end remote from the front vertical shoulder 11a, positioning recesses 29 and 30 and a bore 31 formed in the front vertical shoulder 10a. The fixing pin 23 and the positioning recesses 29 and 30 are engaged with a fixing bore 67 and positioning projections 63 and 64 provided on one side wall 62 of the operation card 60, respectively, to detachably fix the operation card 60 to the camera body 10. Electric terminals 63a and 64a are fixed to the positioning projections 63 and 64, respectively. An attach/detach detection switch 32 is installed in the bore 31 to detect a pin 61 provided on one side wall 62 of the operation card 60 when the operation card 60 is fixed to the camera body 10. The operation card 60 is fixed to the camera body 10 by inserting the pin 61 in the fixing bore 31 sideways and then snapping the fixing bore 67 on the fixing pin 23. The operation card 60 has a retainer mechanism comprising a retainer 68 having a spring loaded V-shaped hook 68a and a release switch button 66. When the fixing pin 23 is inserted into the fixing bore 67, the spring loaded V-shaped hook 68 is automatically brought into engagement with the underside of the hemispheric head 23a of the fixing pin 23 to prevent the fixing pin 23 from escaping out from the fixing bore 67. The spring loaded V-shaped hook 68 is forced sideways by pushing the release switch button 66 to allow the fixing pin 23 to come out of the fixing bore 67.

The camera body 10 at its back wall 13 is provided with a finder eyepiece 41 and a automatic focusing window 42 behind which a light emitting element such as an LED is placed. The finder eyepiece 41 is aligned with a window 69 formed in the operation card 60 while the operation card 60 is attached to the camera body 10 from the back 13. The light emitting element flashes on and off to indicate that the zoom lens 15 on a subject while the shutter release switch 27 remains pushed half. The camera body 10 at its upper corner is provided with a cover 43 for closing an opening of a battery chamber (not shown) in which batteries are received. The camera body 10 further has a fixing pin 51 which has a hemispheric head 51a and extends forward from the front wall 12 at one end remote from the back vertical shoulder 11b, positioning recesses 44 and 45 and a bore 46 formed in the back vertical shoulder 11b. The fixing pin 51 and the positioning recesses 44 and 45 are engaged with the fixing bore 67 and the positioning projections 63 and 64 of the operation card 60, respectively, to detachably fix the operation card 60 to the camera body 10 from the back 13. When the fixing pin 51 is inserted into the fixing bore 67, the spring loaded V-shaped hook 68 is automatically brought into engagement with the underside of the hemispheric head 51a of the fixing pin 51 to prevent the fixing pin 51 from escaping out from the fixing bore 67. The spring loaded V-shaped hook 68 is forced sideways by pushing the release switch button 66 to allow the fixing pin 51 to come out of the fixing bore 67. There are provided electric terminals 44a and 45a (see FIG. 5) in the positioning recesses 44 and 45, respectively. A voltage is applied between the electric terminals 44a and 45a through which the operation card 60 is supplied with the voltage while it is attached to the camera body 10 from the back 13. The camera body 10 is further formed with communication windows 48 and 49 between the positioning recesses 44 and 45 and a center recess 46 between the windows 48 and 49 formed in the back vertical shoulder 11b. An attach/detach detection switch 47 is installed in the center recess 46 to detect the pin 61 on one side wall 62 of the operation card 60 when the operation card 60 is fixed to the camera body 10 from the back 13. The camera body 10 is provided with a light emitting element 110a such as an LED and a photo-electric element 110b such as a photo-transistor (see FIG. 5) in the inside thereof. These light emitting element 110a and photo-electric element 110b are positioned behind the windows 48 and 49, respectively. While the operation card 60 is attached to the camera body 10 from the back 13, optical communication is made between the camera body 10 and the operation card 60 by means of these light emitting element 110a and photo-electric element 110b. The grip section 11 at its back is provided with a zooming switch 50 for actuating a zooming mechanism (not shown) of the zoom lens 15.

Figure 2:
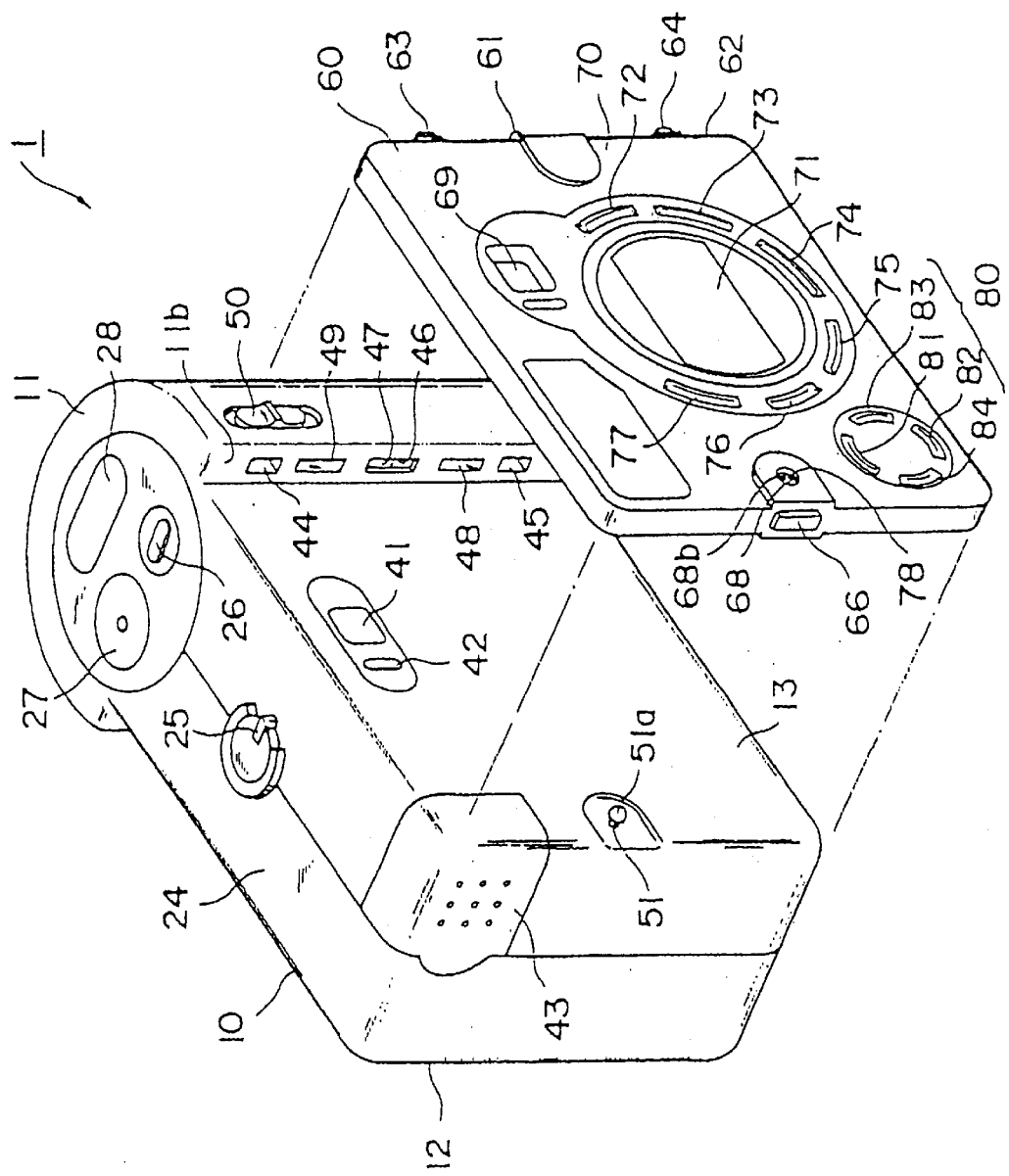
FIG. 2 is a perspective view of a photographic camera in accordance with an another embodiment of the invention.

As shown in detail in FIG. 2, the operation card 60 at the back 70 is provided with a liquid crystal display (LCD) panel 71 (which will be described in detail later) on which exposure information such as a date, an exposure mode, the number of prints and a caption are displayed according to signals from a microprocessor (CPU) 101 (see FIG. 5). Around LCD panel 71 there are provided various switches, namely a date mode select switch 72, a caption select switch 73, a print quantity select switch 74, a flash exposure mode select switch 75, a clear switch 76 and a remote control switch 77 arranged circularly in a clockwise direction in this order. Further, the operation card 60 at the back 70 is provided with a cursor switch 80 comprised of an up-shift switch button 81, a down-shift switch button 82, a right-shift switch button 83 and a left-shift switch button 84.

Figure 3:
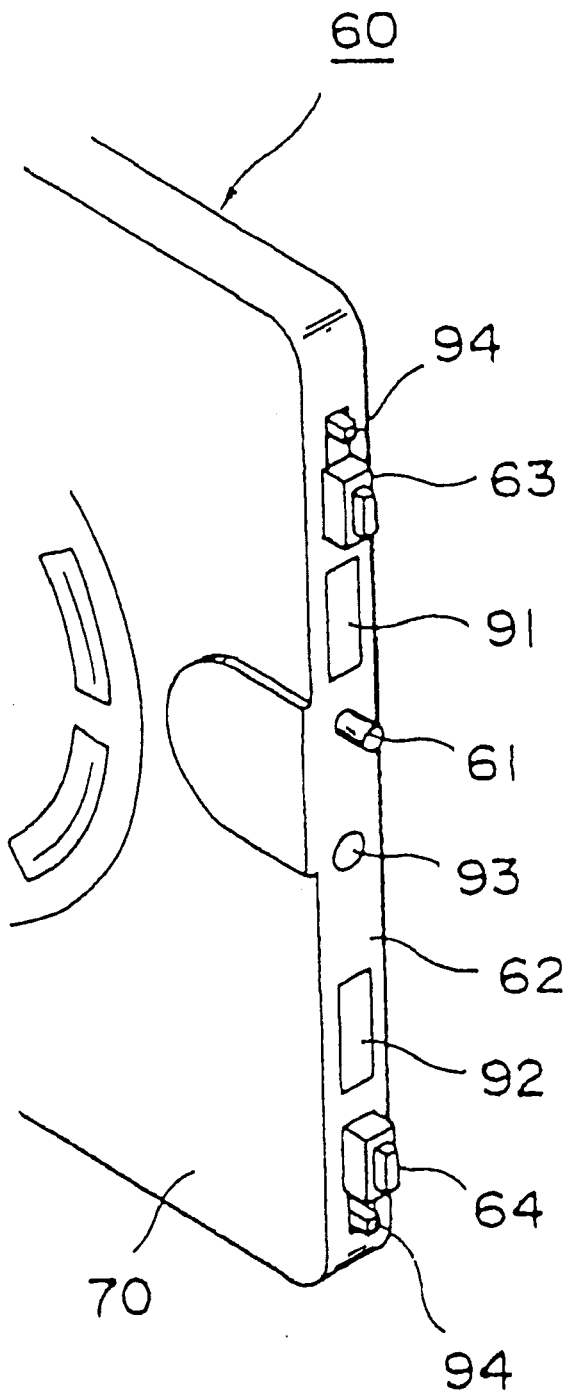
FIG. 3 is a perspective view of a detachable operation card partly cut away.

As shown in detail in FIG. 3 showing the external appearance of the side 62 of the operation card 60, there are provided, in addition to the pin 61 and the positioning projections 63 and 64, communication windows 91 and 92 corresponding in position to the communication windows 48 and 49 of the camera body 10, a light emitting diode (LED) 93 disposed between the communication windows 91 and 92, and a pair of power switches disposed adjacent the positioning projections 63 and 64, respectively. The operation card 60 incorporates a light emitting element 137a (see FIG. 6) such as an light emitting diode (LED) inside the communication window 91 and a photo-electric element 137b (see FIG. 6) such as a photo-transistor inside the communication window 92. Optical communication is made between camera body 10 and the operation card 60 by means of the light emitting element 137a in the operation card 60 and the photo-electric element 110b in the camera body 10 through the communication windows 49 and 91 and by means of the light emitting element 110a in the camera body 10 and the photo-electric element 137b in the operation card 60 through the communication windows 48 and 92. LED 93 projects a light beam when the remote control switch 77 is depressed while the operation card 60 is detached. Each power switch 94 is pushed in by the front vertical shoulder 11a when the operation card 60 is attached to the camera body 10 from the front 12 or by the beck vertical shoulder 11b when the operation card 60 is attached to the camera body 10 from the back 13.

Figure 4:
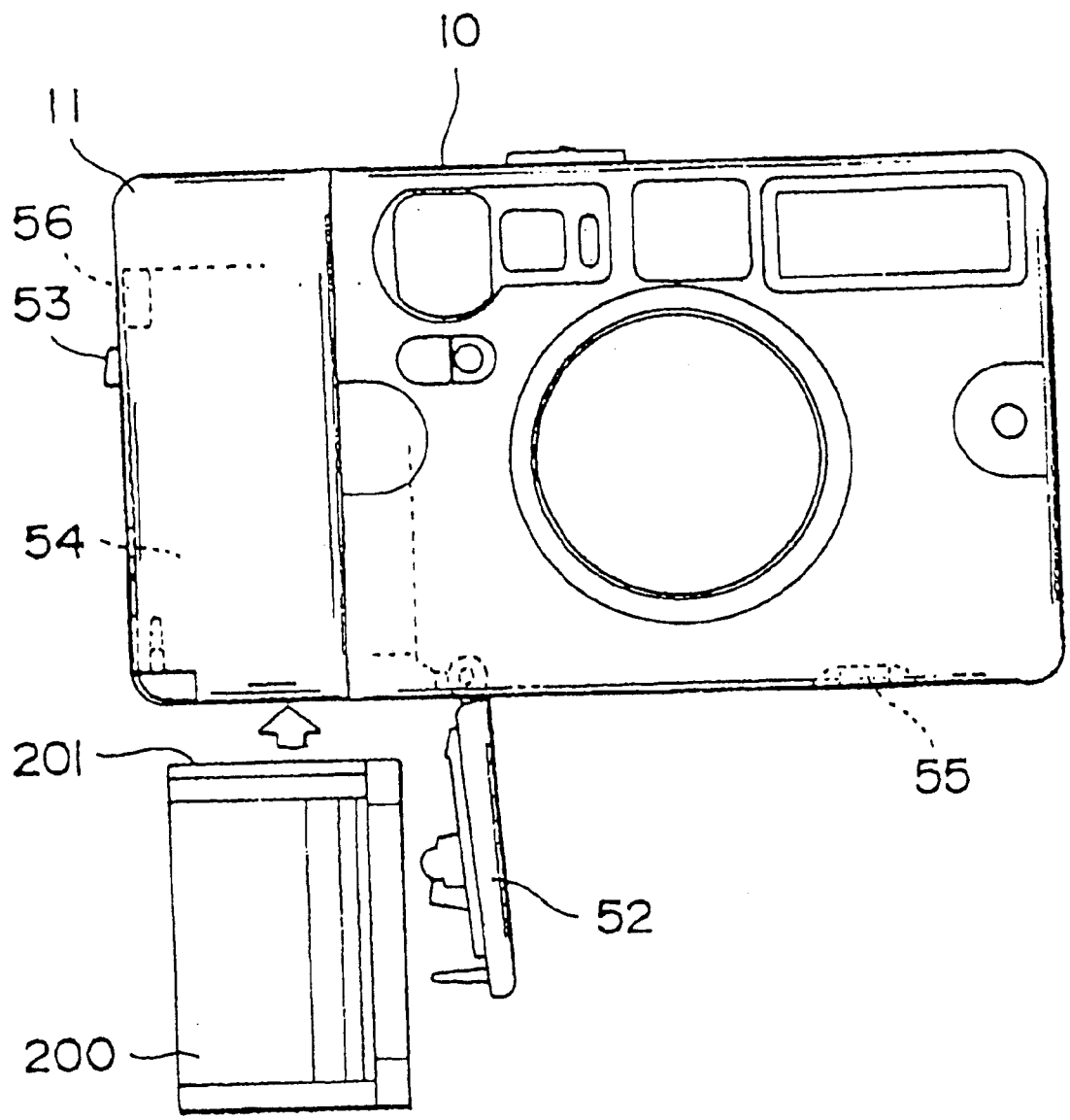
FIG. 4 is a front view of the photographic camera.

As shown in FIG. 4, the camera body 10 is provided with a cartridge chamber rid 52 for opening and closing a bottom opening of the cartridge chamber 54 formed in the grip section 11. The cartridge chamber rid 52 is opened by an electrically controlled retaining and releasing mechanism not shown but well known in the art which is actuated by pushing a switch 53. The camera body 10 is provided with a cartridge sensor 56 within the cartridge chamber 54 and a manual switch 55 at the bottom wall thereof. The cartridge sensor 56 is actuated by the top of a film cartridge 200 to indicates that the camera body 10 is loaded with a film cartridge when the film cartridge 200 is put in the cartridge chamber 54 and the cartridge chamber rid 52 is closed. The manual switch 55 is pushed to actuate an electrically controlled manual film rewinding mechanism.

Figure 5:
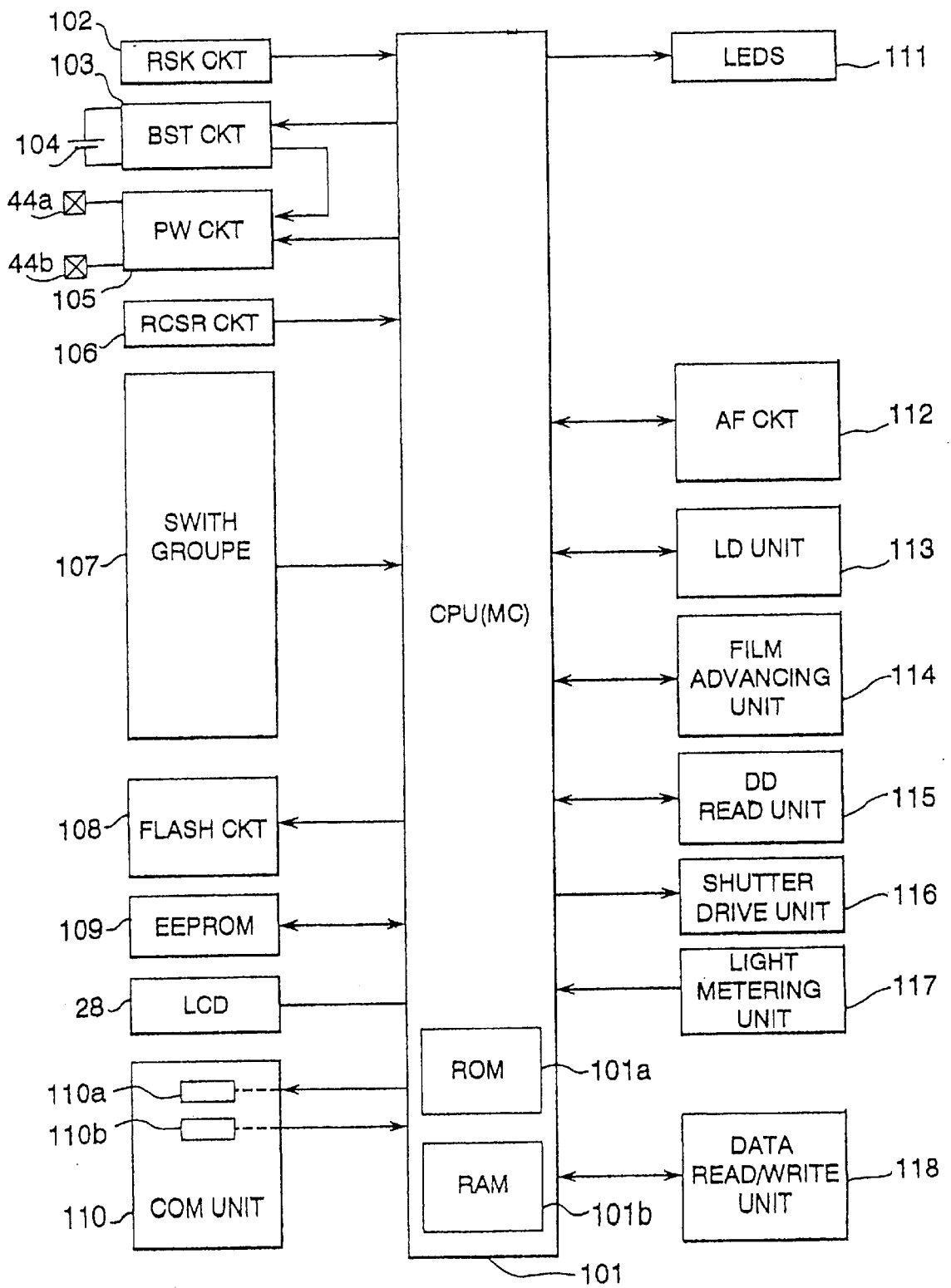
FIG. 5 is a block diagram of a circuit installed in the photographic camera.

FIG. 5 shows CPU 101 in block diagram. CPU 101 is comprised of a microcomputer programmed to execute various control of the camera body 10. CPU 101 is connected to various circuits, switches and optical and electrical elements such as a reset circuit (RST CKT) 102, a booster circuit (BST CKT) 103, a power circuit (PW CKT) 105, a remote control signal receiving (RCSR CKT) circuit 106, a group of switches 107, a flash charging circuit (FLCH CKT) 108, EEPROM 109, LCD 28, a communication unit 110, LED unit 111, an automatic focusing circuit (AF CKT) 112, a lens drive circuit (LD CKT) 113, a film advancing mechanism (FLAD MECH.) 114, a DD read unit 115, a shutter drive mechanism (SHD MECH.) 116, a light metering (LMT) unit 117, and a magnetic data read/write unit 118. CPU 101 incorporates ROM 101a in which control and processing programs are stored, and RAM 101b in which various data are stored during execution of the control and processing. CPU 101 receives commands or instructions by the photographer through the circuits, switches and optical and electrical elements to perform communication between the camera body 10 and the operation card 60. Specifically, the reset circuit (RST CKT) 102 provides a reset signal in response to powering on the camera system 1 to initialize the camera body 10 including CPU 101. The booster circuit (BST CKT) 103 is connected to a battery 104 to boost a voltage supplied by the battery 104 under control by CPU 101 and delivers it to electrically controlled elements in the camera body 10. The power circuit (PW CKT) 105 is connected at its output terminals to the electric terminals 44a and 45a installed in the positioning recesses 44 and 45 and is also connected at one of its input terminals to the booster circuit 103. The voltage boosted by the booster circuit 103 is supplied to the power circuit 105 and then imparted to the operation card 60 through the electric terminals 44a and 45a under control by CPU 101. The remote control signal receiving circuit (RCSR) 106 includes the photo-electric element placed behind the remote control window 21 to receive an infrared light beam from the light emitting diode (LED) 93 installed in the operation card 60 and sends optical data to CPU 101. The group of switches 107 includes the main switch 26 through which an instruction is sent to CPU to switch the camera body 10 between a state ready for exposure and a state unsuited for exposure, the three-way print type select switch 25, the shutter release switch 27, the attach/detach detection switch 32 for detecting the operation card 60 attached to the camera body 10 from the front 12, the attach/detach detection switch 47 for detecting the operation card 60 attached to the camera body 10 from the back 13, the zooming switch 50, the switch 53 for opening the cartridge chamber rid 52, the manual film rewind switch 55 and the cartridge sensor 56. The flash charging (FLCH CKT) circuit 108 includes the xenon tube disposed behind the flash emission window 16 which is excited to flash according to selected exposure modes under control by CPU 101. EEPROM 109 stores data, for example, on the number of unexposed frames, current conditions of the camera system 1 and various control parameters. The communication unit 110 includes the light emitting element 110a and the photoelectric element 110b positioned behind the windows 48 and 49, respectively, of the camera body 10. While the operation card 60 is attached to the camera body 10 from the back 13, optical communication is made between the photo-electric element 110b in the camera body 10 and the light emitting element 137a in the operation card 60 through the communication windows 49 and 91 and between the light emitting element 110a in the camera body 10 and the photo-electric element 137b in the operation card 60 through the communication windows 48 and 92. Specifically, optical data is sent from the camera body 10 to the operation card 60 under control by CPU 101 through the light emitting element 110a of the communication unit 110 and the photo-electric element 137b in the operation card 60, and from the operation card 60 to the camera body 10 through the light emitting element 137a in the operation card 60 to the photo-electric element 137b of the communication unit 110 and then to CPU 101. The LED unit 111 includes all LED elements including the LED placed behind the self-timer window 18 and the LED placed behind the automatic focusing window 42 in the camera body 10 which emit light beams under control by CPU 101. The film advancing mechanism 114 unwinds and advances the film from the film cartridge 200 one frame every exposure and rewinds it into the film cartridge 200. The data disk read unit 115 reads information relating to the film in the film cartridge 200 such as type and speed of the film, the number of available or unexposed frames of the film and information relating to whether the film is virgin, partly exposed, fully exposed or developed and sends the data to CPU 101. These information are recorded in the form of bar codes on a data disk 201 (see FIG. 4) attached to the top of the film cartridge 200. This data disk 201 changes its angular position relative to the cartridge 200 to indicate states of use of the film according to positions. The light metering unit 117 includes a photo-electric element such as a CdS placed behind the light metering window 22 to receive light from a subject and detect the brightness of the subject. The magnetic data read/write unit 118 writes data such as a date of exposure, the number of prints and a caption on a magnetic recording area associated with each frame of the film and reads the information.

Figure 6:
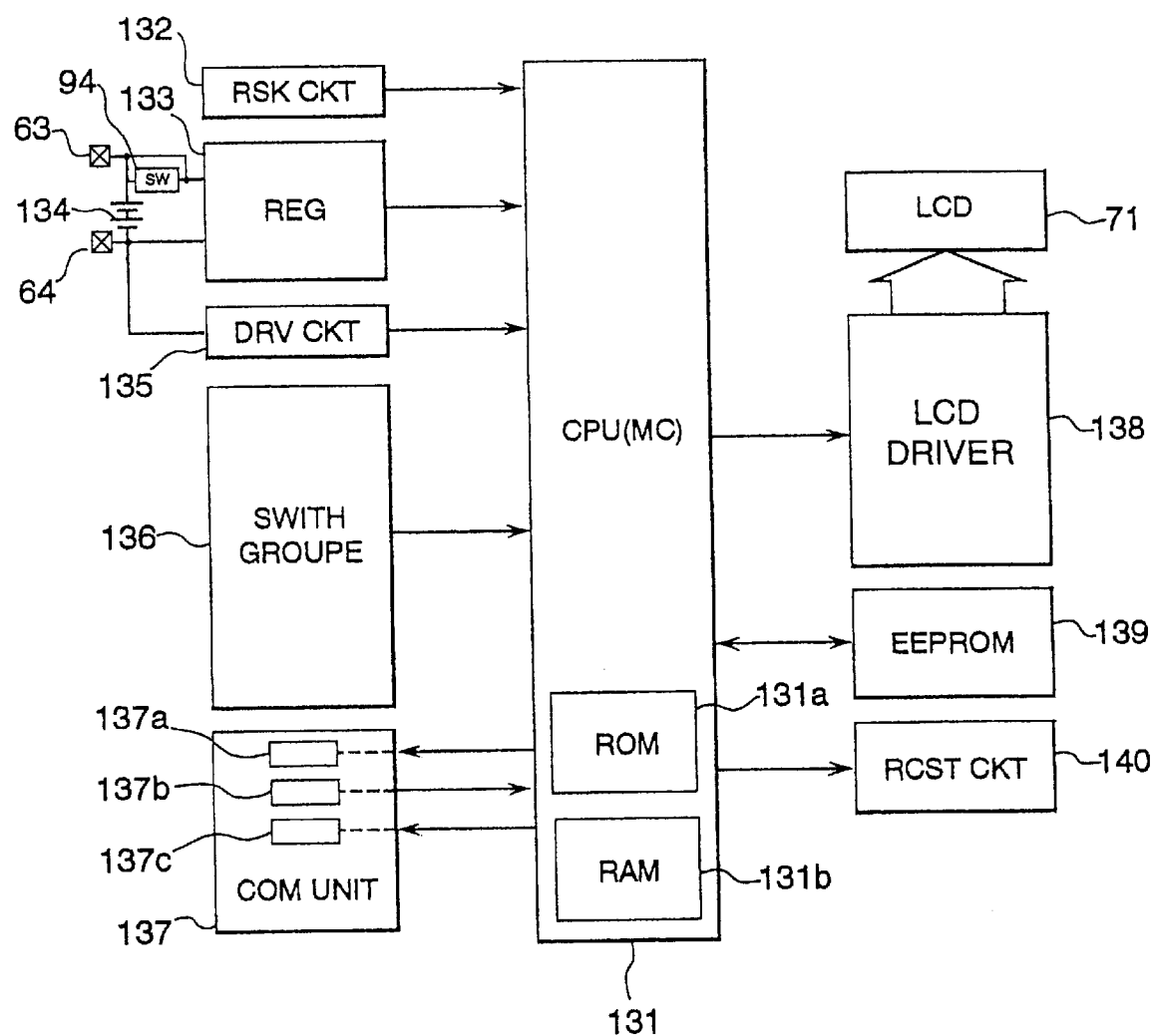
FIG. 6 is a block diagram of an electrical structure of the operation card.

FIG. 6 shows a CPU 131 in block diagram which is comprised of a microcomputer programmed to execute various control of the operation card 60 and its associated electric elements.

As shown in FIG. 6, CPU 131 is connected to various circuits, switches and optical and electric elements such as a reset circuit (RST CKT) 132, a regulator circuit (RGL CKT) 133, a drive circuit (DRV CKT) 135, a group of switches 136, a communication unit 137, LCD driver 138, EEPROM 139, and a remote control signal transfer circuit (RCSR CKT) 140. CPU 101 incorporates ROM 131a in which control and processing programs are stored and RAM 101b in which various data are stored during execution of the control and processing. CPU 131 governs communication between the camera body 10 and the operation card 60 through these elements.

The reset circuit 132 provides a reset signal in response to powering on the camera system 1 to initialize the operation card 60 including CPU 131. The regulator 132 has input terminals which are connected to the electric terminals 63a and 64a fixed to the positioning projections 63 and 64 and between which the power switch 94 and a built-in battery 134 are in series. The power switch 94 turns on and off according to whether the operation card 60 is attached to the camera body 10 from the front 12 or the back 13. That is, the power switch 94 remains turned on while the operation card 60 is detached from the camera body 1 and remains turned off while the operation card 60 is attached to the camera body 10 from the front 12 or the back 13. The regulator circuit 133 stabilizes a source voltage supplied by the built-in battery 134 and delivers it to each electric element of the operation card 60. While the power switch 94 is turned off by attaching the operation card 60 to the camera body 10 from the back 13, the regulator circuit 133 receives a voltage supplied by the power circuit 105 and stabilizes and delivers it to each electric element of the operation card 60. On the other hand, while the power switch 94 is turned off by attaching the operation card 60 to the camera body 10 from the front 12, the regulator circuit 133 is supplied with no voltage by the power circuit 105. The drive circuit 135 has an input terminal connected to the electric terminal 64a positioned adjacent to the positioning projection 64 to detect a potential at the electric terminal 64a based on which CPU 131 determines whether the operation card 60 is attached to the camera body 10 from the back 13.

The group of switches 136 includes the date mode select switch 72, the caption select switch 73, the print quantity select switch 74, the flash exposure mode select switch 75, the clear switch 76, the remote control switch 77 and the cursor switch 80. The date mode select switch 72 is used to select one of date display modes. The title select switch 73 is used to select one of a number of predetermined captions in different languages. The print quantity selection switch 74 is used to select the number of prints made from each exposed frame. The flash exposure mode select switch 75 is used to select one of various programmed exposure modes. The clear switch 76 is used to cancel selected data such as the number of prints and the caption and language. The remote control switch 77 is used to select one of control modes, namely a remote control mode in which the camera system 1 is remotely controlled by means of the operation card 60 detached from the camera body 10 and a self-timer mode in which an exposure is self-timed by means of the operation card 60 attached to the camera body 10 from the back 13.

The communication unit 137, which includes the light emitting element 137a and the photo-electric element 137b placed behind the communication windows 91 and 92, and a drive circuit 137c, makes optical communication between the camera body 10 and the operation card 60 while the operation card 60 remains attached to the camera body 10 from the back 13. For optical communication from the operation card 60 to the camera body 10, CPU 131 causes the light emitting element 137a to provide optical signals to the photo-electric element 110b in the camera body 10. On the other hand, for communication from the camera body 10 to the operation card 60, CPU 131 receives optical signals provided by the photo-electric element 110a in the camera body 10 and detected by the light emitting element 137a. In this manner inter-communication between the camera body 10 and the operation card 60 is performed between the communication units 110 and 137. Data transferred between the camera body 10 and the operation card 60 includes at least data necessary to control the operation card 60 and data relating an exposure mode, a language, a caption and print quantity. The drive circuit 137c governs operation of the light emitting element 137a and the photo-electric element 137b under control by CPU 131. The intercommunication between the camera body 10 and the operation card 60 is executed according to a specified protocol. For example, an optical signal transferred between the camera body 10 and the operation card 60 is comprised of a header, a command, a data number and data "n" arranged in this order. The utilization of communication protocol ensures for data transmission with an effect of improving the reliability of optical communication.

FIG. 7 shows an example of LCD panel 71. LCD driver 138, which has display data RAM, character generating ROM (CGROM) and character generating RAM (CGRAM), drives LCD panel 71 to display information under control by CPU 131. The display data RAM stores data as 8-bit character codes to display character strings or the like on dot matrix display areas 71g and 71h of LCD panel 71. The CGROM stores a 5×8 dot character pattern (alphabets, Japanese "kanas", simple patterns such as a rectangle, numerals) corresponding an 8-bit character code. The CGRAM stores eight character patterns which are not defined in a character set in the CGROM. Each character pattern is assigned as an 8-bit character code to a specified area in the CGROM and written in the data display RAM to be displayed on the dot matrix display area 71g or 71h of LCD panel 71. A character string or the like displayed on the dot matrix display area 71g or 71h of LCD panel 71 can be scrolled from the right to the left bit by bit as viewed in FIG. 7 by LCD driver 138 under control by CPU 131. Following shifting one of the character string, another one of the character string appears from the right in the dot matrix display area 71g or 71h of LCD panel 71, so that the whole character string is visibly displayed. The EEPROM 139 stores cartridge identification data (which is hereafter referred to as CID), and data of an exposure mode, a date mode, a language and a caption all of which are entered by the photographer.

The remote control signal transfer circuit 140 includes the light emitting diode (LED) 93 installed in the operation card 60 and causes the light emitting diode (LED) 93 to sends optical data to the camera body 10 under control by CPU 131. The optical data includes, for example, data relating exposure instructions, a language, a caption and print quantity.

Basic operation of the camera system 1 comprising the camera body 10 and the operation card 60 will be described hereafter.

When a battery 104 is loaded in the camera body 10 with the operation card 60 attached to the front 12 of camera body 10, power is supplied to CPU 101 through the booster circuit 103 and a reset signal is provided by the reset circuit 102. CPU 101 receives the reset signal and initializes the camera body 10 and the operation card 60. Specifically, CPU 101, the RAM 101b, the timer, the exposure mechanism including the zoom lens 15 and shutter are initialized. Further, parameters stored in the EEPROM 109 are read out and written in the RAM 101b, and various elements are examined. In response to operation or depression of the main switch 26 or when it is detected through the attach/detach detection switch 47 that the operation card 60 is attached to the camera body 10 from the back 13, CPU 101 activates the camera body 10 so as to be ready for exposure.

The fact that the operation card 60 remains attached to the camera body 10 from the back 13 is recognized by CPU 101 of the camera body 10 through the attach/detach detection switch 47 and by CPU 131 of the operation card 60 through the drive circuit 135. At this time, information entered through the group of switches 135 of the operation card 60 by the photographer are input into CPU 131 of the operation card 60 and then transferred in the form of optical data to CPU 101 of the camera body 10 through the communication units 137 and 110. Further, information entered through the group of switches 107 of the camera body 10 by the photographer are input into CPU 101 of the camera body 10 and then transferred in the form of optical data to CPU 131 of the operation card 60 through the communication units 137 and 110. The fact that the operation card 60 remains detached from the camera body 10 is recognized by CPU 101 of the camera body 10 through the attach/detach detection switch 47 and by CPU 131 of the operation card 60 through the power switches 94. While the operation card 60 remains detached from the camera body 10, it serves as a remote controller or commander. When operating the switch buttons of the switch group 136 of the operation card 60 to enter information into CPU 131 of the operation card 60, the information is instantaneously transferred in the form of optical data from the remote control signal transfer circuit 140 of the operation card 60 to the remote control signal receiving circuit 106 and then to CPU 101 of the camera body 10.

When the cartridge chamber rid 52 is closed after a film cartridge 200 has been loaded in the cartridge chamber 54 of the camera body 200 and detected by the cartridge sensor 56, the data disk read unit 115 reads in CID data on the data disk 201 of the film cartridge 200 and transfers the CID data to the EEPROM 109. The data are stored in the EEPROM 109 and referred every exposure. When the manual film rewind switch 55 is operated, the film is forcedly rewound into the film cartridge 200. Accordingly, the film cartridge 200 can be taken out of the camera body 10 even when the film is only partly exposed. Before taking the film cartridge 200 out of the camera body 10, the photographer can enter CID data and data on the number of unexposed frames into the EEPROM 139 of the operation card 60. Further, the film cartridge 200 containing a film only partly exposed can be reloaded in the camera body 10. In this instance, the data disk read unit 115 detects an angular position of the data disk 201 which indicates a state of use of the film. While the film is unwound out of the film cartridge 200 until a first unexposed frame is placed in an exposure position, the data read/write unit 118 reads magnetic data on the magnetic recording area of the film associated with each exposed frame.

In any case where the operation card 60 is attached to the camera body 10 from the back 13 or where it remains detached from the camera body 10, the camera system 1 is put operative and manipulated. Before taking a picture or pictures, the flash exposure mode select switch 75 is operated to select either one exposure mode. Further, if necessary, switches, for example, the caption select (ST) switch 73, the print quantity select (PQ) switch 74, the print type select switch 25 to select a language and a caption, a print quantity and a type of print, respectively. Data of the selected items are stored in RAM 131b and simultaneously displayed on LCD panel 71 driven by LCD driver 138. While the operation card 60 is attached to the camera body 10 from the back 13, the shutter release switch 27 may be operated to make exposures. On the other hand, while the operation card 60 remains detached from the camera body 10, the shutter release switch 27 is turned off and the remote control switch 77 is activated to make exposures. During exposure, the light metering unit 117 receives light from a subject and detect the brightness of the subject, and the automatic focusing mechanism 112 finds a subject distance from the camera body 10. CPU 101 actuates the lens drive mechanism 113 to shift the zoom lens 15 according to the subject distance until focusing the zoom lens 15 on the subject. Immediately after having focused the zoom lens 15 on the subject, CPU 101 actuates the shutter drive mechanism 116 and the flash charging circuit 108, if the flush exposure mode is selected, to make an exposure with flash light according to the subject brightness. Immediately after the exposure, CPU 101 actuates the film advancing mechanism 114 to advance one frame for another exposure. During advancing the frame, CPU 101 causes the data read/write unit 118 to write data such as a date of exposure, the number of prints and the selected caption in the selected language on the magnetic recording area associated with the exposed frame of the film. When the main switch 26 is pushed while the camera system 1 is put operative, while the operation card 60 is attached to the camera body 10 from the front 12, when both the camera body 10 and the operation card 60 remain not operated for a specified period of time, or when the operation card 60 is detached from the camera body 10 while the remote control mode is cancelled, the camera system 1 is put inoperative.

While the camera system 1 is not used, the operation card 60 is attached to the camera body 10 from the front 12 as a operation card to protect the zoom lens 15 and other optical elements and windows. If the camera system 1 remains inoperative with the operation card 60 attached to the front 12 of camera body 10, it is left as inoperative. However, if the camera system 1 remains operative, it is automatically turned inoperative by attaching the operation card 60 to the camera body 10 from the front 12. That is, CPU 101 detects the operation card 60 attached to the camera body 10 from the front 12 through the attach/detach detection switch 32, CPU 101 is prohibited from providing an exposure command for the shutter drive mechanism 116 even when the shutter release switch 27 is operated. The operation card 60 is attached to the camera body 10 from the front 12 with LCD panel 71 and the switches 73–77 and cursor switch 80 put inside, LCD panel 71 and the switch 73–77 and 80 are protected from being damaged, and a simple external appearance of the camera system 1 is provided. Even if a large size of LCD panel 71 is installed to the operation card 60, there is no fear of damages.

When the camera system 1 is used, the operation card 60 is detached from the camera body 10. In order to detach the operation card 60, while pushing the release switch button 66, the operation card 60 is pulled up at the right side and then drawn to the right until the positioning projections 63 and 64 come out of the positioning recesses 29 and 30, respectively. When the operation card 60 is detached from the camera body 10, the camera system 1 is automatically put ready for exposure. Specifically, detaching the operation card 60 from the camera body 10 pulls the pin 61 out of the bore 31, as a result of which CPU 101 detects that the operation card 60 has been detached from the camera body 10 through the attach/detach detection switch 32 installed in the bore 31, CPU 101 then provides an exposure command for the shutter drive mechanism 116 when the shutter release switch 27 is operated. Accordingly, it is not necessary to operate the main switch 26 after detaching the operation card 60 from the camera body 10 to put the camera system 1 ready for exposure.

While the operation card 60 is attached to the camera body 10 from the back 13, the operation card 60 serves as a means for changing and/or notifying camera settings such as the time and the exposure mode. The operation card 60 is easily attached to the camera body 10 by engaging the positioning projections 63 and 64 with the positioning recesses 44 and 45, respectively from the left as viewed in FIG. 2 and then pushing down it until the fixing pin 51 is received in the fixing bore 67 and engaged by the spring loaded V-shaped hook 68. The operation card 60 is attached to the camera body 10 such that the back of the operation card 60 is accessed directly to operate the switch 73–77 and 80. The switch 73–77 on the operation card 60 are operated to inter-communicate data between the operation card 60 and the camera body 10. Through the switches of the operation card 60 it is made to select a date mode, an exposure mode and the remote control mode, to change the date, to enter or change CID, to display the CID, to set print quantity, to select a caption and a language for the caption, to register titles and captions, to reset or cancel print quantity for a previous exposed frame, and to rewrite or cancel a title or caption for a previous frame.

The date mode select switch 72 is pushed to select date modes. When the date mode select switch 72 is pushed, a drive signal is provided by CPU 101 and sent to LCD driver 138 to drive LCD panel 71 to display characters and numerals. The date mode select switch 72 is continuously pushed until a desired date is displayed on LCD panel 71. There are six date display modes, such as a date mode I in which a date in the form of year/month/day is displayed together with signs "F" and "B" which indicate that the date appears on front and back of a print, respectively, a date display mode II in which a time in the form of hour/minute is displayed together with the signs "F" and "B," a date display mode III in which a date in the form of year/month/day is displayed together with the sign "B," a date display mode IV in which a time in the form of hour/minute is displayed together with the sign "B," a date display mode V in which CID data accompanied by a sign "ID-" is displayed, and a date display mode VI in which nothing is displayed. In the date display mode VI, CID data is displayed only when a CID entry condition is satisfied into EEPROM or when CID data has been registered in EEPROM. Whenever the date mode select switch 72 is repeatedly pushed, the date patterns in these six date modes are rotated on LCD panel 71. In order to correct a date, the cursor switch 80 is operated after continuously pushing the date mode select switch 72 for a predetermined period of time, for example more than two seconds. For example, the up-shift switch button 81 or the down-shaft switch button is pushed to rotate date display patterns of "year/month/day", "month/day/year" and "day/month/year" in turn. In order to enter or correct CID data, after the date mode select switch 72 is pushed to display CID data on LCD panel 71, the cursor switch 80 is operated.

The flash exposure mode select switch 75 is pushed to select one of available flash exposure modes including a red-eye effect preventive flash exposure (PRE) mode in which the flash is fired several times immediately before an exposure, a coercive flash exposure (CFE) mode in which the flash is coercively fired at an exposure, a spontaneous exposure mode in which the flash is not used for an exposure, a distant view flash exposure (DVE) mode in which a subject at infinity is flash exposed, a night view flash exposure (NVE) mode in which a human figure in a night view is flash exposed, an auto-flash exposure (AFE) mode in which the flash is fired according to subjects, a print quantity setting mode and a caption selection mode. Whenever the flash exposure mode select switch 75 is continuously pushed, the available flash exposure modes are displayed on LCD panel 71 in turn and any one of them which is displayed before releasing the flash exposure mode select switch 75 is released. Further, the remote control switch 77 is pushed to select a self-timer exposure mode and a remote control mode.

The print quantity (the number of copies) is selected by pushing the up-shift switch button 81 and/or the down-shift switch button 82 of the cursor switch 80 while pushing the print quantity select switch 74. When pushing the print quantity select switch 74, an initial value such as "P01" indicating one print is displayed on LCD panel 71. The value is changed by an increment of one every time the up-shift switch button 81 is pushed, or changed by a decrement of one every time the down-shift switch button 82 is pushed. The up-shift switch button 81 and/or the down-shift switch button 82 of the cursor switch 80 are repeatedly pushed until a desired number of prints appears on LCD panel 71. The value displayed is fixed and selected by pushing the date mode select switch 72. While the print quantity select switch 74 is operated to select print quantity after the number of prints has been selected once, the clear switch 76 is pushed to display a date with an effect of cancelling the selected number of prints.

Captions or titles and languages are selected by pushing the caption select switch 73 and the cursor switch 80. Specifically, after pushing the caption select switch 73 once, the up-shift switch button 81 and/or the down-shift switch button 82 of the cursor switch 80 are repeatedly pushed to read out and display a great number of prepared captions, which are stored in ROM 131a, one after another on the LCD panel 71. Further, holding the caption select switch 73 pushed for two seconds, the up-shift switch button 81 and/or the down-shift switch button 82 of the cursor switch 80 are repeatedly pushed to display the selected caption in various languages. The selected caption is automatically printed on a picture in the selected language. If the photographer wishes to register some of the prepared captions which are, for example, frequently used, the captions can be registered in EEPROM 139 of the camera system 1. Caption registration is made by pushing the caption select switch 73 while a specific caption is displayed on the LCD panel 71 by the use of the up-shift switch button 81 and/or the down-shift switch button 82 of the cursor switch 80 in the same manner as selecting the caption. Ten frequently used captions may be registered to enable the photographer to do quick selection of a caption.

Print quantity change is executed by the use of the print quantity select switch 74 and the cursor switch 80. Specifically, when pushing the left-shift switch button 84 following pushing the print quantity select switch 74, a print quantity resetting mode is effected for the data relating to print quantity for the previous exposed frame can be rewritten. When pushing the up-shift switch button 81 and/or the down-shift switch button 82 of the cursor switch 80 until a desired print quantity is displayed on the LCD panel 71 and pushing the left-shift switch button 84 again, the old data for the previous exposed frame is replaced with data on the desired print quantity. Similarly, a caption or title can be rewritten by the use of the caption select switch 73 and the cursor switch 80. When pushing the left-shift switch button 84 following pushing the caption select switch 73, the data relating to the caption for the previous exposed frame can be rewritten. When pushing the up-shift switch button 81 and/or the down-shift switch button 82 of the cursor switch 80 until a desired caption or title is displayed on the LCD panel 71 and then pushing the left-shift switch button 84 again, the old caption or title for the previous exposed frame is replaced with the desired caption or title. The clear switch 76 is used to release the print quantity changing mode or the caption selection mode.

Since signal transfer is performed by means of optical intercommunication between the camera body 10 and the operation card 60 remotely placed from the camera body 10, these camera body 10 and operation card 60 have no necessity to be provided with electric contacts or electric interface elements, which removes an occurrence of poor or wrong communication between them even when the operation card 60 is frequently detached and attached to the camera body 10. Even when attaching the operation card 60 to the back 13 of the camera system 10 remaining alive, the camera system 1 is still alive. On the other hand, when attaching the operation card 60 to the back 13 of the camera system 10 which remaining shut off, the attaching of the operation card 60 to the camera body 10 from the back 13 is detected by the attach/detach detection switch 47 installed in the center recess 46. CPU 101 is put alive with an incoming signal from the attach/detach detection switch 47 to send a drive signal to the shutter drive mechanism 116 in response to depression of the shutter release switch 27. Accordingly, there is no necessity to operate the main switch 26 separately from attaching the operation card 60 to the camera body 10, which is always desirable for easy camera operation. On the other hand, when terminating use of the camera system 1, the operation card 60 is detached from the camera body 10. Specifically, while pushing the release switch button 66 to release the V-shaped hook 68 from the fixing pin 51, the operation card 60 at its left end as viewed in FIG. 2 is pull up and then moved left. As a result, the pin 61 comes off the attach/detach detection switch 47 in the center recess 46, so that a signal disappears to disable CPU 101 from providing any signal even when the shutter release switch 27 is operated or depressed. Accordingly, there is no necessity to operate the main switch 26 separately from detaching the operation card 60 from the camera body 10, which is always desirable for easy camera operation.

When using the operation card 60 to control the camera body 10 remotely, the operation card 60 is detached from the camera body 10. The operation card 60 projects an infrared light beam toward the camera body 10 when operating switches on the operation card 60. For example, when detaching the operation card 60 from the back 13 of the camera body 10 after having pushed the remote control switch 77 once, the camera body 10 is put in a remote control mode to receive a infrared light beam from the operation card 60 through the remote control window 21. Accordingly, various camera operations, such as an exposure, print quantity selection, caption and/or language selection, data rewriting of print quantity and/or caption for the previous exposed frame and the like. Remote control photography is made through the operation card 60 detached from the camera body 10. When directing the light emitting diode (LED) 93 toward the camera body 10 and pushing the remote control switch 77, the light emitting diode (LED) 93 is excited to project a infrared light beam toward the camera body 10, in particular, to the remote control window 21. Then, the photo-electric element placed behind the remote control window 21 receives the infrared light beam and sends a control signal to the CPU 101 of the camera body 10. According to the incoming control signal the CPU 101 actuates the shutter drive mechanism 116 to make exposure.

Selection of a print quantity, a caption and its language, data rewriting of print quantity and/or caption for the previous exposed frame and the like are also remotely performed through the operation card 60. For this purpose, when pushing the remote control switch 77 after operating appropriate switches for the selection and/or data rewriting, the light emitting diode (LED) 93 projects a infrared light beam including instruction signals which are transferred to CPU 101 through the photo-electric element placed behind the remote control window 21. Although signal transmission is performed by means of optical inter-communication between the camera body 10 and the operation card 60 remotely placed from the camera body 10, other types of inter-communication system, such as a radio wave inter-communication system, may be incorporated.

As shown in FIG. 7, LCD panel 71 has a screen divided into three display areas, namely an upper display area with a row of graphic symbols 71a–71f printed thereon which are selectively illuminated, a middle dot matrix display area 71g on which a character string or the like, and a lower dot matrix display area 71h on which a character string or the like. The row of printed symbols includes the red-eye effect preventive flash exposure (PRE) mode symbol 71a which is illuminated when the camera system 1 is put in the red-eye effect preventive flash exposure (PRE) mode, a flash exposure mode symbol 71b which is illuminated when the camera system 1 is put in the coercive flash exposure (CFE) mode or in the flash exposure prohibited mode, a distant view exposure (DVE) mode symbol 71c which is illuminated when the camera system 1 is put in the distant view flash exposure (DVE) mode, a night view flash exposure (NVE) mode symbol 71d which is illuminated when the camera system 1 is put in the night view flash exposure (NVE) mode, a self-timer exposure (STE) mode symbol 71e which is illuminated when the camera system 1 is put in the night view exposure (NVE) mode, and a remote control mode symbol 71f which is illuminated when the camera system 1 is put in the remote control mode, arranged in order from the left to the right. It is indicated by the fact all of the symbols 71a–71d are not illuminated that the camera system 1 is put in the auto-flash exposure (AFE) mode. These symbols 71a–71f are illuminated according to selected modes when the remote control switch 77 on the operation card 60 is pushed. The middle dot matrix display area 71g displays characters and numerals stating a date and the like. The lower dot matrix display area 71h displays a character string stating a selected caption in a selected language. Each character is comprised of a 5×8 dot character pattern of which data is stored in CGROM in LCD driver 138. Further, when entering or correcting cartridge identification data (CID), available switch buttons 81–84 of the cursor switch 80 are indicated on the middle dot matrix display area 71g, and CID data at every moment during cursor switch operation or CID data definitely finalized and the number of unexposed or available frames are displayed on the lower dot matrix display area 71*h*.

Figure 8B:
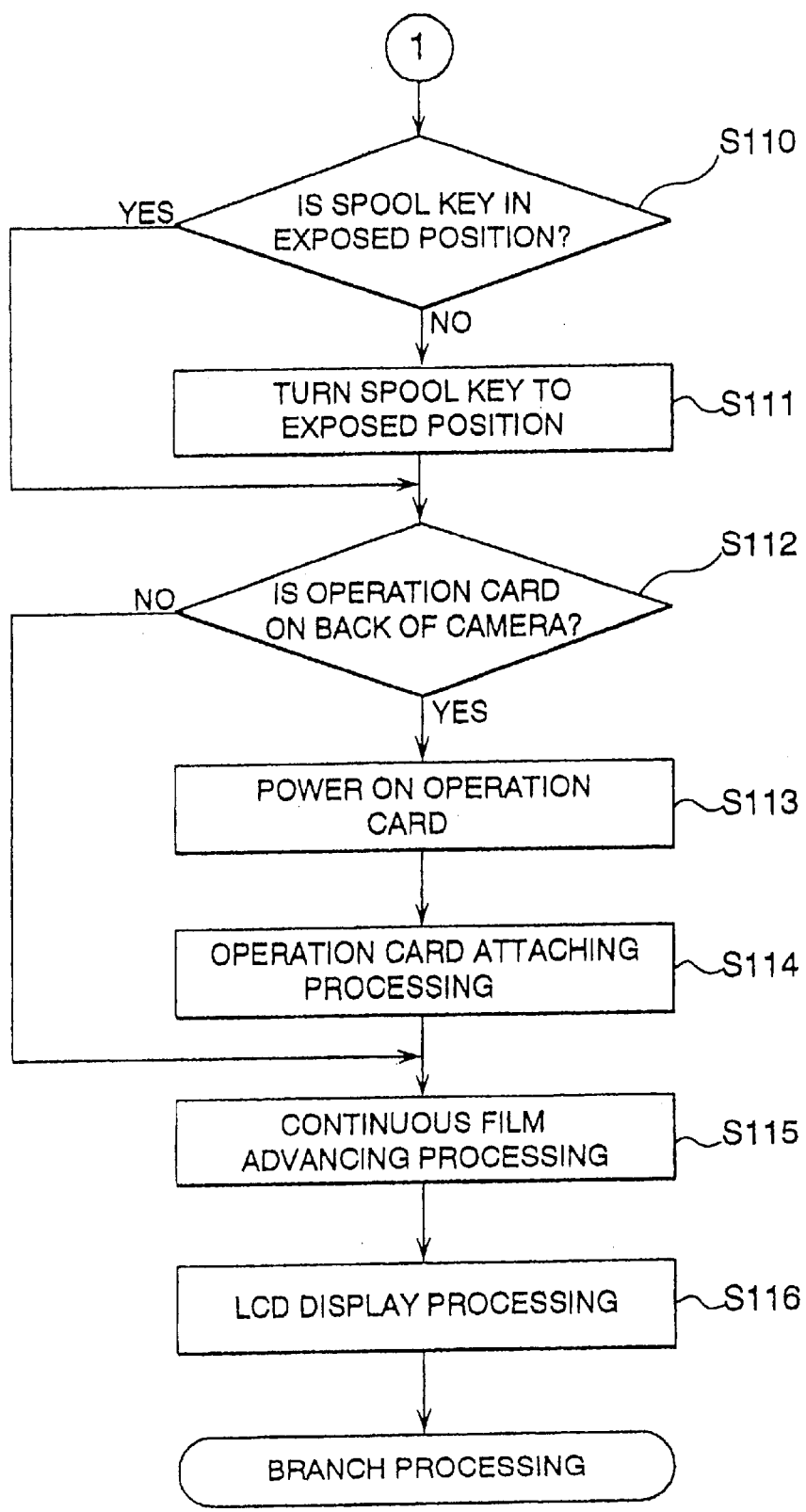

The operation of the camera system 1 depicted in FIGS. 1 through 7 is be best understood by reviewing FIGS. 8A through 79, which are flow charts illustrating various routines and subroutines for the microcomputer of CPU 101 and 131. Programming a computer is a skill well understood in the art. The following description is written to enable a programmer having ordinary skill in the art to prepare an appropriate program for the microcomputer. The particular details of any such program would of course depend upon the architecture of the particular computer selected. Referring to FIGS. 8A and 8B, which are a flow chart of the general sequence routine of data initialization processing of the camera body 10 which runs following loading a battery 104 in the camera body 10. When the flow chart logic commences and control proceeds to a function block at step S101 where CPU 101 is initialized to set initial values of a clock, a timer, registers and so forth and waits until the clock is stabilized. Subsequently, a judgement is made at step S102 as to whether a condition for writing initial values into EEPROM 109 is satisfied. This initial value writing condition is satisfied when a plurality of the switch buttons of the switch group 107 have been operated and remain turned on. When the initial value writing condition is satisfied, a judgement is made at step S103 as to whether the camera system 1 has been placed in condition for communication with an external apparatus. The external apparatus as used herein shall mean a special data entering and writing apparatus used to write data into EEPROM 109 during manufacturing the camera system 1. When the camera body 10 is placed in condition for communication with the external apparatus, specific electric data of initial values is transferred to the camera body 10. When the camera body 10 satisfies the communication condition, the specific electric data is practically transferred to the camera body 10 to enter the initial values in EEPROM 109 at step S104. When it is judged at step S105 that all data have been entered in EEPROM 109, the flow chart logic orders termination of the data initialization processing sequence routine and calls for a branch implementation sequence routine. On the other hand, when the camera body 10 has not yet satisfied the initial value writing condition, or when the camera body 10 has not yet been placed in condition for communication with the external data storage and writing apparatus while it has satisfied the initial value writing condition, data is read out from EEPROM 109 at step S106, and frame count data in EEPROM 109 is displayed at step S107. Subsequently, the shutter drive mechanism 116 is actuated to close the shutter at step S108, and then the lens drive mechanism 113 is actuated to return back the zoom lens 15 to the retracted position at step S109.

Thereafter, a judgement is made at step S110 as to whether a spool key of the camera body 10 is in an exposed position. After waiting until the spool key is in the exposed position at step S111, another judgement is made based on a signal from the attach/detach detection switch 47 at step S112 as to whether the operation card 60 is attached to the back 13 of the camera body 10. When it is detected that the operation card 60 is attached to the camera body 10, after actuating the power circuit 105 to impart a specified voltage between the terminals 44*a* and 45*a* to supply electric power to the operation card 60 at step S113, an operation card attaching processing sequence subroutine is called for at step S114. After the operation card attaching processing, a continuous film advancing processing sequence subroutine and an LCD panel display processing sequence subroutine are called for in order at steps S115 and S116, respectively. As will be described later, in the continuous film advancing processing, after setting the camera body 10 in the date display mode I for printing a date of year, month and day on the back of a print, data including a date designating instruction or a mode reset instruction, a flush mode instruction and other instructions are transmitted to the operation card 60 by means of the inter-communication function. In the LCD panel display processing, after displaying all indications on LCD panel 71 for a specified period of time, indications as to the existence of a film cartridge 200 in the camera body 10, the number of exposed frames and available battery power. Then, after the final step, the flow chart logic orders termination of the data initialization processing sequence routine and implements the branch to the branch processing sequence routine.

Figure 9A:
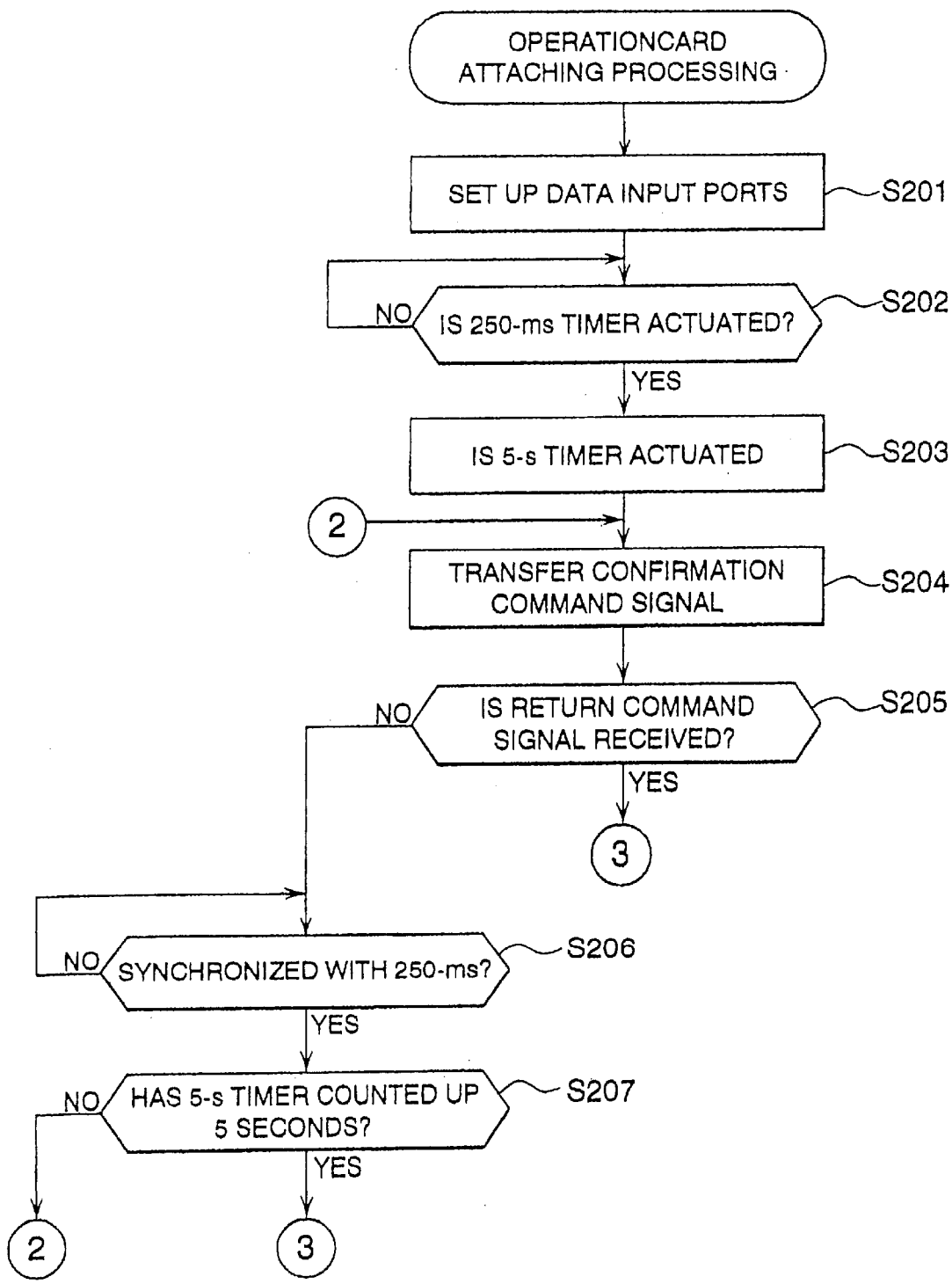
FIGS. 9A and 9B are a flow chart illustrating an operation card attaching processing sequence subroutine.
Figure 10A:
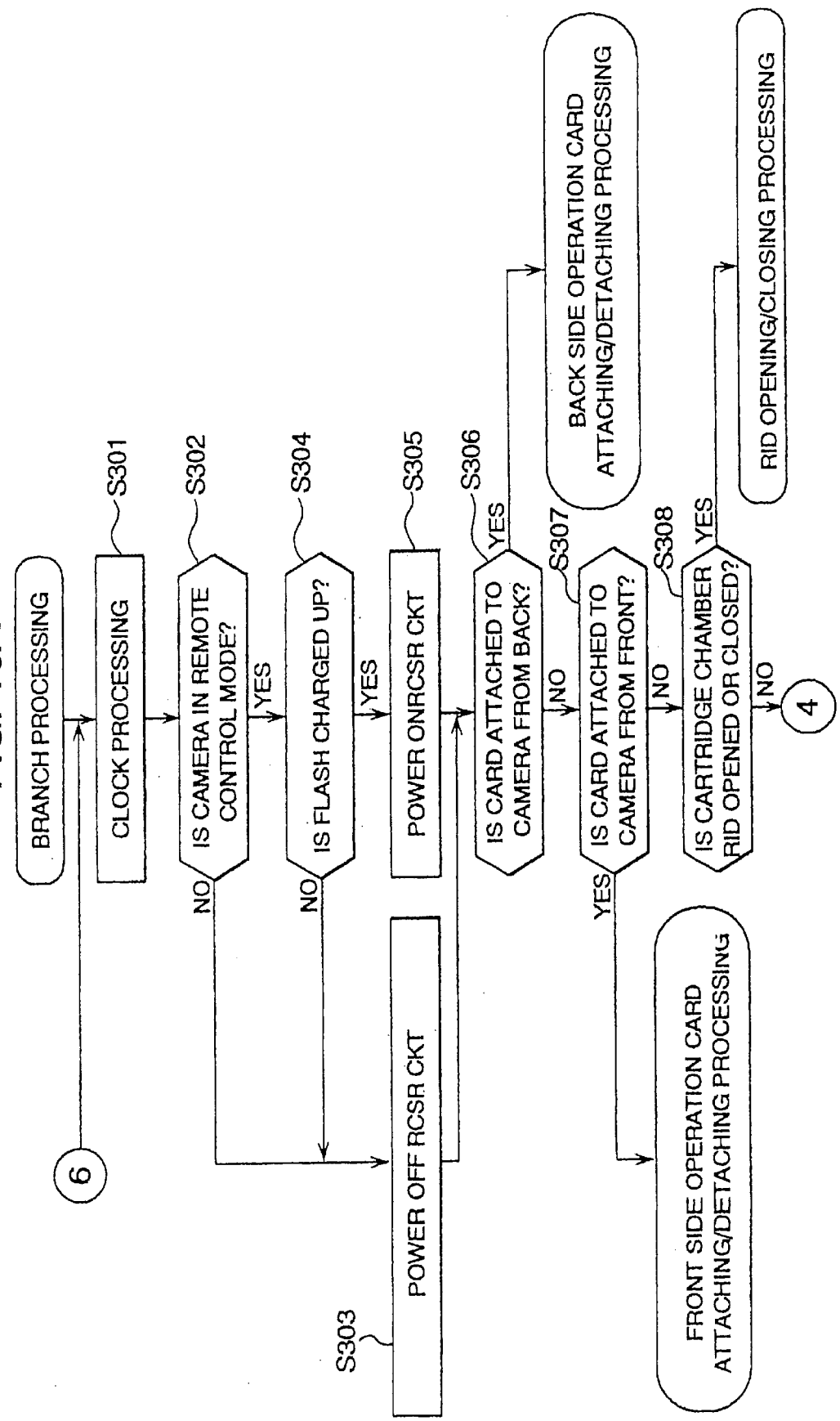
Figure 10B:
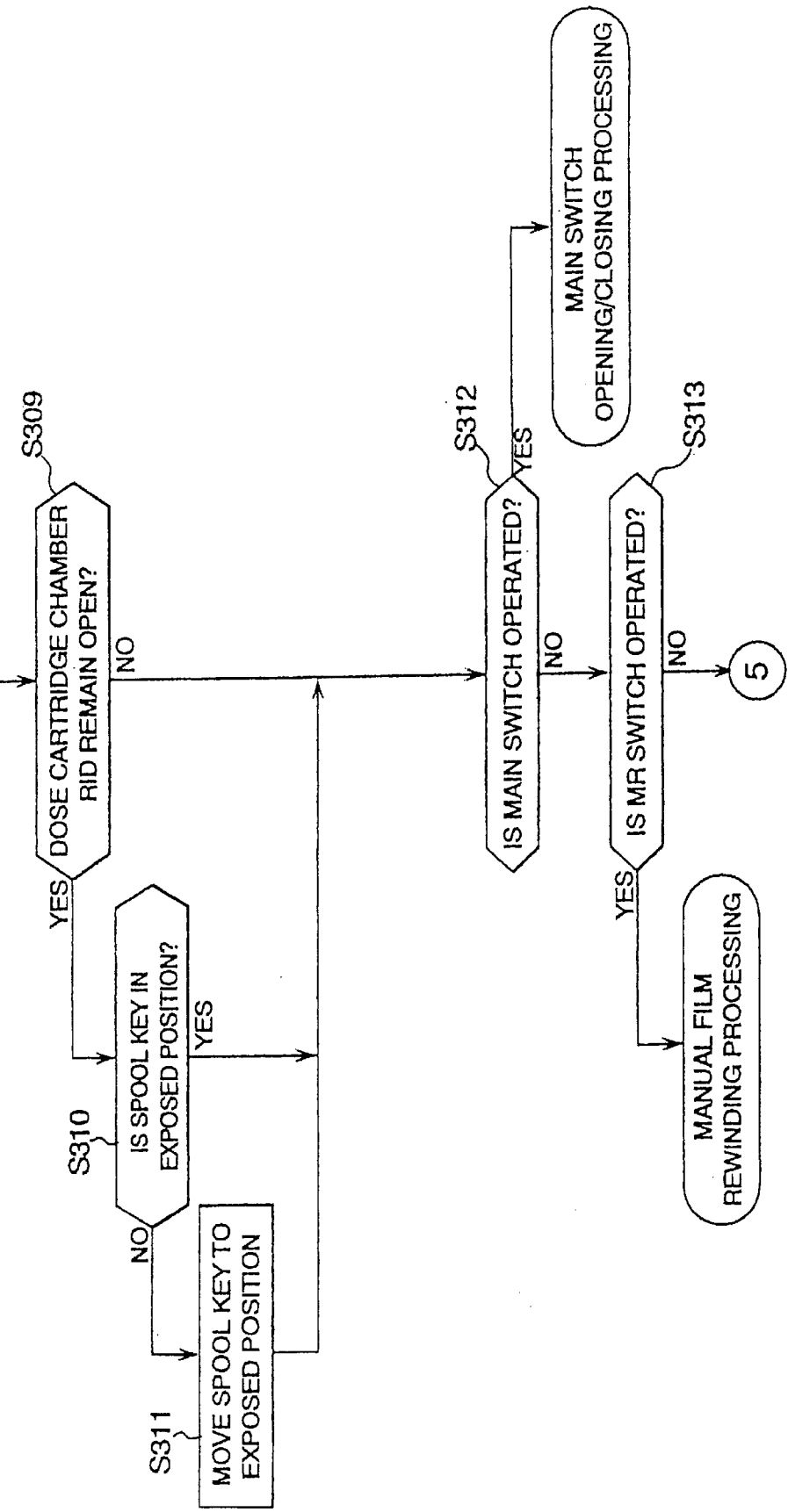
Figure 11A:
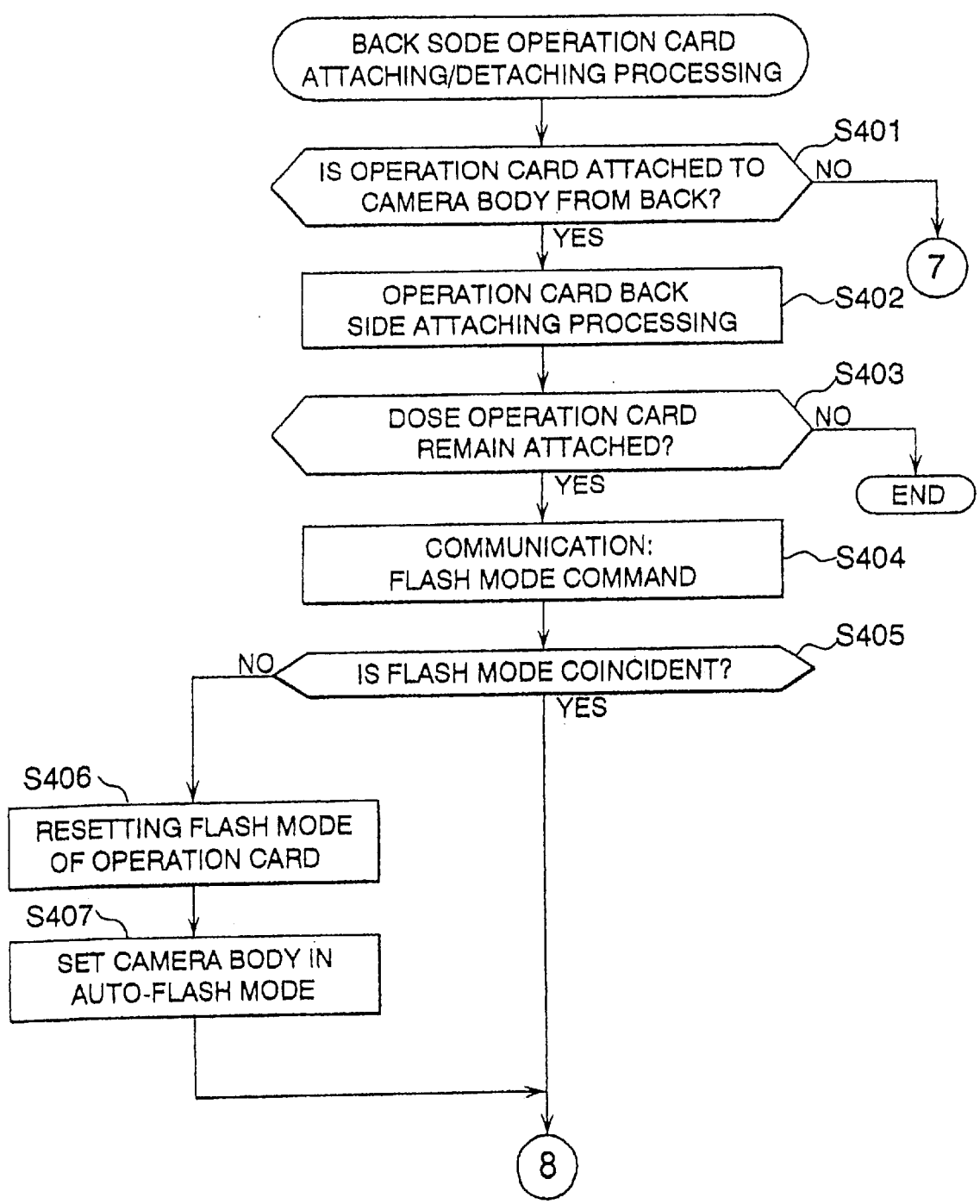
FIGS. 11A–11D are a flow chart illustrating a back side operation card attaching/detaching processing sequence routine.
Figure 11B:
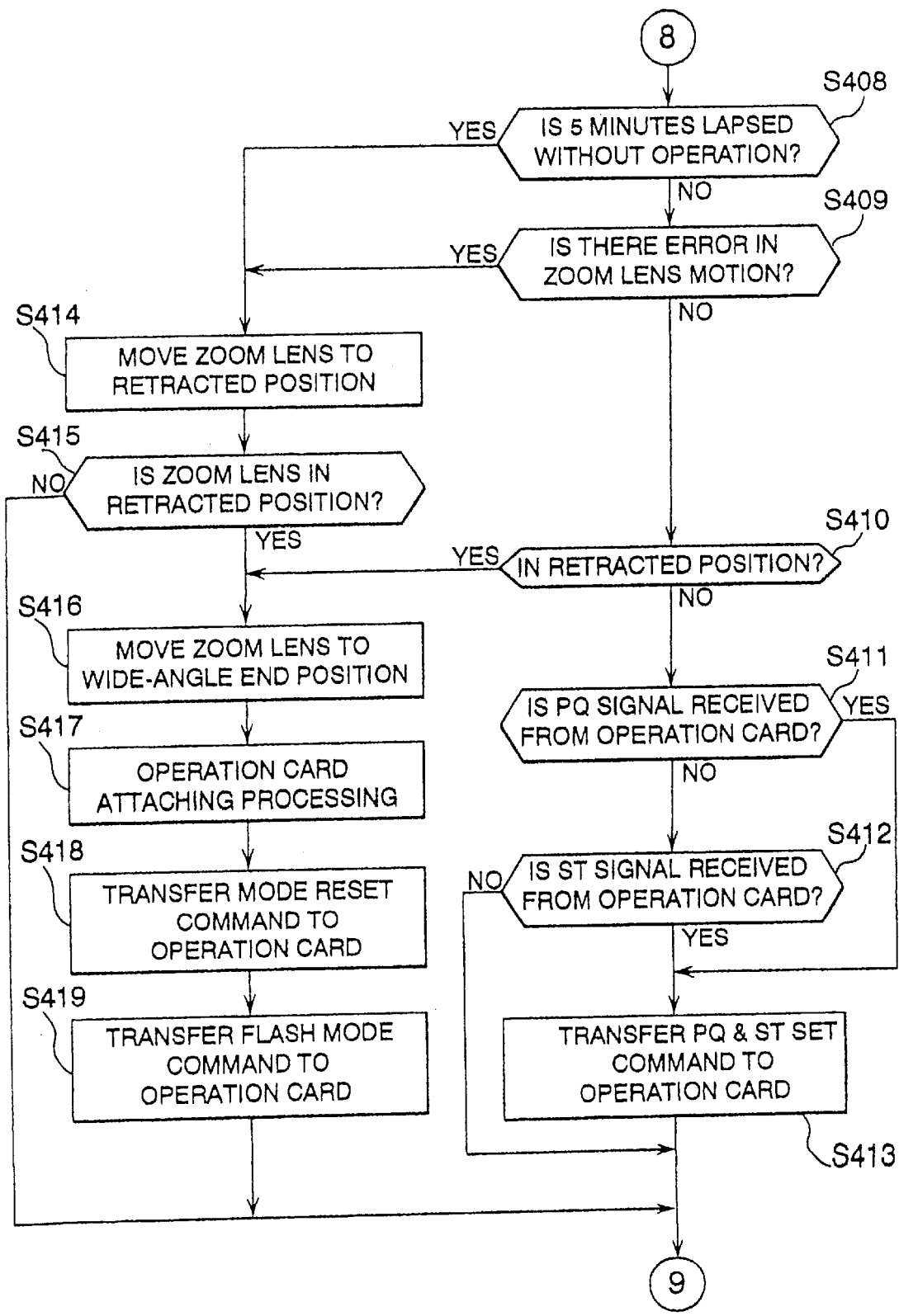
Figure 11C:
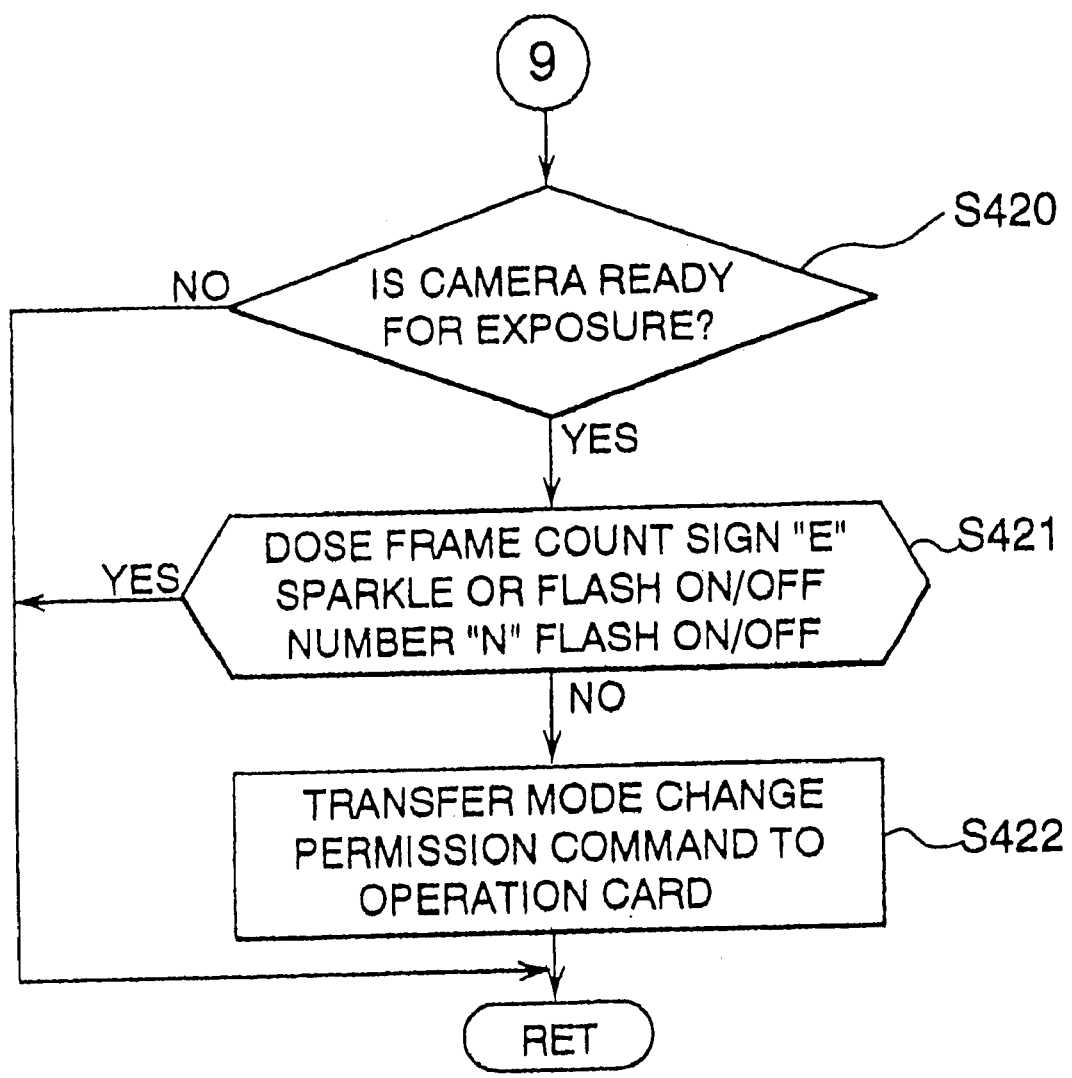
Figure 11D:
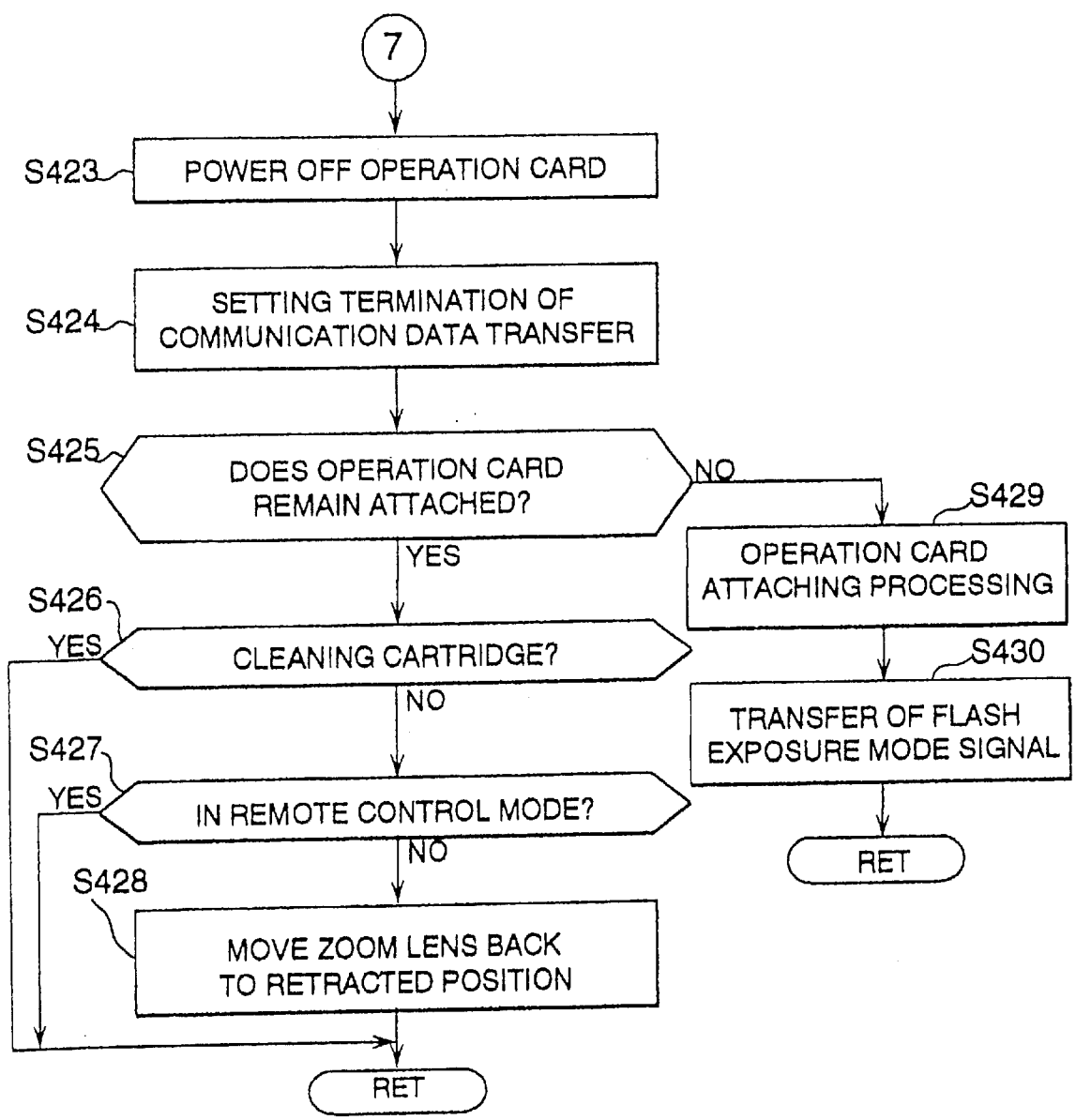

Referring to FIGS. 9A and 10B, which are a flow chart of the operation card attaching processing sequence subroutine which takes place to confirm actuation of the operation card 60 when the operation card 60 is attached to the back 13 of the camera system 10. When it is detected that the operation card 60 is powered on at step S113 in the data initialization processing general sequence routine and the flow chart logic commences, the communication data input ports are set up to place the camera body 10 in condition for communication with the operation card 60 through the communication units 137 and 110 at step S201. A judgement is subsequently made at step S202 as to whether an internal 250-ms count timer of CPU 101 is actuated to count a predetermined standard time of 250 milliseconds. This standard time is counted when confirming operation command and operation of the operation card 60 through communication with the camera body 10. In response to actuation of the 250-ms count timer, another internal 5-sec count timer is actuated at step S203 to count a predetermined time of, for example, five seconds from a point of time at which the operation card 60 is attached to the camera body 10 from the back 13. At step S204, a confirmation request command is transferred to the operation card 60 through the communication units 110 and 137 to confirm whether there is no change in operated state of the operation card 60. Subsequently, a judgement is made at step S205 as to whether there is a command answer instructing no change in operated state from the operation card 60. If there is no command answer from the operation card, after waiting that the communication is brought into synchronism with the 250-ms timer at step S206, a judgement is made at step S207 as to whether the 5-sec timer has counted up five seconds. Until the 5-sec count timer counts up five seconds, a confirmation request command is transferred to the operation card 60.

When it is judged that there is a command answer from the operation card 60 or when the 5-sec count timer has counted up five second while there is no command answer from the operation card 60, a judgement is made at step S208 as to whether a magnetic head cleaning cartridge is loaded in the camera body 10 for the purpose of cleaning magnetic heads installed in the camera body 10. When a magnetic head cleaning cartridge is in the camera body 10, a CID display command is transferred to the operation card 60 through the communication units 110 and 137 at step S209. However, when a magnetic head cleaning cartridge is in the camera body 10, the command causes LCD panel 71 to display a sign of "CLEANING." After displaying the sign, the flow chart logic orders termination of the branch processing sequence routine.

On the other hand, when the camera body 10 is loaded with a cartridge other than a magnetic head cleaning cartridge, then a date display command is transferred to the operation card 60 through the communication units 110 and 137. In response to reception of the date display command, LCD panel 71 displays a film type of the film cartridge 200 loaded in the camera body 10 at step S210. For example, a black-and-white film having an ISO film speed of 1600 is indicated as "b ISO 1600." Subsequently, judgement is made at step S211 as to whether the camera body 10 is in condition to permit data rewrite film rewind. When camera body 10 is in the condition of data rewrite film rewind, a data rewrite film rewind permission command is transferred to the operation card 60 through the communication units 110 and 137 to permit data rewrite for the previous exposed frame through the operation card 60 at step 212. However, When camera body 10 is not in the data rewrite film rewind condition, a data rewrite film rewind prohibition command is transferred to the operation card 60 through the communication units 110 and 137 to prohibit data rewrite film rewind at step 213. After transferring a data rewrite film rewind permission command or a data rewrite film rewind prohibition command to the operation card 60 at step S212 or S213, the flow chart logic orders return to the general sequence routine after the step in the general sequence routine calling for the operation card attaching processing sequence subroutine.

Through execution of the operation card attaching processing sequence subroutine, the operation card 60 is automatically powered on in response to attaching the operation card 60 to the camera body 10 from the back 13, which is accompanied by compulsory display of the type of a film in the cartridge 200 loaded in the camera body 10 on LCD panel 71.

Referring to FIGS. 10A through 10C which are a flow chart of the branch processing sequence routine for implementing the branch to various processing of the camera body 10 following input signals from the camera switches or after a lapse of waiting time counted by timers, when the flow chart logic commences and control proceeds to a function block at step S301 where clock processing is executed. In the clock processing the 250-ms count timer starts to count the seconds, and, when counting up 60 seconds, clock data are established in order of minute, hour, day, month and year and transferred to the operation card 60 through the communication units 110 and 137. Subsequently, a judgement is made at step S302 as to whether the camera system 1 is put in the remote control mode. When the camera system 1 is not in the remote control mode, the remote control signal receiving circuit 106 is deenergized at step S303. On the other hand, when the camera system 1 is in the remote control mode, another judgement is made at step S304 as to whether the flash unit has been charged up. If having not yet been charged up, the remote control signal receiving circuit 106 is deenergized at step S303. When the flash unit has been charged up, the remote control signal receiving circuit 106 is powered on and energized at step S305. Subsequently to deenergization or energization of the remote control signal receiving circuit 106 at step S303 or S305, a judgement is made based on a signal from the attach/detach detection switch 47 at step S306 as to whether the operation card 60 is attached to or detached from the back 13 of the camera body 10. When the attach/detach detection switch 47 changes its state from an off-state to an on-state or vice versa, this indicate that the operation card 60 is attached to or detached from the back 13 of the camera body 10, then the branch to back side operation card attaching/detaching processing is implemented. On the other hand, when the attach/detach detection switch 47 remains unchanged in its state, this indicate that the operation card 60 is neither attached to nor detached from the back 13 of the camera body 10, then, another judgement is made based on a signal from the attach/detach detection switch 32 at step S307 as to whether the operation card 60 is either attached to or detached from the front 12 of the camera body 10. When the attach/detach detection switch 47 changed its state from an off-state to an on-state or vice versa, this indicate that the operation card 60 is attached to or detached from the front 12 of the camera body 10, then the branch to front side operation card attaching/detaching processing is implemented. However, when the attach/detach detection switch 47 remains unchanged in its state, this indicate that the operation card 60 is neither attached to nor detached from the front 12 of the camera body 10, then, a judgement is made at step S308 as to whether the cartridge chamber rid 52 is either opened or closed. This judgement is made based on a change in state of a rid open/close detection switch (not shown). When the cartridge chamber rid 52 is opened or closed, then, the branch to rid opening/closing processing is implemented. When there is no operation of the cartridge chamber rid 52, i.e. the cartridge chamber rid 52 remains open, at step S309, a judgement is made at step S310 as to whether the spool key of the camera body 10 is in the exposed position. When it is out of the exposed position, then, the spool key is moved to the exposed position at step S311. When the cartridge chamber rid 52 remains closed or when the spool key is in the exposed position while the cartridge chamber rid 52 remains open, judgements are made at steps S312 and S313 as to whether the main switch 26 is operated and whether the manual rewind switch 55 is operated. When the main switch 26 is operated, the branch to main switch opening/closing processing is implemented. When the manual rewind switch 55 is operated while the main switch 26 is not operated, then, the branch to manual film rewinding processing is implemented. However, neither the main switch 26 nor the manual rewind switch 55 is operated, a judgement is made at step S314 as to whether a sign "E" is displayed and sparkles as an indication of the frame count data and remains present on LCD panel 71. The sign "E" remaining present on LCD panel 71 indicates that a film in the film cartridge 200 is completely exposed. When the sign "E" is not sparkling, then, a judgement is made at step S315 as to whether the sign "E" is flashing on and off on LCD panel 71. The sign "E" flashing on and off on LCD panel 71 indicates that the film in the film cartridge 200 is improper for exposure for some reason. When the sign "E" is not displayed, then, a judgement is further made at step S316 as to whether a numeral "N" is displayed and flashes on and off on LCD panel 71. The numeral "N" displayed on LCD panel 71 indicates the number of exposable frames of a film in the cartridge 200. If the numeral "N" displayed on LCD panel 71 flashes on and off indicates that an accident has occurred during advancing an exposed frame after having made a shutter release and it is impossible to make another exposure. When a numeral "N" is not displayed on LCD panel 71, a judgement is made at step S317 as to whether the camera system 1 has been placed in condition for making exposure.

When the sign "E" displayed on LCD panel 71 remains sparkling or flashes on and off when a numeral "N" is displayed and flashes on and off, or when the camera system 1 is not placed in condition for making exposure, after deenergizing the remote control signal receiving circuit 106 at step S318, the flow chart logic orders a restart of the branch processing sequence routine.

When the camera system 1 is in condition for exposure and the shutter release switch 27 is operated or depressed at step S319, the branch to shutter release controlling processing is implemented. However, if there is no operation of the shutter release switch 27, a judgement is made at step S320 as to whether the camera system 1 is in the remote control mode. When the camera system 1 is in the remote control mode, a judgement is made at step S321 as to whether there is a remote control signal is transferred from the operation card 60 and received by the camera body 10 through the remote control signal receiving circuit 106. When the remote control signal is received by the camera body 10, the branch to remote control signal receiving processing is implemented. On the other hand, when the camera system 1 is not in the remote control mode or when there is no remote control signal from the operation card 60 while the camera system 1 is in the remote control mode, a judgements are subsequently made at steps S322 and S323 as to whether the zooming switch 50 is operated to shift the zoom lens 15 toward a telephoto end, namely to protrude the zoom lens from the camera body 10 or toward a wide-angle end, namely to retract the zoom lens 14 from the camera body 10, respectively. When the zoom switch 50 is operated to shift the zoom lens 15 toward the telephoto end, the branch to telephoto side zooming processing is implemented. On the other hand, when the zoom switch 50 is operated to shift the zoom lens 15 toward the wide-angle, the branch to wide-angle side zooming processing is implemented. When the zoom switch 50 is not operated, the flow chart logic orders a restart of the branch processing sequence routine.

Figure 9B:
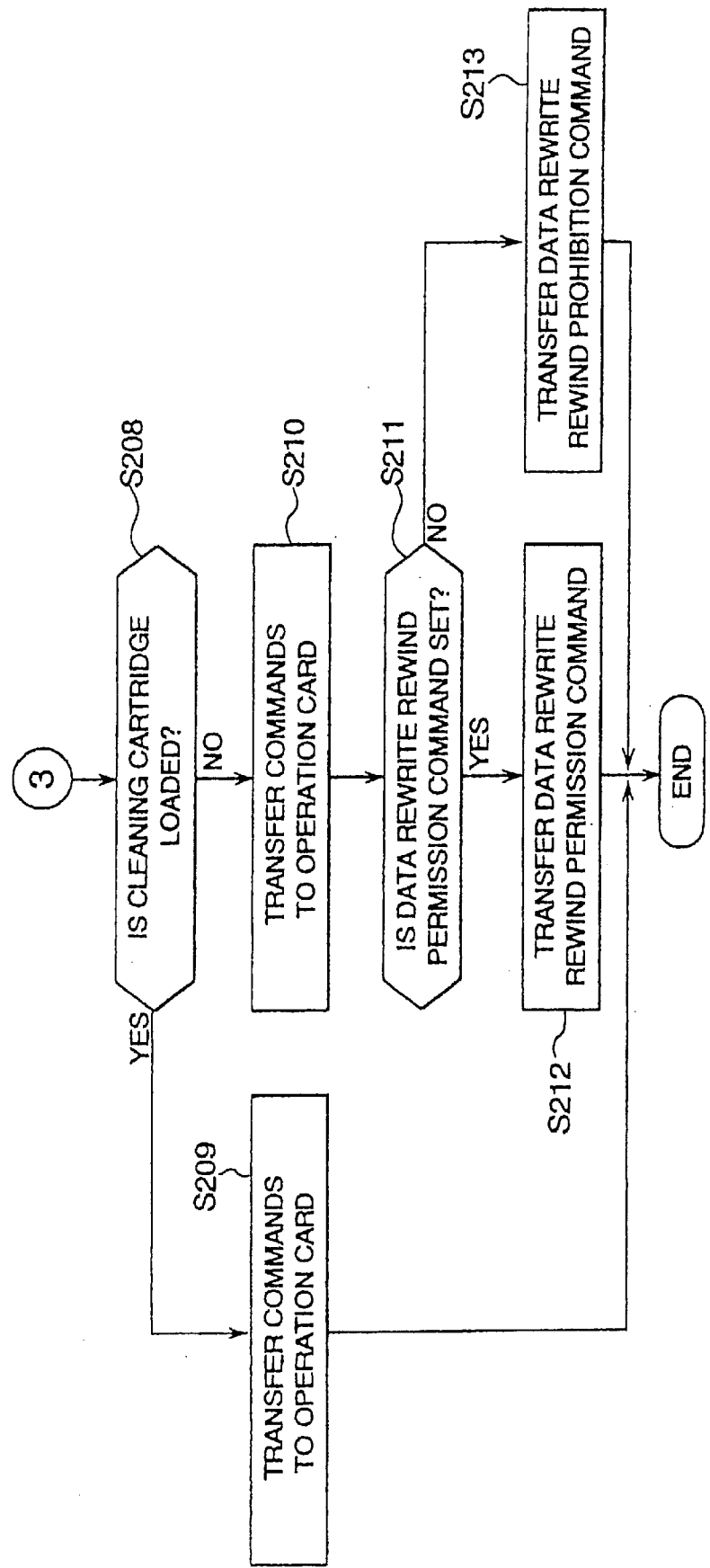

Referring to FIGS. 11A through 11D, which are a flow chart of the back side operation card attaching/detaching processing sequence routine, when the flow chart logic commences and control proceeds to a decision at step S401 as to whether the operation card 60 is attached to the camera body 10 from the back 13. This decision is made based on a new appearance of a signal from the attach/detach detection switch 47. When the operation card 60 is attached to the camera body 10, the operation card attaching processing sequence subroutine shown in FIGS. 9A and 9B is run at step S402. Subsequently, at step S403, a judgement is made as to whether the operation card 60 remains attached. When the operation card 60 is not attached any more to the camera body 10, i.e. detached from the camera body 10, which is detected due to the fact that the signal from the attach/detach detection switch 47 disappears, then, the flow chart logic orders termination of the back side operation card attaching/ detaching processing sequence routine. When the operation card 60 remains attached, in other words, when there is a signal from the attach/detach detection switch 47 remaining present, a flash mode instruction signal is transferred to the camera body 10 through the communication units 110 and 137 at step S404 to compare the flash modes between the camera body 10 and the operation card 60 at step S405. When it is judged that there is no coincidence of flash modes between the camera body 10 and the operation card 60, a flash mode reset signal is transferred to the operation card 60 from the camera body 10 to reset the operation card 60 to the auto-flash exposure (AFP) mode at step S406, and simultaneously the camera body 10 resets itself to the auto-flash exposure (AFP) mode at step S407. When there is a coincidence of the flash modes between the camera body 10 and the operation card 60, or after bringing the camera body 10 and the operation card 60 into coincidence in flash mode with each other by resetting them to the auto-flash exposure (AFE) mode, a judgement is made at step S408 as to whether a specified time of, for example, five minutes has elapsed without operating the camera system 1 including the operation card 60 and the film cartridge 200. This time may be counted by the 250-ms internal timer. When the camera system 1 is operated in five minutes, a judgement is made at step S409 as to whether there is an operational error, such as wrong retraction or wrong protrusion, of the zoom lens 15. When no operational error of the zoom lens 15 is detected, a judgement is made at step S410 as to whether the zoom lens 15 has returned back to the retracted position. Either when the camera body 10 receives a print quantity code signal (PQ signal) from the operation card 60 at step S411 before the zoom lens 15 has returned back to the retracted position, or when the camera body 10 receives a selected caption (ST) code signal from the operation card 60 at step S412 before the zoom lens 15 has returned back to the retracted position, a command is transferred to the operation card 60 to display the print quantity or the selected caption on LCD panel 71 at step S413. On the other hand, when the camera system 1 is not operated for five minutes or more, or there is any operational error of the zoom lens 15 while the camera system 1 is operated within the five minute period, the lens drive mechanism 113 is actuated to force the zoom lens 15 to return back to the retracted position at step S414. Subsequently, a judgement is made at step S415 as to whether the zoom lens 15 has returned back to the retracted position. When it is detected that the zoom lens 15 is in the retracted position as a result of the judgement made at step S410 or S415, after compulsorily shifting the zoom lens 15 to the wide-angle end at step S416, the operation card attaching processing sequence subroutine shown in FIGS. 9A and 9B is run at step S417. Subsequently, a command is transferred to the operation card 60 to reset it to initial mode at step S418, and then a command signal relating to flash mode is inter-communicated between the camera body 10 and the operation card 60 at step S419.

When the camera body 10 does not receive a selected caption (ST) code signal at step S412, or when the zoom lens 15 is not in the retracted position at step S415 although it is forced to return to the position at step S414, or after transferred a command for displaying the print quantity or the selected caption on LCD panel 71 to the operation card 60 at step S413, or after transferred a command signal relating to flash mode between the camera body 10 and the operation card 60 at step S419, a judgement is made at step S420 as to whether the camera system 1 is placed in condition for exposure. When the camera system 1 is ready for exposure, a judgement is subsequently made at step S421 as to whether the sign "E" displayed on LCD panel 71 remains sparkling or flashes on and off, or a numeral "N" displayed on LCD panel 71 flashes on and off. When nothing of the sign "E" and a numeral "N" appears on LCD panel 71, a mode change permission command is transferred to the operation card 60 to permit any change in available mode, as a result of which the operation card 60 is placed in condition for operation of the all switches and the like. However, if the camera system 1 is not in condition for exposure, or when the sign "E" remains sparkling or flashing on and off, or a numeral "N" flashes on and off, the flow chart logic terminates the back side operation card attaching/ detaching processing and orders return to the branch processing sequence routine after the step in the sequence routine calling for the back side operation card attaching/ detaching processing sequence routine.

At the beginning of the back side operation card attaching/detaching processing sequence routine, when it is detected that the operation card 60 is not attached to the camera body 10 from the back 13, i.e. detached from the camera body 10, the flow chart logic orders a jump to a function block at step S422 where the power circuit 105 is shut off to power off the operation card 60. After setting termination of the communication data to the communication unit 110 down at step S423, a judgement is made at step S424 as to whether the operation card 60 remains detached from the camera body 10. When the operation card 60 remains detached, judgements are subsequently made at steps S425 and S426 as to whether there is a magnetic head cleaning cartridge loaded in the camera body 10 and whether the camera system 1 is placed in the remote control mode, respectively. When there is no magnetic head cleaning cartridge but a film cartridge and the camera system 1 is not in the remote control mode, then, the lens drive mechanism 113 is actuated to force the zoom lens 15 to return back to the retracted position at step S427. On the other hand, when the operation card 60 is attached to the camera body 10 from the back 13, then, after performing the operation card attaching processing sequence subroutine at step 428, a command relating to flash mode is transferred between the camera body 10 and the operation card 60 at step S429. When the camera body 10 is loaded with a magnetic head cleaning cartridge or when the camera system 1 is out of the remote control mode while the camera body 10 is loaded with a film cartridge, or after returning the zoom lens 15 back to the retracted position at step S427 or after transferred a command relating to flash mode the camera body 10 and the operation card 60 at step S429, the flow chart logic terminates the back side operation card attaching/detaching processing and orders return to the branch processing sequence routine after the step in the sequence routine calling for the back side operation card attaching/detaching processing sequence routine.

With to the back side operation card attaching/detaching processing, the operation card 60 can be attached to the camera body 10 from the back 13 with an effect of automatically protruding the zoom lens 15 in condition for exposure camera system 1, which is always desirable for easy and quick operation, and can be detached from the camera body 10 with an effect of automatically returning the zoom lens 15 in the camera body 10, as a result of which the operation card 60 is quickly attached to the camera body from the front 12. Further, when the operation card 60 is detached from the back 13 of the camera system 10 while the camera system 1 is in the remote control mode, the camera body 10 remains duly operative through the operation card 60, which is always convenient for the photographer to start the use of the camera system 1.

Figure 12:
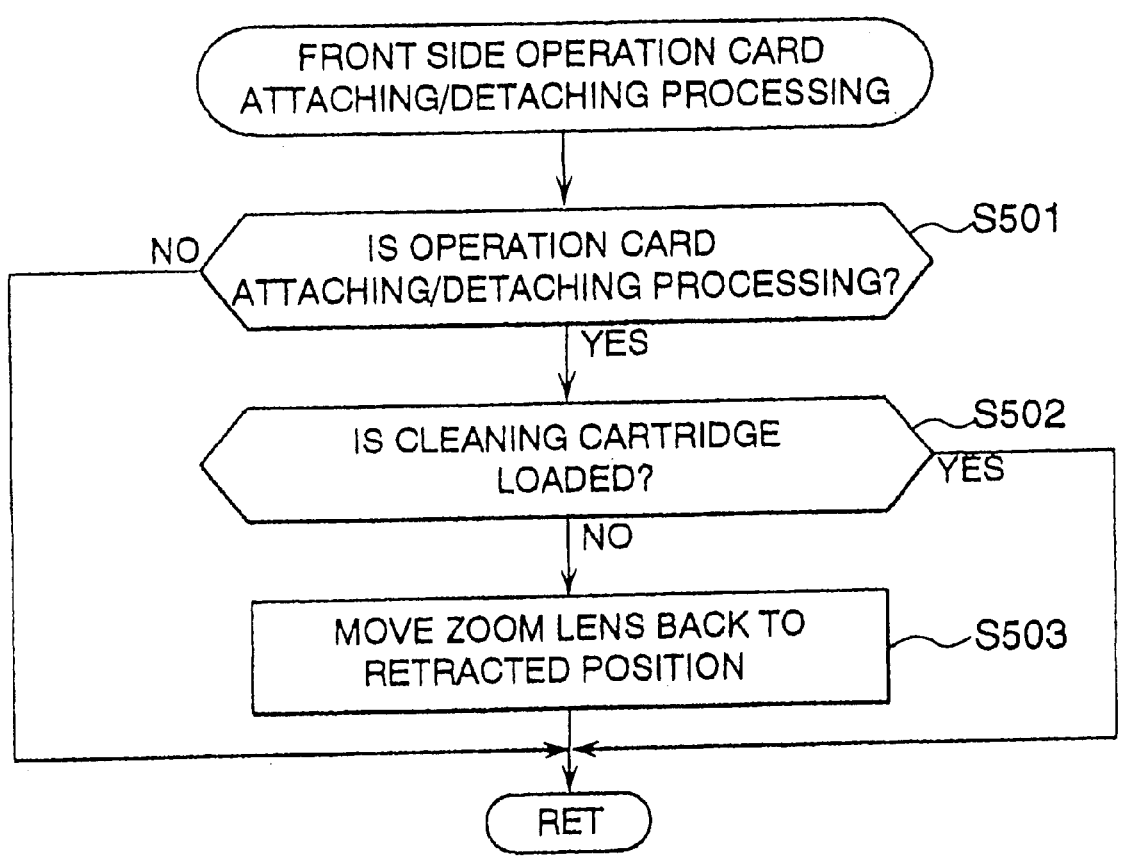
FIG. 12 is a flow chart illustrating a front side operation card attaching/detaching processing sequence routine.

Referring to FIG. 12, which is a flow chart of the front side operation card attaching/detaching processing sequence routine, when the flow chart logic commences and control proceeds to a decision at step S501 as to whether the operation card 60 is attached to the camera body 10 from the front 12. This decision is made based on a signal from the attach/detach detection switch 32. When the operation card 60 is attached to the camera body 10 from the front 12, another judgement is made at step S502 as to whether the cartridge loaded in the camera body 10 is a magnetic head cleaning cartridge. When the camera body 10 is loaded with a film cartridge 200, then, the lens drive mechanism 113 is actuated to force the zoom lens 15 to return back to the retracted position at step S503. On the other hand, when the operation card 60 is not attached to the camera system 10, when the camera body 10 is loaded with a magnetic head cleaning cartridge, or when the zoom lens 15 has returned back to the retracted position, the flow chart logic terminates the front side operation card attaching/detaching processing and orders return to the branch processing sequence routine after the step in the sequence routine calling for the front side operation card attaching/detaching processing sequence routine. The execution of the front side operation card attaching/detaching processing causes the zoom lens 15 to automatically return back to the retracted position without operating the main switch 26, which is always desirable for the photographer to terminate the use of the camera system 1.

Figure 13:
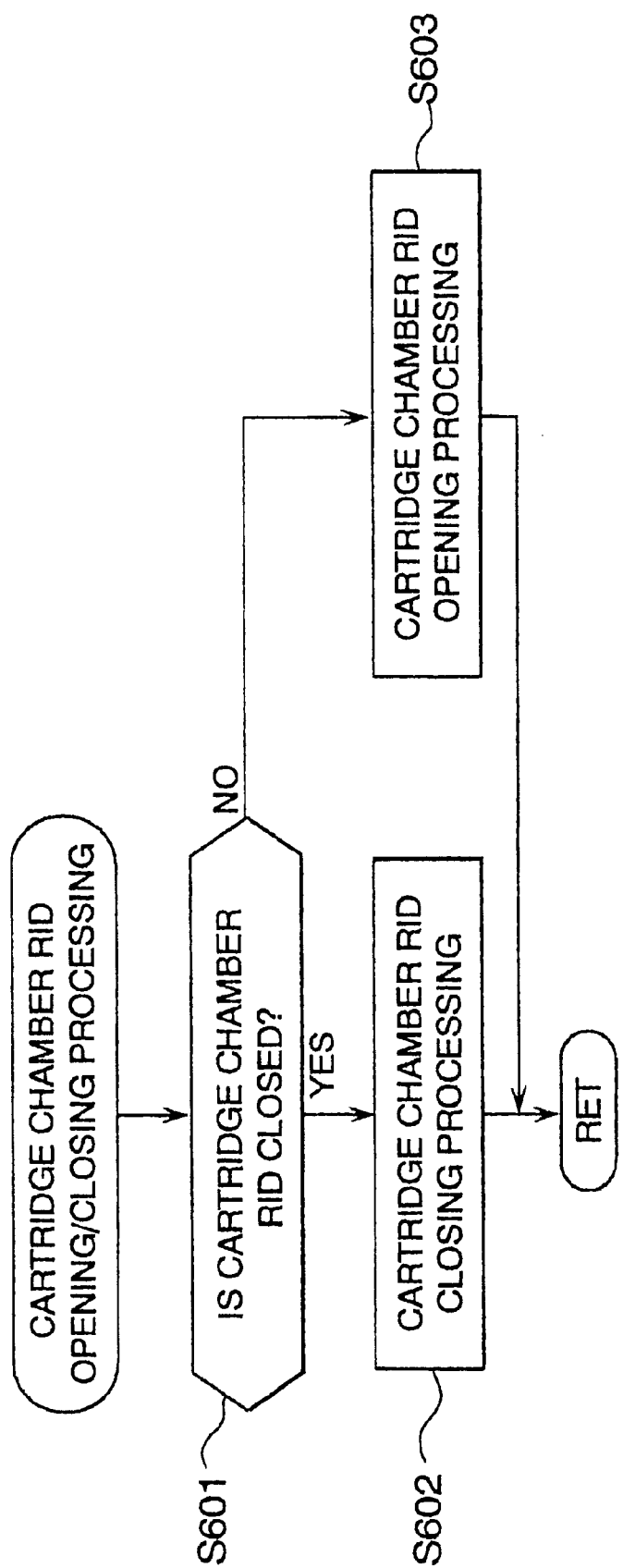
FIG. 13 is a flow chart illustrating a cartridge rid handling processing sequence routine.

Referring to FIG. 13, which is a flow chart of the cartridge chamber rid opening/closing processing sequence routine, when the flow chart logic commences and control proceeds to a decision at step S601 as to whether the cartridge chamber rid 52 is closed. Subsequently, a cartridge chamber rid closing processing is executed at step S602 when it is closed, or a cartridge chamber rid opening processing is executed at step S603 when it is opened. After the cartridge chamber rid opening processing or the cartridge chamber rid closing processing, the flow chart logic terminates the cartridge chamber rid opening/closing processing and orders return to the branch processing sequence routine after the step in the sequence routine calling for the cartridge chamber rid opening/closing processing sequence routine.

Figure 14C:
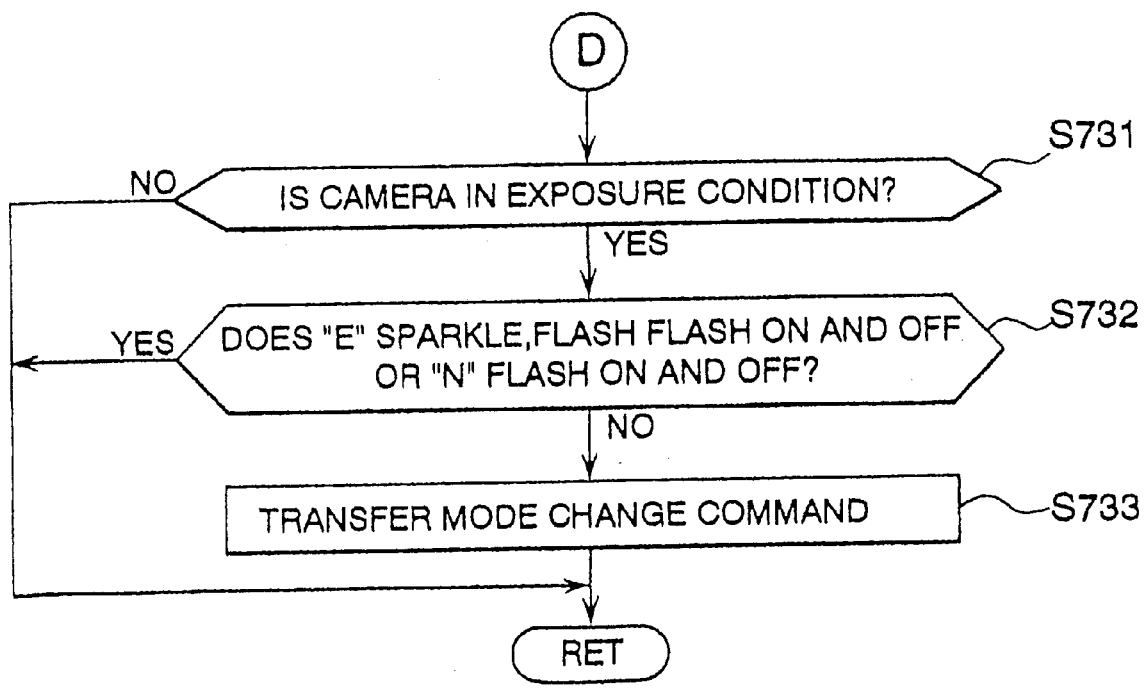

Referring to FIGS. 14A through 14C, which are a flow chart of the cartridge chamber rid closing processing sequence routine, when the flow chart logic commences and control proceeds to a function block at step S701 where a command is transferred to the operation card 60 through the communication units 110 and 137 to cancel setting of the self-timer exposure mode, the print quantity (PQ) code and selected caption (ST) code. Subsequently, a mode change prohibition command is transferred to the operation card 60 through the communication units 110 and 137 to prohibit any change in available mode at step S702, and a clock data request command is transferred to the operation card 60 through the communication units 110 and 137 to request clock data at step S703. In response to reception the clock data request command, the operation card 60 transfers renewed clock data to the camera body 10 or a return signal indicating a conclusion of transfer of renewed clock data when the renewed clock data has been transferred. Further, the self-timer exposure mode and settings of the print quantity (PQ) code and selected caption (ST) code in RAM 101b of CPU 110 are cancelled at step S704 and S705, respectively. Subsequently, at step S707, after checking a voltage of the battery 104 at step S706, cartridge existence data is stored in RAM 101b of CPU 110 when there is a cartridge signal indicating that a film cartridge 200 is loaded in the film cartridge chamber 54 from the cartridge sensor 56 or cartridge chamber empty data is stored in RAM 101b of CPU 110 when there is no cartridge signal. RAM 101b of CPU 110 is accessed to find that the cartridge chamber 54 is loaded with a film cartridge 200 at step S708. When there is the cartridge existence data in RAM 101b of CPU 110, after cancelling cartridge identification data (CID) relating to unexposed frames and data on that the spool key has been moved to the exposed position, which are to be stored in RAM 101b of CPU 110 of CPU 110, at step S709 and step S710, respectively, a CID data cancellation command is transferred to the operation card 60 through the communication units 110 and 137 to cancel the CID entry data at step S711. Thereafter, a judgement is made at step S712 as to whether the camera is under visual exposure index (VEI) processing. A visual exposure index system is an unique system to indicate states of exposure of a film in the film cartridge 200. Specifically, the film cartridge 200 at one of its ends has four different cut-outs, such as a circular cut-out which effects an indication that the film is fresh or unexposed, a semi-circular cut-out which effects an indication that the film is partly exposed and partly unexposed, a cross-shaped cut-out which effects an indication that the film has been fully exposed but not yet processed in a film processing machine to develop the latent image on the exposed film, and a square cut-out which effects an indication that the film has been processed in a film processing machine to develop the latent image on the exposed film. Any one of the visual exposure index cut-outs is positioned according to the state of exposure of the film so as to be viewed by the photographer through the visual exposure index (VEI) processing. When the visual exposure index (VEI) processing does not take place, then, a judgement is made at step S713 as to whether the frame counter, whose data is stored in RAM 101b of the CPU 101, indicates "E" representing that no available or unexposed frames is left. When the frame counter data indicates a numeral "N" representing a number of unexposed frames, a judgement is further made at step S714 as to whether there is no frame counter data to be stored in RAM 101b of CPU 110. When there is data of frame counter data, then, storing the frame counter data is stored as VEI data for "fully exposed" in EEPROM 109 of CPU 110 at step S715, film rewinding processing is executed to actuate the film advancing mechanism 114 to rewind the film into the film cartridge 200 at step S716. During execution of the film rewinding processing, the visual exposure index (VEI) processing is executed.

On the other hand, when it is found that there is the cartridge existence data in RAM 101b of CPU 110 at step S708, a command is stored in RAM 101b of CPU 101 of the camera body 10 to turn off a sign, such as a cartridge symbol, on LCD panel 28 and the cartridge sign is turned off at step S717, and frame counter data of "E" indicating that no available or unexposed frames is left is stored in RAM 101b of CPU 110 at step S718. When it is judged at step S713 that the frame counter indicates "E" representing that no available or unexposed frames is left or after storing the frame counter data for "E" at step S718, data is written in EEPROM 109 to renew initial data including an ISO film speed, a film type and an initial frame counter value at step S719. Subsequently, a data rewrite film rewind permission command is removed at step S720, and a data rewrite film rewind prohibition command is transferred to the operation card 60 through the communication units 110 and 137 at step S721. When the operation card 60 receives the data rewrite film rewind prohibition command, the operation card 60 is put impossible to receive a film rewinding signal. A date display command and data of a date are transferred to the operation card 60 at step S722, and then, LCD panel 28 is deenergized to remove an indication of frame counter data for a numeral "N" representing the number of unexposed frames at step S723.

When it is judged at step S714 that there is no frame counter data to be stored in RAM 101b of CPU 110, after deenergizing LCD panel 28 to remove an indication of frame counter data for a numeral "N" representing the number of available or unexposed frames at step S724, a date display command and data of a date are transferred to the operation card 60 at step S725. Subsequently a judgement is made at step S726 as to whether the camera system 1 is under DEP-DD processing. The DEP-DD processing is executed to read information on the film cartridge 200, which includes an ISO film speed, a film type and available exposures, put on the data disk 201 of a film cartridge 200 loaded in the camera body 10 by means of the data disk read unit 115 and one of the visual exposure indices (VEI) of the film cartridge 200. The cartridge information is factory printed in the form of bar codes on the film cartridge 200. When the DEP-DD processing is out of execution, another judgement is made at step S727 as to whether the battery 104 is short of power. When the battery 104 is at a necessary power level, first frame positioning (FFS) processing is executed at step S728. However, when the DEP-DD processing is under execution, after writing data in EEPROM 109 to renew initial information including an ISO film speed, a film type and an initial frame counter value at step S729, the visual exposure index (VEI) processing is executed at step S730.

Subsequently to execution of the film rewinding processing at step S716, execution of the first frame positioning (FFS) processing at step S728 or the visual exposure index (VEI) processing, or after removing an indication of frame counter data for a numeral "N" at step S723, a judgement is made at step S731 as to whether the camera system 1 has been placed in condition for exposure. When the camera system 1 is not in condition for exposure, the flow chart logic terminates the cartridge chamber rid closing processing and orders return to the branch processing sequence routine after the step in the sequence routine calling for the cartridge chamber rid opening/closing processing sequence routine. On the other hand, when the camera system 1 is in condition for exposure, another judgement is subsequently made at step S732 as to whether the sign "E" displayed on LCD panel 71 remains sparkling or flashes on and off, or a numeral "N" displayed on LCD panel 71 flashes on and off. When nothing of the sign "E" and a numeral "N" appears on LCD panel 71, a mode change permission command is transferred to the operation card 60 to permit any change in available mode at step S733. When it is detected that the sign "E" remains sparkling on LCD panel 71, or flashes on and off on LCD panel 71, or a numeral "N" flashes on and off on LCD panel 71, the flow chart logic terminates the cartridge chamber rid closing processing and orders return to the branch processing sequence routine after the step in the sequence routine calling for the cartridge chamber rid opening/closing processing sequence routine.

Figure 15A:
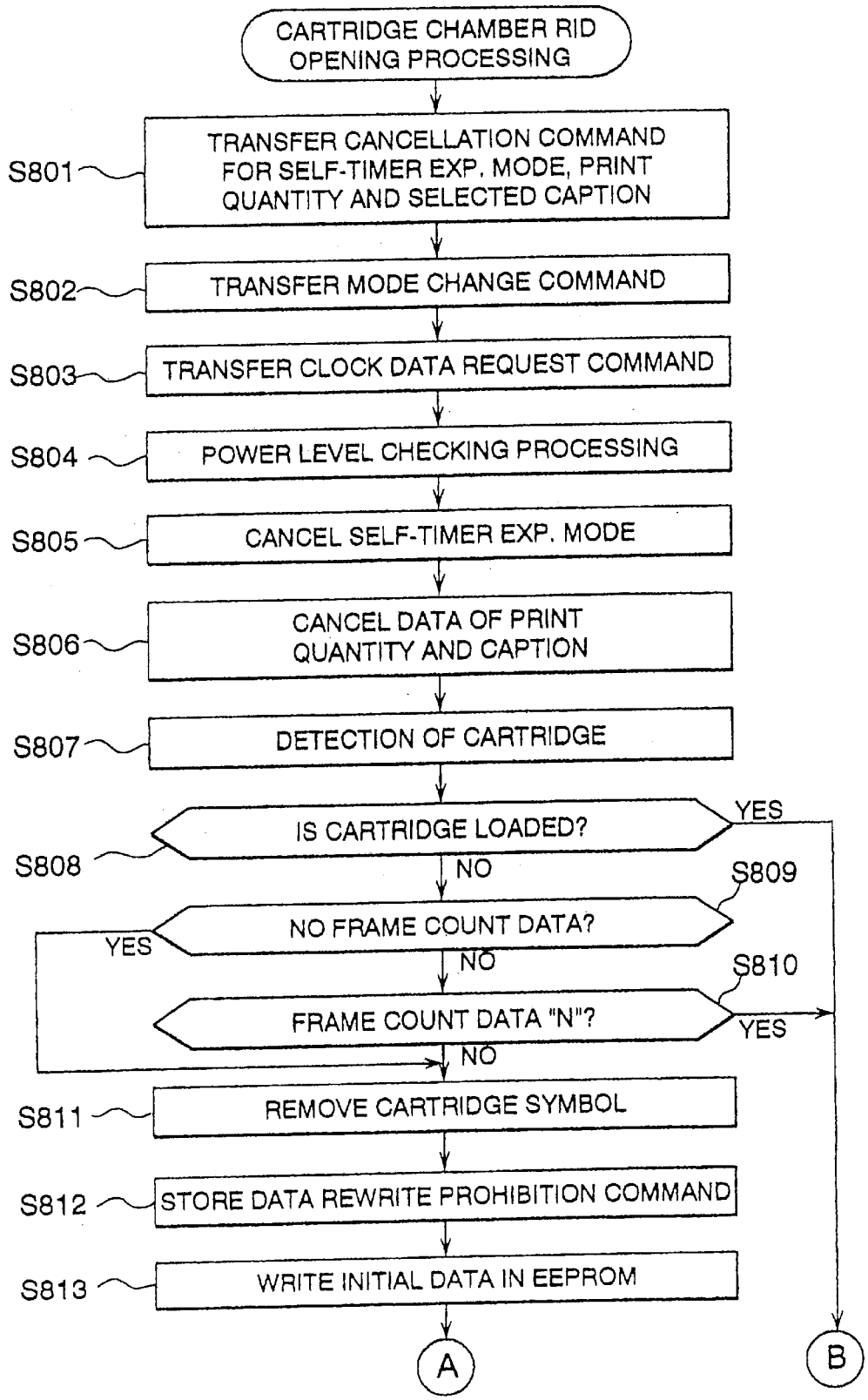
FIGS. 15A and 15B are a flow chart illustrating a cartridge chamber rid opening processing sequence routine.
Figure 15B:
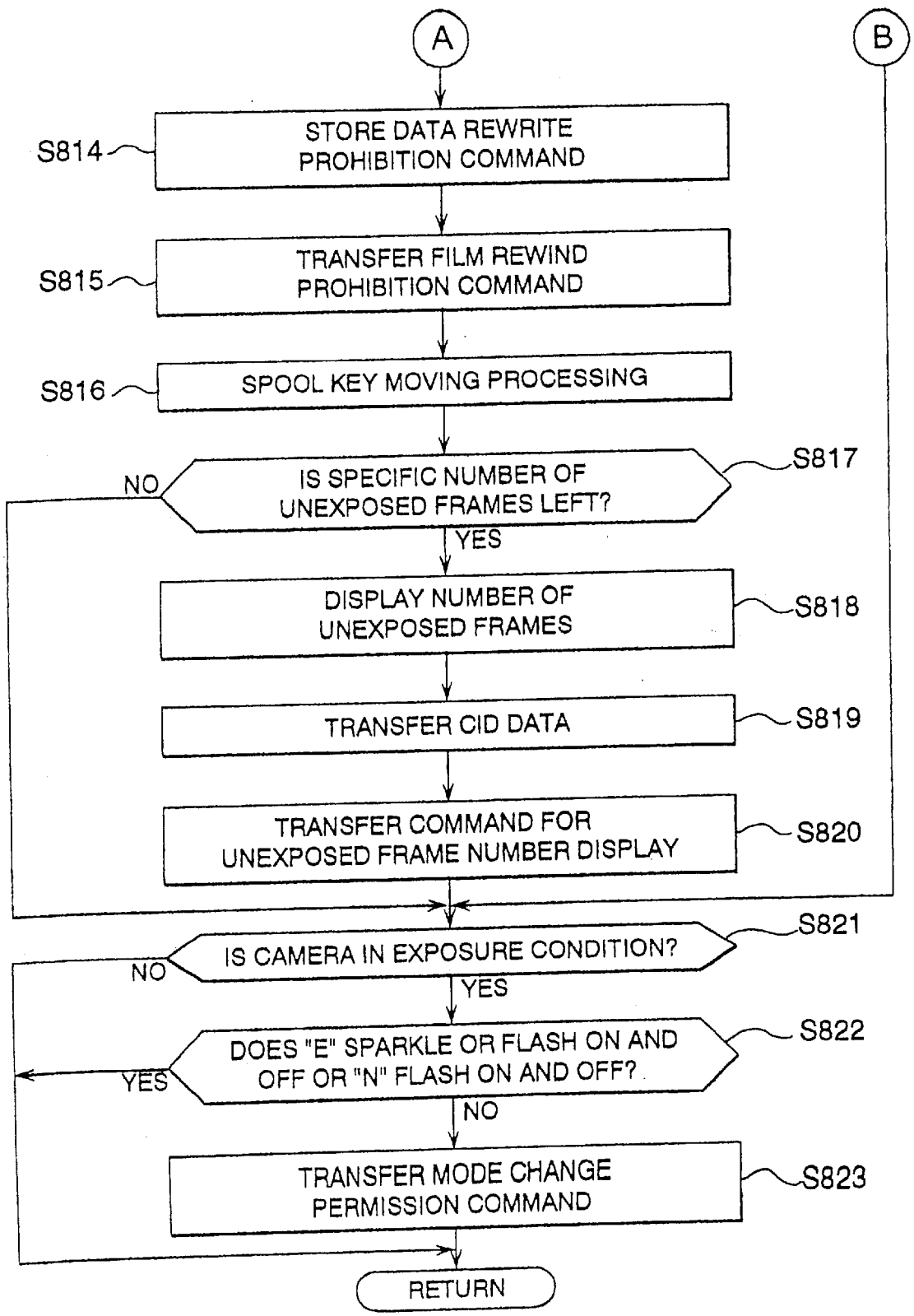

Referring to FIGS. 15A and 15B, which are a flow chart of the cartridge chamber rid opening processing sequence routine, when the flow chart logic commences and control proceeds to a function block at step S801 where a cancellation command is transferred to the operation card 60 through the communication units 110 and 137 to cancel setting of the self-timer exposure mode, the print quantity (PQ) code and the selected caption (ST) code. Subsequently, a mode change prohibition command is transferred to the operation card 60 through the communication units 110 and 137 to prohibit any change in available mode at step S802, and a clock data request command is transferred to the operation card 60 through the communication units 110 and 137 to request the operation card 60 to transfer clock data at step S803. After checking a power level of the battery 104 at step S804, the self-timer exposure mode and settings of the print quantity code and the caption code in RAM 101b of CPU 110 are cancelled at step S805 and S806, respectively. Subsequently, at step S807, it is detected based on a cartridge signal from the cartridge sensor 56 that a film cartridge 200 exists in the film cartridge chamber 54.

The cartridge signal is stored as cartridge existence data in RAM 101b of CPU 110. If there is no cartridge signal, cartridge chamber empty data is stored in RAM 101b of CPU 110. At step S808, RAM 101b of CPU 110 is accessed to find that the cartridge chamber 54 is loaded with a film cartridge 200 or empty at step S608. When there is no cartridge existence data but the cartridge empty data in RAM 101b of CPU 110, a judgement is made at step S809 as to whether there is no frame counter data to be stored in RAM 101b of CPU 101. When there is some frame counter data, a further judgement is made at step S810 as to whether the frame counter data indicates a numeral "N" representing the number of unexposed frames. When there is no frame counter data at step S809 or when the frame counter data indicates no numeral "N" at step S810, a display removal command is stored in RAM 101b of CPU 101 of the camera body 10 to turn off the cartridge symbol, on LCD panel 28 and the cartridge sign is turned off at step S811. Subsequently, after storing data indicating that there is no frame counter data in RAM 101b of CPU 101 at step S812, data is written in EEPROM 109 to renew initial information including an ISO film speed, a film type and an initial frame counter value "N" at step S813. Subsequently, a data rewrite film rewind permission command is removed at step S814, and a data rewrite film rewind prohibition command is transferred to the operation card 60 through the communication units 110 and 137 at step S815. After moving the spool key into a specified position at step S816, a judgement is made at step S817 as to whether the number of available or unexposed frames represented by the frame counter data to be stored in RAM 101b of CPU 101, is equal to the initial frame counter value of "N". When the number of available or unexposed frames is equal to a specified number of "N," the number of available or unexposed frames, i.e. the specified number of "N," is displayed on LCD panel 28 of the camera body 10 at step S818. Subsequently, the cartridge identification data (CID) including data of the number of unexposed frames is transferred to the operation card 60 through the communication units 110 and 137 at step S819, and a frame count display command is transferred to the operation card 60 through the communication units 110 and 137 to display the number of unexposed frames on LCD panel 71 of the operation card 60 at step S820.

When there is the cartridge existence data in RAM 101b of CPU 110 as a result of an access to RAM 101b of CPU 110 at step S808 or when there is the frame counter data indicating a numeral "N" representing the number of unexposed frames in RAM 101b of CPU 110 as a result of an access to RAM 101b of CPU 110 at step S810 while there is the cartridge empty data in RAM 101b of CPU 110, or when the number of unexposed frames is not equal to the specified number of "N" at step S817, or after displaying the number of unexposed frames on LCD panel 71 of the operation card 60 at step S820, a judgement is made at step S821 as to whether the camera system 1 has been placed in condition for exposure. When the camera system 1 is in condition for exposure, another judgement is subsequently made at step S822 as to whether the sign "E" displayed on LCD panel 71 sparkles or flashes on and off, or a numeral "N" displayed on LCD panel 71 flashes on and off. When nothing of the sign "E" and a numeral "N" appears on LCD panel 71, a mode change permission command is transferred to the operation card 60 to permit any change in available mode at step S823.

When the camera system 1 is not in condition for exposure at step S821, or when the sign "E" sparkles on LCD panel 71, or flashes on and off on LCD panel 71, or a numeral "N" flashes on and off on LCD panel 71, or after permitting any change in available mode at step S823, the flow chart logic terminates the cartridge chamber rid opening processing and orders return to the branch processing sequence routine after the step in the sequence routine calling for the cartridge chamber rid opening/closing processing sequence routine.

By execution of the cartridge chamber rid opening/closing processing, the camera system 1 automatically advances a film and is placed in condition for exposure in response to closing the cartridge chamber rid 52 following loading the film cartridge 200 in the cartridge chamber 54. Further, when the cartridge chamber rid 52 is opened and there is no film cartridge in the cartridge chamber 54, the camera body 10 is automatically put ready for another film cartridge loading, which is always desirable for the photographer to use the camera system 1.

Figure 16A:
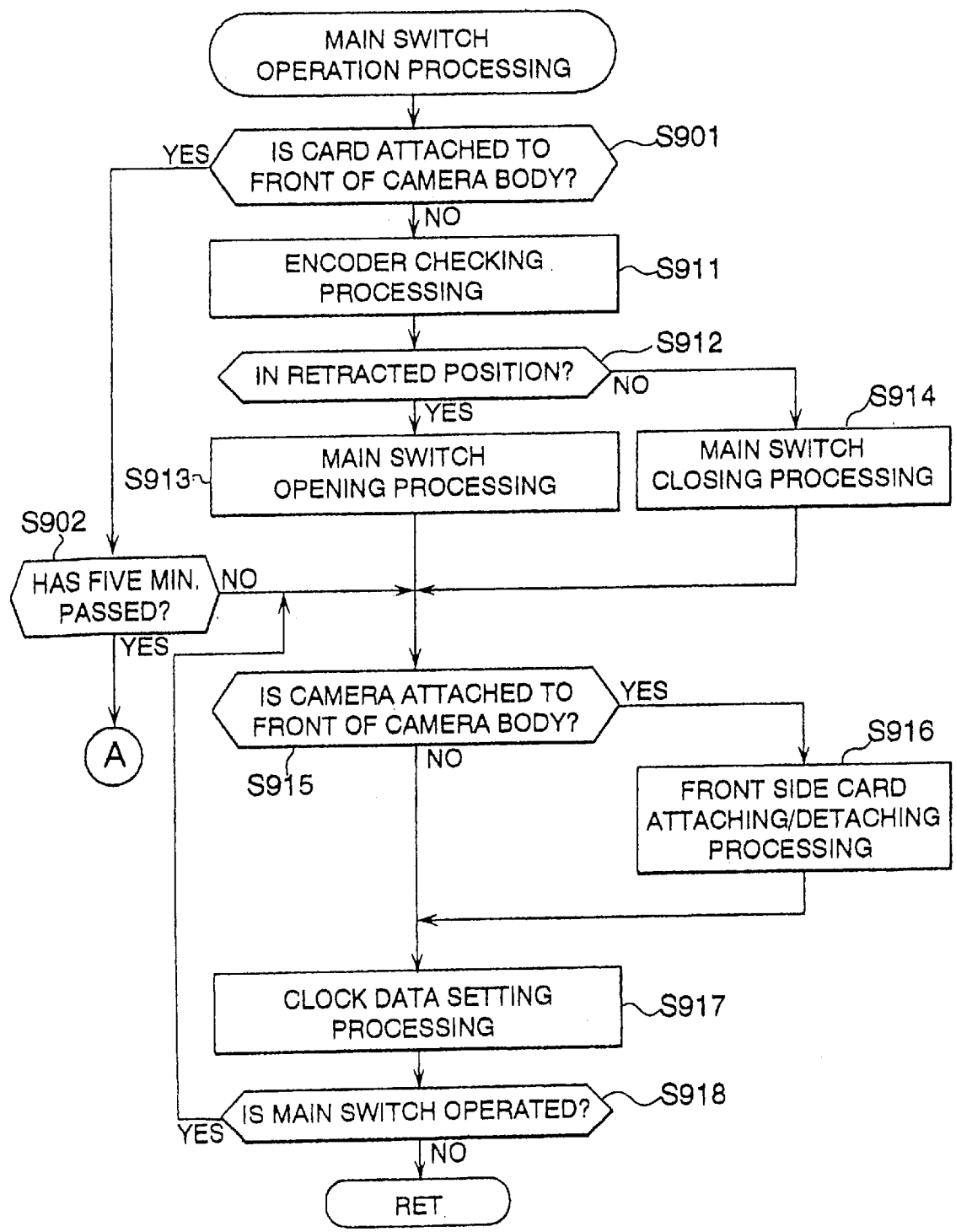
FIGS. 16A and 16B are a flow chart illustrating a main switch operation processing sequence routine.
Figure 16B:
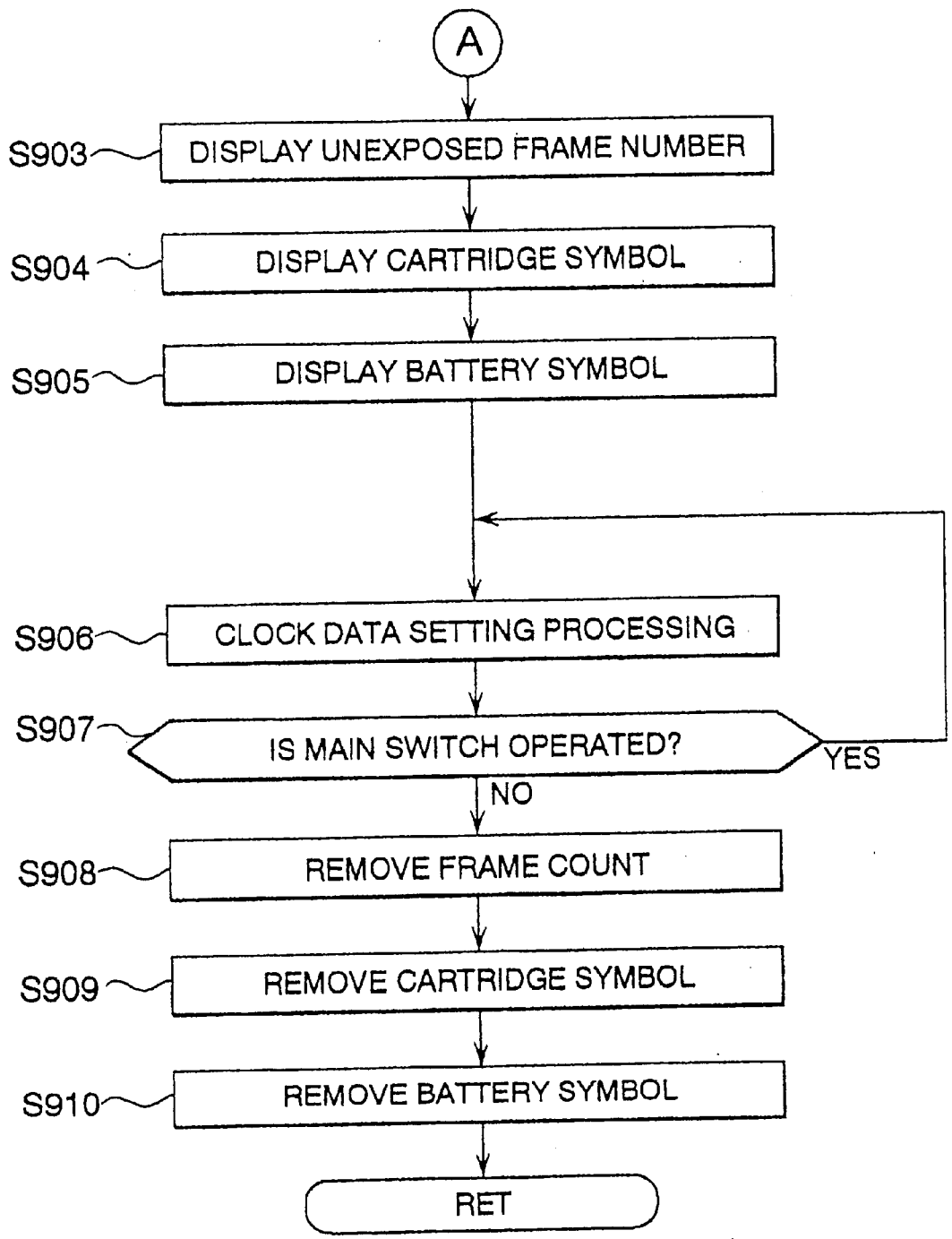

Referring to FIGS. 16A and 16B, which are a flow chart of the main switch operation processing sequence routine which is called for in response to a main switch operation, when the flow chart logic commences and control proceeds directly to a function block at step S901 where a judgement is made based on a signal from the attach/detach detection switch 32 as to whether the operation card 60 has been attached to the front 12 of the camera body 12. When the operation card 60 has been attached to the camera body 12, a judgement is made at step S902 as to whether a specified reserve time of, for example, five minutes has passed before any active operation of, for example, switches, of the camera system 1. LCD panel 28 of the camera body 10 is energized to display the number of available frames of the film in the film cartridge 200 loaded in the camera body 10 at step S903 when the specified reserve time expires without any active operation of the camera system 1 and subsequently the cartridge symbol at step 904 only when there is a signal from the cartridge sensor 56. Further, LCD panel 28 displays a battery symbol to indicate the power level of the battery 104 in the camera body 10 at step 905. Thereafter, at step S906, clock data setting processing is executed to establish data of date in order of minute, hour, day, month and year when the 250-ms count timer counts up 60 seconds and to transfer the data of date to the operation card 60 through the communication units 110 and 137. This date data is repeatedly established while the main switch 26 remains operated at step S907. When operation of the main switch 26 is discontinued, after deenergizing LCD panel 28 to remove the number of frames at step S908, the cartridge symbol at step S909 and the battery symbol at step S910, the flow chart logic terminates the main switch opening/closing processing and orders return to the branch processing sequence routine after the step in the sequence routine calling for the main switch opening/closing processing sequence routine.

On the other hand, when the operation card 60 has been detached from the camera body 12, encoder checking processing is executed to detect a position of the zoom lens 15 at step S911. Based on a result of the encoder checking processing, a judgement is made at step S912 as to whether the zoom lens 15 is in the retracted position. Subsequently to the judgement, main switch opening processing is executed at step S913 when the zoom lens 15 is in the retracted position, or main switch closing processing is executed at step S914 when the zoom lens 15 is out of the retracted position.

When it is before expiration of the specified reserve time of five minutes at step S902 while any active operation of the camera system 1 is not made at all, or after execution of the main switch opening processing at step S913 or the main switch closing processing at step S914, a judgement is made based on a signal from the attach/detach detection switch 32 at step S915 as to whether the operation card 60 is attached to the front 12 of the camera body 12. Directly when the operation card 60 is not attached to the front 12 of the camera body 12 or after execution of the operation card attaching processing at step S916, the clock data setting processing is executed to establish data of date in order of minute, hour, day, month and year at step S917. The judgement at step S915 and the clock data setting processing at step S917 are repeated while the main switch 26 remains operated. When operation of the main switch 26 is discontinued, the flow chart logic terminates the main switch opening/closing processing and orders return to the branch processing sequence routine after the step in the sequence routine calling for the main switch opening/closing processing sequence routine.

Figure 17:
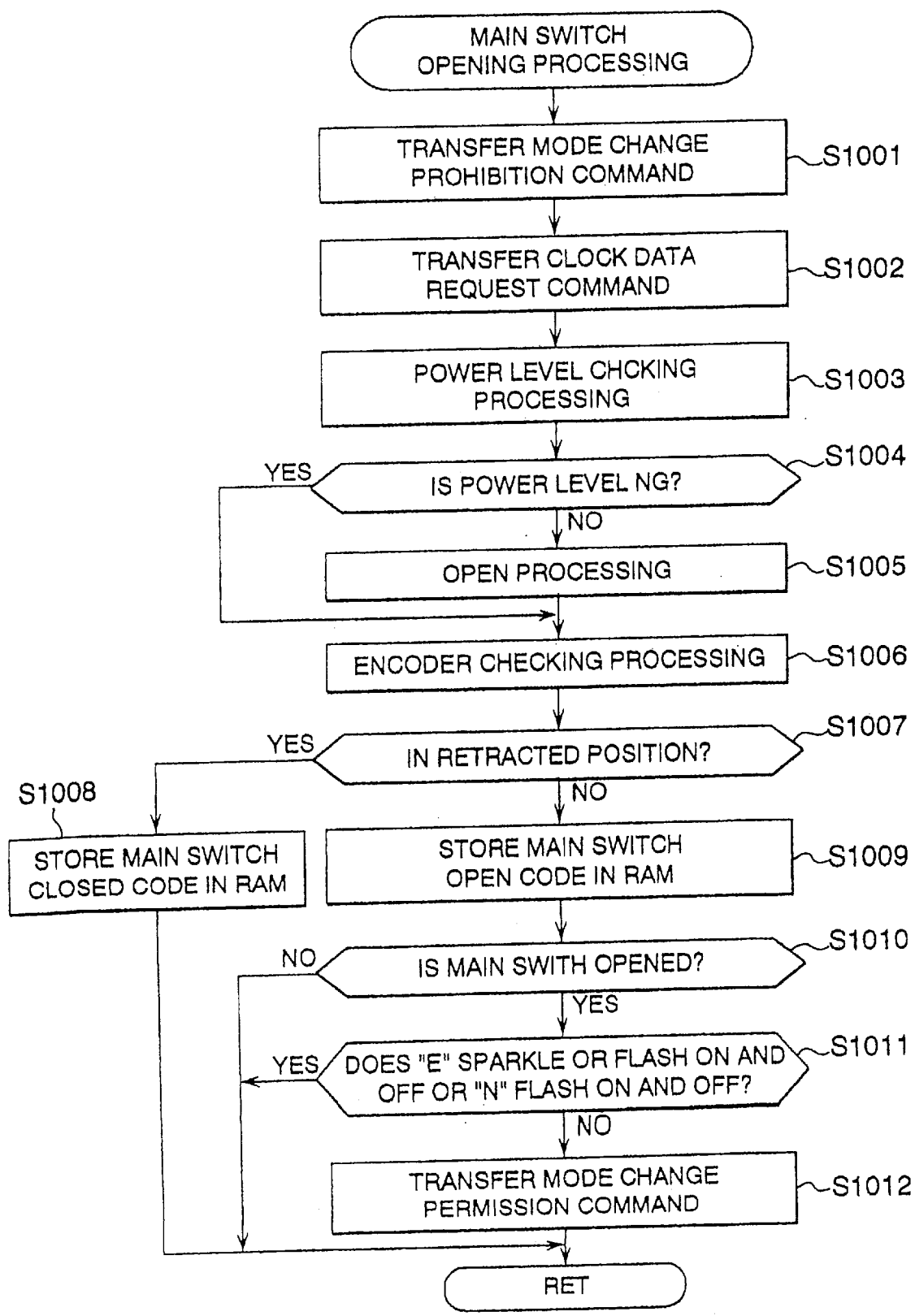
FIG. 17 is a flow chart illustrating a main switch opening processing sequence routine.

Referring to FIG. 17, which is a flow chart of the main switch opening processing sequence routine, when the flow chart logic commences and control proceeds directly to a function block at step S1001 where a mode change prohibition command is transferred to the operation card 60 to prohibit any change in available mode. Subsequently, a clock data request command is transferred to the operation card 60 through the communication units 110 and 137 to request the operation card 60 to transfer clock data at step S1002. After checking a power level of the battery 104 at step S1003, the power level is compared with a threshold level to determine that the battery 104 is no good for use at step S1004. When the battery 104 does not lack for power, opening processing is executed to actuate the lens drive mechanism 113 to shift the zoom lens 15 to a predetermined position for taking a picture at step S1005. After execution of the opening processing or when the battery 104 lacks for, power, the encoder checking processing is executed to detect a position of the zoom lens 15 at step S1006. Based on a result of the encoder checking processing, a judgement is made at step S1007 as to whether the zoom lens 15 is in the retracted position. When the zoom lens 15 is in the retracted position, after storing a main switch close code indicating that the camera system 1 is not in condition for exposure in RAM 101b of CPU 101 at step S1008, the flow chart logic terminates the main switch opening processing.

On the other hand, when the zoom lens 15 is out of the retracted position, after storing a main switch open code indicating that the camera system 1 is ready for exposure in RAM 101b of CPU 101 at step S1009, RAM 101b of CPU 101 is accessed to judge whether there is a main switch open code in RAM 101b of CPU 101 at step S1010. When it is found that there is a main switch open code in RAM 101b of CPU 101, a judgement is subsequently made at step S1011 as to whether the sign "E" displayed on LCD panel 71 sparkles or flashes on and off, or a numeral "N" displayed on LCD panel 71 flashes on and off. When nothing of the sign "E" and the numeral "N" appears on LCD panel 71, a mode change permission command is transferred to the operation card 60 to permit any change in available mode at step S1012. When it is found that there is no a main switch open code in RAM 101b of CPU 101, or when the sign "E" displayed on LCD panel 71 sparkles or flashes on and off, or a numeral "N" displayed on LCD panel 71 flashes on and off, the flow chart logic terminates the main switch opening processing.

Figure 18A:
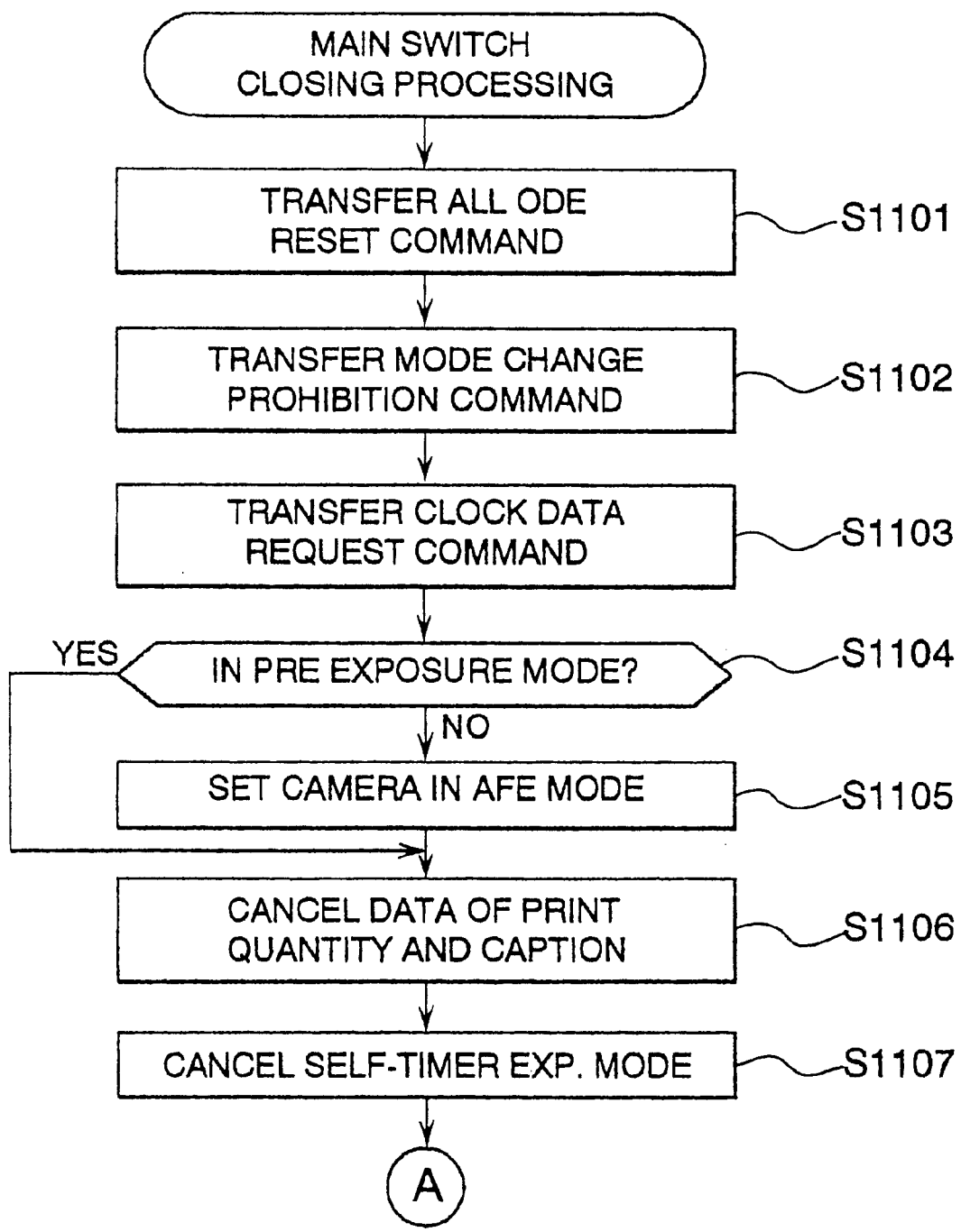
FIGS. 18A and 18B are a flow chart illustrating a main switch closing processing sequence routine.
Figure 18B:
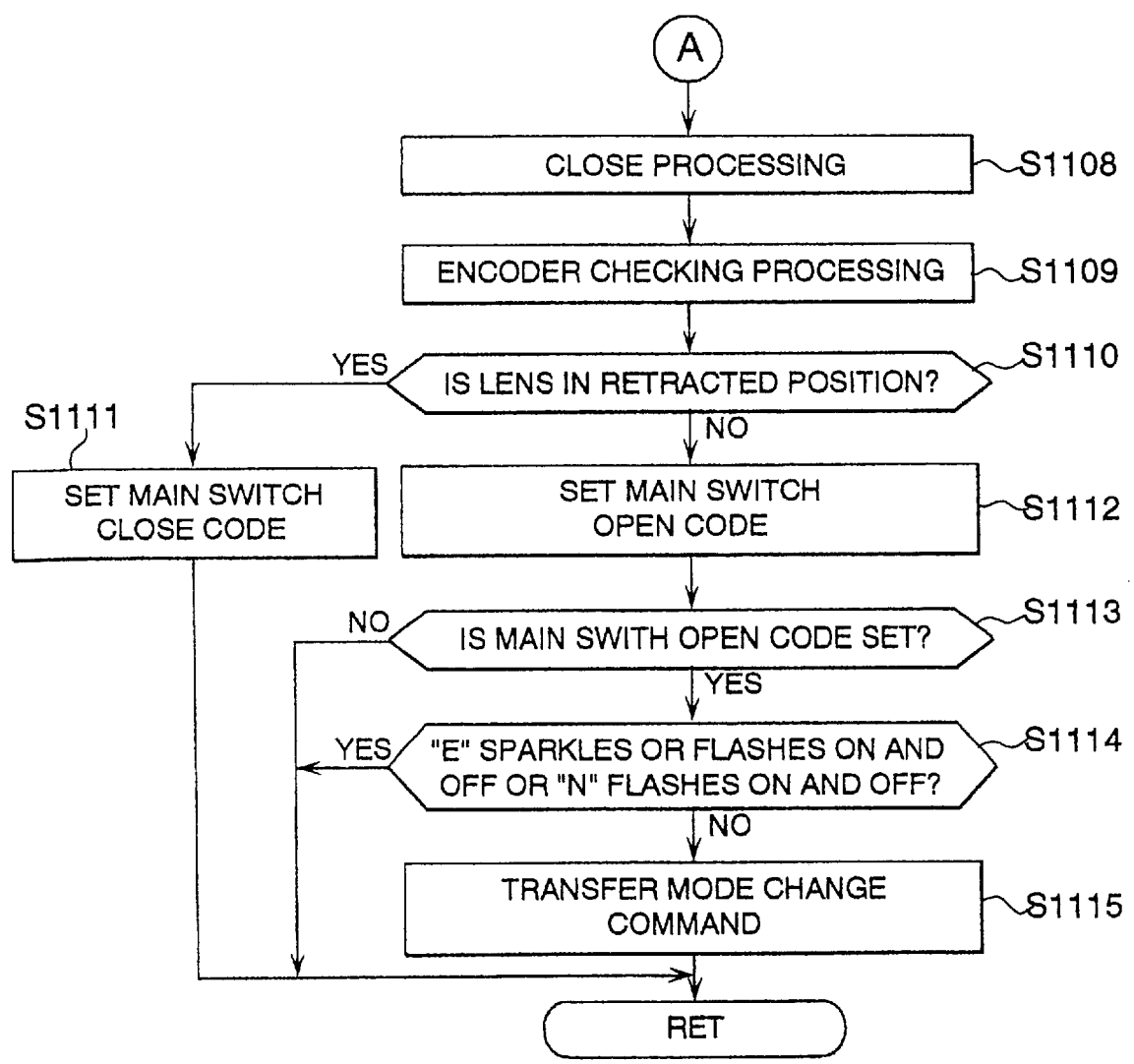

Referring to FIGS. 18A and 18B, which are a flow chart of the main switch closing processing sequence routine, when the flow chart logic commences and control proceeds directly to a function block at step S1101 where a mode reset command is transmitted to the operation card 60 through the communication units 110 and 137 to cancel all available mode. Subsequently, a mode change prohibition command is transferred to the operation card 60 through the communication units 110 and 137 to prohibit any change in available mode at step S1102, and a clock data request command is transferred to the operation card 60 through the communication units 110 and 137 to request the operation card 60 to transfer clock data at step S1103. A judgement is made at step S1104 as to whether the camera system 10 has been put in the red-eye effect preventive flash exposure (PRE) mode. When the camera body 10 is in the red-eye effect preventive flash exposure (PRE) mode, or after putting the camera body 10 in the auto-flash exposure (AFE) mode at step S1105 when it is not in the red-eye effect preventive flash exposure (PRE) mode, data of the print quantity (PQ) and selected caption (ST) and data of the self-timer exposure mode in RAM 101b of CPU 101 are removed at step S1106 and S1107, respectively. Subsequently, closing processing is executed to actuate the lens drive mechanism 113 to shift back the zoom lens 15 to the a retracted position at step S108. After execution of the opening processing, the encoder checking processing is executed to detect a position of the zoom lens 15 at step S1109. Based on a result of the encoder checking processing, a judgement is made at step S1110 as to whether the zoom lens 15 is in the retracted position. When the zoom lens 15 is in the retracted position, after setting a main switch close code indicating that the camera system 1 is not in condition for exposure is stored in RAM 101b of CPU 101 at step S1111, the flow chart logic terminates the main switch closing processing.

On the other hand, when the zoom lens 15 is out of the retracted position, after storing a main switch open code indicating that the camera system 1 is ready for exposure in RAM 101b of CPU 101 at step S1112, RAM 101b of CPU 101 is accessed to judge whether there is a main switch open code in RAM 101b of CPU 101 at step S1113. When it is found that there is a main switch open code in RAM 101b of CPU 101, a judgement is subsequently made at step S1114 as to whether the sign "E" displayed on LCD panel 71 sparkles or flashes on and off, or a numeral "N" displayed on LCD panel 71 flashes on and off. When nothing of the sign "E" and the numeral "N" appears on LCD panel 71, a mode change permission command is transferred to the operation card 60 to permit any change in available mode at step S1115. When it is found that there is no a main switch open code in RAM 101b of CPU 101, or when the sign "E" displayed on LCD panel 71 sparkles or flashes on and off, or either the sign "E" or a numeral "N" displayed on LCD panel 71 flashes on and off, the flow chart logic terminates the main switch closing processing.

By execution of the main switch opening/closing processing, it is possible to notify existence of a film cartridge, the number of unexposed frames and the power level of a battery by operating the main switch 26 even while the operation card 20 remains attached to the front 12 of the camera body 10. Further, the camera system 1 is automatically put in the red-eye effect preventive flash exposure (PRE) mode at the end of use, which is always desirable for the photographer to use the camera system 1.

Figure 19B:
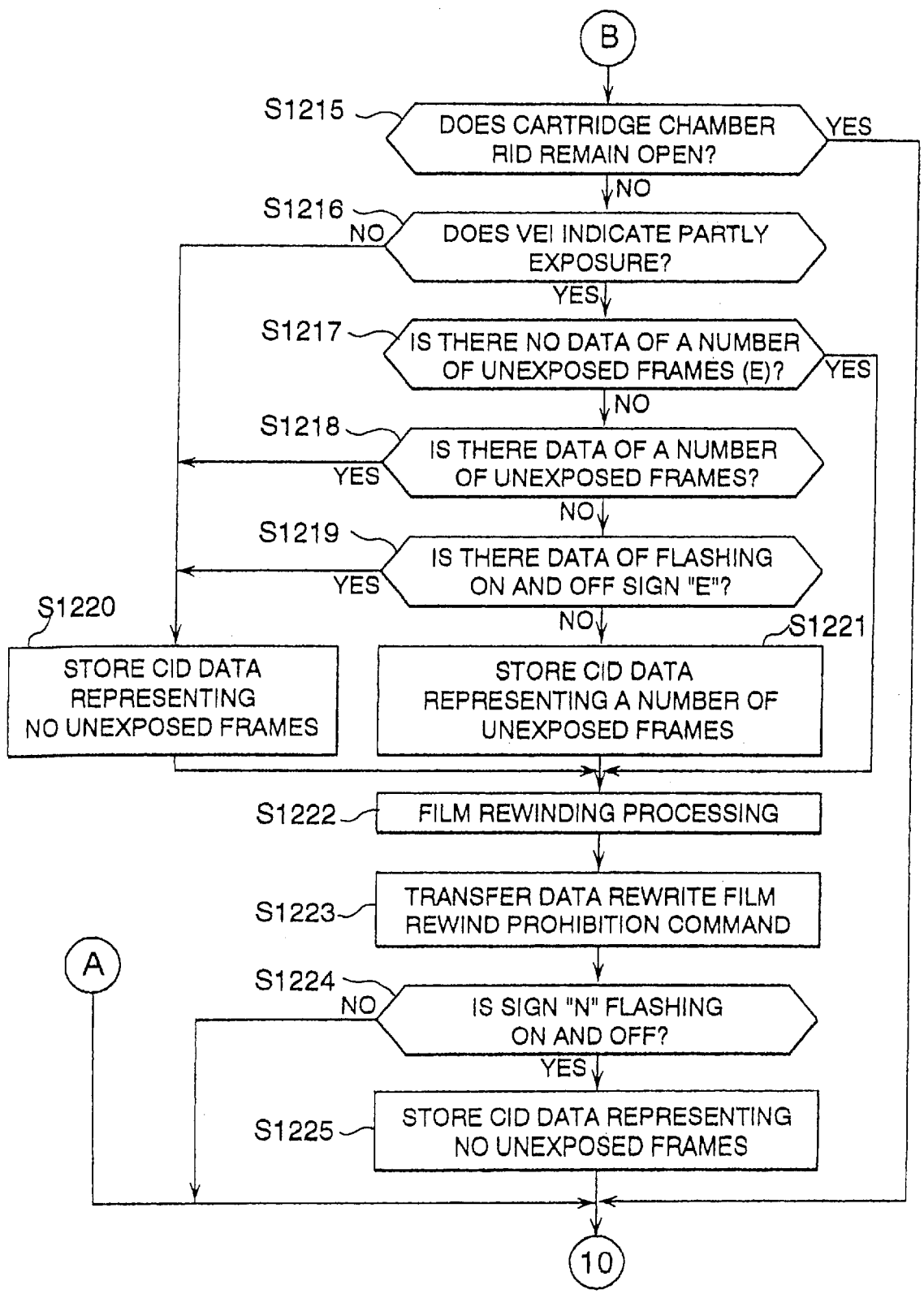
Figure 19C:
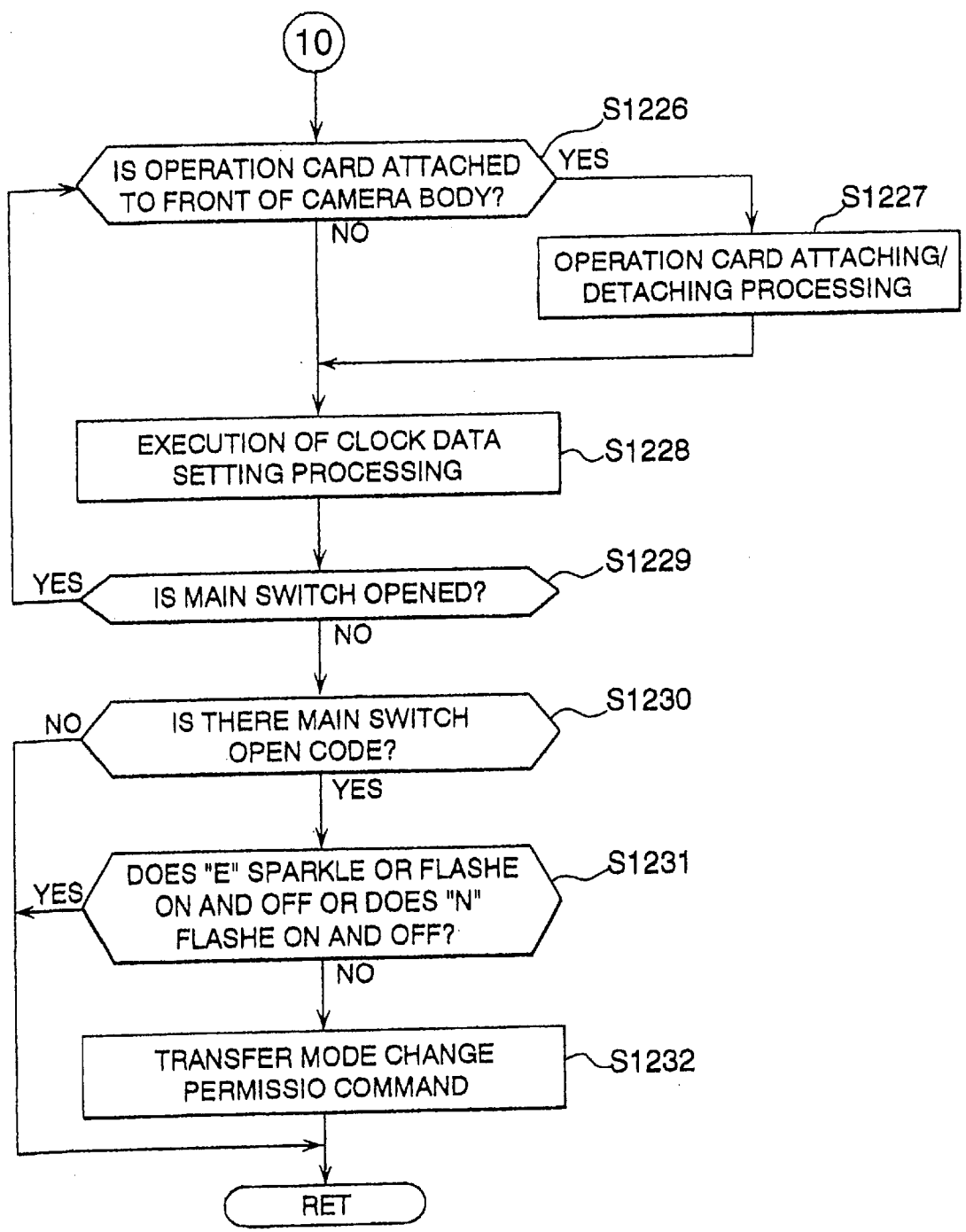
Figure 20A:
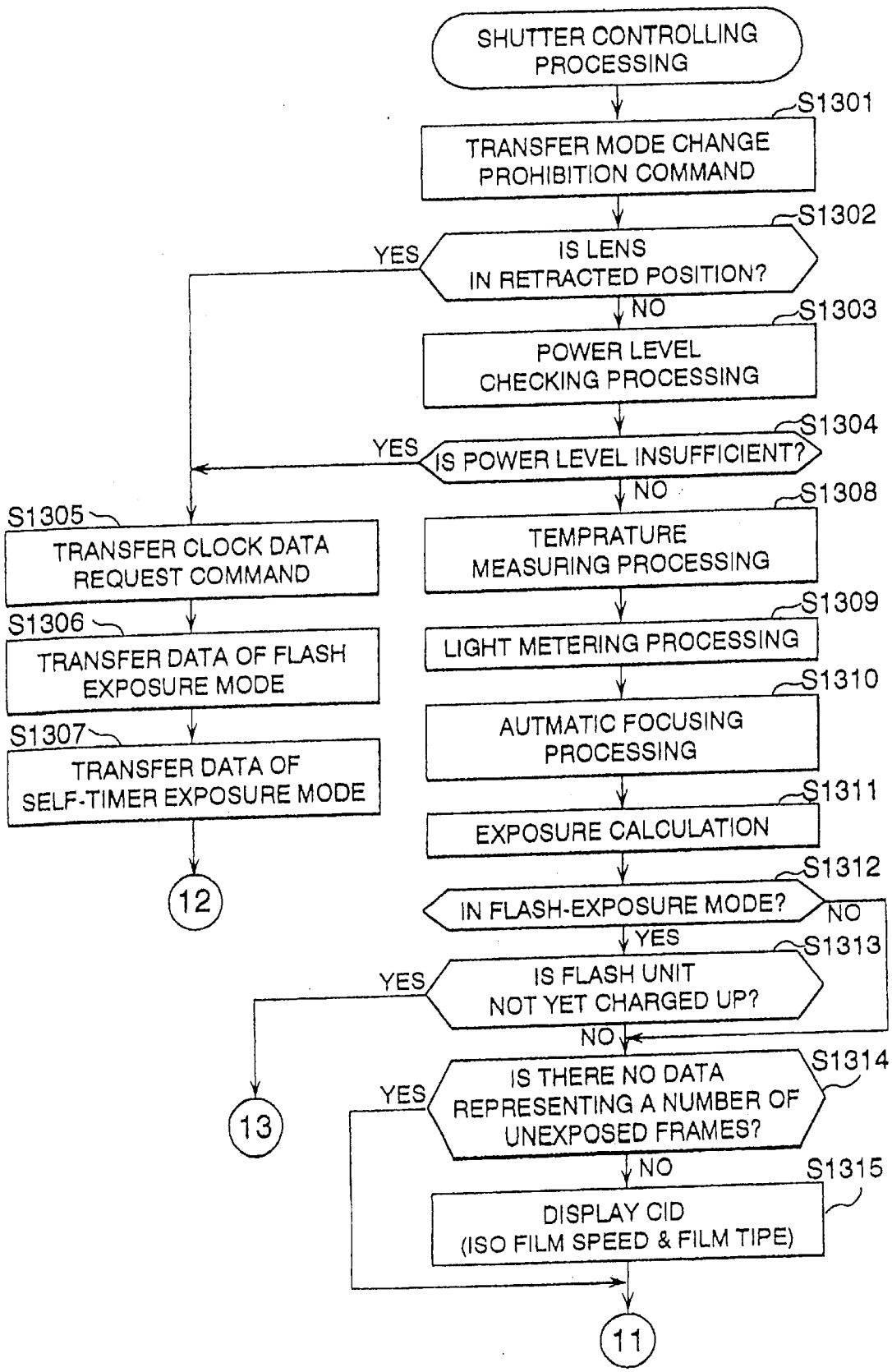
FIGS. 20A–20F are a flow chart illustrating a shutter release processing sequence routine.
Figure 20B:
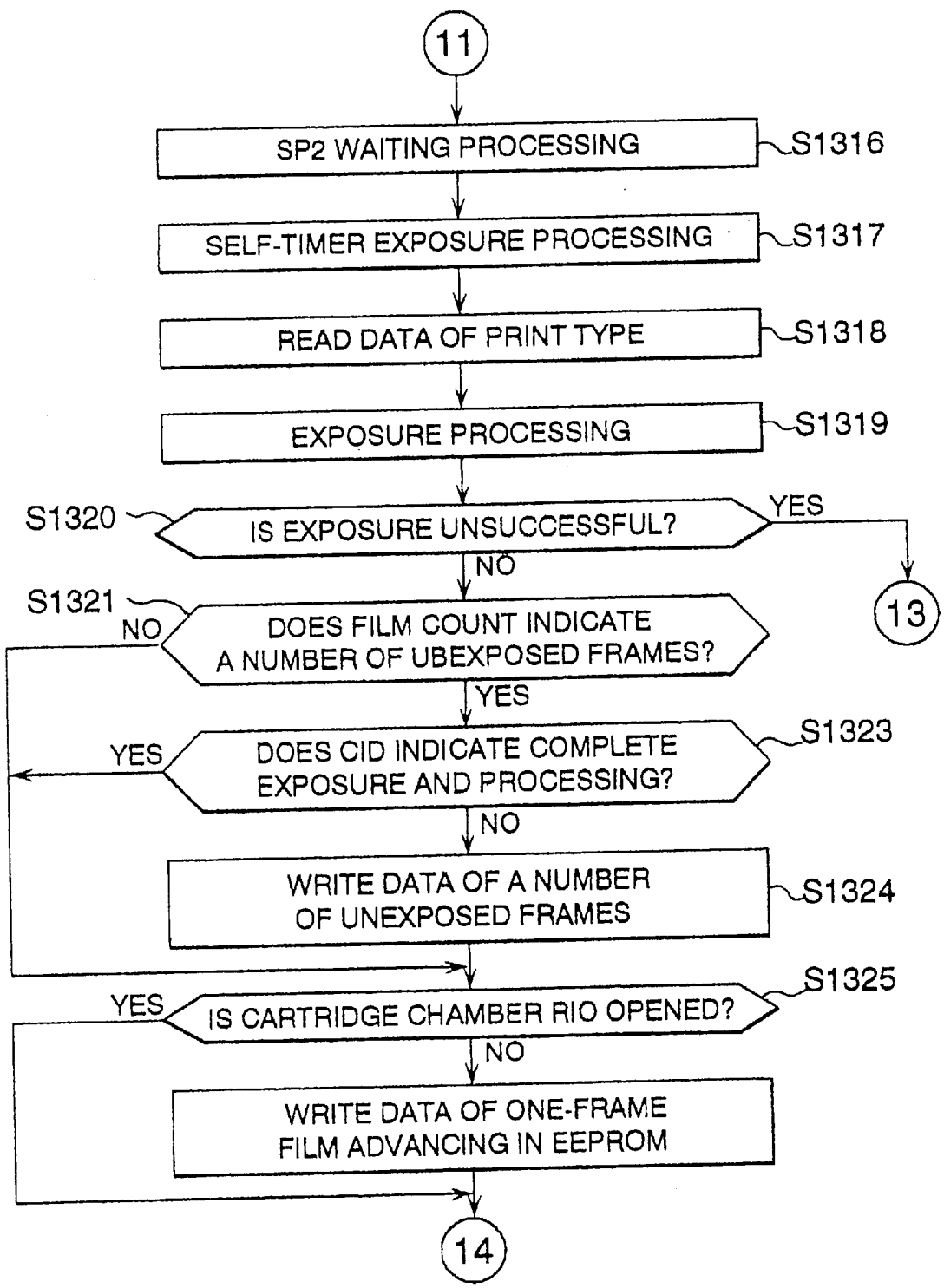
Figure 20C:
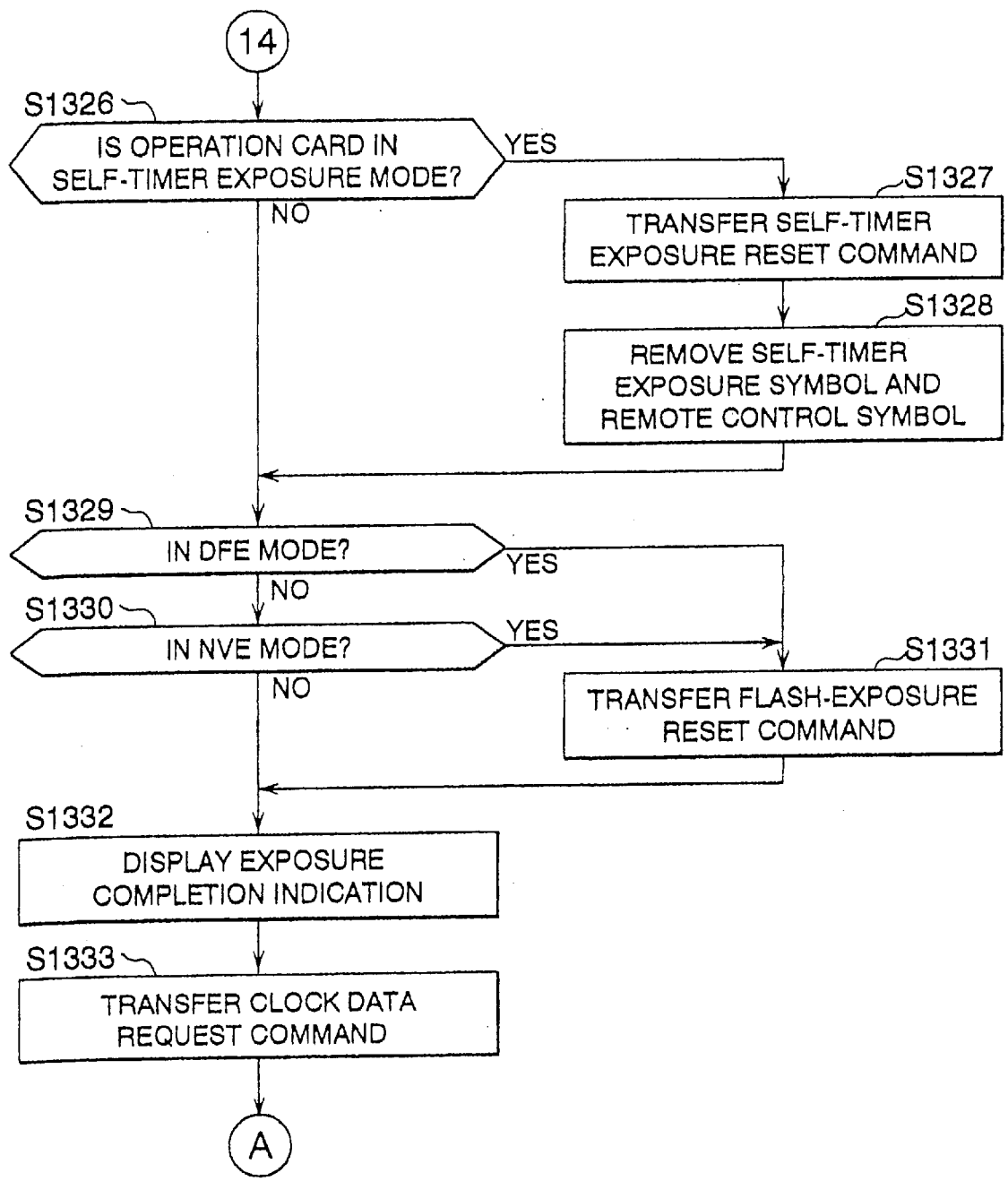
Figure 20D:
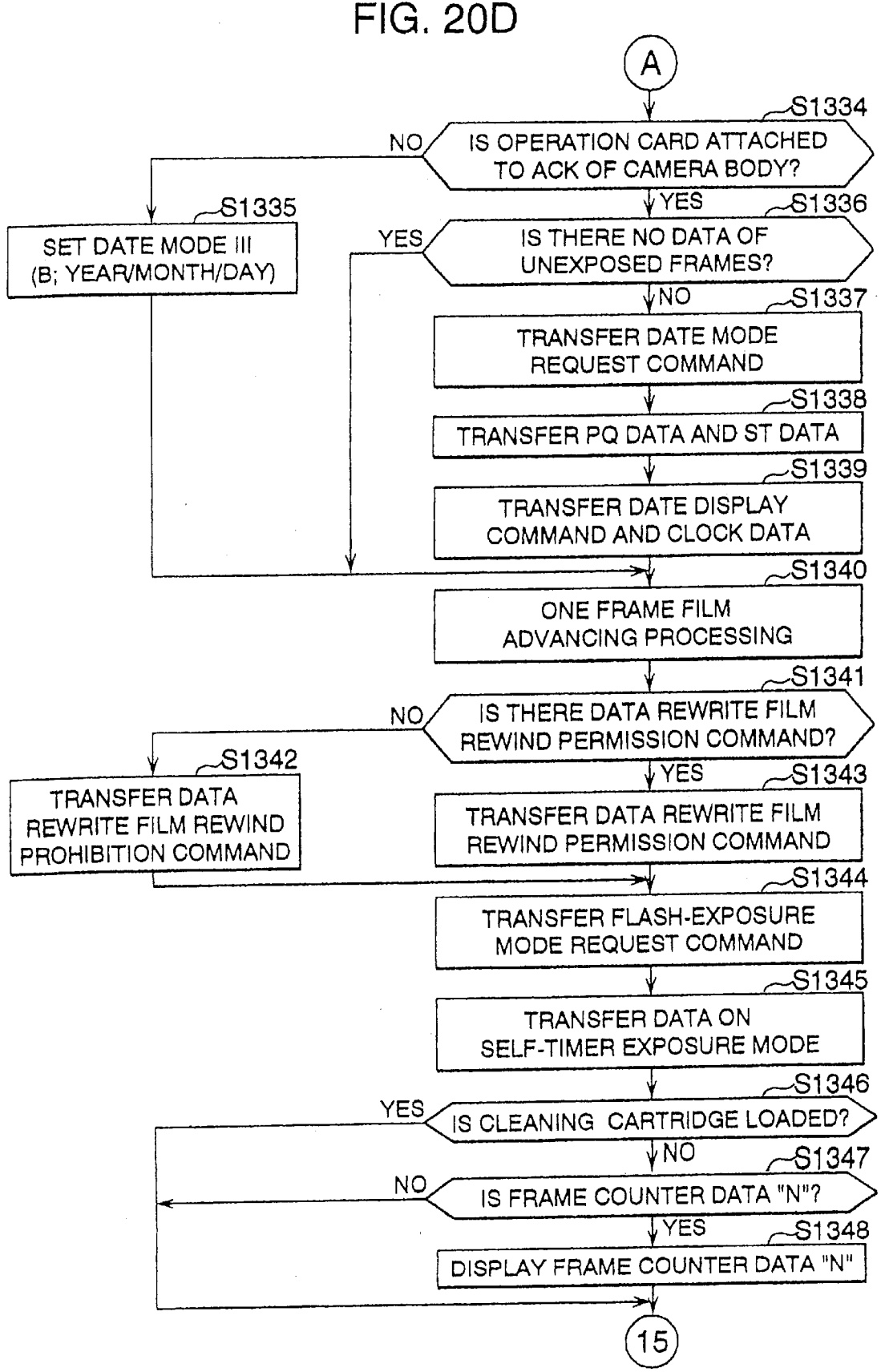
Figure 20E:
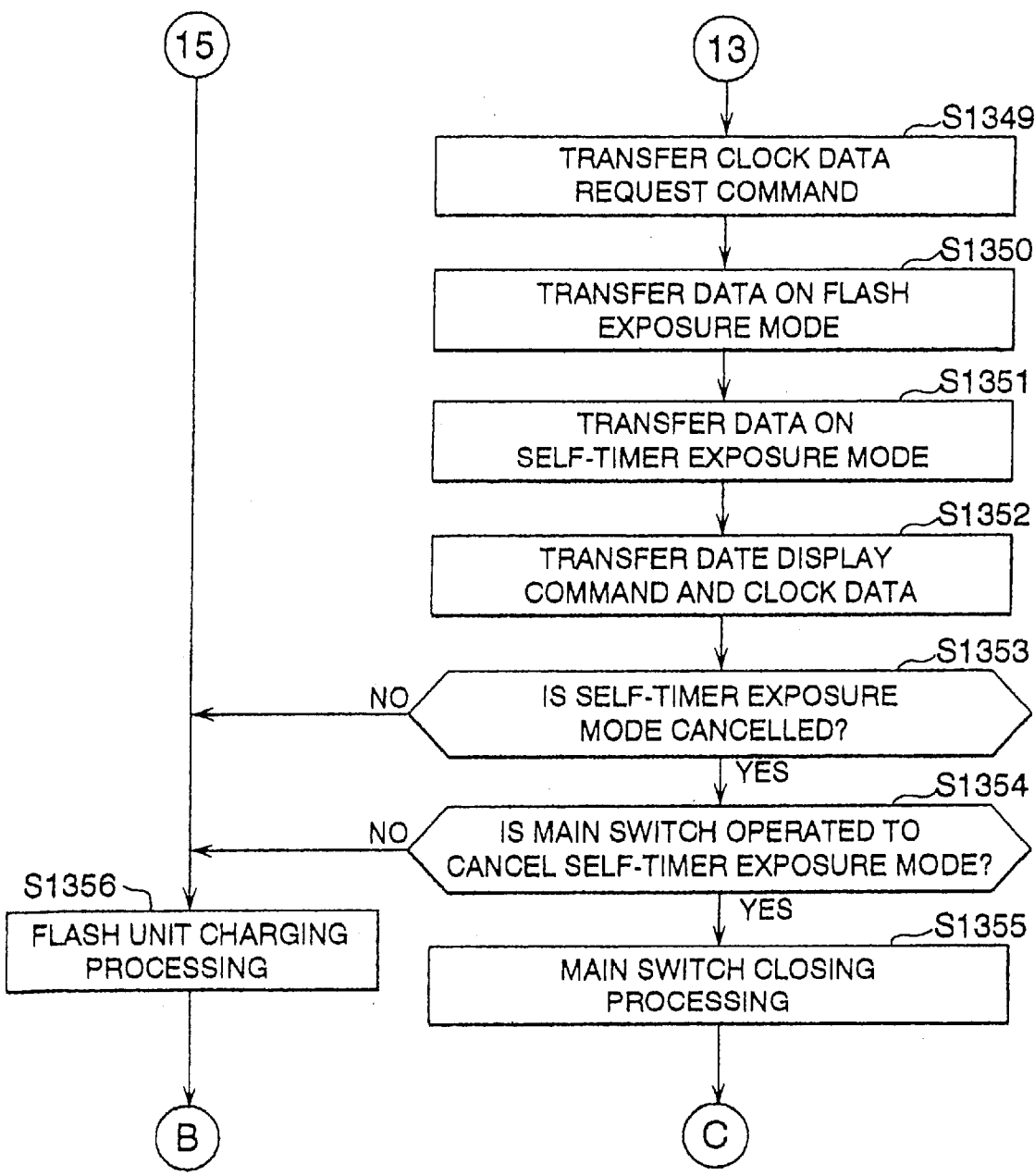
Figure 20F:
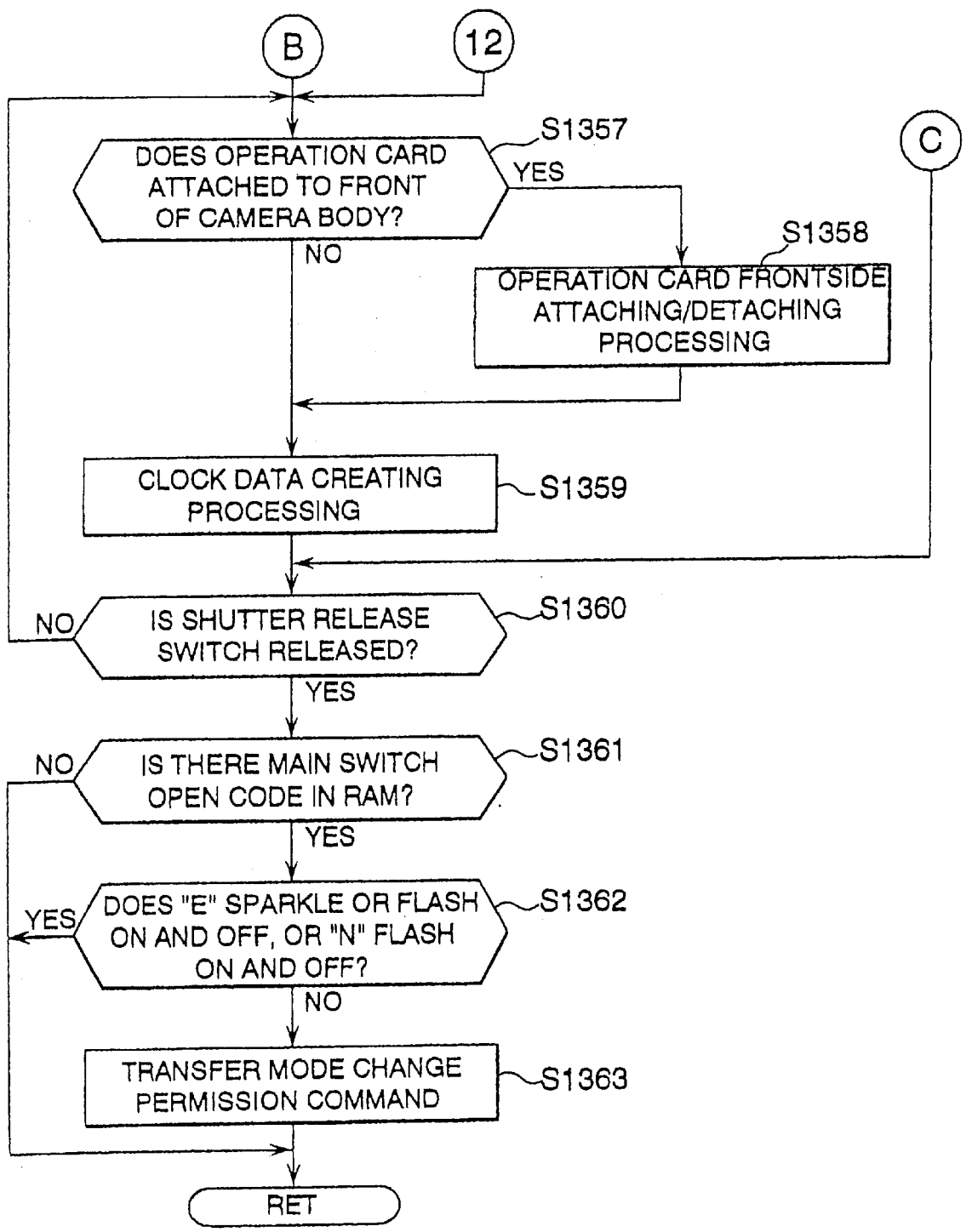

Referring to FIGS. 19A through 19C, which are a flow chart of the manual film rewinding processing sequence routine called for in response to operation of the manual rewind switch 55, when the flow chart logic commences and control proceeds directly to a function block at step S1201 where a reset command is transferred to the operation card 60 through the communication units 110 and 137 to cancel the self-timer exposure mode, the print quantity (PQ) and the number of unexposed frames (ST). Subsequently, a mode change prohibition command is transferred to the operation card 60 through the communication units 110 and 137 to prohibit any change in available mode at step S1202, and a clock data request command is transferred to the operation card 60 through the communication units 110 and 137 to request the operation card 60 to transfer clock data at step S1203. After removing data of setting the self-timer exposure mode and data of the print quantity (PQ) and selected caption (ST) in RAM 101b of CPU 101 at step S1204 and S1205, respectively, a power level of the battery 104 is checked at step S1206. Thereafter, a judgement is made at step S1207 as to whether the cartridge chamber rid 52 remains open. When the cartridge chamber rid 52 has been closed, detection of a film cartridge 200 loaded into the cartridge chamber 54 of the camera body 10 is made based on a signal from the cartridge sensor 56 at step S1208. Data of existence or absence of a film cartridge is stored in RAM 101b of CPU 101. When the cartridge chamber rid 52 remains open at step S1207 or after execution of the detection of a film cartridge 200 in the cartridge chamber 54 of the camera body 10 at step S1208 when the cartridge chamber rid 52 has been closed, RAM 101b is accessed to judge whether there is the data of the number of unexposed frames at step S1209. If there is no data of the number of unexposed frames, another judgement is subsequently made at step S1210 as to whether the camera body 10 has been loaded with a film cartridge 200. When there is no film cartridge 200 in the cartridge chamber 54, data is written in EEPROM 109 to set initial data including an ISO film speed, a film type and an initial frame counter value at step S1211. Subsequently, a data rewrite film rewind permission command in RAM 101b is cancelled at step S1212, and a data rewrite film rewind prohibition command is transferred to the operation card 60 through the communication units 110 and 137 at step S1213. When the operation card 60 receives the data rewrite film rewind prohibition command, the operation card 60 is put impossible to receive a film rewind command. A date display command and data of a date are transferred to the operation card 60 at step S1214.

On the other hand, when there is the data of the number of unexposed frames in RAM 101b, or when there is a film cartridge 200 loaded in the cartridge chamber 54 while there is no data of the number of unexposed frames in RAM 101b, a judgement is made at step S1215 as to whether the cartridge chamber rid 52 remains open. When the cartridge chamber rid 52 has been closed, a judgement is made at step S1216 as to whether the visual exposure index (VEI) system indicates a semi-circular cut-out in the data disk 201 of the film cartridge 200 indicating that the film in the film cartridge 200 is partly exposed and partly unexposed at step S1216. When the visual exposure index (VEI) system indicates the semi-circular cut-out in the data disk 201 of a film cartridge 200, RAM 101b of CPU 101 is accessed to make judgements as to whether there is data representing the sign "E" that indicates that the film in the film cartridge 200 has no available or unexposed frames at step S1217 and whether there is data representing "N" that indicates a number of available or unexposed frames of the film in the film cartridge 200 at step S1218, respectively. When there is no data relating to unexposed and exposed frames made at steps S1217 and S1218, RAM 101b of CPU 101 is further accessed to judge whether there is data representing that the sign "N" should flash on and off at step S1219. When the visual exposure index (VEI) system indicates an index other than the semi-circular cut-out in the data disk 201 of the film cartridge 200, when there is no data representing both "E" and "N" in RAM 101b, or when there is the data representing that the sign "N" should flash on and off in RAM 101b, a frame counter data is stored as cartridge identification data (CID) indicating no available unexposed frames in RAM 101b of CPU 101 at step S1220. When there is no data representing that the sign "N" shoud flash on and off in RAM 101b, a frame counter data is stored as cartridge identification data (CID) indicating a number of available unexposed frames in RAM 101b of CPI 101 at step S1221. After storing a frame counter data at step S1220 or S1221, the film rewind processing is executed, in which the film advancing mechanism 114 is actuated to rewind the whole length of film into the film cartridge 200 and the visual exposure index (VEI) system is actuated to show the semi-circular cut-out in the data disk 201 of the film cartridge 200 at step S1222. Subsequently, after transferring a data rewrite film rewind prohibition command to the operation card 60 through the communication units 110 and 137 to prevent reception of film rewind command at step S1223, a judgement is made at step S1224 as to whether data to be stored in RAM 101b indicates that the sign "N" should flash on and of. When there is no such data or after storing data indicating there is no cartridge identification data (CID) in RAM 101b of CPI 101 at step S1225 when there is the data, a judgement is further made based on a signal from the attach/detach detection switch 32 at step S1226 as to whether the operation card 60 is attached to the camera body 10 from the front 12. When the operation card 60 remains detached, or after execution of the front side operation card attaching/detaching processing at step S1227 when the operation card 60 is attached to the camera body 10 from the front 12, after execution of the clock data setting processing at step S1228 another judgement is made at step S1229 as to whether the main switch 26 remains operated. Until operation of the main switch 26 is discontinued, the flow chart logic orders return to the step of the decision concerning attaching the operation card 60 to the camera body 10 from the front 12 made at step S1226. When operation of the main switch 26 is discontinued, RAM 101b of CPU 101 is accessed to judge whether there is a main switch open code in RAM 101b of CPU 101 at step S1230. When the main switch open code is found in RAM 101b of CPU 101, a judgement is subsequently made at step S1231 as to whether the sign "E" displayed on LCD panel 71 sparkles or flashes on and off, or a numeral "N" displayed on LCD panel 71 flashes on and off. When nothing of the sign "E" and the numeral "N" appears on LCD panel 71, a mode change permission command is transferred to the operation card 60 to permit any change in available mode at step S1233. When it is found that there is no main switch open code in RAM 101b of CPU 101, or when the sign "E" displayed on LCD panel 71 sparkles or flashes on and off, or either the sign "E" or a numeral "N" displayed on LCD panel 71 flashes on and off, or after transfer of the mode change permission command to the operation card 60, the flow chart logic terminates the manual film rewinding processing and orders return to the branch processing sequence routine after the step in the sequence routine calling for the manual film rewinding processing sequence routine.

By execution of the manual film rewinding processing, it is possible to rewind the whole length of film into the film cartridge 200 whenever the manual rewind switch 55 is operated even while the film is partly unexposed, which is always convenient for the photographer.

FIGS. 20A through 20F are a flow chart of the shutter controlling processing sequence routine called for in response to operation of the shutter release switch 27. It will be recalled from the previously description, the shutter release switch 27 has a two step stroke, i.e. the first half stroke (which is hereafter referred to as the SP1 stroke) for subject distance metering and focusing and the second half stroke (which is hereafter referred to as the SP2 stroke) for an exposure.

When the flow chart logic commences and control proceeds directly to a function block at step S1301 where a mode change permission command is transferred to the operation card 60 through the communication units 110 and 137 to prohibit any change in available mode. Subsequently, the encoder checking processing is executed to detect whether the zoom lens 15 has been put in the retracted position at step S1302. When the zoom lens 15 is out of the retracted position, after checking a power level of the battery 104 at step S1303, the power level is compared with a threshold level to determine that the battery 104 is no good (NG) for use at step S1304. When the zoom lens 15 is out of the retracted position or when the battery 104 lacks for power, then, a clock data request command is transferred to the operation card 60 through the communication units 110 and 137 to request the operation card 60 to transfer clock data at step S1305. In response to reception of the clock data request command, the operation card 60 transfers renewed clock data to the camera body 10 or a return signal indicating a conclusion of transfer of clock data renewal when the renewed clock data has been transferred. Subsequently, a flash mode request command is transferred to the operation card 60 through the communication units 110 and 137 to request the operation card 60 to transfer data on a flash mode set in the operation card 60 at step S1306, and a self-timer exposure mode request command is transferred to the operation card 60 through the communication units 110 and 137 to request the operation card 60 to transfer data on the self-timer exposure mode to the camera body 10 at step S1307. In response to reception of these commands, the operation card 60 transfer data on the flash exposure mode and the self-timer exposure mode through the communication units 110 and 137 at step S1306 and S1307, respectively.

On the other hand, when the battery 104 does not lack for power, a temperature of the camera body 10 is detected by a temperature sensor (not shown) installed in the camera body 10 at step S1308, the light metering unit 117 is actuated to receive light from a subject through the light metering window 22 to detect the brightness of the subject at step S1309, and the automatic focusing (AF) processing is executed to detect a subject distance from the camera body 10 at step S1310. Based on the brightness and distance of the subject detected at steps S1309 and 1310 a calculation of proper exposure is made at step S1311. Subsequently, judgements are made as to whether the camera system 1 is placed in any flash mode at step S1312, and whether the built-in electronic flash unit has not yet been charged up at step S1313 when the camera system 1 is placed in any flash mode. When the camera system 1 is not placed in any flash mode or when the built-in electronic flash unit has been charged up, RAM 101b of CPU 101 is accessed at step S1314 to judge whether there is no data representing a number of available or unexposed frames "N" of the film in the film cartridge 200. When it is found that there is data representing a number of available or unexposed frames "N" of the film in RAM 101b of CPU 101, the cartridge identification data (CID) is transferred to the operation card 60 to display the ISO film speed and the film type on LCD panel plate 71 of the operation card 71 at step S1315.

When there is no data representing a number of available or unexposed frames "N" of the film in RAM 101b of CPU 101, or after displaying the ISO film speed and the film type on LCD panel plate 71 of the operation card 71, SP2 waiting processing and self-timer exposure processing, which will be described in detail later, are consecutively executed at step S1316 and S1317.

Subsequently, at step S1318, one of the print types, namely the normal print, high-vision print and the panoramic print, selected by the print type select switch 25 is read in CPU 101. Thereafter, the exposure processing which will be described in detail later is executed at step S1319. At step S1320, a judgement is made as to whether the exposure is unsuccessful. When the exposure is successful or proper, a judgement is made at step S1321 as to whether frame counter data to be stored in RAM 101b of CPU 101 indicates a number of unexposed frames "N." When the film counter data indicates a number of unexposed frames "N," another judgement is made at step S1322 as to whether the film is not completely exposed nor processed. When the film is not completely exposed, then, data indicating that the film is partly exposed and data of the number of unexposed frames "N" are stored in EEPROM 109 at step S1323. When the film counter data does not indicate a number of unexposed frames "N" or when the film is completely exposed, or after storing the data of use of the film and the frame counter data in EEPROM 109, a further judgement is made at step S1324 as to whether the cartridge chamber rid 52 is opened. When the cartridge chamber rid 52 remains closed, data indicating that the film is being advanced by one frame at step S1325.

When the cartridge chamber rid 52 is opened at step S1324 or after storing the data indicating one-frame advancement of the film at step S1325, a judgement is made at step S1326 as to whether the operation card 60 has been put in the self-timer exposure mode. When the operation card 60 is in the self-timer exposure mode, a self-timer exposure reset command is transferred to the operation card 60 through the communication units 110 and 137 to cause it to cancel the self-timer exposure mode at step S1327, and LCD panel 71 is forced to remove the self-timer exposure mode symbol 71e and the remote control mode symbol 71f at step S1328. When the operation card 60 is not in the self-timer exposure mode, or after disappearance of the self-timer exposure mode symbol 71e and the remote control mode symbol 71f, judgements are consecutively made at step S1329 and S1330 as to whether the camera body 10 has been put in the distant view flash exposure (DFP) mode and whether the camera body 10 has been put in the night view flash exposure (NVP) mode, respectively. When the camera body 10 is in the distant view flash exposure (DVP) mode or is put in the night view flash exposure (NVP) mode, a flash mode reset command is transferred to the operation card 60 through the communication units 110 and 137 to put it the auto-flash exposure (AFE) mode at step S1331. When the camera body 10 is put neither in the distant view flash exposure (DVE) mode nor in the night view flash exposure (NVE) mode, or after putting the operation card 60 in the auto-flash exposure (AFE) mode, both light emitting elements placed behind the self-timer window 18 and the automatic focusing window 42 are energized to sparkle for 10 ms so as thereby to provide an indication that the exposure is completed at step S1332, and then a clock data request command is transferred to the operation card 60 through the communication units 110 and 137 to request the operation card 60 to transfer clock data at step S1333. In response to reception of the clock data request command, the operation card 60 transfers renewed clock data to the camera body 10 or a return signal indicating a conclusion of transfer of clock data renewal when the renewed clock data has been transferred. Thereafter, at step S1334, a judgement is made as to whether the operation card 60 is attached to the camera body 10 from the back 13. When the operation card 60 remains detached, the operation card 60 is put in the date mode III in which the sign "B" (back print) is displayed together with a date of year, month and day on LCD panel 71 at step S1335. On the other hand, when the operation card 60 is attached to the camera body 10 from the back 13, RAM 101b of CPU 101 is accessed to make a judgement as to whether there is no data representing "N" that indicates a number of available or unexposed frames of the film in the film cartridge 200 at step S1336. When there is the data in RAM 101b of CPU 101, a date mode request command is transferred to the operation card 60 through the communication units 110 and 137 to request the operation card 60 to transfer clock data at step S1337. In response to reception of the date mode request command, the operation card 60 transfers data of the date mode to the camera body 10. A request command is transferred to the operation card 60 through the communication units 110 and 137 to request data of print quantity (PQ) and selected caption (ST) to the camera body 10 at step S1338. In response to reception of the request command, the operation card 60 transfers the data of print quantity (PQ) and selected caption (ST) to the camera body 10. Subsequently, a date display command is transferred together with clock data to the operation card 60 through the communication units 110 and 137 to cause the LCD driver 138 to put LCD panel 71 in the date display mode at step S1339. The clock data is held as time count data by CPU 131.

After putting the operation card 60 is put in the date mode III S1335 or after transferring the date display command together with clock data to the operation card 60 at step S1339, or when it is judged that there is no data representing "N" that indicates a number of available or unexposed frames in ROM 101b of CPU 101 at step S1336, one-frame advancing processing is executed to actuate the film advancing mechanism 114 to advance the film by one frame at step S1340. Subsequently, at step S1341, RAM 101b of CPU 101 is accessed to judge whether there is data of a data rewrite film rewind permission command. When there is no data of a data rewrite film rewind permission command in RAM 101b of CPU 101 due to an occurrence of an error of one-frame film advance, then, a data rewrite film rewind prohibition command is transferred to the operation card 60 through the communication units 110 and 137 to disable CPU 101 from receiving signals from the switches of the operation card 60 relating to one-frame film rewinding at step S1342. When there is data of a data rewrite film rewind permission command in RAM 101b of CPU 101, then, a data rewrite film rewind permission command is transferred to the operation card 60 through the communication units 110 and 137 to enable the switches of the operation card 60 relating to one-frame film rewinding at step S1343. After transfer of a data rewrite film rewind prohibition command at step S1342 or transfer of a data rewrite film rewind permission command at step S1343, a flash mode request command is transferred to the operation card 60 through the communication units 110 and 137 to request the operation card 60 to transfer data on a flash mode set in the operation card 60 at step S1344, and a self-timer exposure (STE) mode request command is transferred to the operation card 60 through the communication units 110 and 137 to request the operation card 60 to transfer data on the self-timer exposure (STE) mode to the camera body 10 at step S1345. In response to reception of the command, the operation card 60 transfer data on the self-timer exposure (STE) mode through the communication units 110 and 137. At step S1346, a judgement is made as to whether the cartridge in the camera body 10 is a magnetic head cleaning cartridge. When there is not a magnetic head cleaning cartridge but a film cartridge in the camera body 10, another judgement is made at step S1347 as to whether frame counter data to be stored in RAM 101b of CPU 101 indicates a number of unexposed frames "N." When the frame counter data indicates a number of unexposed frames "N," a counter data display command is transferred to the operation card 60 through the communication units 110 and 137 to cause LCD panel 71 to display the number of unexposed frames "N" such as "20 frames" thereon for a predetermined time period at step S1348.

When the built-in electronic flash unit has not yet been charged up at step S1313 or when the exposure is unsuccessful or improper at step S1320, a clock data request command is transferred to the operation card 60 through the communication units 110 and 137 to request the operation card 60 to transfer clock data at step S1349. In response to reception of the clock data request command, the operation card 60 transfers renewed clock data to the camera body 10 or a return signal indicating a conclusion of transfer of clock data renewal when the renewed clock data has been transferred. Subsequently, a flash mode request command is transferred to the operation card 60 through the communication units 110 and 137 to request the operation card 60 to transfer data on a flash mode set in the operation card 60 at step S1350, and a self-timer exposure (STE) mode request command is transferred to the operation card 60 through the communication units 110 and 137 to request the operation card 60 to transfer data on the self-timer exposure (STE) mode to the camera body 10 at step S1351. At step S1352, a date display command is transferred together with clock data to the operation card 60 through the communication units 110 and 137 to cause the LCD driver 138 to put LCD panel 71 in the date display mode. Subsequently, a judgement is made at step S1353 as to whether the self-timer exposure (STE) mode is cancelled in the middle of self-timer exposure. When the self-timer exposure (STE) mode is cancelled, a further judgement is made at step S1354 as to whether the cancellation of self-timer exposure (STE) is caused through operation of the main switch 26, the main switch closing processing is executed to return the zoom lens 15 to the retracted position at step S1355.

After displaying the number of unexposed frames "N" on LCD panel 71 for the predetermined time period at step S1348, or when the self-timer exposure (STE) mode remains effected at step S1353 or when the self-timer exposure (STE) mode is cancelled for some reasons other than operation of the main switch 26 at step S1354, the built-in electronic flash unit is charged at step S1356. After the electronic flash unit charging processing at step S1356, or after the transfer of data on the self-timer exposure (STE) mode to the camera body through the communication units 110 and 137 at step S1307, a judgement is made based on a signal from the attach/detach detection switch 32 at step S1357 as to whether the operation card 60 is attached to the camera body 10 from the front 12. After execution of the front side operation card attaching/detaching processing at step S1258 when the operation card 60 is attached to the camera body 10 from the front 12 or after execution of the clock data setting processing at step S1359 when the operation card 60 remains detached, another judgement is made at step S1360 as to whether the shutter release switch 27 remains operated or depressed half. Until operation or half depression of the shutter releasing switch 27 is discontinued, the flow chart logic orders return to the step of the decision concerning attaching the operation card 60 to the camera body 10 from the front 12 made at step S1357. When operation of the shutter release switch 27 is discontinued, RAM 101b of CPU 101 is accessed to judge whether there is a main switch open code in RAM 101b of CPU 101 at step S1361. When it is found that there is the main switch open code in RAM 101b of CPU 101, a judgement is subsequently made at step S1362 as to whether the sign "E" displayed on LCD panel 71 sparkles or flashes on and off, or a numeral "N" displayed on LCD panel 71 flashes on and off. When nothing of the sign "E" and the numeral "N" appears on LCD panel 71, a mode change permission command is transferred to the operation card 60 to permit any change in available mode at step S1363. When it is found that there is no main switch open code in RAM 101b of CPU 101, or when the sign "E" displayed on LCD panel 71 sparkles or flashes on and off, or either the sign "E" or a numeral "N" displayed on LCD panel 71 flashes on and off, or after transmission of the mode change permission command the operation card 60, the flow chart logic terminates the shutter controlling processing and orders return to the branch processing sequence routine after the step in the sequence routine calling for the shutter controlling processing sequence routine.

Figure 21:
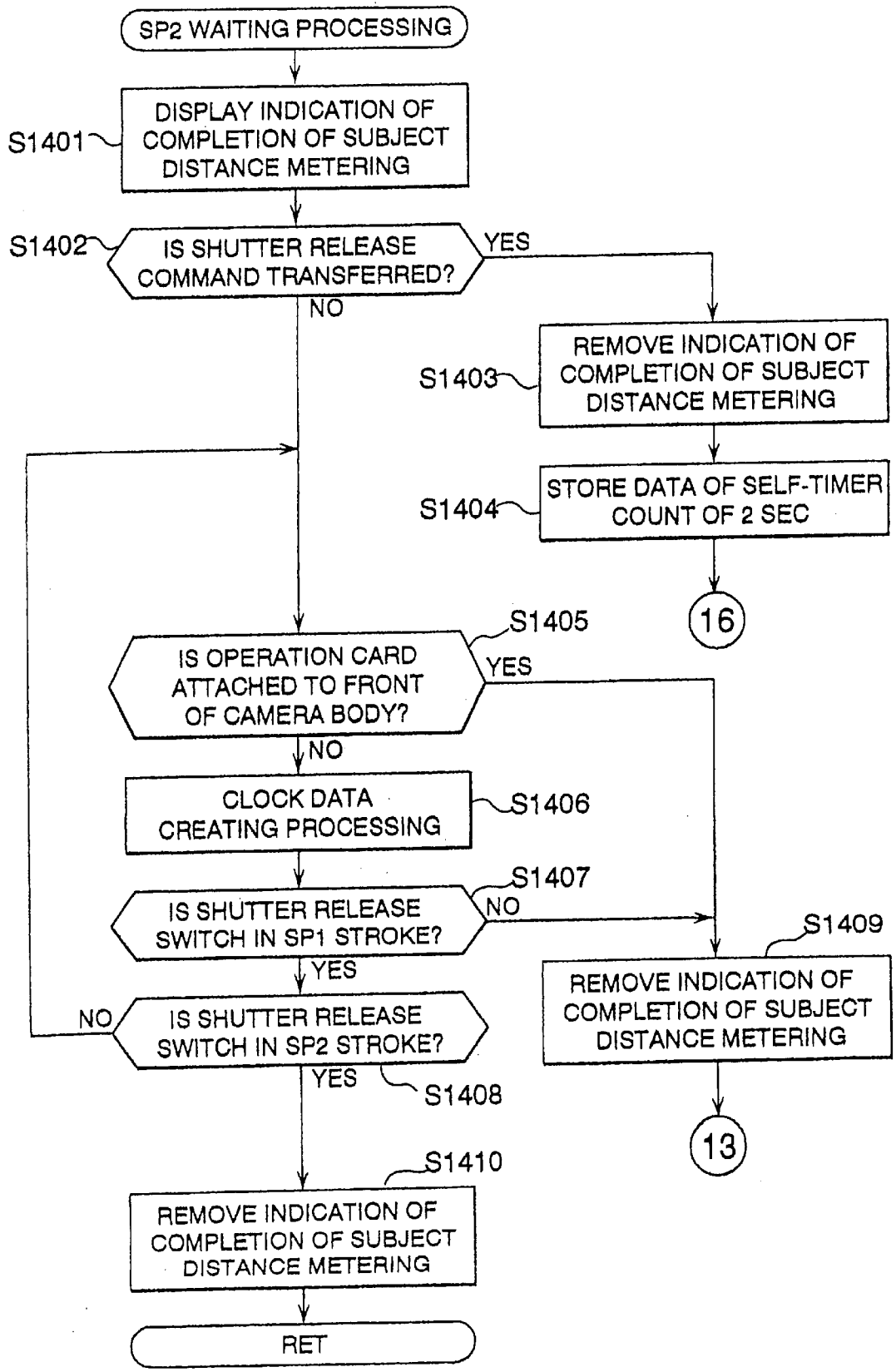
FIG. 21 is a flow chart illustrating a second half shutter depression waiting processing sequence routine.

FIG. 21 is a flow chart of the SP2 waiting processing sequence routine run at step S1316 of the shutter controlling processing sequence routine. The SP2 waiting processing takes place while the shutter release switch 27 remains depressed half. As was previously described, when the shutter release switch 27 is depressed in the first half stroke, i.e. SP1 stroke, the subject distance metering and focusing is executed and the light emitting element in the automatic focusing window 42 is energized to sparkle for 10 ms to indicate that object distance metering is completed at step S1401. Subsequently, a judgement is made at step S1402 as to whether a shutter release command is transferred to the camera body 10 from the operation card 60. In response to reception of the shutter release command, the light emitting element is deenergized at step S1403 and data on a self-timer count of 2 seconds is stored in RAM 101b of CPU 101 at step S1404. Then, the flow chart logic orders a jump to self-timer exposure processing which will be described later after causing the light emitting element in the automatic focusing window 42 to flash on and off for 2 seconds. On the other hand, when the camera body 10 does not any shutter release command, a judgement is made based on a signal from the attach/detach detection switch 32 at step S1405 as to whether the operation card 60 is attached to the camera body 10 from the front 12. When the operation card 60 remains detached, the clock data setting processing is executed at step S1406 to actuate the 250-ms count timer and to create clock data of a date including minute, hour, day, month and year in this order when the 250-ms count timer counts up 60 seconds. The clock data is transferred to the operation card 60 through the communication units 110 and 137. Subsequently, a judgement is made at step S1407 as to whether the shutter release switch 27 is depressed half in the first half stroke SP1. When the operation card 60 is attached to the camera body 10 from the front 12 or when the shutter release switch 27 is released, after deenergizing the light emitting element to remove the indication of completion of subject distance metering at step S1409, the flow chart logic terminates the SP1 waiting processing and orders return to the shutter controlling processing sequence routine after the step in the sequence routine calling for the SP waiting processing sequence routine. When it is judged that shutter release switch 27 is depressed in the first half stroke SP1, after waiting until the shutter release switch 27 is fully depressed in the second half stroke SP2, the light emitting element is deenergized to remove the indication of completion of subject distance metering at step S1410. Then, the flow chart logic terminates the SP1 waiting processing and orders return to the shutter controlling processing sequence routine.

Figure 22A:
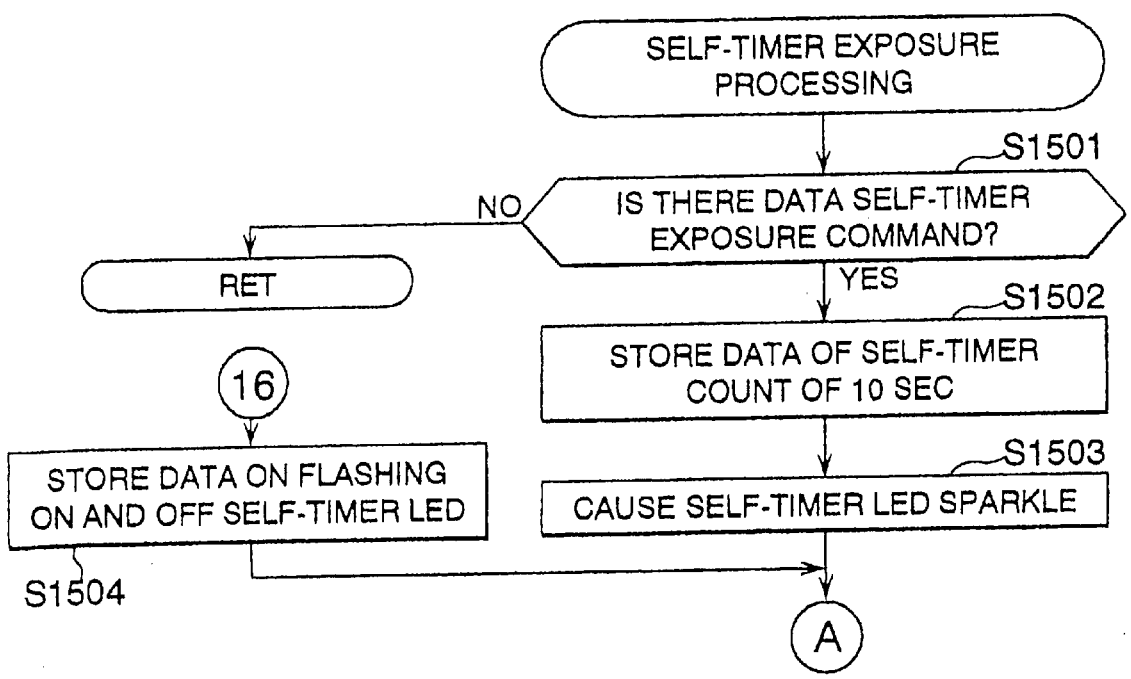

FIGS. 22A and 22B are a flow chart of the self-timer exposure processing sequence routine run within a specified time period when the self-timer exposure (STE) mode is set. When the flow chart logic commences and control proceeds directly a function block at step S1501 to access to RAM 101b of CPU 101 to judge whether there is data of self-timer exposure (STE) command stored therein. When there is not found data of self-timer exposure (STE) command in RAM 101b of CPU 101, the flow chart logic terminates the self-timer exposure controlling processing and orders return to the shutter controlling processing sequence routine after the step in the sequence routine calling for the self-timer exposure processing sequence routine. On the other hand, when there is found data of self-timer exposure command in RAM 101b of CPU 101, a self-timer is set to 10 seconds at step S1502, the light emitting element (self-timer LED) placed behind the self-timer window 18 is caused to sparkle at step S1503. When the data on a self-timer count of 2 seconds is stored in RAM 101b of CPU 101 at step S1404 in the SP2 waiting processing sequence routine, data on flashing on and off the self-timer LED is stored in RAM 101b of CPU 101 at step 1504. After storing the data on flashing on and off the self-timer LED in RAM 101b of CPU 101 at step 1504 or when the light emitting element (self-timer LED) sparkles at step S1503, the self-timer starts to count down the time at step S1505. A judgement is made at step S1506 as to whether the self-timer has counted down the time. When the self-timer has counted down the time, then, after deenergizing the self-timer LED at step S1507, the flow chart logic terminates the self-timer exposure processing and orders return to the shutter controlling processing sequence routine after the step in the sequence routine calling for the self-timer exposure controlling processing sequence routine. Before the self-timer has counted the time, another judgement is made at step S1508 as to whether there is left three seconds or less before the self-timer counts down the time. When there is left three seconds or less, the self-timer LED is caused to flash on and off at step S1509 to provide for subjects peoples an indication that an exposure will be made shortly. When there is left more than three seconds or after causing the self-timer LED to flash on and off at step S1509 when there is left three seconds or less, judgements are consecutively made at steps S1510–S1512 as to whether the main switch 26 is operated, whether the operation card 60 is attached to the camera body 10 from the front 12, and whether the operation card 60 is attached to the camera body 10 from the back 13, respectively. In any event where the main switch 26 is operated, or the operation card 60 is attached to the camera body 10 from the front 12 or from the back 13, data on cancellation of self-timer exposure is stored in RAM 101b of CPU 101 at step S1515. Otherwise, a self-timer exposure data request command is transferred to the operation card 60 through the communication units 110 and 173 at step S1513. In response to reception of the self mode data request command, data on the self-timer exposure is transferred to the camera body 10 from the operation card 60. Subsequently, at step S1514 communication is made between the camera body 10 and the operation card 60 to judge whether the operation card 60 has received a self mode reset signal. Until the operation card 60 receives a self mode reset signal, the flow char logic orders return to the step after the self-timer starts to count down. When the operation card 60 received a self mode reset signal, after storing data on cancellation of self-timer exposure in RAM 101b of CPU 101 at step S1515, the flow chart logic terminates the self-timer exposure controlling processing and orders return to the shutter controlling processing sequence routine before the step in the sequence routine for requesting a clock data request command for requesting the operation card 60 to transfer clock data at step S1349.

Figure 23:
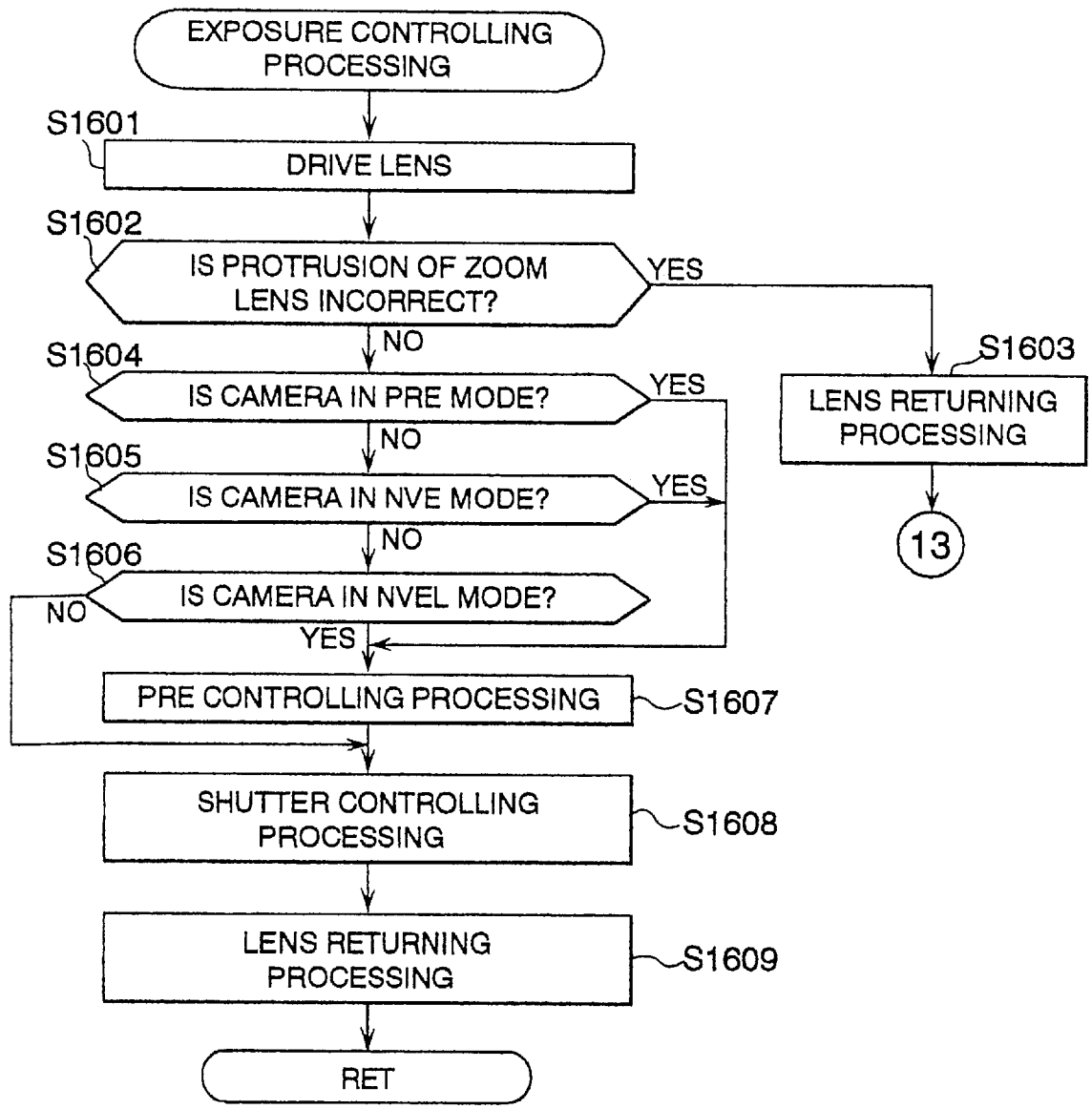
FIG. 23 is a flow chart illustrating an exposure processing sequence routine.

FIG. 23 is a flow chart of the exposure controlling processing sequence routine for performing position control of the zoom lens 15, flash light emission control in the red-eye effect preventive flash exposure (PRE) mode and exposure timer control. When the flow chart logic commences and control proceeds directly a function block at step S1601 where lens drive processing is performed to protrude the zoom lens 15 to an axial position based on various exposure control factors. Subsequently, a judgement is made at step S1602 whether there is an operational error of protruding the zoom lens 15. If there is an operational error, then, after performing lens returning (LR) processing to return the zoom lens 15 to the retracted position at step S1603, the flow chart logic terminates the exposure controlling processing and orders return to the shutter controlling processing sequence routine before the step in the sequence routine for requesting a clock data request command for requesting the operation card 60 to transfer clock data at step S1349. When there is no operational error of the zoom lens 15, judgements are consecutively made at step S1604–S1606 as to whether the camera body 10 is in the red-eye effect preventive flash exposure (PRE) mode, in the night view flash exposure (NVE) mode or in the night view flash exposure latch (NVEL) mode, respectively. When the camera body 10 is in either the red-eye effect preventive flash exposure (PRE) mode, in the night view flash exposure (NVE) mode or in the night view flash exposure latch (NVEL) mode in which the camera body 10 remains set in the night view flash exposure (NVE) mode until the night view flash exposure latch (NVEL) mode is cancelled, the red-eye effect preventive flash exposure (PRE) controlling processing is executed at step S1607. When the camera body 10 is neither in either the red-eye effect preventive flash exposure (PRE) mode, nor in the night view flash exposure (NVE) mode nor in the night view flash exposure latch (NVEL) mode, or after execution of the red-eye effect preventive flash exposure (PRE) processing, the shutter controlling processing is executed to make exposure at step S1608, and the lens returning (LR) processing is executed to return the zoom lens 15 to the retracted position at step S1609. After the final step, the flow chart logic terminates the exposure controlling processing and orders return to the shutter controlling processing sequence routine after the step in the sequence routine calling for the exposure controlling processing sequence routine.

With the shutter controlling processing, every exposure is automatically performed following operation of the shutter release switch 27.

Figure 24A:
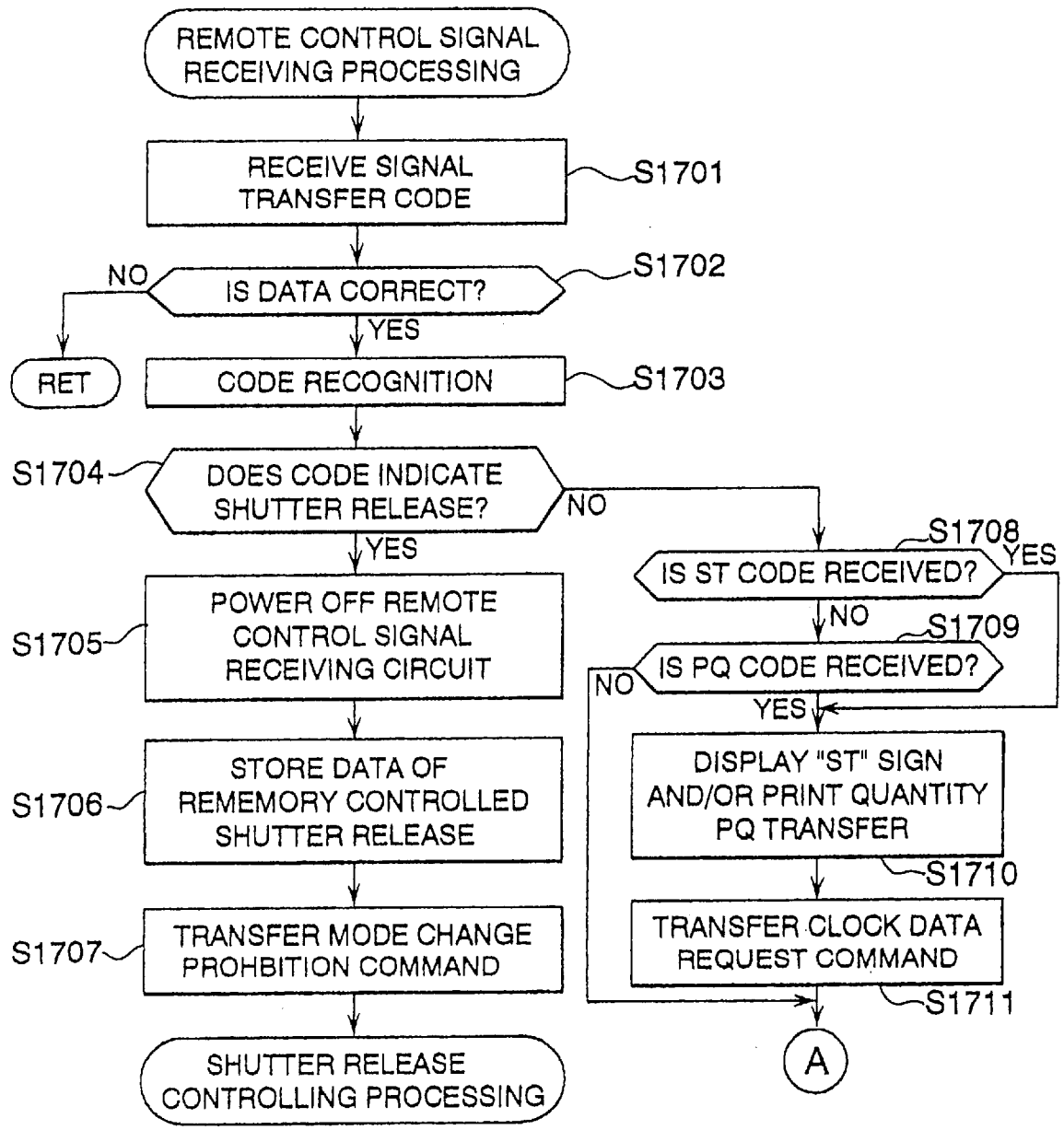
FIGS. 24A and 24B are a flow chart illustrating a remote control signal transmission processing sequence routine.
Figure 24B:
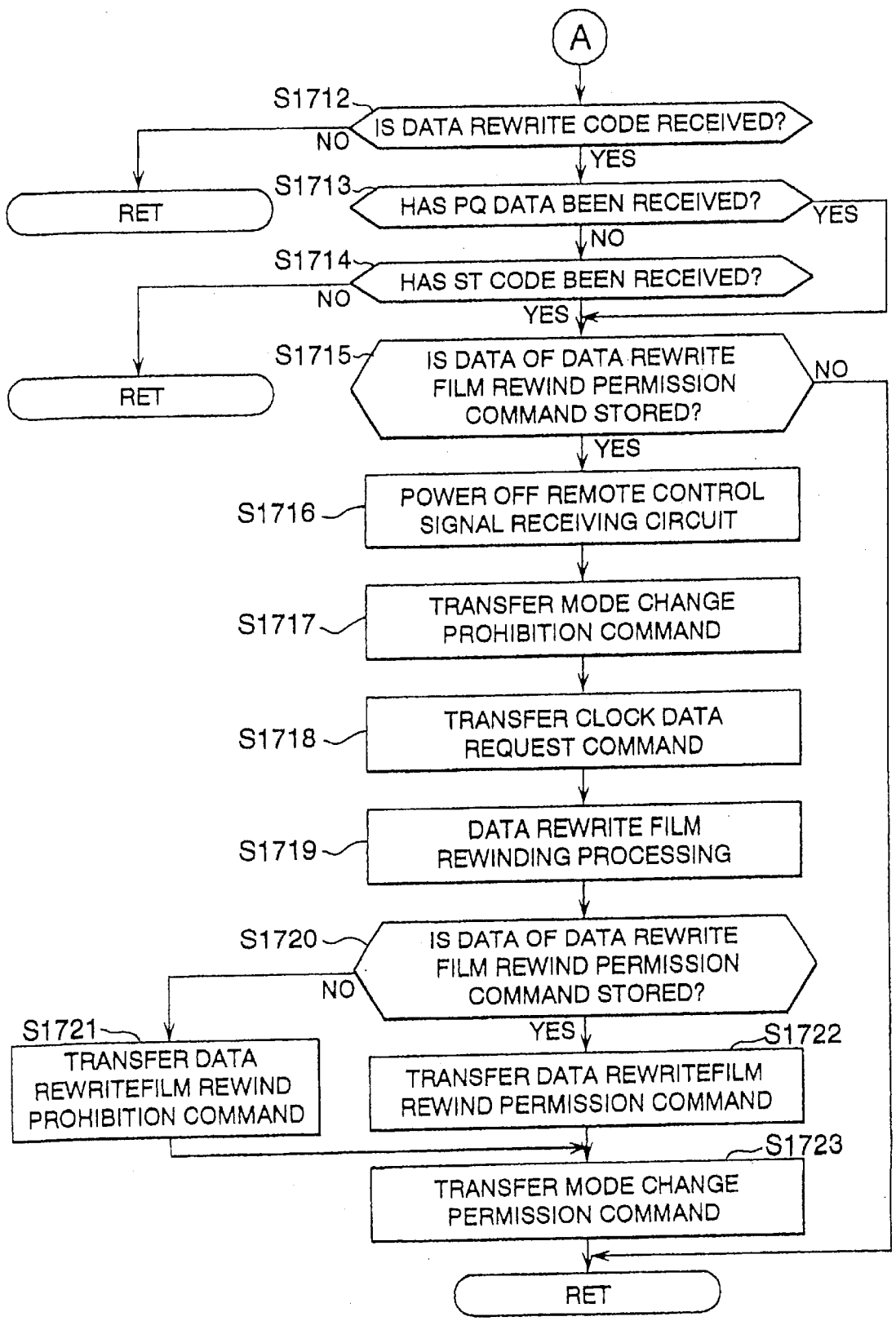

FIGS. 24A and 24B are a flow chart of the remote control signal receiving processing sequence routine called for when the remote control signal is received by the camera body 10 in the branch processing sequence routine. When the flow chart logic commences and control proceeds directly to a function block at step S1701 where the camera body 10 receives a code signal transferred from the operation card 60. When a code received is abnormal at step S1702, the flow chart logic terminates the remote control signal receiving and orders return to the branch processing sequence routine after the step in the sequence routine calling for the remote control signal receiving processing sequence routine. When the received code is normal at step S1702, after recognizing the code at step S1703, a judgement is made at step S1704 as to whether the code dictates shutter release. When the code dictates shutter release, after turning off the remote control signal receiving circuit 106 to eliminate unnecessary power consumption of the battery 104 at step S1705, data on remotely controlled shutter release is stored in RAM 101b of CPU 101 at step S1706, and a mode change prohibition command is subsequently transferred to the operation card 60 through the communication units 110 and 137 to prohibit any change in available mode at step S1707. Thereafter, the flow chart logic terminates the remote control signal receiving and calls for the shutter controlling processing. When the code does not dictate shutter release, then, judgements are consecutively made at steps S1708 and S1709 as to whether the code dictates caption selection (ST) and whether the code dictates print quantity (PQ), respectively. When the code does not dictate caption selection (ST) but print quantity (PQ), or when the code dictates caption selection (ST), then, a signal of data on both or either one of caption selection and print quantity is transferred to the operation card 60 through the communication units 110 and 137 to store the data in ROM 139 and display sign "ST" and/or the print quantity together with a sign "P" on the LCD panel 71 at step S1710. Subsequently, a clock data request command is transferred to the operation card 60 through the communication units 110 and 137 to request the operation card 60 to transfer clock data at step S1711. In response to reception of the clock data request command, the operation card 60 transfers renewed clock data to the camera body 10 or a return signal indicating a conclusion of transfer of clock data renewal when the renewed clock data has been transferred. When the code does not dictate caption selection (ST) nor print quantity (PQ) or after transfer of the renewed clock data, a judgement is made at step S1712 as to whether the code dictates data rewrite film rewind. When the code does not dictate data rewrite film rewind, the flow chart logic terminates the remote control signal receiving processing and orders return to the branch processing sequence routine after the step in the sequence routine calling for the remote control signal receiving processing sequence routine. However, when the code dictates data rewrite film rewind, judgements are consecutively made at steps S1713 and S1714 as to whether the code dictating print quantity (PQ) has been received and whether the code dictating caption selection (ST) has been received, respectively. If the code dictating both print quantity (PT) and caption selection (ST) has not been received, the flow chart logic terminates the remote control signal receiving processing and orders return to the branch processing sequence routine after the step in the sequence routine calling for the remote control signal receiving processing sequence routine. However, when the code dictating either one of print quantity (PT) and caption selection (ST) has been received, then, RAM 101b of CPU 101 is accessed to judge there is a data rewrite film rewind permission command at step S1715. When there is not found any data rewrite film rewind permission command due, for example, to film rewind error, the flow chart logic terminates the remote control signal receiving processing and orders return to the branch processing sequence routine after the step in the sequence routine calling for the remote control signal receiving processing sequence routine. On the other hand, when there is found a data rewrite film rewind permission command, then, after turning off the remote control signal receiving circuit 106 to eliminate unnecessary power consumption of the battery 104 at step S1715, a mode change prohibition command is transferred to the operation card 60 to prohibit any change in effective mode at step S1716, and a clock data request command is subsequently transferred to the operation card 60 through the communication units 110 and 137 to request the operation card 60 to transfer clock data at step S1717. In response to reception of the clock data request command, the operation card 60 transfers renewed clock data to the camera body 10 or a return signal indicating a conclusion of transfer of clock data renewal when the renewed clock data has been transferred. At step S1718, the film advancing mechanism 114 is actuated to rewind the film by one frame in response to presence of a signal from CPU 101, and the magnetic data read/write unit 118 is actuated to rewrite data on print quantity, caption and language in the magnetic recording area associated with the pervious frame. Thereafter, RAM 101b of CPU 101 is accessed to judge there is a data rewrite film rewind permission command at step S1719. Then, a data rewrite film rewind prohibition command is transferred to the operation card 60 to put the manual rewind switch 55 ineffective at step S1720 when there is not found any data rewrite film rewind permission command due, for example, to film rewind error, or a data rewrite film rewind permission command is transferred to the operation card 60 to make the manual rewind switch 55 effective at step S1721 when there is found a data rewrite film rewind permission command. After transferring the data rewrite film rewind prohibition command or the data rewrite film rewind permission command, a mode change permission command is transferred to the operation card 60 to permit any change in effective mode at step S1722. Then, the flow chart logic terminates the remote control signal receiving processing and orders return to the branch processing sequence routine after the step in the sequence routine calling for the remote control signal receiving processing sequence routine.

FIGS. 25A through 25D are a flow chart of the telephoto side zooming processing sequence routine called for when the zoom switch 50 is operated for moving the zoom lens 15 to the telephoto side in the branch processing sequence routine. When the flow chart logic commences, a mode change prohibition command is transferred to the operation card 60 to prohibit any change in effective mode at step S1801, and a clock data request command is subsequently transferred to the operation card 60 through the communication units 110 and 137 to request the operation card 60 to transfer clock data at step S1802. In response to reception of the clock data request command, the operation card 60 transfers renewed clock data to the camera body 10 or a return signal indicating a conclusion of transfer of clock data renewal when the renewed clock data has been transferred. After executing the performing battery checking processing to check the power level of the battery 104 at step S1803, the power level is compared with a threshold level to determine that the battery 104 is no good (NG) for use at step S1804. When the power level is sufficient, a judgement is made at step S1805 as to whether the zoom lens 15 has a trouble in movement back and force. When the zoom lens 15 has a trouble, the main switch closing processing is executed to return the zoom lens 15 to the retracted position at step S1806. On the other hand, when there is no trouble, the encoder checking processing is executed to detect a protruded axial position of the zoom lens 15 at step S1807. Subsequently, a judgement is made at step S1808 as to whether the zoom lens 15 is in the retracted position. When the zoom lens 15 is in the retracted position, the main switch closing processing is executed. When the zoom lens 15 is out of the retracted position, a judgement is made st step S1809 as to whether the zoom lens 15 is in a telephoto end position (an extreme protruded position). When the zoom lens 15 is out of the telephoto end position, an internal encoder timer is actuated to count time at step S1810, and the lens drive mechanism 113 is actuated at step S1811 to protrude the zoom lens 15. At step S1812, a judgement is made as to whether the zoom lens 15 has reached an axial position indicated by a zoom position code. Specifically, there are provided with a plurality of zoom positions arranged at regular distances in a range of axial movement of the zoom lens 15 between the telephoto end position and the wide-angle end position. By comparing an axial position with the zoom position code, it is judged whether the zoom lens 15 is protruded or retracted to a desired position dictated by a signal from the zoom switch 50. When the zoom lens 15 does not yet reach the axial position indicated by the zoom position code, after executing the encoder checking processing to detect an axial position of the zoom lens 15 at step S1813, another judgement is made at step S1814 as to whether the zoom lens 15 has reached the axial position indicated by the zoom position code. When the zoom lens 15 does not yet reach the axial position indicated by the zoom position code, after checking the encoder timer at step S1815, a judgement is made at step S1816 as to whether the encoder timer has counted up a specified time. Until the encoder timer counts up the specified time, the flow chart logic repeats steps S1813 through S1815. On the other hand, when the zoom lens 15 reaches the axial position indicated by the zoom position code at step S1812 or at step S1814, a judgement is made at step S1817 as to whether the zoom switch 50 is operated to move the zoom lens 15 to the telephoto side. After executing the encoder checking processing to detect an axial position of the zoom lens 15 at step S1818 when the zoom switch 50 is still operated, a judgement is made at step S1819 as to whether the zoom lens 15 has reached the telephoto end position. This judgement is repeated until the zoom lens 15 reaches the telephoto end position while the zoom switch 50 remains operated.

When the zoom lens 15 reaches the telephoto end position, the lens drive mechanism 113 is stopped to fix the zoom lens 15 in the telephoto end position at step S1820. Subsequently, a judgement is made at step S1821 as to whether the zoom lens 15 has a trouble in movement. When the zoom lens 15 has no trouble, a judgement is made at step S1822 as to whether the zoom lens 15 is in the telephoto end position. When the zoom lens 15 remains placed in the telephoto end position at step S1809 or S1822, the flash unit charging processing is executed at step S1823, which will be described in detail later. Subsequently, a judgement is made based on a signal from the attach/detach detection switch 32 at step S1824 as to whether the operation card 60 is attached to the camera body 10 from the front 12. When the operation card 60 remains detached from the camera body 10 or after execution of the front side operation card attaching/detaching processing at step S1825 when the operation card 60 is attached to the camera body 10 from the front 12, the clock data setting processing is executed at step S1826 to actuate the 250-ms count timer and to create clock data of a date including minute, hour, day, month and year in this order when the 250-ms count timer counts up 60 seconds. The clock data is transferred to the operation card 60 through the communication units 110 and 137. These steps S1824 through S1826 are repeated while the zoom switch 50 remains operated at step S1827.

When the power level of the battery 104 is insufficient (NG) as a result of the judgement by comparing the power level of the battery 104 with the threshold level, when there is a trouble in movement at step S1821 or when the zoom lens 15 is out of the telephoto end position at step S1822, a judgement is made based on a signal from the attach/detach detection switch 32 at step S1829 as to whether the operation card 60 is attached to the camera body 10 from the front 12. When the operation card 60 remains detached from the camera body 10 or after execution of the front side operation card attaching/detaching processing at step S1830 when the operation card 60 is attached to the camera body 10 from the front 12, the clock data setting processing is executed at step S1831 to actuate the 250-ms count timer and to create clock data of a date including minute, hour, day, month and year in this order when the 250-ms count timer counts up 60 seconds. The clock data is transferred to the operation card 60 through the communication units 110 and 137. These steps S1829 through S1831 are repeated while the zoom switch 50 remains operated at step S1832. After execution of the main switch closing processing at step S1806, or when operation of the zoom switch 50 is ended at step S1828 or S1832, another judgement is made at step S1833 as to whether the main switch 26 remains open, i.e. there is the main switch open code in RAM 101b of CPU 101. When the main switch open code is found in RAM 101b of CPU 101, a judgement is subsequently made at step S1834 as to whether the sign "E" displayed on LCD panel 71 sparkles or flashes on and off, or a numeral "N" displayed on LCD panel 71 flashes on and off. When nothing of the sign "E" and the numeral "N" appears on LCD panel 71, a mode change permission command is transferred to the operation card 60 to permit any change in effective mode at step S1835. When the main switch open code is not found in RAM 101b of CPU 101, or when the sign "E" displayed on LCD panel 71 sparkles or flashes on and off, or either the sign "E" or a numeral "N" displayed on LCD panel 71 flashes on and off, or after transfer of the mode change permission command to the operation card 60, the flow chart logic terminates the telephoto side zooming processing and orders return to the branch processing sequence routine after the step in the sequence routine calling for the telephoto side zooming processing sequence routine.

Figure 25A:
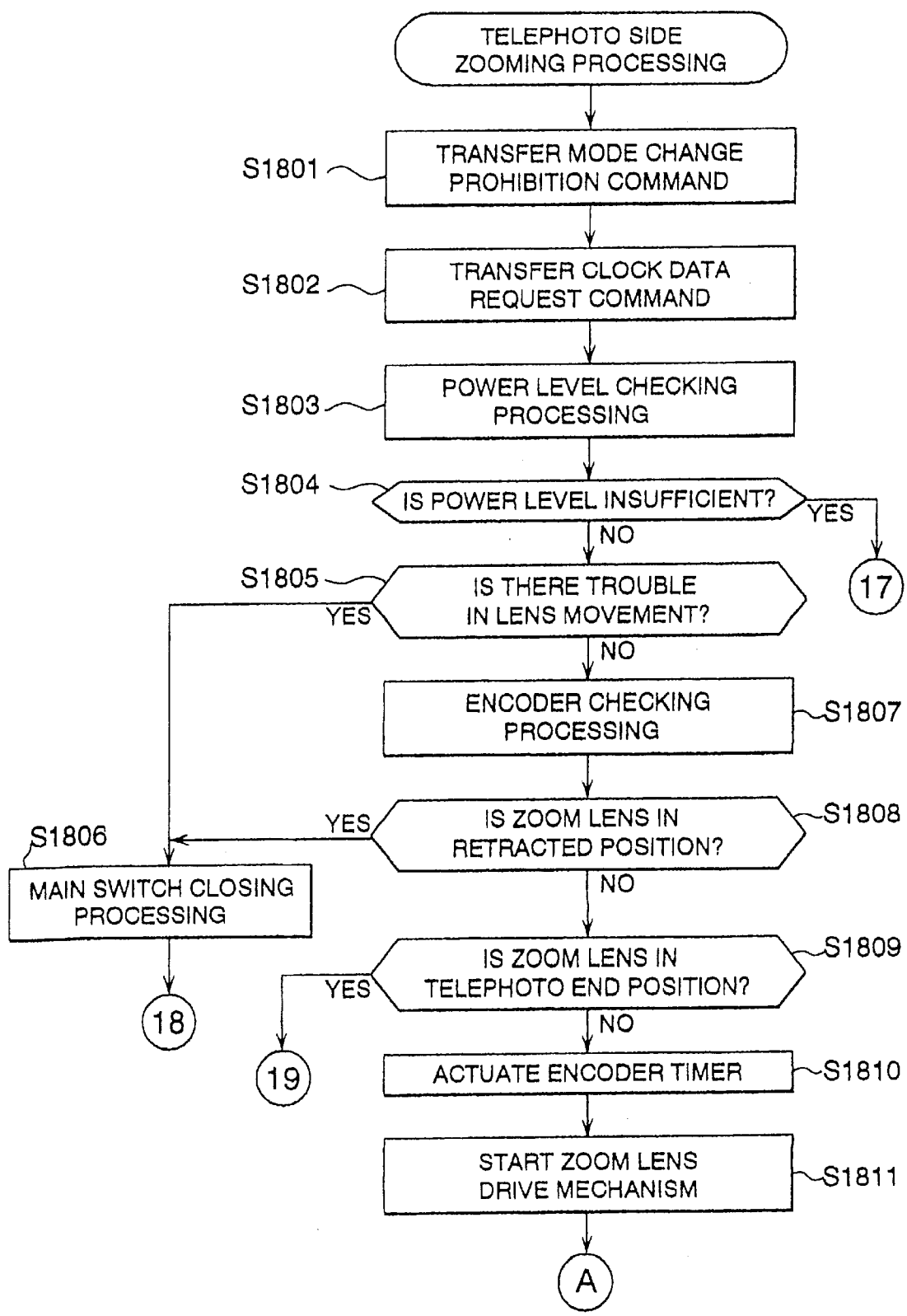
FIGS. 25A–25D are a flow chart illustrating a zooming signal transmission processing sequence routine.
Figure 25B:
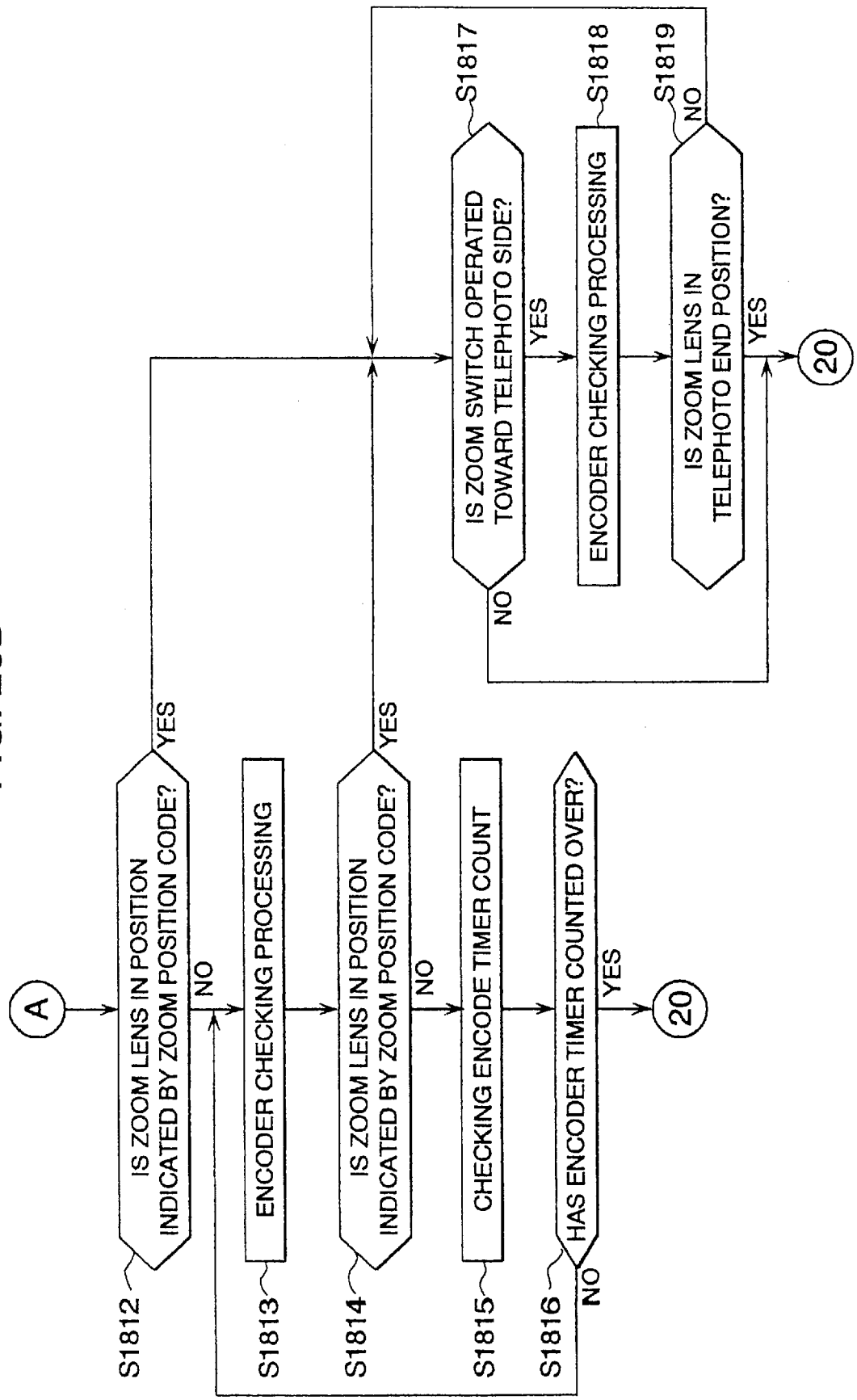
Figure 25C:
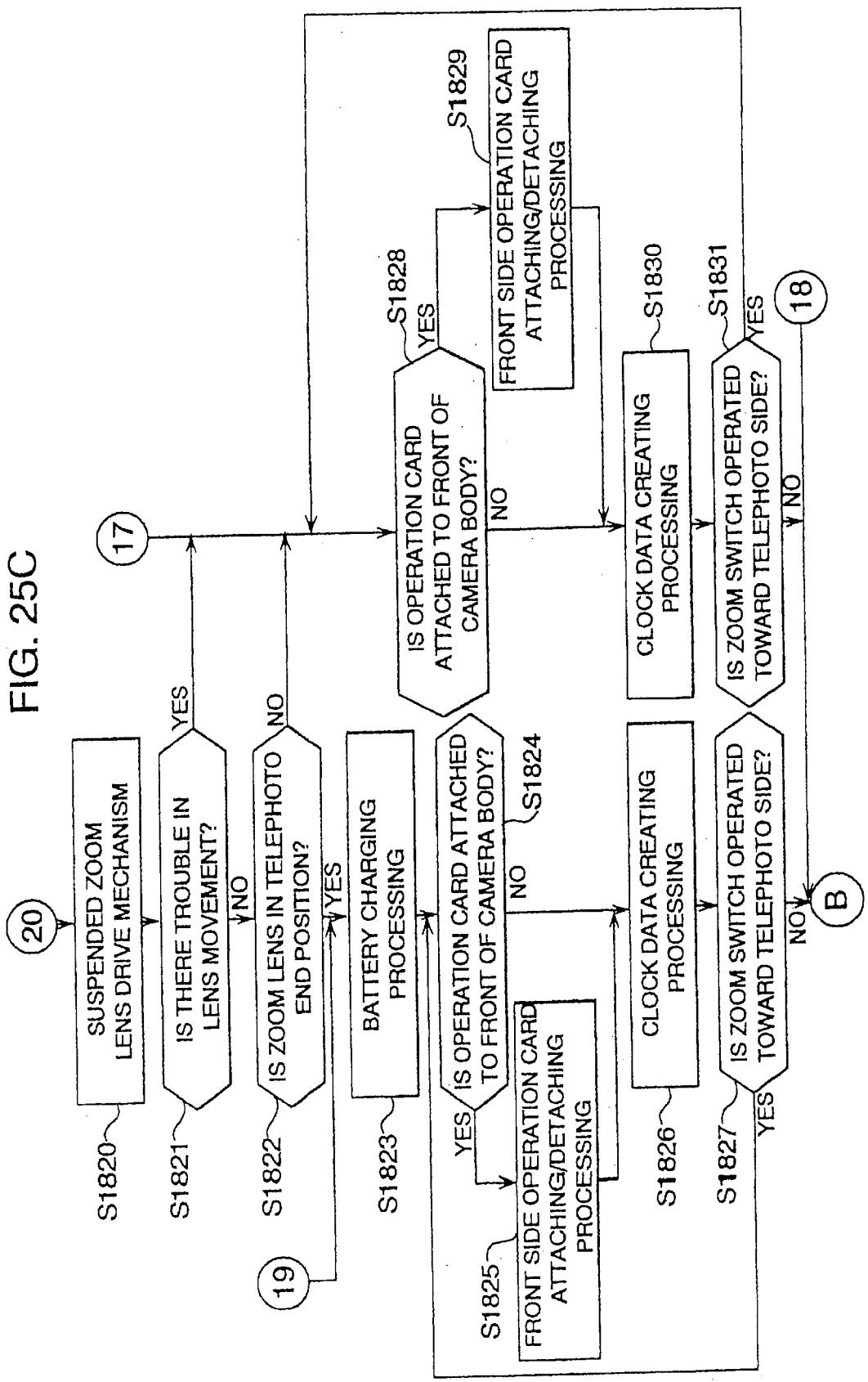
Figure 25D:
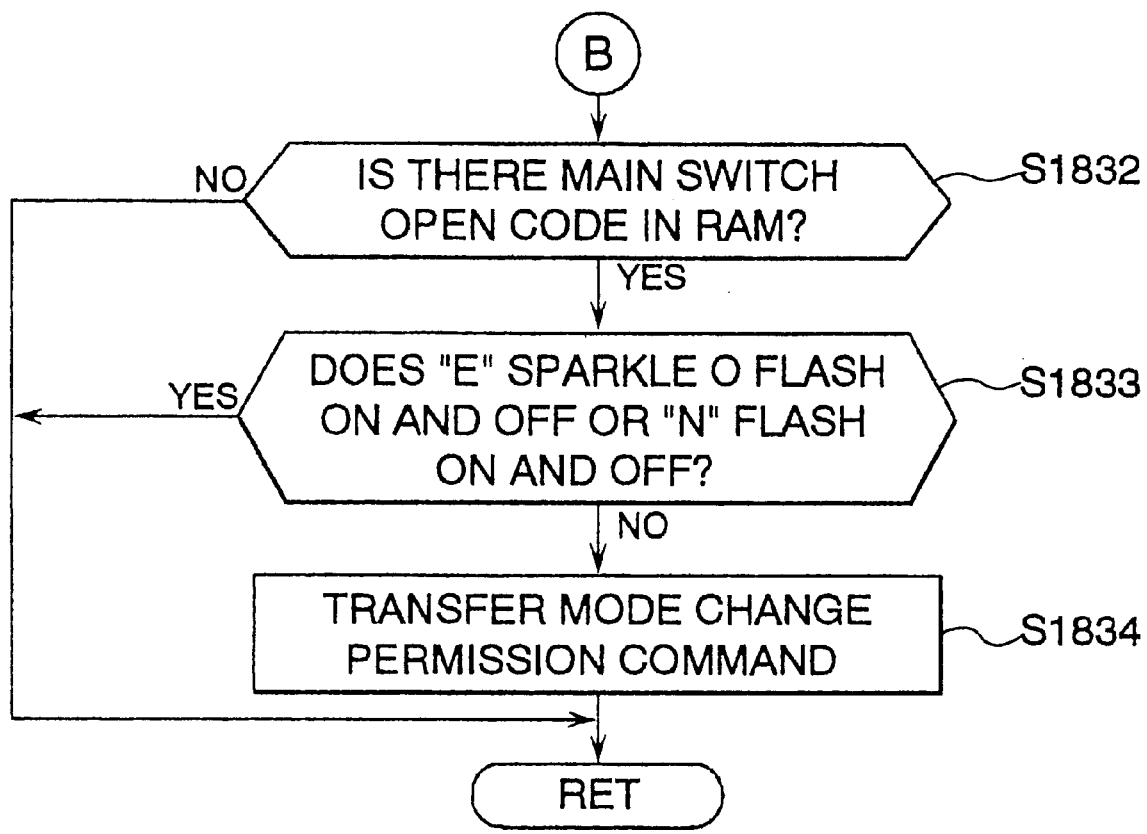
Figure 26A:
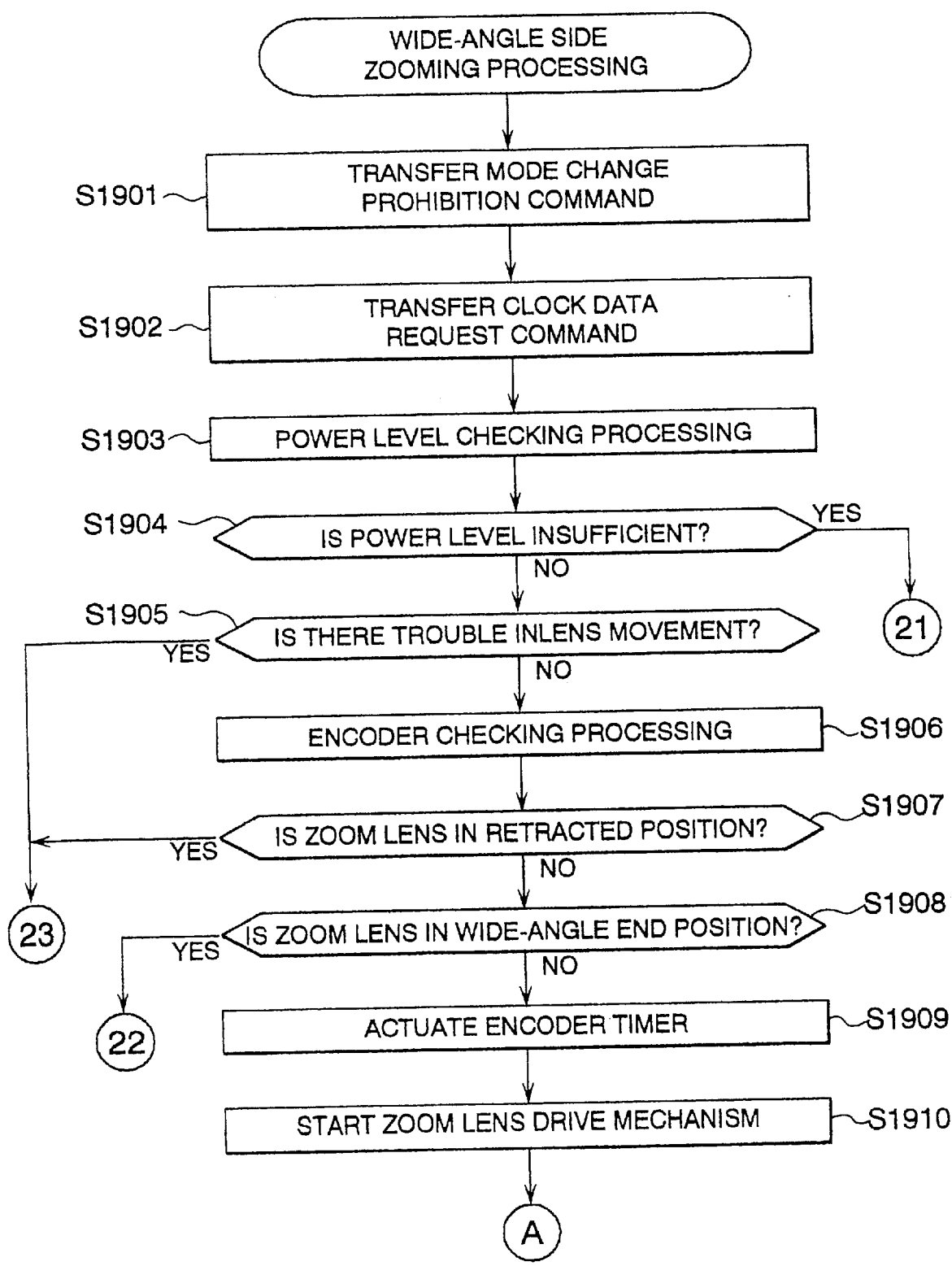
FIGS. 26A–26C are a flow chart illustrating a zooming signal transmission processing sequence routine.
Figure 26B:
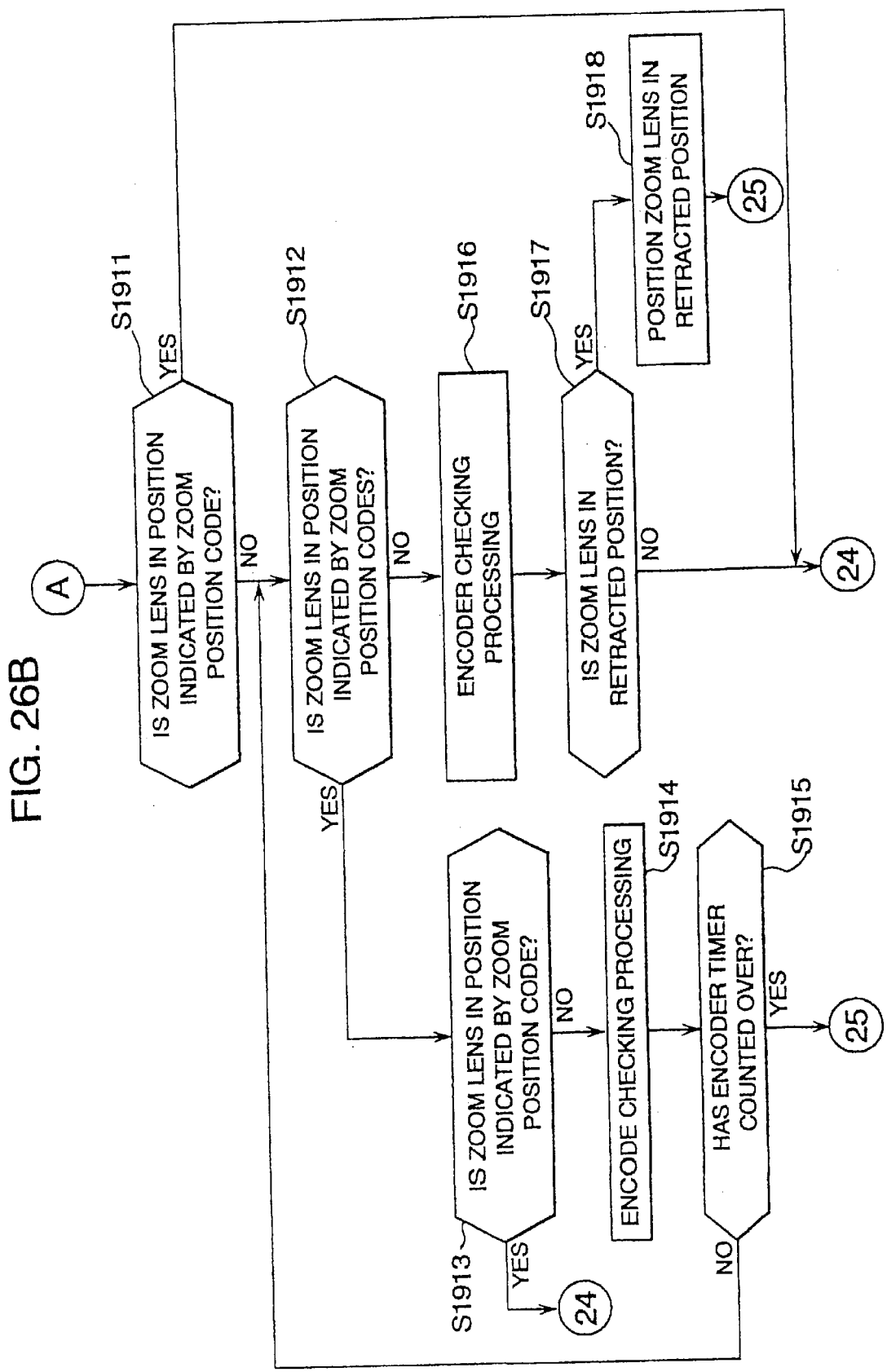
Figure 26D:
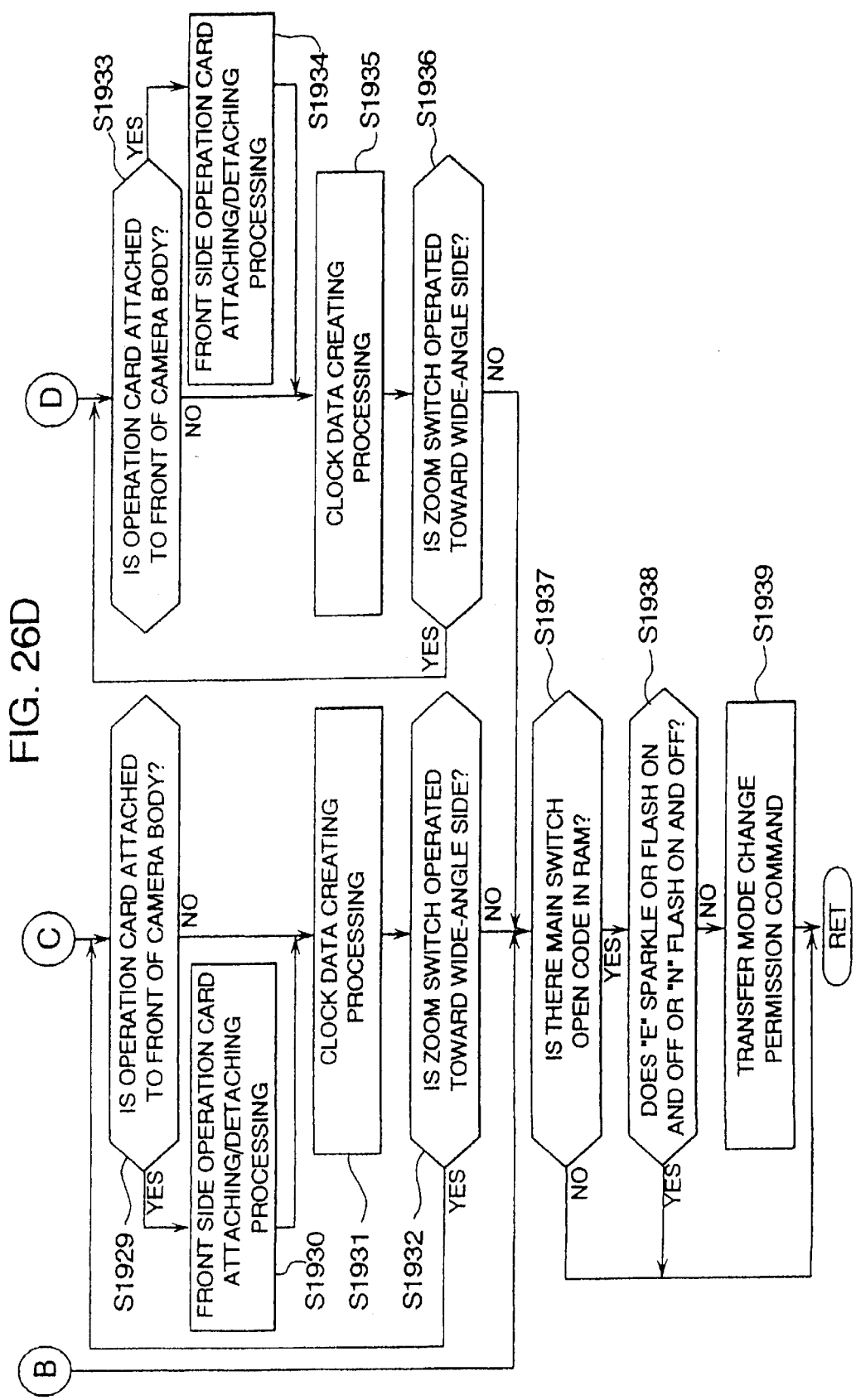

FIGS. 26A through 25D are a flow chart of the wide-angle side zooming processing sequence routine called for when the zoom switch 50 is operated for moving the zoom lens 15 to the wide-angle side in the branch processing sequence routine. When the flow chart logic commences, a mode change prohibition command is transferred to the operation card 60 to prohibit any change in effective mode at step S1901, and a clock data request command is subsequently transferred to the operation card 60 through the communication units 110 and 137 to request the operation card 60 to transfer clock data at step S1902. In response to reception of the clock data request command, the operation card 60 transfers renewed clock data to the camera body 10 or a return signal indicating a conclusion of transfer of clock data renewal when the renewed clock data has been transferred. After executing the performing battery checking processing to check the power level of the battery 104 at step S1903, the power level is compared with a threshold level to determine that the battery 104 is no good (NG) for use at step S1904. When the power level is sufficient, a judgement is made at step S1805 as to whether the zoom lens 15 has a trouble in movement back and force. When there is no trouble of movement of the zoom lens 15, the encoder checking processing is executed to detect a axial position of the zoom lens 15 at step S1906. Subsequently, a judgement is made at step S1907 as to whether the zoom lens 15 is in the retracted position. When the zoom lens 15 is out of the retracted position, a judgement is made st step S1908 as to whether the zoom lens 15 is in a wide-angle end position (an extreme retracted position). When the zoom lens 15 is out of the wide-angle end position, the internal encoder timer is actuated to count time at step S1909, and the lens drive mechanism 113 is actuated at step S1910 to protrude the zoom lens 15. At step S1911, a judgement is made as to whether the zoom lens 15 has reached an axial position indicated by a zoom position code. Specifically, there are provided with a plurality of zoom positions arranged at regular distances in a range of axial movement of the zoom lens 15 between the telephoto end position and the wide-angle end position. By comparing an axial position with the zoom position code, it is judged whether the zoom lens 15 is protruded or retracted to a desired position dictated by a position code signal from the zoom switch 50. When the zoom lens 15 is out of the axial position indicated by the zoom position code, a judgement is made at step S1912 as to whether the zoom lens 15 is in an in-between position between axial positions indicated by adjacent zoom position codes. When the zoom lens 15 is in the in-between position, another judgement is made at step S1913 as to whether the zoom lens 15 has reached the axial position indicated by the zoom position code. When the zoom lens 15 does not yet reach the axial position indicated by the zoom position code, after checking the encoder timer at step S1914, a judgement is made at step S1915 as to whether the encoder timer has counted up a specified time. Until the encoder timer counts up the specified time, the flow chart logic repeats steps S1912 through S1915. On the other hand, when the zoom lens 15 is not in an in-between position, after executing the encoder checking processing to detect an axial position of the zoom lens 15 at step S1916, a judgement is made at step S1918 as to whether the zoom lens 15 is in the retracted position. When the zoom lens 15 is in the retracted position, data on that the zoom lens 15 is in the retracted position is stored in RAM 101b.

When the zoom lens 15 is in an axial position indicated by the zoom position code at step S1913, or when the zoom lens 15 is out of the retracted position at step S1919, after setting the encoder timer to 2 seconds over time at step S1919, a judgement is made at step S1920 as to whether the zoom switch 50 is operated to move the zoom lens 15 to the wide-angle side. After executing the encoder checking processing to detect an axial position of the zoom lens 15 at step S1921 when the zoom switch 50 is still operated, a judgement is made at step S1922 as to whether the zoom lens 15 has reached the wide-angle end position. This judgement is repeated until the zoom lens 15 reaches the wide-angle end position while the zoom switch 50 remains operated. When the zoom lens 15 reaches the wide-angle end position at step S1918 or S1922, or when operation of the zoom switch 50 is discontinued at step S1820, the lens drive mechanism 113 is stopped to fix the zoom lens 15 in the wide-angle end position at step S1923. Subsequently, a judgement is made at step S1924 as to whether the zoom lens 15 is in the retracted position. When the zoom lens 15 is in the retracted position at step S1907 or S1924, or when it is found that there is a trouble in movement of the zoom lens 15 at step S1905, the main switch closing processing is executed at step S1925. On the other hand, when the zoom lens 15 is out of the retracted position, a judgement is made at step S1926 as to whether the zoom lens 15 has a trouble in movement. When the zoom lens 15 has no trouble, a judgement is made at step S1927 as to whether the zoom lens 15 is in the wide-angle end position. When the zoom lens 15 remains placed in the wide-angle end position at step S1908 or S1927, the flash unit charging processing is executed at step S1928. Subsequently, a judgement is made based on a signal from the attach/detach detection switch 32 at step S1929 as to whether the operation card 60 is attached to the camera body 10 from the front 12. When the operation card 60 remains detached from the camera body 10 or after execution of the front side operation card attaching/detaching processing at step S1930 when the operation card 60 is attached to the camera body 10 from the front 12, the clock data setting processing is executed at step S1931 to actuate the 250-ms count timer and to create clock data of a date including minute, hour, day, month and year in this order when the 250-ms count timer counts up 60 seconds. The clock data is transferred to the operation card 60 through the communication units 110 and 137. These steps S1929 through S1931 are repeated while the zoom switch 50 remains operated at step S1932.

When the power level of the battery 104 is insufficient (NG) as a result of the judgement by comparing the power level of the battery 104 with the threshold level at step S1904, when it is found that there is a trouble in movement of the zoom lens 15 at step S1926 or when the zoom lens 15 is out of the wide-angle end position at step S1927, a judgement is made based on a signal from the attach/detach detection switch 32 at step S1933 as to whether the operation card 60 is attached to the camera body 10 from the front 12. When the operation card 60 remains detached from the camera body 10 or after execution of the front side operation card attaching/detaching processing at step S1934 when the operation card 60 is attached to the camera body 10 from the front 12, the clock data setting processing is executed at step S1935 to actuate the 250-ms count timer and to create clock data of a date including minute, hour, day, month and year in this order when the 250-ms count timer counts up 60 seconds. The clock data is transferred to the operation card 60 through the communication units 110 and 137. These steps S1933 through S1935 are repeated while the zoom switch 50 remains operated at step S1936. After execution of the main switch closing processing at step S1925, or when operation of the zoom switch 50 is ended at step S1932 or S1936, another judgement is made at step S1937 as to whether the main switch 26 remains open, i.e. there is the main switch open code in RAM 101b of CPU 101. When the main switch open code is found in RAM 101b of CPU 101, a judgement is subsequently made at step S1938 as to whether the sign "E" displayed on LCD panel 71 sparkles or flashes on and off, or a numeral "N" displayed on LCD panel 71 flashes on and off. When nothing of the sign "E" and the numeral "N" appears on LCD panel 71, a mode change permission command is transferred to the operation card 60 to permit any change in effective mode at step S1939. When the main switch open code is not found in RAM 101b of CPU 101, or when the sign "E" displayed on LCD panel 71 sparkles or flashes on and off, or either the sign "E" or a numeral "N" displayed on LCD panel 71 flashes on and off, or after transfer of the mode change permission command to the operation card 60, the flow chart logic terminates the wide-angle side zooming processing and orders return to the branch processing sequence routine after the step in the sequence routine calling for the wide-angle side zooming processing sequence routine.

With the zooming processing, the photographer can easily frame an picture only by operating the zoom switch 50 on opposite sides, i.e. the telephoto side and the wide-angle side.

Figure 27A:
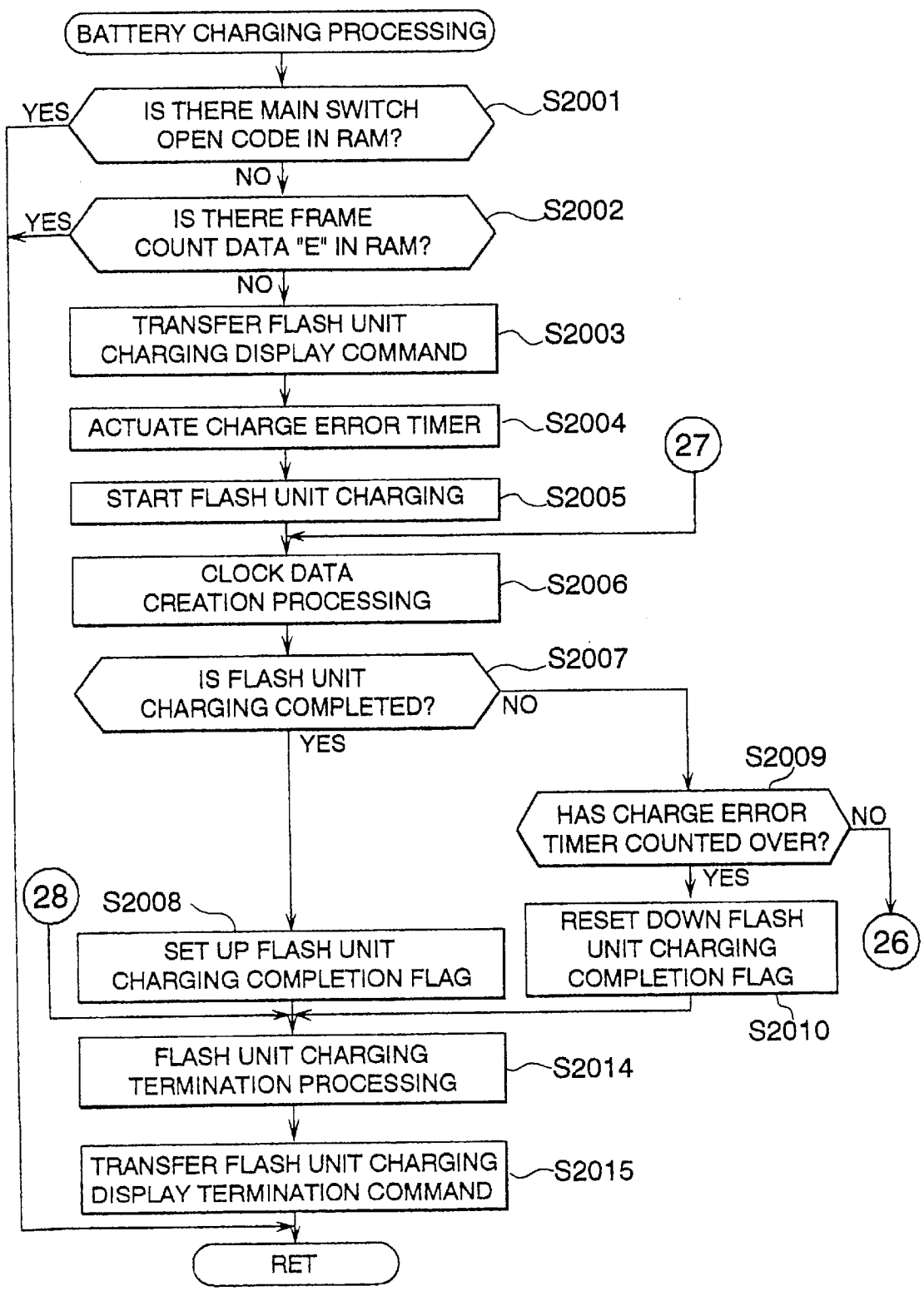
FIGS. 27A and 27B are a flow chart illustrating a flash charge processing sequence routine.
Figure 27B:
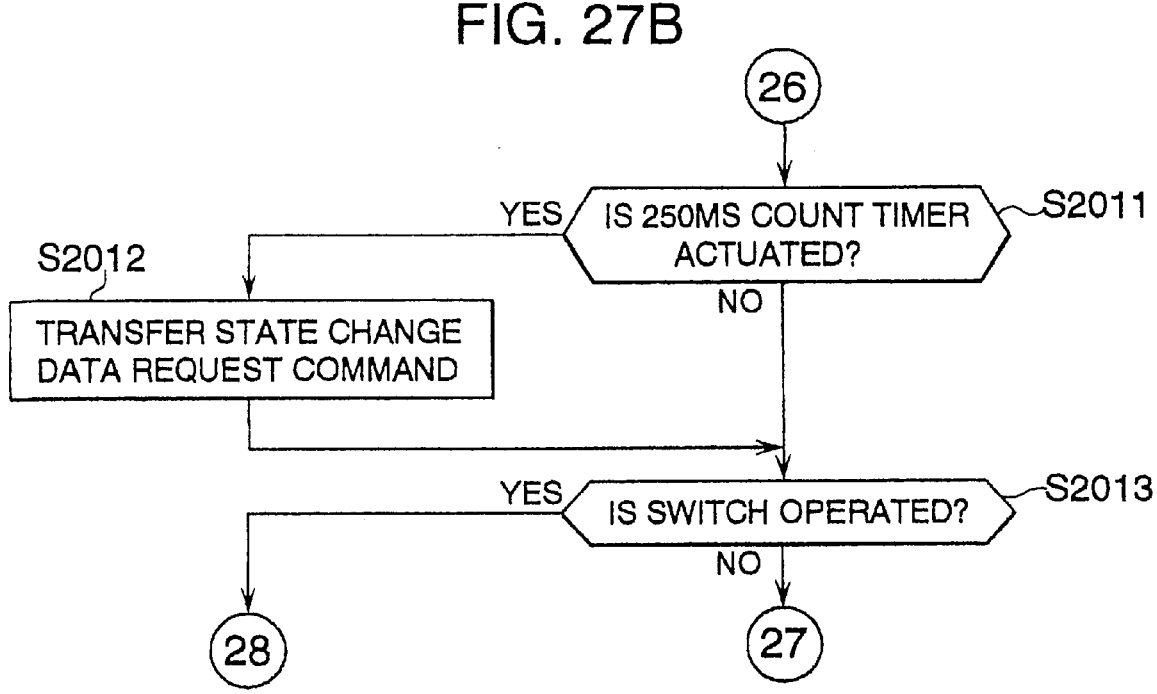

FIGS. 27A and 27B are a flow chart of the flash unit charging processing sequence routine called for during or after execution of some processing. When the flow chart logic commences, RAM 101b of CPU 101 is accessed to find that there are data of main switch closing code which indicates that the camera system 1 is put ineffective and data of frame counter indication "E" which indicates that there is no effective frame at step S2001 and S2002, respectively. When it is found that there are both data in RAM 101b, the flow chart logic terminates the flash unit charging processing. When there is no data found in RAM 101b, a flash charge display command is transferred to the operation card 60 through the communication units 110 and 137 to cause the LCD driver 138 to flash on and off a lightning symbol which provides an indication that the flash unit is being charged on LCD panel 71 at step S2003. In this instance, the lightning symbol is displayed only when the camera system 1 is in the auto-flash exposure (AFE) mode, in the red-eye effect preventive flash exposure (PRE) mode, in the night view flash exposure (NVE) mode or in the coercive flash exposure (CFE) mode. After actuating an internal timer to count a predetermined time of, for example, 30 seconds at step S2004, the flash charging circuit 108 is actuated to charge the flash unit at step S2005.

The clock data setting processing is executed at step S2006 to actuate the 250-ms count timer and to create clock data of a date including minute, hour, day, month and year in this order when the 250-ms count timer counts more than 60 seconds. The clock data is transferred to the operation card 60 through the communication units 110 and 137. Subsequently, at step S2007, a judgement is made as to whether the flash unit is charged up. When a charge-up signal is provided by the flash charging circuit 108, a charge-up flag is set up in RAM 101b at step S2008. On the other hand, when the flash unit is not yet charged up, a judgement is made at step S2008 as to the internal timer has count more than 30 seconds. When the 30-sec count timer has counted over 30 seconds while the flash unit is not yet charged up, the charge-up flag is reset down in RAM 101b at step S2010.

When the 30-sec count timer has not yet counted 30 seconds, then, a judgement is made at step S2011 as to whether the 250-ms count timer has been actuated. When the 250-ms count timer has been actuated, a confirmation requesting command is transferred to the operation card 60 at step S2012. In response to reception of the confirmation requesting command, the operation card 60 sends a data signal relating to a current state thereof to the camera body 10. When the 250-ms count timer is not actuated, or after transfer of the data of state of the operation card 60 to the camera body 10, a judgement is made at step S2013 as to whether any one or more of various switches such as the cartridge chamber rid sensor switch, the attach/detach detection switch 32, the main switch 26, the manual rewind switch 55, the shutter release switch 27 and the zoom switch 50 are operated. Subsequently, the flow chart logic orders return to the step after actuation of the flash charging circuit 108 at step S2005 when any switch is not operated, or to the step after setting up or resetting down the charge-up flag at step S2008 or S2010. After setting up or resetting down the charge-up flag, the flash charge circuit 108 is put ineffective to terminate charging the flash unit at step S2014. Subsequently, at step S2015, an indication disconnect command is transferred to the operation card 60 through the communication units 110 and 137 to cause the LCD driver 138 to drive the LCD driver 138 such that the lightning symbol disappears when the camera system 1 is in the auto-flash exposure (AFE) mode, in the red-eye effect preventive flash exposure (PRE) mode or in the night view flash exposure (NVE) mode, or continuously sparkles when the camera system 1 is in the coercive flash exposure (CFE) mode. The final step orders termination of the flash unit charging processing sequence routine.

According to the flash charging processing, information that the flash unit charging processing is being performed is transferred to the operation card 60 through the communication units 110 and 137 to cause LCD panel 71 to display a symbol providing an indication that the flash unit is being charged. Further, information that charging the flash unit is terminated is transferred to the operation card 60 through the communication units 110 and 137 to cause LCD panel 71 to remove the symbol so as thereby to provide an indication that charging the flash unit is terminated.

Figure 28:
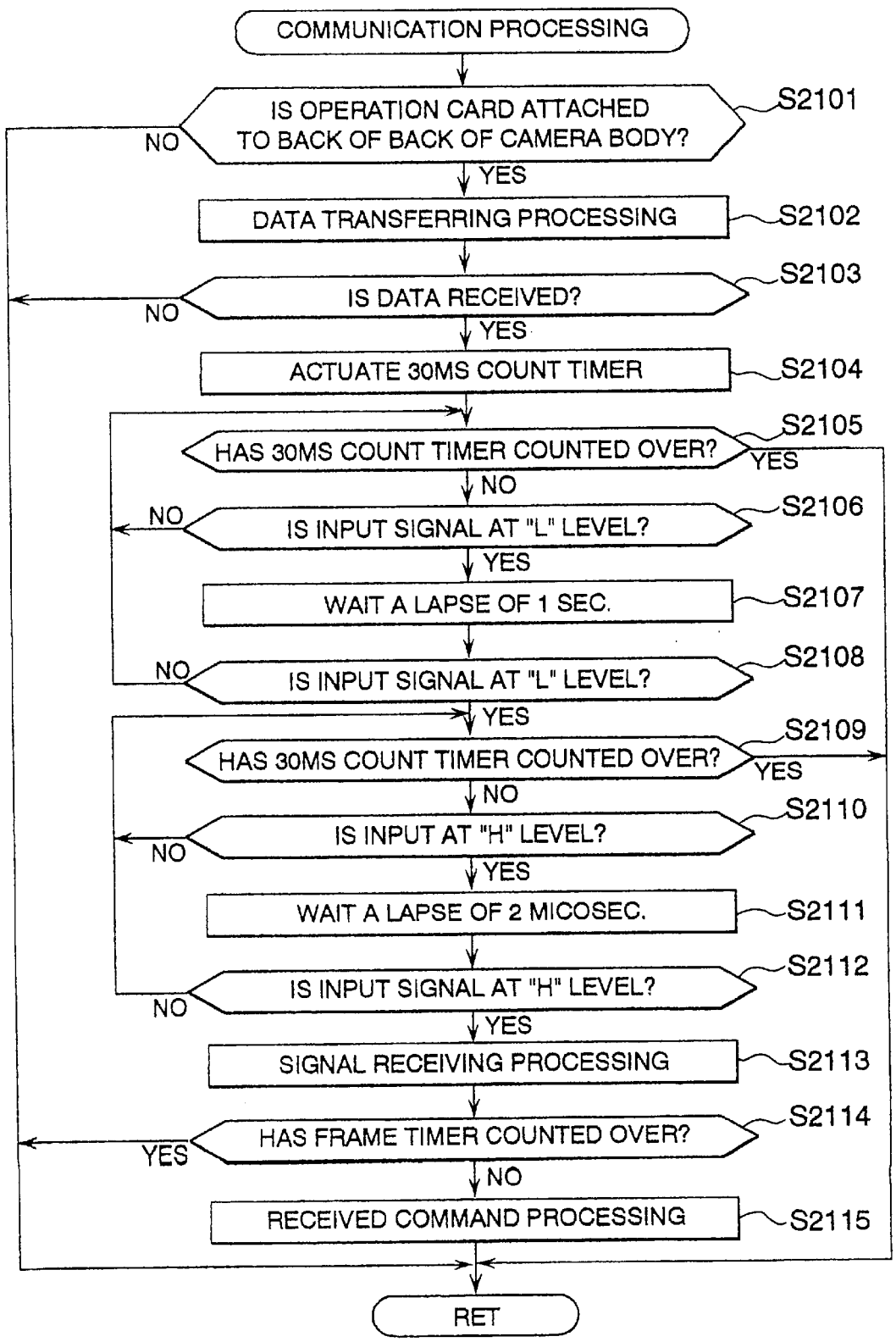
FIG. 28 is a flow chart illustrating a communication processing sequence routine.
Figure 31:
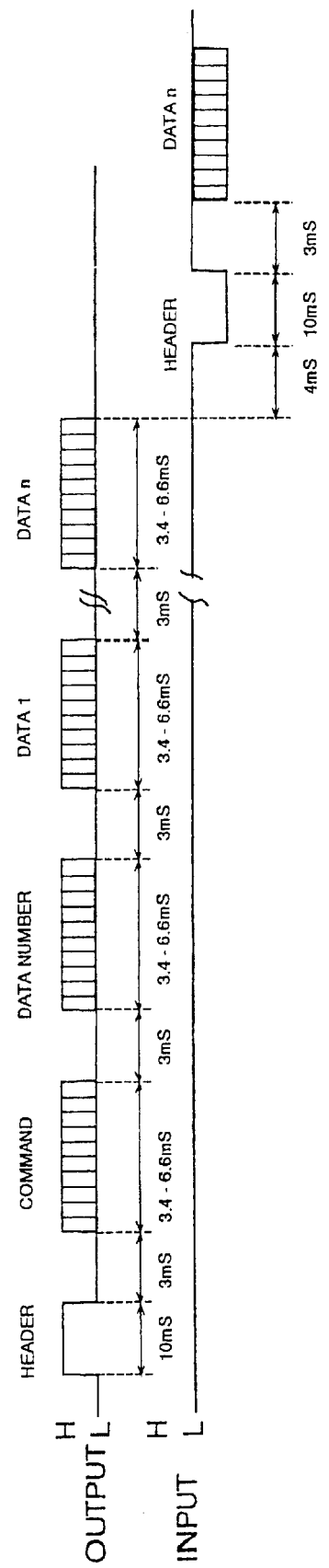
FIG. 31 is an illustration showing a signal structure.

FIG. 28 is a flow chart of the communication processing sequence routine for intercommunicating various data and commands between the camera body 10 and the operation card 60 through communication units 110 and 137. A signal used for the communication processing is shown in FIG. 31. when the flow chart logic commences and control proceeds directly to a function block at step S2101 where a judgement is made as to whether the operation card 60 remains attached to the back 13 of the camera body 10. When the operation card 60 has been detached from the back 13 of the camera body 10, the flow chart logic terminates the communication processing. When the operation card 60 remains attached to the camera body 10, then, signal transferring processing is executed at step S2102 to transfer a control signal is transferred to the operation card 60 through the communication units 110 and 137 as will be described in detail later. Subsequently, at step S2103, the signal is judged whether it is a data request command to request the operation card 60 to transfer data relating a state of the operation card 60. When the signal is not a data request command, the flow chart logic terminates the communication processing. On the other hand, when the signal is a data request command, the operation card 60 transfers data of its state. After actuating an internal 30-ms count timer at step S2104, a judgement is made at step S2105 as to whether the 30-ms count timer has counted 30 milliseconds. The flow chart logic terminates the communication processing when the 30-ms count timer has counted 30 milliseconds. On the other hand, when the 30-ms count timer has not yet counted 30 milliseconds, a judgement is made at step S2106 as to whether an input signal to the communication unit 110 is at a low potential level (L). As shown in FIG. 31, the input signal transferred from the operation card 60 has a header at a low potential level for 4 milliseconds. When the low potential level of input signal is detected, after waiting for one millisecond at step S2107, another judgement concerning the low potential level of input signal is made again at step S2108. Unless the input signal remains at the low potential level (L) for more than one millisecond, the judgement concerning the low potential level of input signal is repeated. Repeating the judgement concerning the low potential level of input signal eliminates a wrong detection of a header of the input signal. When the input signal continues to be at a low potential level (L) for more than one millisecond, a judgement is made at step S2109 as to whether the 30-ms count timer has counted 30 milliseconds. The flow chart logic terminates the communication processing when the 30-ms count timer has counted 30 milliseconds. On the other hand, when the 30-ms count timer has not yet counted 30 milliseconds, a judgement is made at step S2110 as to whether the input signal is at a high potential level (H). When the high potential level of input signal is detected, after wating for 24 microseconds at step S2111, another judgement concerning the high potential level of input signal is made again at step S2112. Unless the input signal remains at the high potential level (H) for more 24 microseconds, the judgement concerning the high potential level of input signal is repeated. When the input signal continues to be at the high potential level (H) for more than 24 microsecond, then, signal receiving processing is executed at step S2113 as will be described in detail later. Subsequently, the flow chart logic terminates the communication processing when a frame timer has counted over at step S2114, or after execution of command processing at step S2115 when the frame timer has not yet counted over at step S2114. In the command processing, various data are stored, written and/or read out according to a command of the input signal, and various modes are reset according to the command of the input signal. For example, when the camera body 10 transfers a signal requesting a change in state of the operation card 60 to the operation card 60 and receives a signal containing data on print quantity (PQ) and caption selection (ST) from the operation card 60 in response to reception of the request signal, the data is stored in RAM 101*b* of CPU 101. When the camera body 10 receives a signal containing data on a flash exposure mode, the camera body 10 is set in the flash exposure mode. When the camera body 10 receives a signal containing data on a self-timer exposure (STE) mode, the camera body 10 is set in the self-timer exposure (STE) mode. On the other hand, nothing is caused in the camera body 10 when the camera body 10 receives a signal containing a command dictating no change in state of the operation card 60.

Figure 29A:
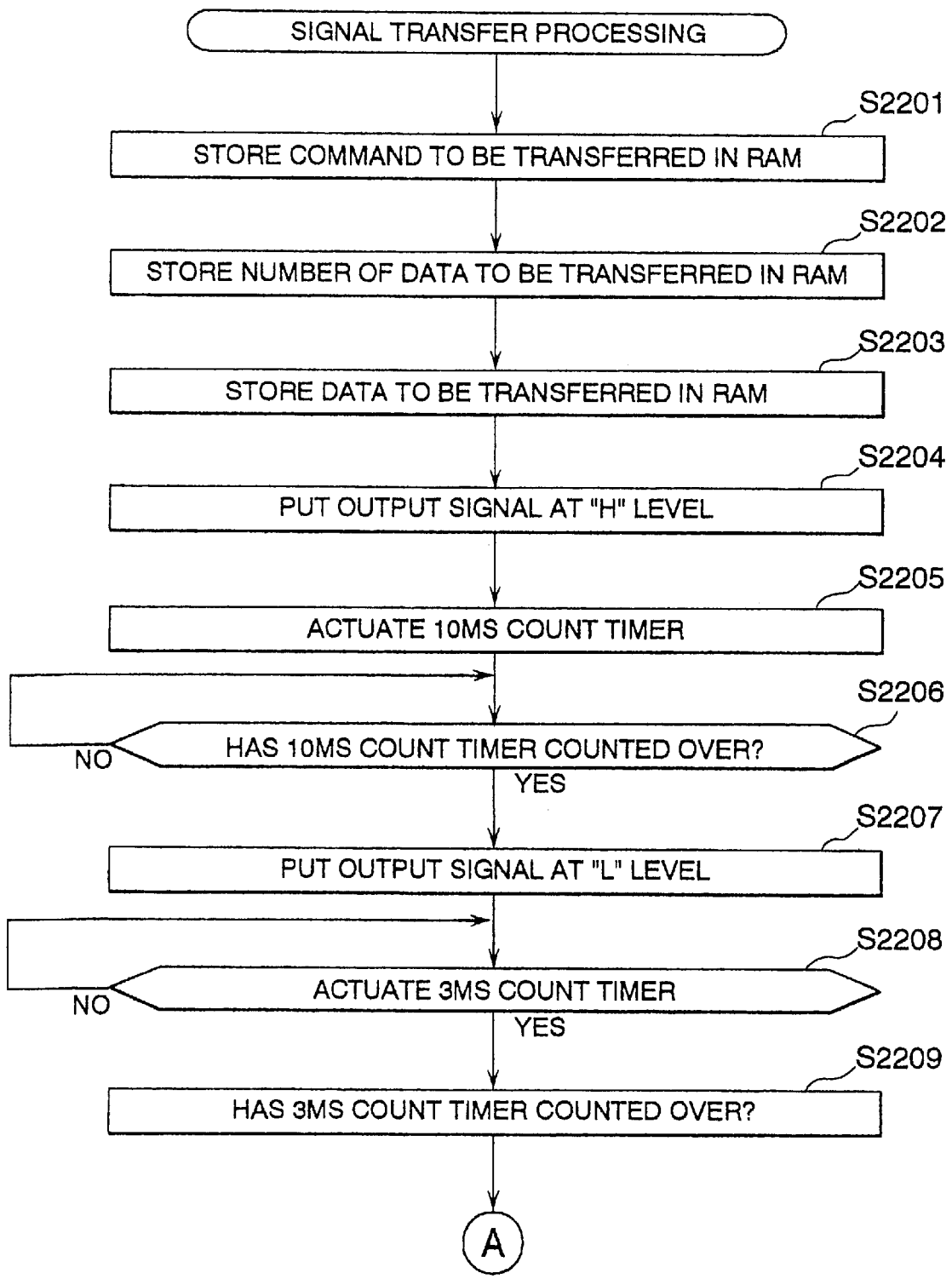
FIGS. 29A and 29B are a flow chart illustrating a signal transmission processing sequence routine.
Figure 29B:
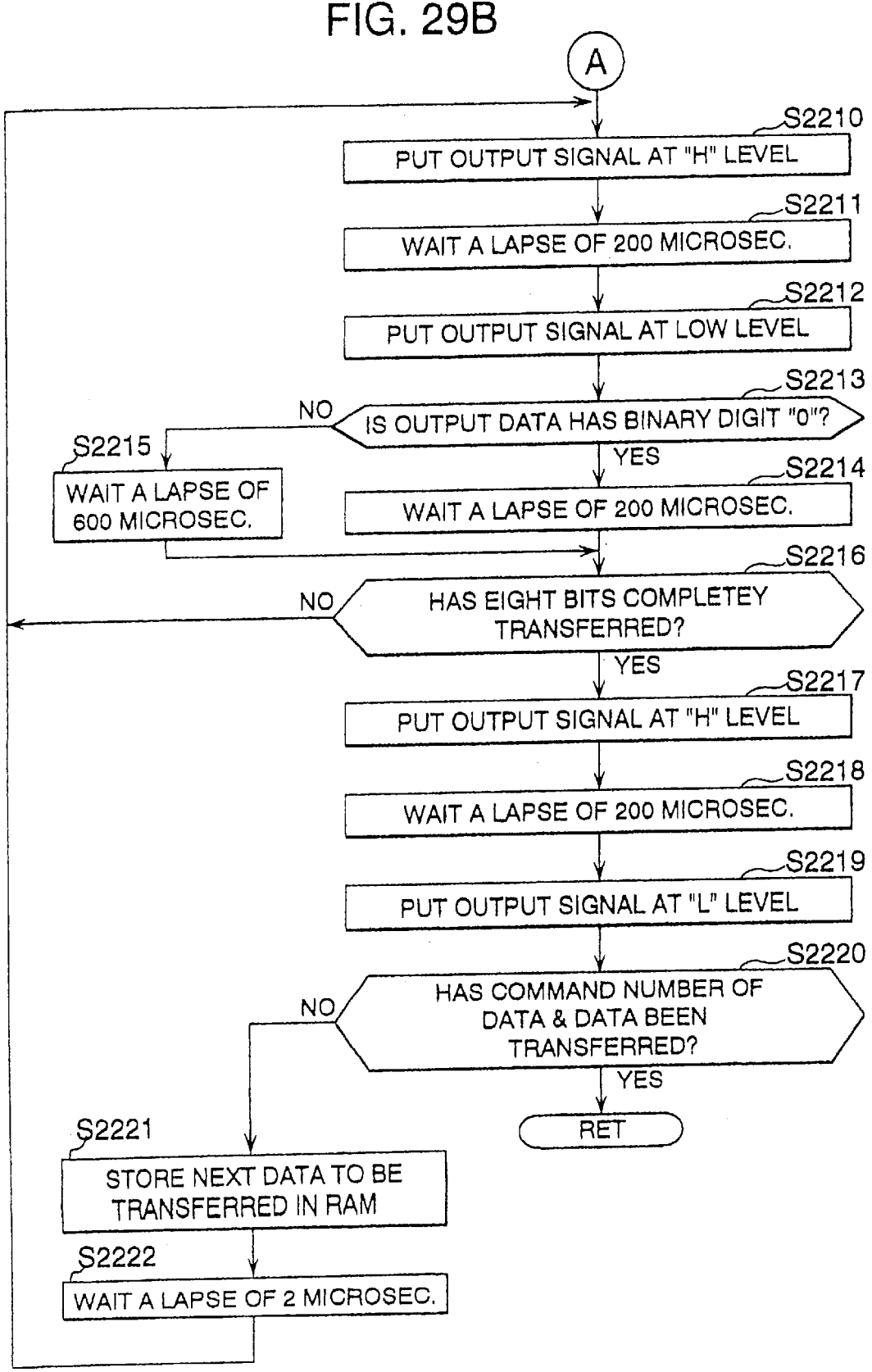

FIGS. 29A and 29B are a flow chart of the sequence routine of signal transferring processing. When the flow chart logic commences and control proceeds to function blocks where a command, a data of the number of and various data of a signal to be transferred to the operation card 60 are stored in RAM 101*b* of CPU 101 of the camera body 10 at steps S2201 to S2203, respectively. After putting an output signal to the communication unit 110 at a high potential level (H) at step S2204, a 10-ms count timer is actuated to count time at step S2205. When the 10-ms count timer counts over 10 milliseconds at step S2206, the output signal is inverted to the high potential level at step S2207, and a 3-ms count timer is actuated to count time at step S2208. When the 3-ms count timer counts over 3 milliseconds at step S2209, the output signal is inverted to the low potential level at step S2210. After a lapse of 200 microseconds at step S2211, the output signal is inverted to the low potential level at step S2212. Subsequently, a judgement is made at step S2213 as to whether the output signal has data of a binary digit of "0". After waiting a lapse of 200 micro-seconds at step S2214 when the output data represent the binary digit of "0" or after waiting 600 micro-seconds at step S2215 when the output data represents a binary digit of "1", a judgement is made at step S2216 as to whether the eight bit data signal has completely been transferred bit by bit. When the eight bit data signal has not yet completely been transferred, the flow chart logic orders return to the step after the judgement concerning a lapse of 3 millisecond at step S2209. When the eight bit data signal has completely been transferred, the output signal is inverted to the high potential level at step S2217, and, after waiting a lapse of 200 micro-seconds at step S2218, the output signal is inverted again to the low potential level at step S2219. Subsequently, a judgement is made at step S2220 as to whether a data signal containing a command, a data of the number of and data has been transferred. When the signal has completely been transferred, the flow chart logic terminates the communication processing sequence routine. O the other hand, when the signal has not yet completely been transferred, after setting another data of a command, a data of the number of and various data at step S2221 and waiting for a waiting time of 2 milliseconds at step S2222, the flow chart logic terminates the communication processing sequence routine.

With the signal transferring processing, there is provided a signal which comprises a header remaining high in level for a specified time period, a command consisting of eight bits which are at high or low level and have different durations of time, and various data and is transferable to the operation card 60.

Figure 30B:
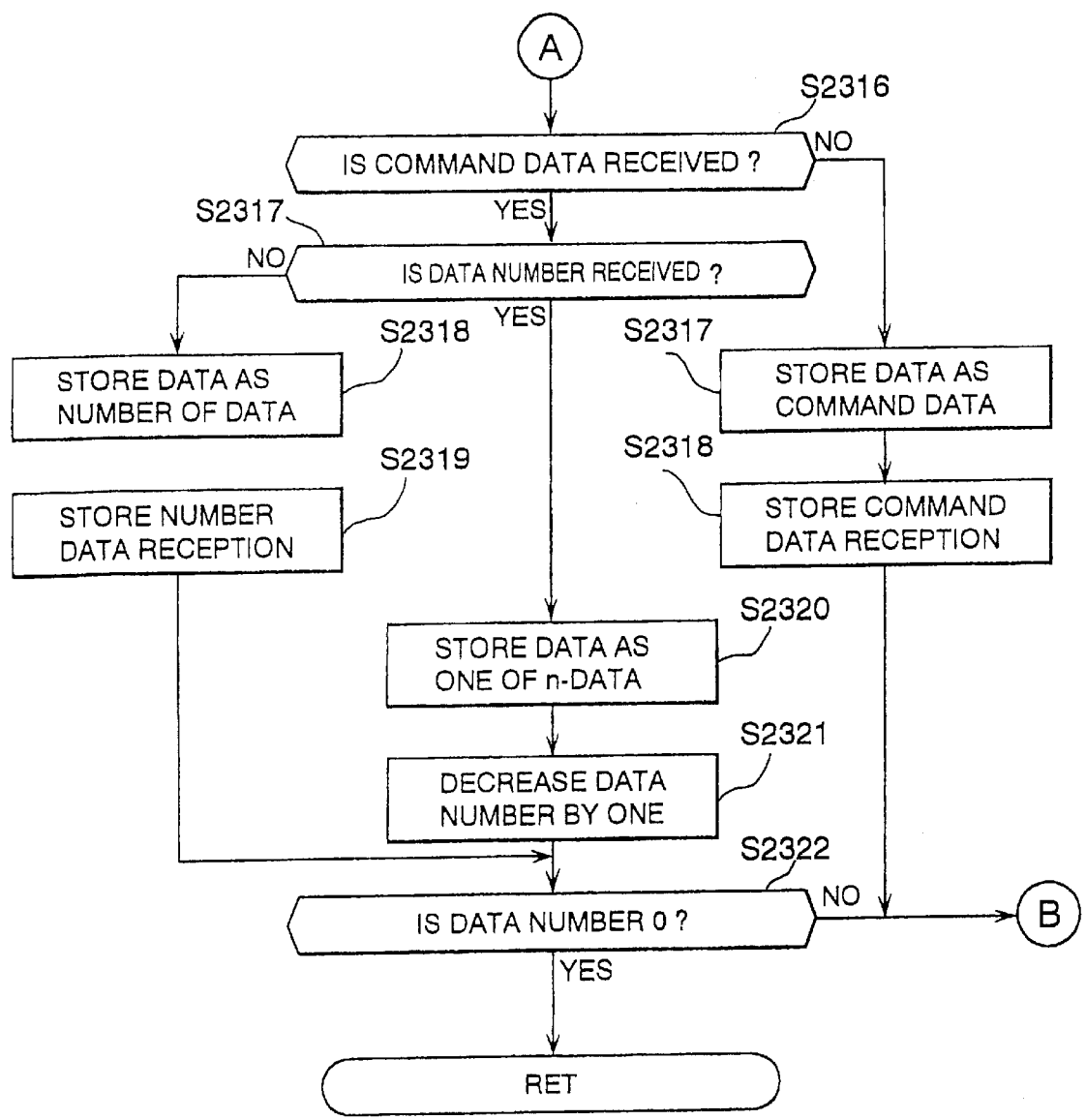

FIGS. 30A and 30B a flow chart of the sequence routine of signal receiving processing. When the flow chart logic commences and control proceeds to a function block at step S2301 where a frame timer is reset and actuated to count down a specified time, for example 20 milliseconds. Subsequently, measurement of a duration for which an input signal remains low (L) in level is started at step S2302, and a judgement is made at step S2303 as to whether the frame timer has counted over 20 milliseconds. The flow chart logic terminates the signal receiving processing when the frame timer has counted over 20 milliseconds. On the other hand, when the frame timer has not yet counted 20 milliseconds, a judgement is made at step S2304 as to whether an input signal to the communication unit 110 of CPU 101 is at a low potential level (L). When a high potential level (H) of input signal is detected, after wating a lapse of 24 micro-seconds at step S2305, another judgement concerning the low potential level (L) of input signal is made again at step S2306. Whenever the input signal turns from the high level (H) to the low level (L) within 24 micro-seconds, the judgements concerning the low potential level of input signal are repeated. When the input signal continues to be at the high potential level (H) for more than 24 micro-seconds, then, the measurement of the duration of low level input signal is ended at step S2307, and, subsequently, measurement of a duration for which the input signal remains high (H) in potential level is started at step S2308. Subsequently, a judgement is made at step S2309 as to whether the frame timer has counted over 20 milliseconds. The flow chart logic terminates the signal receiving processing when the frame timer has counted over 20 milliseconds. Otherwise, a judgement is made at step S2310 as to whether the input signal to the communication unit 110 of CPU 101 is at the low potential level (L). When the low potential level (L) of input signal is detected, after wating for a lapse of 24 micro-seconds at step S2311, another judgement concerning the low potential level (L) of input signal is made again at step S2312. Whenever the input signal turns from the low potential level (H) to the high potential level (H), the judgements concerning the low potential level of input signal are repeated. When the input signal continues to be at the low potential level (L) for more than 24 micro-seconds, then, the measurement of the duration of high level input signal is ended at step S2313, and it is determined whether the input signal represents a binary digit of "0" or "1" according to the time for which the input signal remains low (L) or high (H) in potential level at step S2314. Subsequently, a judgement is made at step S2315 as to whether the eight bit data signal has completely been transferred bit by bit. When the eight bit data signal has not yet completely been transferred, the flow chart logic orders return to the step after a start of frame timer at step S2301. When the eight bit data signal has completely been transferred, a judgement is made at step S2316 as to whether reception of data of a command of the input signal has been completed. When the command data of the input signal has not yet been received, after receiving and storing the command data in RAM 101b of CPU 101 at step S2317, and storing data of command reception completion in RAM 101b of CPU 101 at step S2318, the flow chart logic orders return to the first step of the signal receiving processing sequence routine. When the command data of the input signal has completely been received at step S2316, a judgement is made at step S2319 as to whether reception of data of the data of the number of the input signal has been completed. When the data of the data of the number of has not yet been received, the data of the data of the number of is received and stored in RAM 101b of CPU 101 at step S2320, and, subsequently, data of completion of reception of the data of the number of data is stored in RAM 101b of CPU 101 at step S2321. When the data of the number of data has been completely received at step S2319, the received data is stored as one of n-data in RAM 101b of CPU 101 at step S2322. After storing the data of completion of reception of the data of the number of data in RAM 101b of CPU 101 at step S2321 or after changing the number of data by a decrement of one at step S2323, a judgement is made at step S2324 as to whether the number of data is "0" (zero). When the number of data to be stored is not "0," the flow chart logic orders return to the first step of the signal receiving processing sequence routine. Otherwise, when the number of data to be stored is "0," the flow chart logic orders terminates the signal receiving processing.

With the signal receiving processing, an input signal from the operation card 60 are recognized by a command, the number of data and respective data on the side of the camera body 10.

Referring to FIG. 32, which is a flow chart of the sequence routine of initialization processing of the operation card 60 which is run following loading a battery 104 in the camera body 10. When the flow chart logic commences, CPU 131 of the operation card 60 is initialized to set the time, reset a timer and a register to their initial values and execute clock stabilization waiting processing at step S2401, and EEPROM 139 is accessed to read out all of predefined data and store them in RAM 131b of CPU 131 at step S2402. After interpreting the data to determine modes in which the operation card 60 is set at step S2403 and initializing the LCD driver 138 at step S2404, a signal from the drive circuit 135 is read in. The drive circuit 135 provides a signal only when the operation card 60 is attached to the back of the camera body 10. Subsequently, a judgement is made at step S2405 as to whether there is a signal from the drive circuit 135. When there is a signal, this indicates that the operation card 60 remains attached to the back 13 of the camera body 10, then, the drive circuit 137c is put effective to permit the communication unit 137 to transfer signals to CPU 131. On the other hand, when there is no signal, this indicates that the operation card 60 is detached from the camera body 10, then, the drive circuit 137c is put ineffective to prevent the communication unit 137 from receiving signals. After putting the drive circuit 137c effective or ineffective, the flow chart logic orders terminates the operation card initialization processing sequence routine.

Figure 33A:
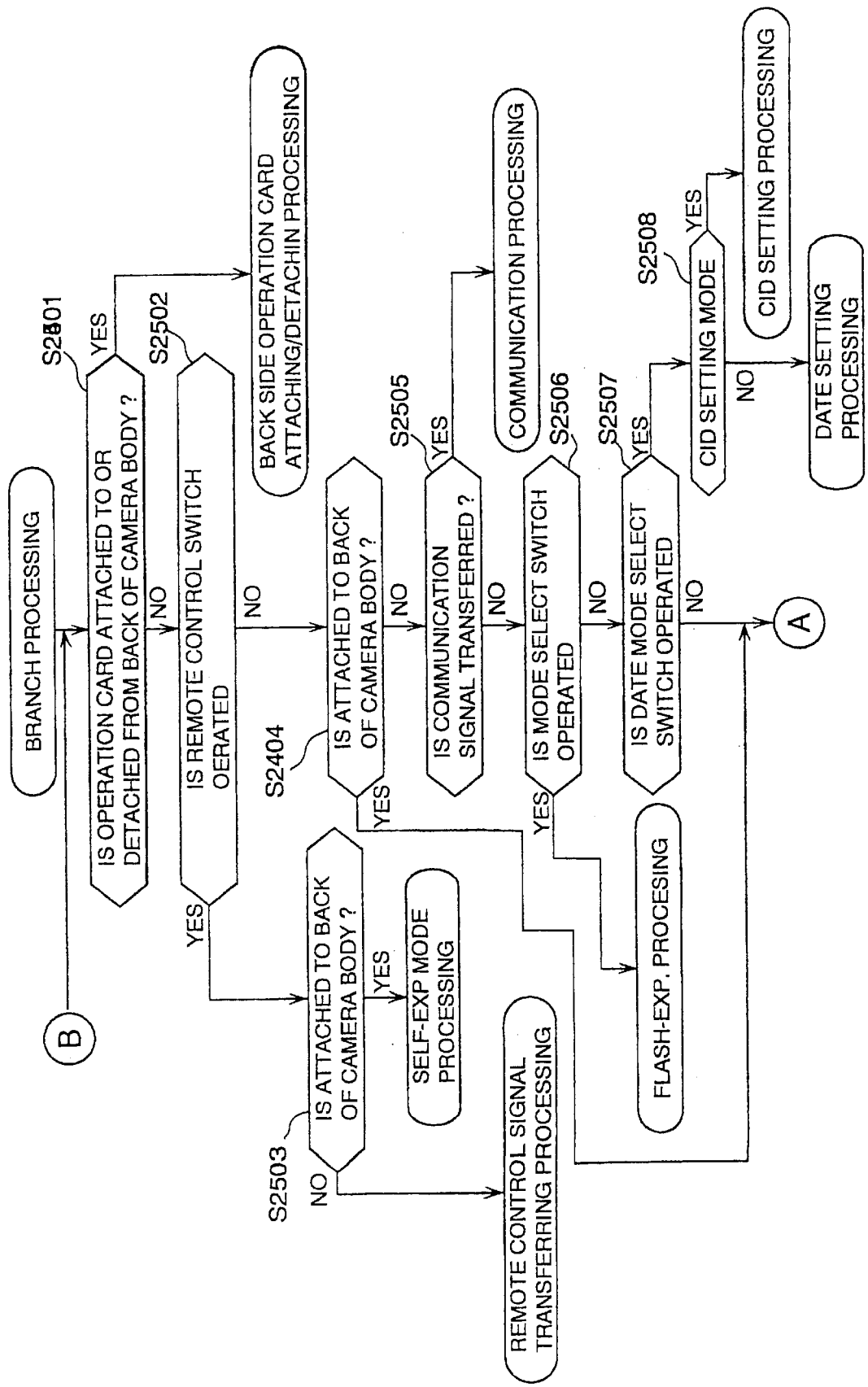
FIGS. 33A and 33B are a flow chart illustrating a card diverging processing sequence routine.
Figure 33B:
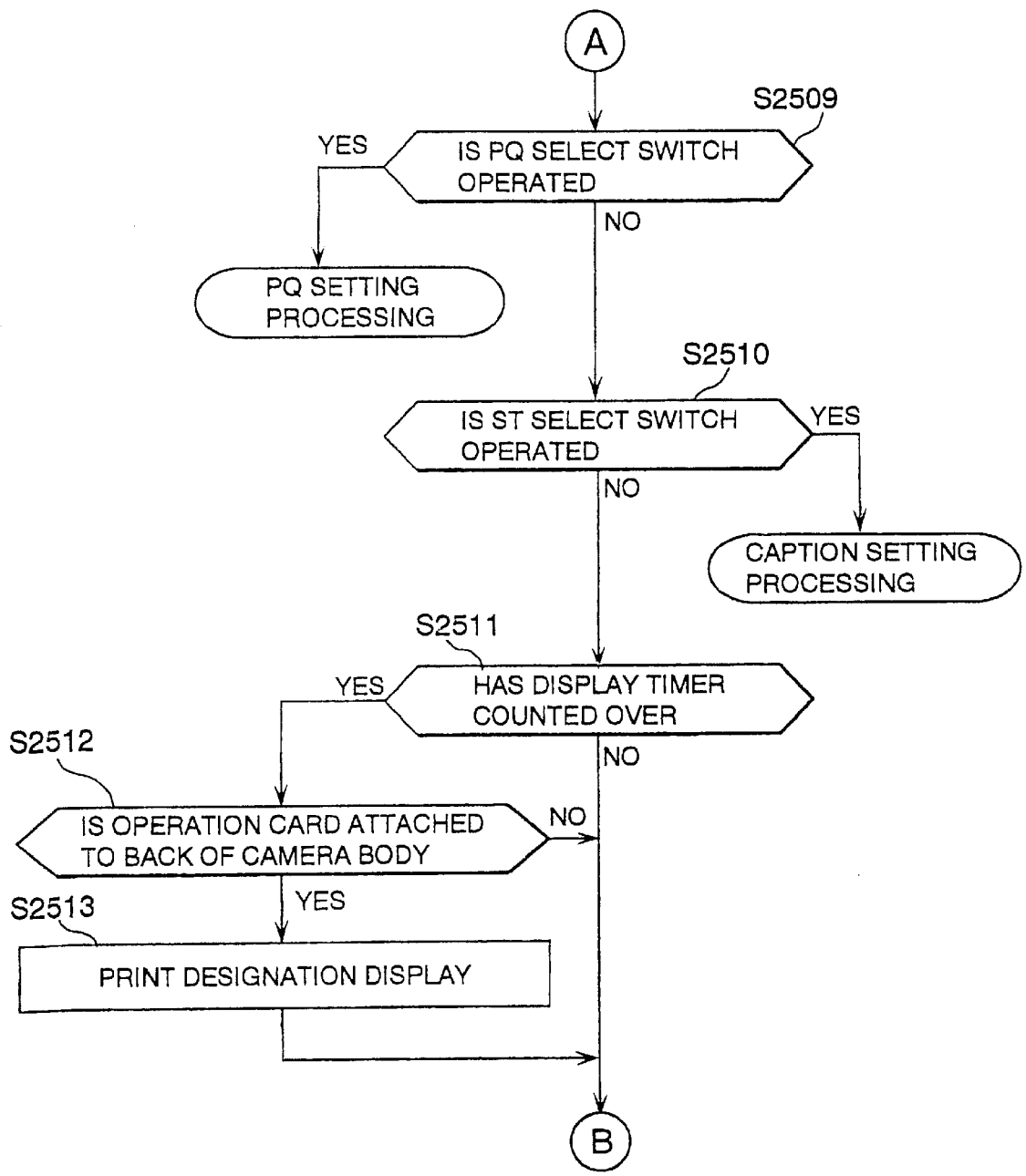

Referring to FIGS. 33A and 33B, which is a flow chart of the branch processing sequence routine for implementing the branch to various processing of the operation card 60 following presence of switch signals and communication signals. When the flow chart logic commences and control proceeds directly to a judgement at step S2501 as to whether the operation card 60 is attached to or detached from the back 13 of the camera body 10. This judgement is made based on a signal from the attach/detach detection switch 47. When the operation card 60 is either attached to or detached from the back 13 of the camera body 10, the branch to back side operation card attaching/detaching processing is implemented. On the other hand, the operation card 60 remains attached or detached, a judgement is made at step S2502 as to whether there is operation of the remote control switch 77. When the remote control switch 77 is operated, the branch to the self-timer exposure processing is implemented in the event where the operation card 60 remains attached to the back 13 of the camera body at step S2503 or the branch to remote control signal transferring processing is implemented in the event where the operation card 60 remains detached from the camera body at step S2503. When there is no operation of the remote control switch 77, a judgement is made at steps S2504 as to whether the operation card remains attached to the back 13 of the camera body 10. When the operation card remains attached to the back 13 of the camera body 10, a judgement is made at step S2505 as to whether there is any communication signal from the camera body 10 through the communication unit 137. The branch to communication processing is implemented when there is a communication signal. On the other hand, there is no communication signal from the camera body 10, then, judgements are consecutively made at step S2506 and S2507 as to whether the flash exposure mode select switch 75 is operated and whether the date mode select switch 72 is operated, respectively. When the flash exposure mode select switch 75 is operated, the branch to flash exposure mode processing is implemented. When the date selection switch 72 is operated, a judgement is made at step S2508 as to whether the operation card 60 is in a cartridge identification data (CID) setting mode. When it is in the cartridge identification data (CID) setting mode, the branch to cartridge identification data (CID) setting processing is implemented. On the other hand, when it is not in the cartridge identification data (CID) setting mode, the branch to date setting processing is implemented.

When both exposure mode select switch 75 and date selection switch 72 are not operated at steps S2506 and S2507 or when the operation card 60 remains detached at step S2502, judgement are made at step S2509 and S2510 as to whether the print quantity select switch 74 is operated and whether the caption selection switch 73 is operated, respectively. When the print quantity select switch 74 is operated, print quantity setting processing is implemented. When the caption selection switch 73 is operated, caption setting processing is implemented. When neither the print quantity select switch 74 nor the caption selection switch 73 are operated, a judgement is made at step S2511 as to whether a display time is over at step S2512. When the display time is over, a judgement is made at step S2513 as to whether the operation card 60 is attached to the back 13 of the camera body 10. When the operation card 60 is attached to the camera body 10, the LCD driver 138 is actuated to display an indication of print quantity in LCD panel 71. On the other hand, when the display time is not over or when the operation card 60 is attached to the camera body 10 while the display time is over, the flow chart logic orders return to the first step of the branch processing sequence routine.

FIG. 34 is a flow chart of the sequence routine of back side operation card attaching/detaching processing. When the flow chart logic commences and control proceeds directly to a function block at step S2601 as to whether the operation card 60 is attached to the camera body 10 from the back 13. When the operation card 60 is attached to the camera body 10, data of mode change prohibition is stored in RAM 131b of CPU 131 to disable the CPU 131 from receiving signals from any switch of the operation card 60 at step S2602. This makes it possible that the camera system 1 is never set in some modes nor actuated even if the operation card 60 is attached to the camera body 10 unintentionally operating some switches. Subsequently, the drive circuit 137c is effected to permit communication between the camera body 10 and the operation card 60 at step S2603. After waiting a lapse of 40 milliseconds for saving battery power stabilization at step 2604 and causing the LCD panel 71 to remove the remote control mode symbol 71f at step S2605, the flow chart logic terminates the back side operation card attaching/detaching processing sequence routine and orders return to the branch processing sequence routine after the step in the sequence routine calling for the back side operation card attaching/detaching. On the other hand, when the operation card 60 remains detached, data of mode change permission and data of data rewrite film rewind permission are stored in RAM 131b of CPU 131 at steps S2606 and S2607, respectively. As a result of these data storage, it is permitted to set the camera body 10 in any mode and to rewrite data of print quantity (PQ) and selected caption (ST). After disabling the drive circuit 137c from making communication between the camera body 10 and the operation card 60 so as to eliminate noises from entering CPU 131 at step S2608, a judgement is made at step S2609 as to whether the camera system 1 is in the self-timer exposure (STE) mode. After causing the LCD panel 71 to remove the self-timer exposure mode symbol 71e at step S2610 when the camera system 1 is in the self-timer exposure (STE) mode or when the camera system 1 is not in the self-timer exposure (STE) mode, the LCD panel 71 is caused to remove the flash exposure mode symbol 71b and frames of the dot matrix display area 71g and 71h at step S2611 and S2612, respectively. Subsequently, after causing the LCD panel 71 to display the remote control mode symbol 71f for a specified time period only at step S2613, the flow chart logic terminates the back side operation card attaching/detaching processing sequence routine and orders return to the branch processing sequence routine after the step in the sequence routine calling for the back side operation card attaching/detaching processing.

With the back side operation card attaching/detaching processing, the communication unit 131 is disabled to prevent unuseful power consumption of the battery 134 in the operation card 60 while the operation card 60 is detached from the camera body 10 from the back 13. On the other hand, the communication unit 131 is effected in response to attaching the operation card 60 to the camera body 10 from the back 13, so as to make communication effective between the operation card 60 and the camera body 10.

Figure 35B:
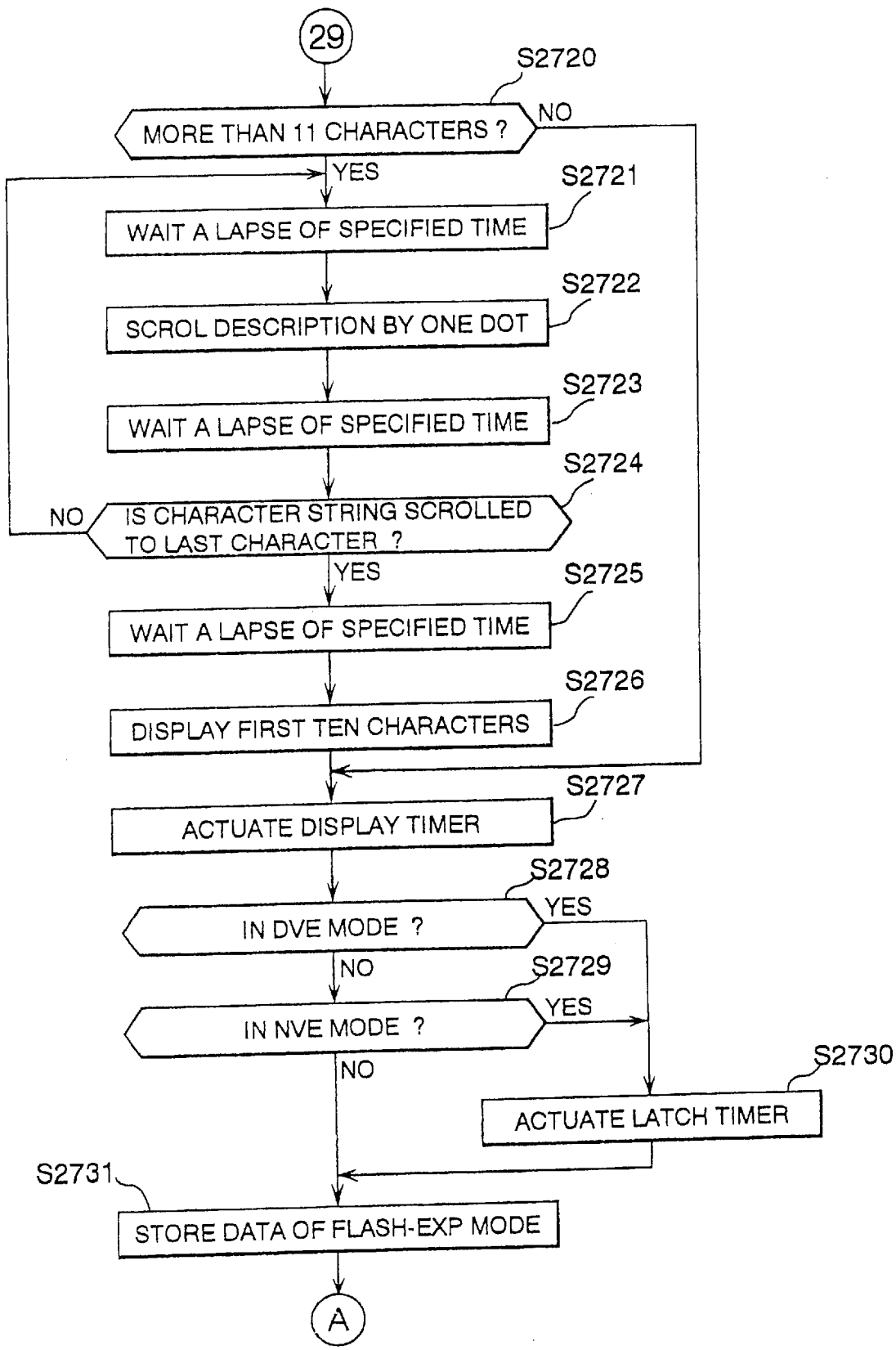

FIGS. 35A through 35C are a flow chart of the sequence routine of flash exposure mode setting processing in which the LCD panel 71 rotate and display effective flash exposure modes thereon when the flash exposure mode select switch 75 is operated. When the flow chart logic commences and control preceeds directly to a function block at step S2701 as to whether the operation card 60 receives a mode change permission command through the communication units 110 and 137. When the operation card 60 receives no mode change permission command, another judgement is made at step S2702 as to whether the CPU 131 receives a communication signal from the camera body 10 through the communication units 110 and 137. When there is no communication signal from the camera body 10 or after execution of the communication processing at step S2703 when there is a communication signal from the camera body 10, a judgement is made at step S2704 as to whether the flash exposure mode select switch 75 remains operated. Until the flash exposure mode select switch 75 is released, these steps are repeated. On the other hand, when the flash exposure mode select switch 75 is released, the flow chart logic terminates the flash exposure processing sequence routine and orders return to the branch processing sequence routine after the step in the sequence routine calling for the flash exposure processing. When the operation card 60 receives a mode change permission command through the communication units 110 and 137, judgements are consecutively made at steps S2705, S2707, S2709 and S2711 as to whether data to be stored in RAM 131*b* of CPU 131 dictates the auto-flash exposure (AFE) mode, the red-eye effect preventive flash exposure (PRE) mode, the coercive flash exposure (CFE) mode and the off-flash exposure (OFF) mode, respectively. The operation card 60 is set in the red-eye effect preventive flash exposure (PRE) mode by storing the data of the red-eye effect preventive flash exposure (PRE) mode in RAM 131*b* at step S2706 when the data to be stored in RAM 131*b* of CPU 131 dictates the auto-flash exposure (AFE) mode, in the coercive flash exposure (CFE) mode by storing the data of the coercive flash exposure (CFE) mode in RAM 131*b* at step S2708 when the data to be stored in RAM 131*b* of CPU 131 dictates the red-eye effect preventive flash exposure (PRE) mode, in the off-flash exposure (OFF) mode by storing the data of the flash exposure off (OFF) mode in RAM 131*b* at step S2710 when the data to be stored in RAM 131*b* of CPU 131 dictates the coercive flash exposure (CFE) mode, or in the distant view flash exposure (DVE) mode by storing the data of the distant view flash exposure (DVE) mode in RAM 131*b* at step S2712 when the data to be stored in RAM 131*b* of CPU 131 dictates the coercive flash exposure (CFE) mode. Further, when data to be stored in RAM 131*b* dictates either the distant view flash exposure (DVE) mode at step S2713 or the distant view flash exposure latch (DVEL) mode at step S2714, the operation card 60 is set in the night view flash exposure (NVE) mode by storing the data of the night view flash exposure (NVE) mode in RAM 131*b* at step S2715. However, when data to be stored in RAM 131*b* does not dictate the distant view flash exposure (DVE) mode at step S2713 nor the distant view flash exposure latch (DVEL) mode at step S2714, the operation card 60 is set in the auto-flash exposure (AFE) mode by storing the data of the auto-flash exposure (AFE) mode in RAM 131*b* at step S2716.

After setting the operation card 60 in any one of the effective flash exposure modes at step S2706, S2708, S2710, S2712, S2715 or S2716, the data concerning flash exposure mode stored in RAM 131*b* is written in EEPROM 139 at step S2717. Subsequently, the LCD driver 138 is actuated to display an indication of a flash exposure mode on LCD panel 71 according to the flash exposure mode data in EEPROM 139 at step S2718. Specifically, LCD panel 71 displays nothing when the operation card 60 is set in the auto-flash exposure (AFE) mode, the red-eye effect preventive flash exposure (PRE) mode symbol 71*a* when set in the red-eye effect preventive flash exposure (PRE) mode, a lightening mark of the flash exposure mode symbol 71*b* when set in the coercive flash exposure (CFE) mode, the flash exposure mode symbol 71*b* when set in the off-flash exposure (OFF) mode, the distant view exposure (DVP) mode symbol 71*c* when set in the distant view exposure (DVP) mode, or the night view flash exposure (NVP) mode symbol 71*d* when set in the night view flash exposure (DVP) mode. Subsequently, LCD panel 71 displays fist 10 characters of a short description relating to the selected flash exposure mode in a selected language in the dot matrix display area 71*g* thereof at step S2719. Specifically, the auto-flash exposure (AFE) mode is described, for example, as "Auto" in German, "Automatica" in Italian, "Auto" in Spanish, or "Full Auto" in American English. The red-eye effect preventive flash exposure (PRE) mode is described, for example, as "Rote Augen Reduzierung" in German, "Riduzione Occhi Rossi" in Italian, "Reduccion del Efecto Ojos Rojos" in Spanish, or "Red-Eye Reduction" in American English. The coercive flash exposure (CFE) mode is described, for example, as "Britz ein" in German, "Flash Attivato" in Italian, "Flash Activado" in Spanish, or "Fill-in Flash" in American English. The off-flash exposure (OFF) mode is described, for example, as "Britz aus" in German, "Flash Disattivato" in Italian, "Flash Disactivado" in Spanish, or "Flash Off" in American English. The distant view exposure (DVP) mode is described, for example, as "Landshafts-Funktion" in German, "Paesaggio" in Italian, "Paisaje" in Spanish, or "Landscape" in American English. The night view flash exposure (NVP) is described, for example, as "Nacht-Portrait" in German, "Riprese Notturune" in Italian, "Escena Nocturna" in Spanish, or "Night Portrait" in American English. These short description can be given by any other effective languages including Danish, French, Finnish, Norwegian, Portuguese, Swedish, English, Dutch and others.

Subsequently, a judgement is made at step S2720 as to whether the description has 11 or more characters. When the description has 11 or more characters, while LCD panel 71 is maintained to display the description for a specified time period at step S2721, the description is scrolled or shifted by one dot at step S2721, and each part of the description appearing on LCD panel 71 remains displayed for a specified time period at step S2722. The description is continuously scrolled until it is scrolled from the top to the last through steps S2721 to S2724. When the description is completely scrolled from the top to the last, LCD panel 71 continuously displays the last 10 characters of the description on LCD panel 71 for a specified time period at step S2725, and thereafter it displays the first 10 characters of the description thereon at step S2726. When the description has 10 or less characters at step S2720 or the LCD panel 71 displays the first 10 characters of the description thereon at step S2726, an internal display timer is actuated to count a specified description display time at step S2727. Subsequently, the RAM 131*b* is accessed to find whether the distant view flash exposure (DVE) mode is set at step S2728 and whether the night view flash exposure (DVE) mode is set at step S2729. When neither the distant view flash exposure (DVE) mode nor the night view flash exposure (DVE) mode is set or after actuating a latch timer to count a latch time of, for example, three seconds at step S2730 when either the distant view flash exposure (DVE) mode or the night view flash exposure (DVE) mode is set, data of the selected flash exposure mode is stored in RAM 131*b* at step S2731. Subsequently, a judgement is made at step S2732 as to whether there is a communication signal to the operation card 60 from the camera body 10 through the communication units 110 and 137. When there is a communication signal, communication processing, which will be described in detail later, is executed at step S2733. When there is no communication signal to the operation card 60 or after execution of the communication processing, a judgement is made at step S2734 as to whether the internal timer has counted over the display time. When having counted over the display time, the LCD driver 138 is actuated to display a sign indicating a date print side, namely the sign "F" indicating that a date is printed on the front of a print or the sign "B" indicating that a date is printed on the back of a print, on LCD panel 71 at step S2735. When not yet having counted over the display time, or after displaying a sign indicating a date print side on LCD panel 71, the RAM 131*b* is accessed to find whether the distant view flash exposure (DVE) mode is set at step S2736 and whether the night view flash exposure (DVE) mode is set at step S2737. When either the distant view flash exposure (DVE) mode or the night view flash exposure (DVE) mode is set, a judgement is made at step S2738 as to whether the latch timer has counted over the latch time of three seconds. When the latch timer has counted over the latch time, another judgement is made at step S2739 as to whether the distant view flash exposure (DVE) mode is set. When in the distant view flash exposure (DVE) mode is not set, after storing data of setting the distant view flash exposure latch (DVEL) mode in RAM 131b at step S2740, the LCD driver 138 is actuated to display and flash on and off the night view flash exposure (NVE) mode symbol 71d on LCD panel 71 at step S2741. On the other hand, when in the distant view flash exposure (DVE) mode is set, after storing data of setting the distant view flash exposure latch (DVEL) mode in RAM 131b at step S2742, the LCD driver 138 is actuated to display and flash on and off the distant view flash exposure (DVE) mode symbol 71c on LCD panel 71 at step S2743. Subsequently to flashing on and off either the night view flash exposure (NVE) mode symbol 71d or the distant view flash exposure (DVE) mode symbol 71c on LCD panel 71 at step S2741 or S2743, after writing the data of flash exposure mode stored in RAM 131b in EEPROM 139 at step S2744, either the night view flash exposure (NVE) mode or the distant view flash exposure (DVE) mode is fixedly set in RAM 131b at step S2745.

When the night view flash exposure (DVE) mode is not set at step S2737, when the latch timer has not yet counted over the latch time of three seconds at step S2738, or after setting the flash exposure mode, either the night view flash exposure (NVE) mode or the distant view flash exposure (DVE) mode, in RAM 131b at step S2745, a judgement is made at step S2746 as to whether the flash exposure mode select switch 75 remains operated. When the flash exposure mode select switch 75 is still operated, the flow chart logic repeats steps from step S2732 where a judgement concerning communication between the operation card 60 and the camera body 10. On the other hand, when the flash exposure mode select switch 75 is released, the flow chart logic terminates the flash exposure mode processing and orders return to the branch processing sequence routine after the step in the sequence routine calling for the flash exposure mode processing.

With the flash exposure mode processing, any flash exposure mode is set by operating the flash exposure mode select switch 75 on the operation card 60, and communication is made between the operation card 60 and the camera body 10 to set the camera body 10 in the flash exposure mode set by the flash exposure mode select switch 75.

Figure 36B:
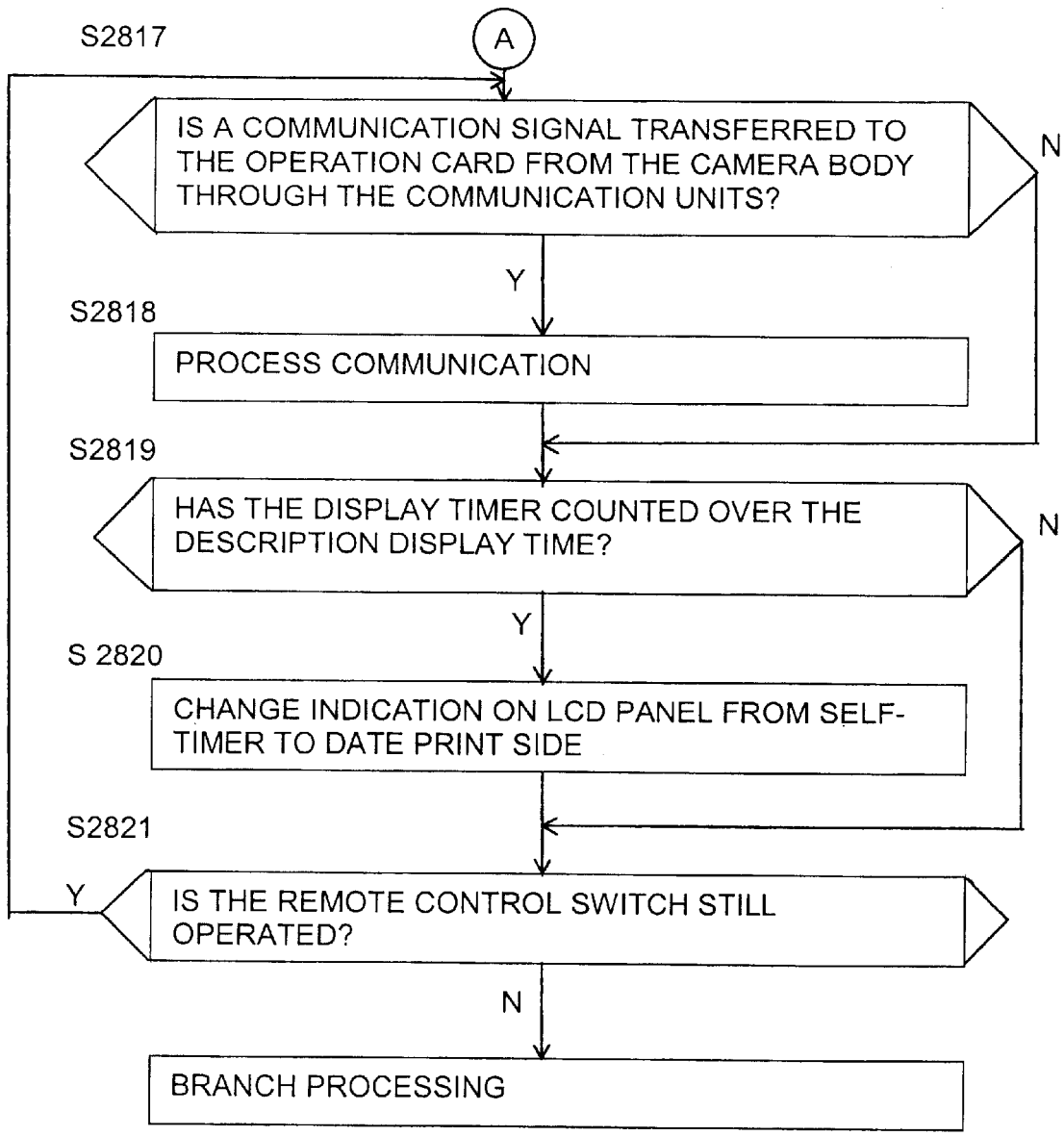

FIGS. 36A and 36B is a flow chart of the sequence routine of self-timer exposure mode setting processing which is performed to set or reset the self-timer exposure mode as well as to indicate that the self-timer exposure mode is set or reset when the remote control switch 77 is operated. When the flow chart logic commences and control proceeds directly to a function block at step S2801 where a judgement is made as to whether a mode change permission command is transferred to the operation card 60 through the communication units 110 and 137. When the operation card 60 does not receive any mode change permission command, a judgement is made at step S2802 as to whether the camera system 1 is set in the self-timer exposure mode. When the camera system 1 is in the self-timer exposure mode while the operation card 60 does not receive any mode change permission command or when the operation card 60 receives the mode change permission command, a judgement as to the self-timer exposure mode is made once again at step S2803. The judgement as to the self-timer exposure mode is performed based on whether there is data of the self-timer exposure mode in RAM 131b. When the camera system 1 is set in the self-timer exposure mode, communication is made between the operation card 60 and the camera body 10 to cancel the self-timer exposure mode of the operation card 60 at step S2804. In response to receipt of a confirmation request signal from the camera body 10, the operation card 60 transfers a signal confirming that the self-timer exposure mode is cancelled in the operation card 60 to the camera body 10. Subsequently, the LCD driver 138 is actuated to remove the remote control mode symbol 71f and the self-timer exposure mode symbol 71e displayed on LCD panel 71 at step S2805. On the other hand, when the camera system 1 is not set in the self-timer exposure mode, communication is made between the operation card 60 and the camera body 10 to set the self-mode exposure mode of the operation card 60 at step S2806. In response to receipt of a confirmation request signal from the camera body 10, the operation card 60 transfers a signal confirming that the self-timer exposure mode is set in the operation card 60 to the camera body 10. Subsequently, data of displaying self-timer exposure mode symbol is stored in RAM 131b of CPU 131 at step S2807, and the LCD driver 138 is actuated to display a description of the self-timer exposure mode in a selected language in the dot matrix display area 71g of LCD panel 71 at step S2808. For instance, a description such as "Self-Timer" when American English is selected.

Subsequently, a judgement is made at step S2809 as to whether the description has 11 or more characters. For instance, the description is given Such as "Self-Timer" in American English which has 10 characters, "Autoscatto" in Italian which has 10 characters, "Selbstausloser" in German which has 14 characters, "Autodisparador" in Spanish which has 14 characters. When the description has 11 or more characters, while LCD panel 71 is maintained to display the description for a specified time period at step S2810, the description is scrolled or shifted by one dot at step S2811, and each part of the description appearing on LCD panel 71 remains displayed for a specified time period at step S2812. The description is continuously scrolled until it is scrolled from the top to the last through steps S2811 to S2813. When the description is completely scrolled from the top to the last, LCD panel 71 continuously displays the last 10 characters of the description on LCD panel 71 for a specified time period at step S2814, and thereafter, it displays the first 10 characters of the description thereon at step S2815. When the description has 10 or less characters at step S2809 or the LCD panel 71 displays the first 10 characters of the description thereon at step S2815, an internal display timer is actuated to count a specified description display time at step S2727. When the operation card 60 is judged to be not set in the self-timer exposure mode at step S2802 or after actuation of the display timer for counting the description display time at step S2727, a judgement is made at step S2817 as to whether a communication signal is transferred to the operation card 60 from the camera body 10 through the communication units 110 and 137. When there is no communication signal or after execution of the communication processing at step S2818 when there is any communication signal, a judgement is made at step S2819 as to whether the display timer has counted over the description display time. When the display timer has not yet counted over the description display time or after changing the indication on LCD panel 71 from the description of self-timer exposure mode to an indication of date print side, either "F" or "B" at step S2820 when the internal timer has counted over the description display time, a judgement is made at step S2821 as to whether the remote control switch 77 remains operated. The flow chart logic repeats steps S2817 through S2820 until the remote control switch 77 is released or terminates the self-timer exposure mode setting processing sequence routine and orders return to the branch processing sequence routine after the step in the sequence routine calling for the self-timer exposure mode setting processing.

With the self-timer exposure mode setting processing, Communication signal representing setting or cancelling the self-timer exposure mode is certainly transferred to the camera body 10 through the communication units 110 and 137 by operating the remote control switch 77 of the operation card 60. Accordingly, self-timer exposure is performed through operation of the remote control switch 77. Further, it is easily performed to cancel the self-timer exposure mode set in the camera body 10 through operation of the remote control switch 77. Even a relatively long description is displayed from its top to the last on LCD panel 71.

Figure 37A:
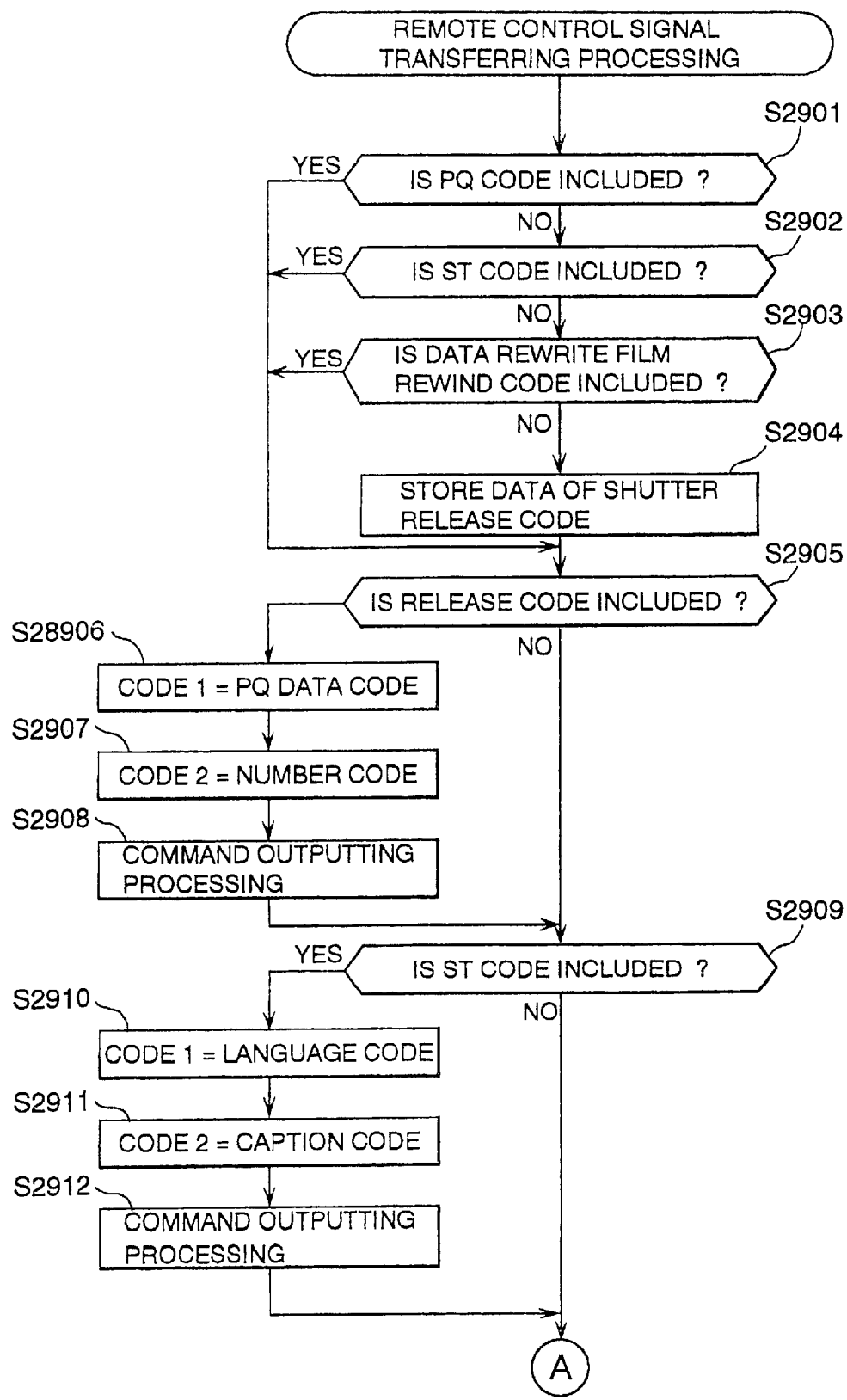
FIGS. 37A and 37B are a flow chart illustrating an operation card remote control signal transmission processing sequence routine.
Figure 37B:
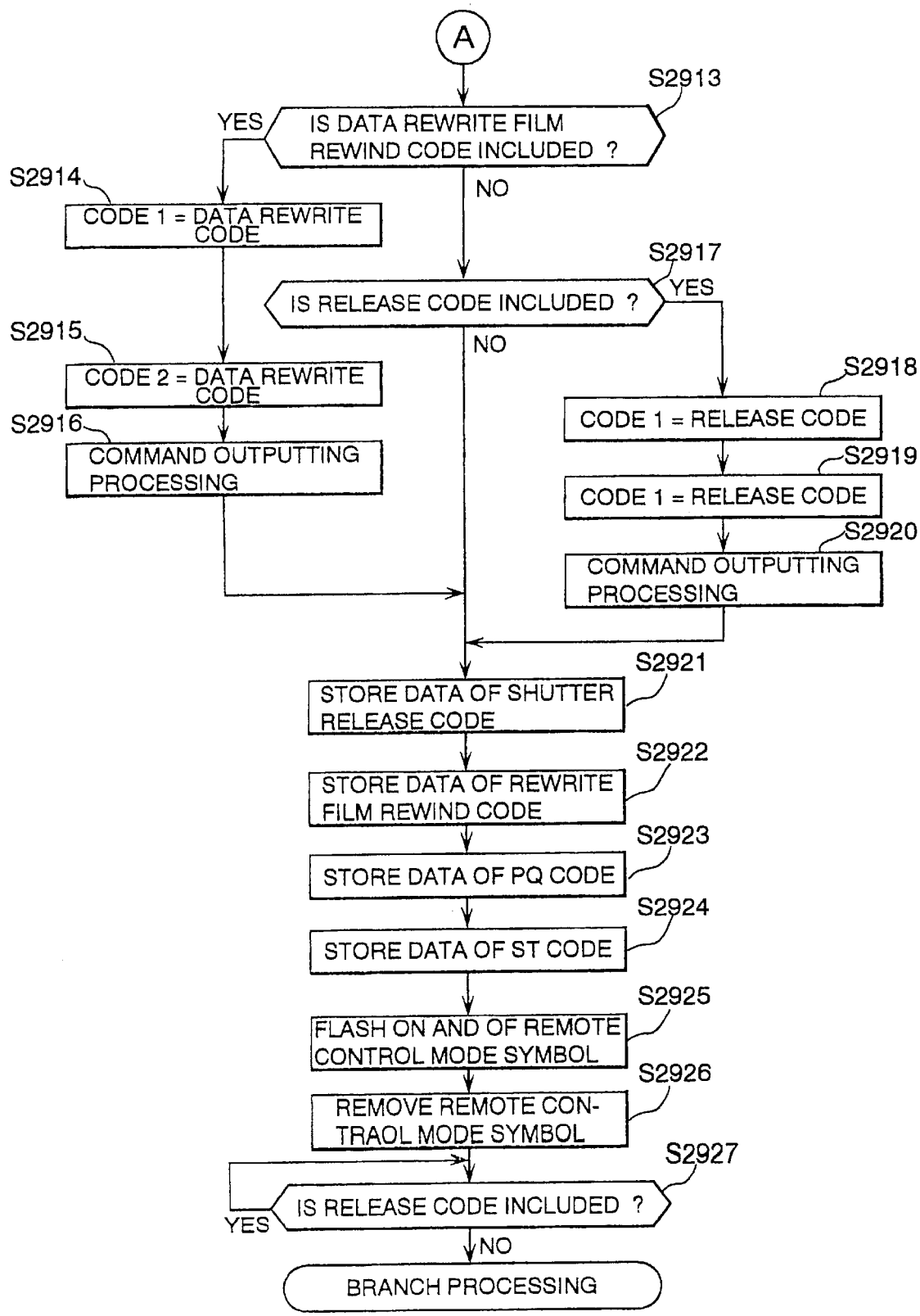
Figure 38:
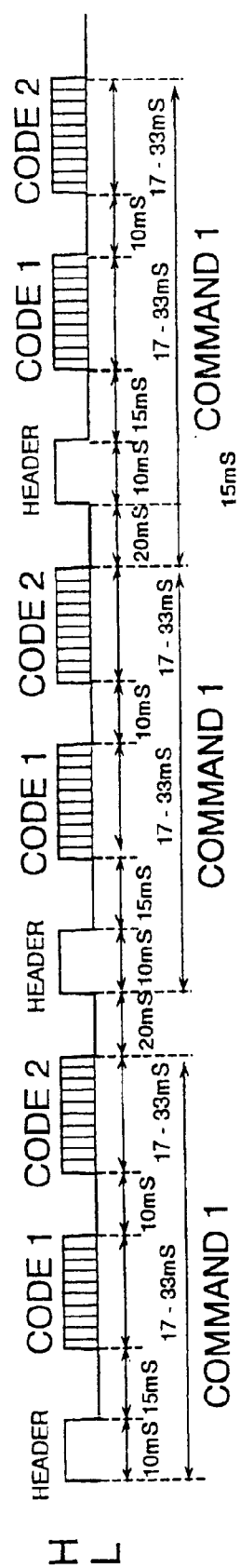
FIG. 38 is an illustration showing a structure of used in the operation card remote control signal transmission.

FIGS. 37A and 37B are a flow chart of the sequence routine of remote control signal transferring processing which is called for when the remote control switch 77 is operated while the operation card 60 remains detached from the camera system 10. When the flow chart logic commences, judgements are consecutively made at steps S2901 through S2903 as to whether the remote control signal includes a print quantity (PQ) code, whether the remote control signal includes a caption selection (ST) code, and whether the remote control signal includes a data rewrite film rewind code, respectively. When the remote control signal does not includes any one of these codes, data of a shutter release code is stored in RAM 131b at step S2904. When the remote control signal includes at least one of these codes, or after storing the data of a shutter release code in RAM 131b, a judgement is made at step S2905 as to whether the remote control signal includes a print quantity (PQ) code. After storing data of the print quantity (PQ) code and data of the number of prints as a code 2 in RAM 131b at steps S2906 and S2907 when the remote control signal includes a print quantity (PQ) code, a command outputting processing is executed at step S2908. In the command outputting processing, CPU 131 sends a remote control signal such as shown in FIG. 54 to the control signal transmission circuit 140 actuates LED 93 to project a light beam toward the camera body 10. When the remote control signal does not include a print quantity (PQ) code, or after execution of the command outputting processing, a judgement is made at step S2909 as to whether the remote control signal includes a caption selection (ST) code. After storing data of a language value as code 1 and data of a caption value as a code 2 in RAM 131b at steps S2910 and S2911 when the remote control signal includes a caption selection (ST) code, the command outputting processing is executed at step S2912. In the command outputting processing, CPU 131 sends a remote control signal to the control signal transmission circuit 140 actuates LED 93 to project a light beam toward the camera body 10. When the remote control signal does not include a caption selection (ST) code, or after execution of the command outputting processing, a judgement is made at step S2913 as to whether the remote control signal includes a data rewrite film rewind code. When the remote control signal includes a data rewrite film rewind code, after storing data of a data rewrite film rewind code as a code 1 and a code 2 in RAM 131b at steps S2914 and S2915, respectively, the command outputting processing is executed at step S2916. In the command outputting processing, CPU 131 sends a remote control signal to the control signal transmission circuit 140 actuates LED 93 to project a light beam toward the camera body 10. When the remote control signal does not include a data rewrite film rewind code, a judgement is made at step S2917 as to whether the remote control signal includes a shutter release code. When the remote control signal includes a shutter release code, after storing data of a shutter release code as a code 1 and a code 2 in RAM 131b at steps S2918 and S2919, respectively, the command outputting processing is executed at step S2920. In the command outputting processing, CPU 131 sends a remote control signal to the control signal transmission circuit 140 actuates LED 93 to project a light beam toward the camera body 10.

When the remote control signal does not include a shutter release code at step S2917, or after execution of the command outputting processing at step S2916 or S2920, data of the shutter release code, the data rewrite film rewind code, the print quantity (PQ) code and the caption selection (ST) code are cancelled at step S2921 through S2924, respectively. Subsequently, LCD driver 138 is actuated to display the remote control mode symbol 71f flashing on and off on LCD panel 71 at step S2925. This provides for the photographer an indication that a remote control signal has been transferred. After a lapse of a specified time period, LCD driver 138 cause LCD panel 71 to remove the remote control mode symbol 71f at step S2926. When operation of the remote control switch 77 is discontinued at step S2917, the flow chart logic terminates the remote control signal transferring processing and orders return to the branch processing sequence routine after the step in the sequence routine calling for the remote control signal transferring processing.

According to the remote control signal transferring processing, it is possible to make shutter release, print quantity (PQ) setting, caption setting and data rewriting remotely from the camera body 10.

Figure 39:
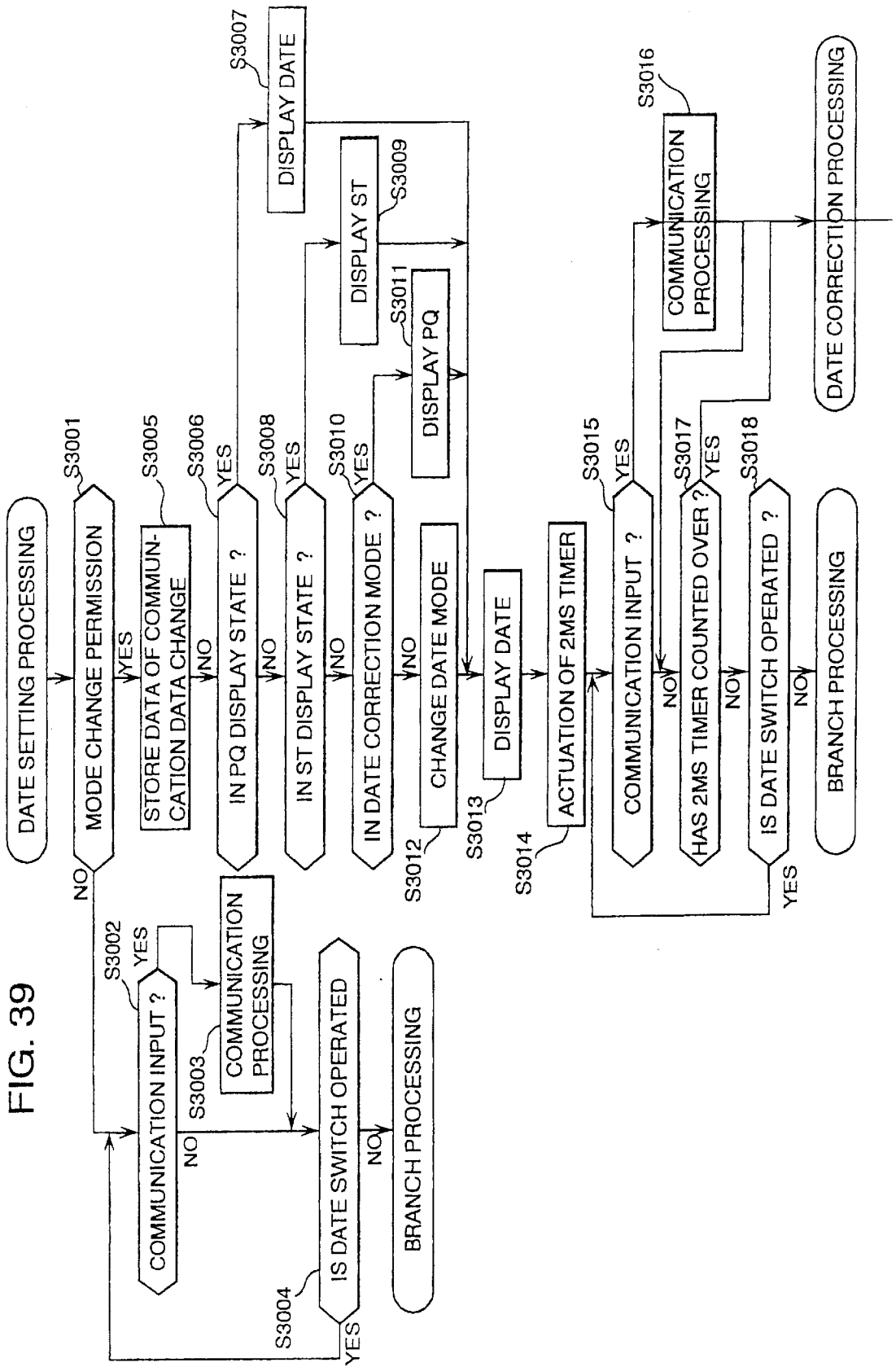
FIG. 39 is a flow chart illustrating a date mode setting processing sequence routine.

FIG. 39 is a flow chart of the sequence routine of date setting processing which is called for when switches 138 are operated. When the flow chart logic commences, a judgement is made at steps S3001 as to whether a mode change permission command is transferred to the operation card 60 through the communication units 110 and 137. When the operation card 60 does not receive a mode change permission command, a judgement is made at step S3002 as to whether there is a communication input from the camera body 10. When the operation card 60 receives, communication processing is executed as will be described later. These steps are continued until operation of the date selection switch 72 is discontinued at step S3004. When the date selection switch 72 is released at step S3004, the flow chart logic terminates the date setting processing and orders return to the branch processing sequence routine after the step in the sequence routine calling for the date setting processing. When the operation card 60 receives a mode change permission command, data indicating that there is a change in communication data to be transferred to the camera body 10 (which is hereafter referred as communication data change indication data) is stored in RAM 131b at step S3005. This data stored in RAM 131b is transferred to the camera body 10 when the operation card 60 receives a signal including a command of no change from the camera body 10 through the communication units 110 and 137. Subsequently, judgements are consecutively made as to whether the operation card 60 is in a print quantity display state, in a caption display state and in a date correction made at step S3006, S3008 and S3010, respectively.

LCD driver 138 causes LCD panel 71 to display the print quantity (PQ) thereon at step S3007 when the operation card

60 is in the print quantity display state, the caption in a selected language at step S3009 when in the caption display state, and a corrected date at step S3011 when in the date correction mode. When the operation card 60 is not in any one of these states or mode, after execution of date mode changing processing (which will be described later) at step S3012, the date is displayed on LCD panel 71 at step S3013. Then, an internal 2-sec count timer starts to count a specified date correction suspension time of, for example, two seconds at step S3014. Subsequently, a judgement is made at step S3015 as to whether there is a communication input from the camera body 10. When the operation card 60 receives, the communication processing is executed at step S3016. When the operation card 60 does not receive any communication input from the camera body 10, or after execution of the communication processing, a judgement is made at step S3017 as to whether the internal timer has counted over the date correction suspension time. When the date correction suspension time is over, date correcting or changing processing (which will be described later) is executed. These steps S3015 through S3017 are continued until operation of the date selection switch 72 is discontinued at step S3018. When the date selection switch 72 is released at step S3004, the flow chart logic terminates the date setting processing and orders return to the branch processing sequence routine after the step in the sequence routine calling for the date setting processing.

Figure 40:
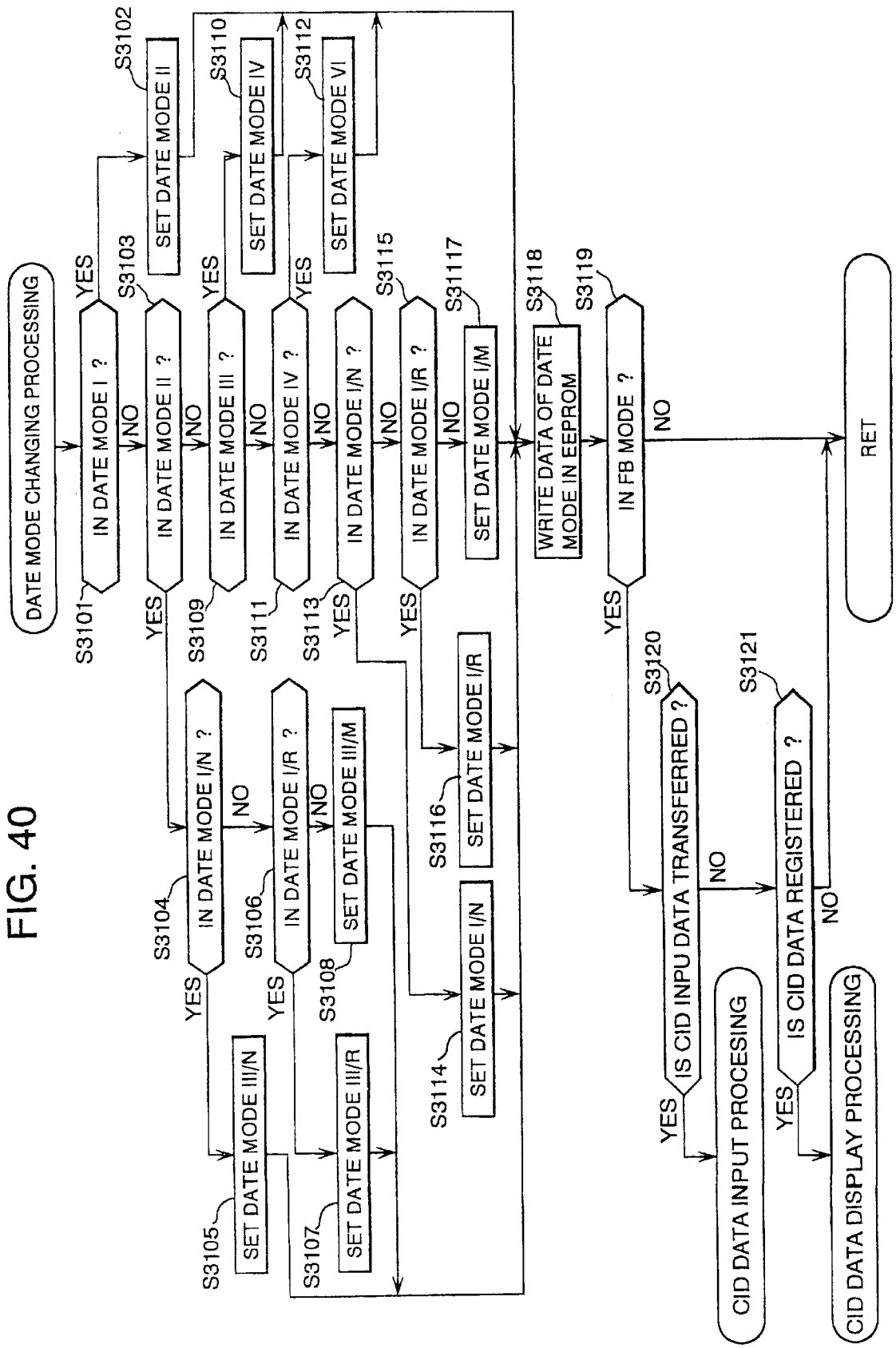
FIG. 40 is a flow chart illustrating a date mode changing processing sequence routine.
Figure 41A:
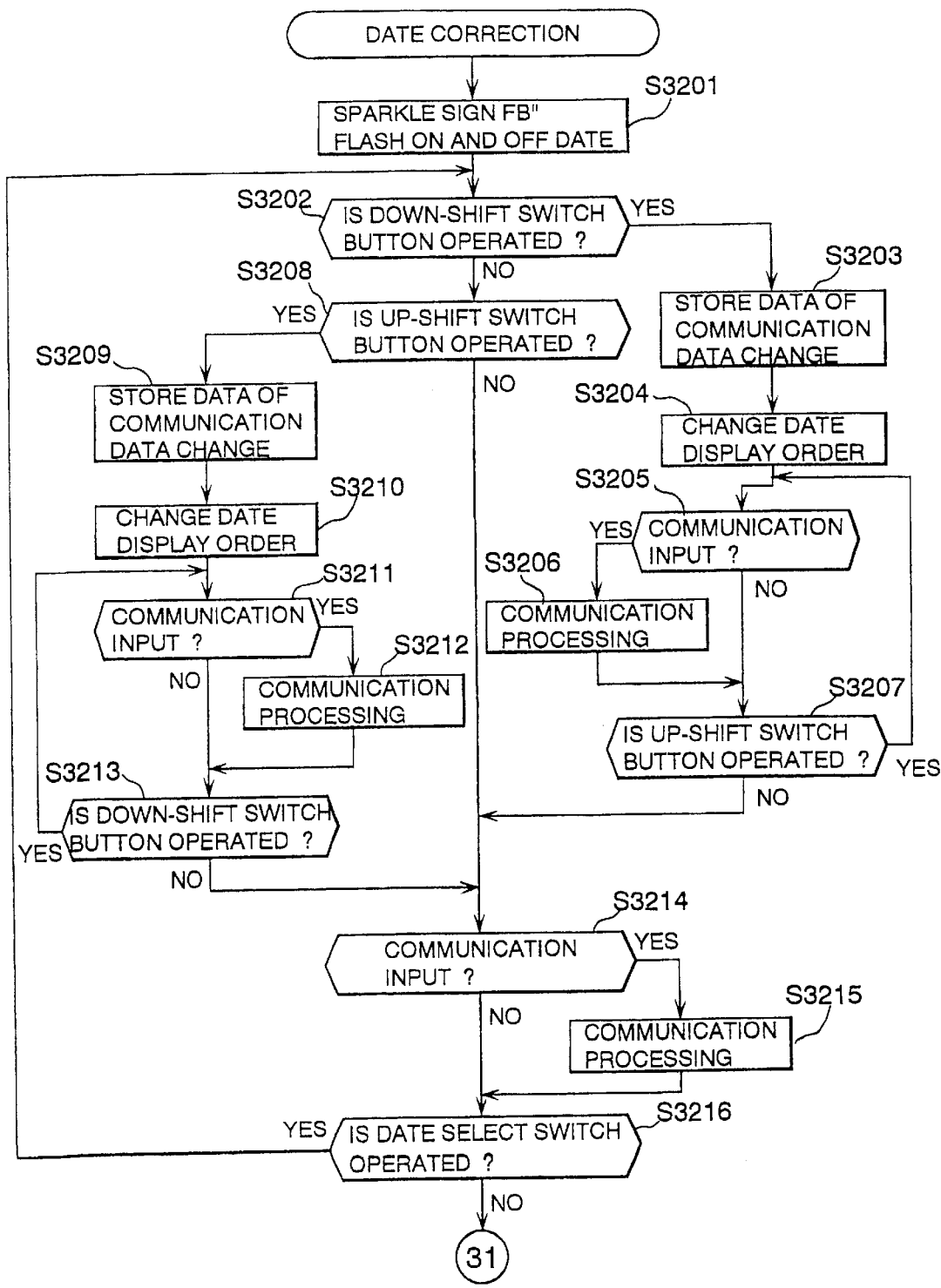
FIGS. 41A through 41D are a flow chart illustrating a date correction processing sequence routine.
Figure 41B:
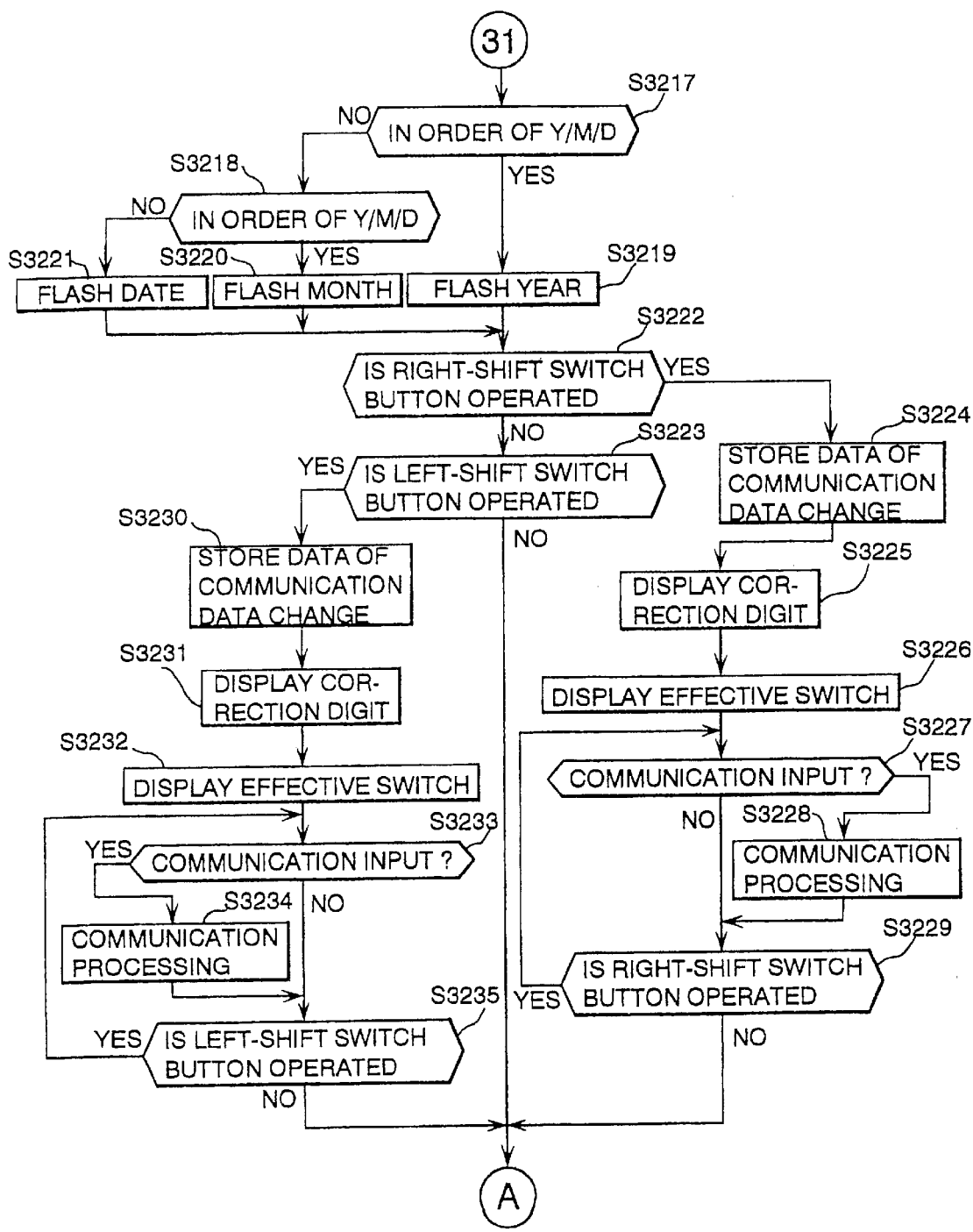
Figure 41C:
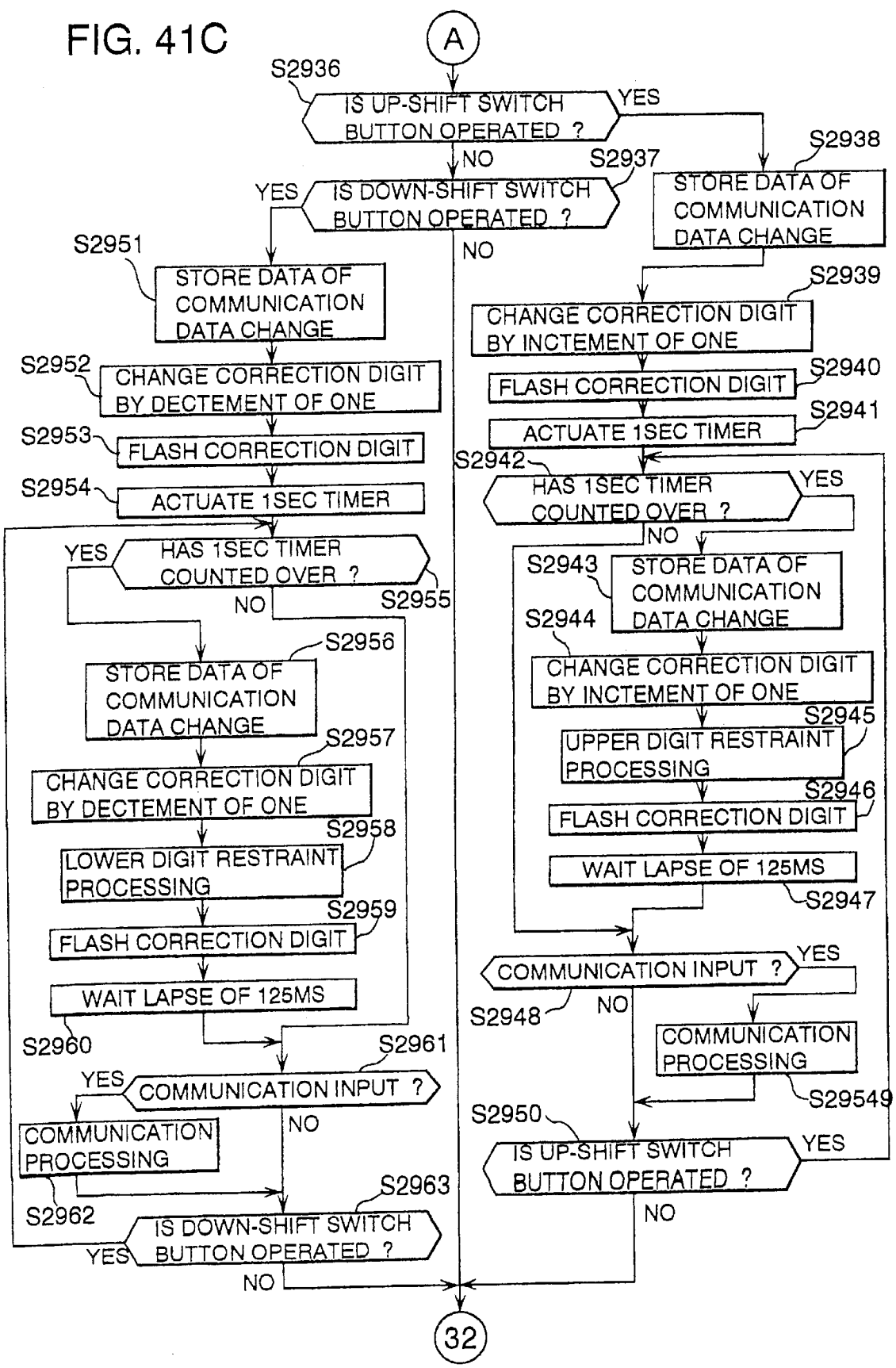
Figure 41D:
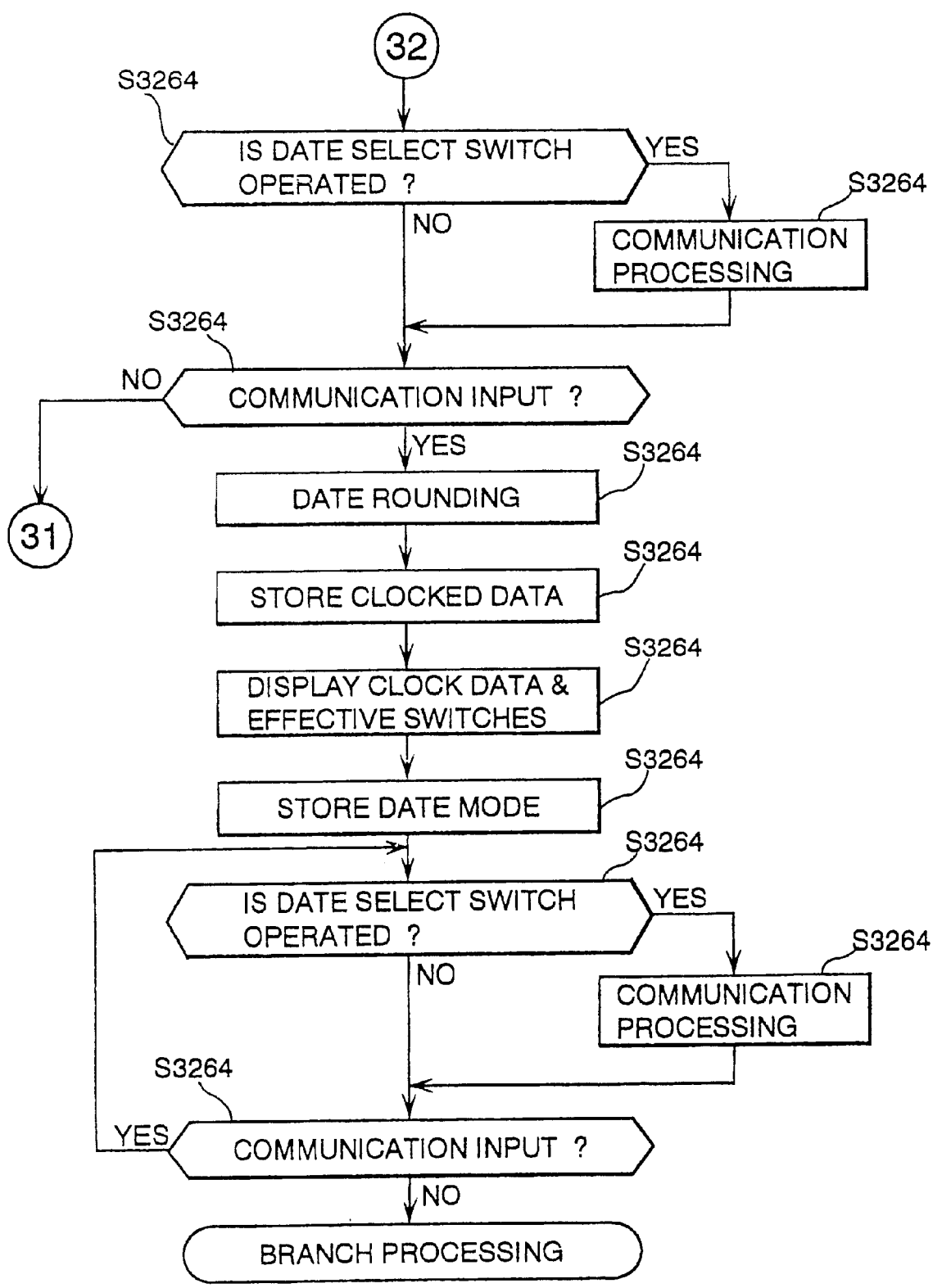
Figure 43B:
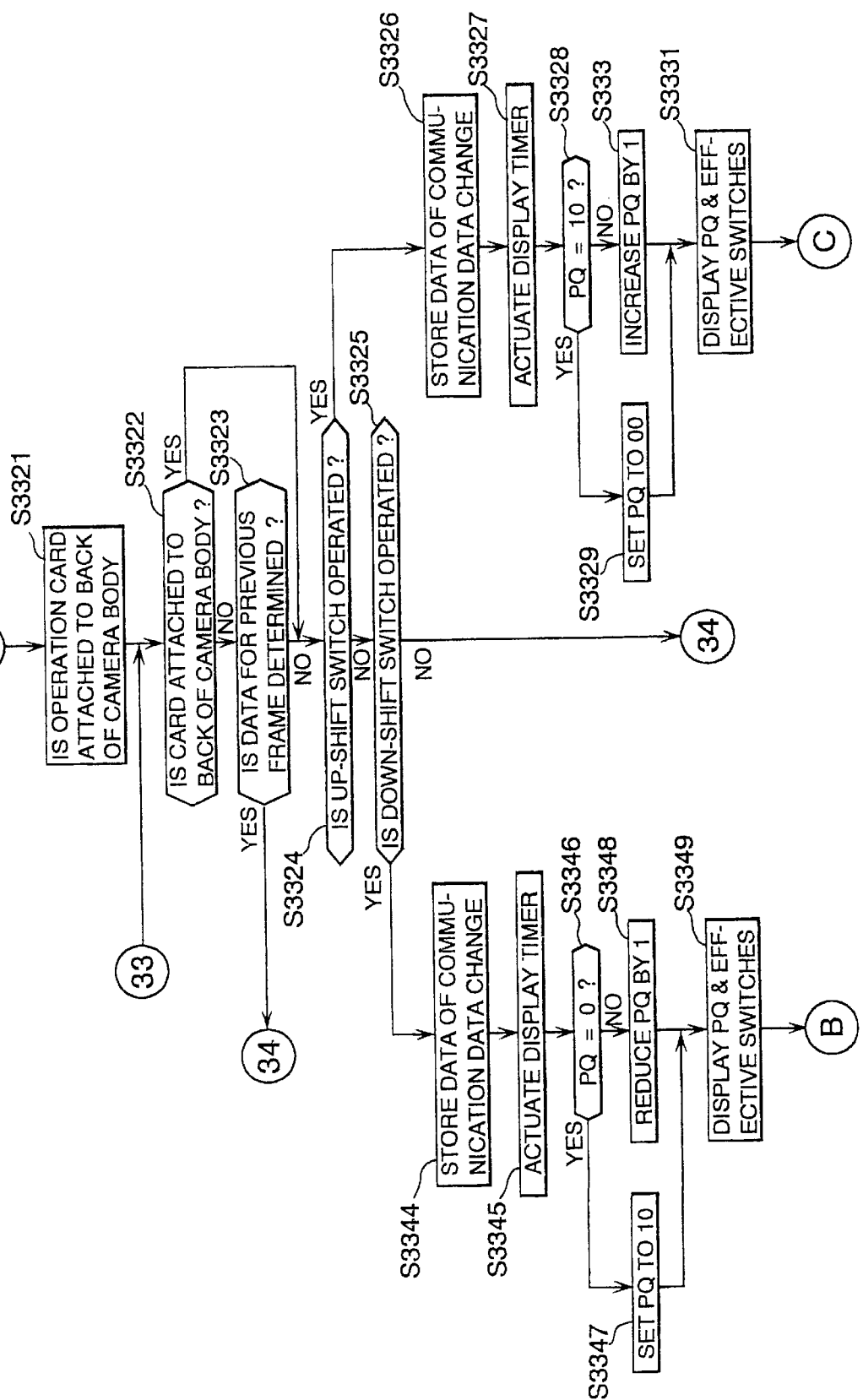
Figure 43C:
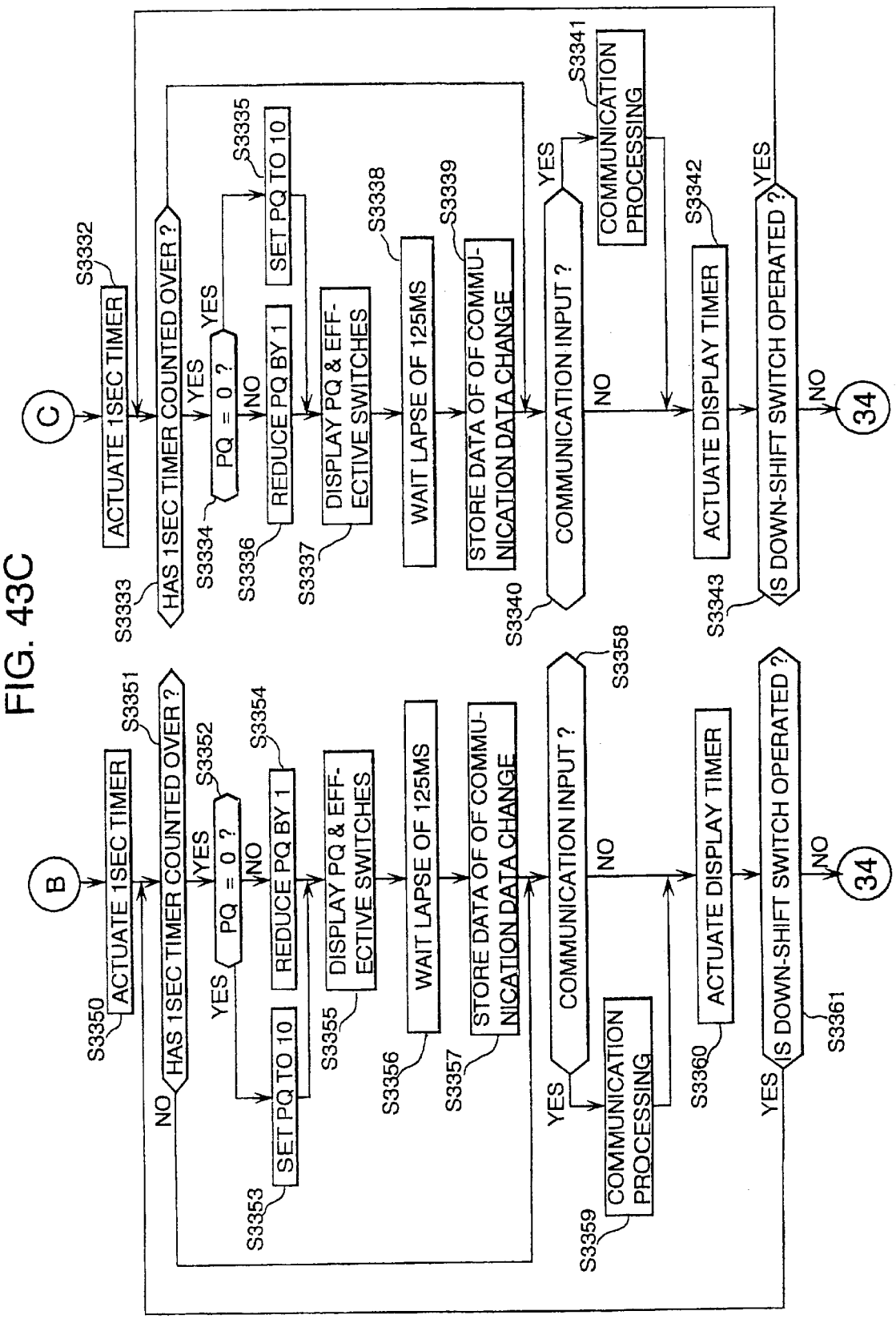
Figure 43D:
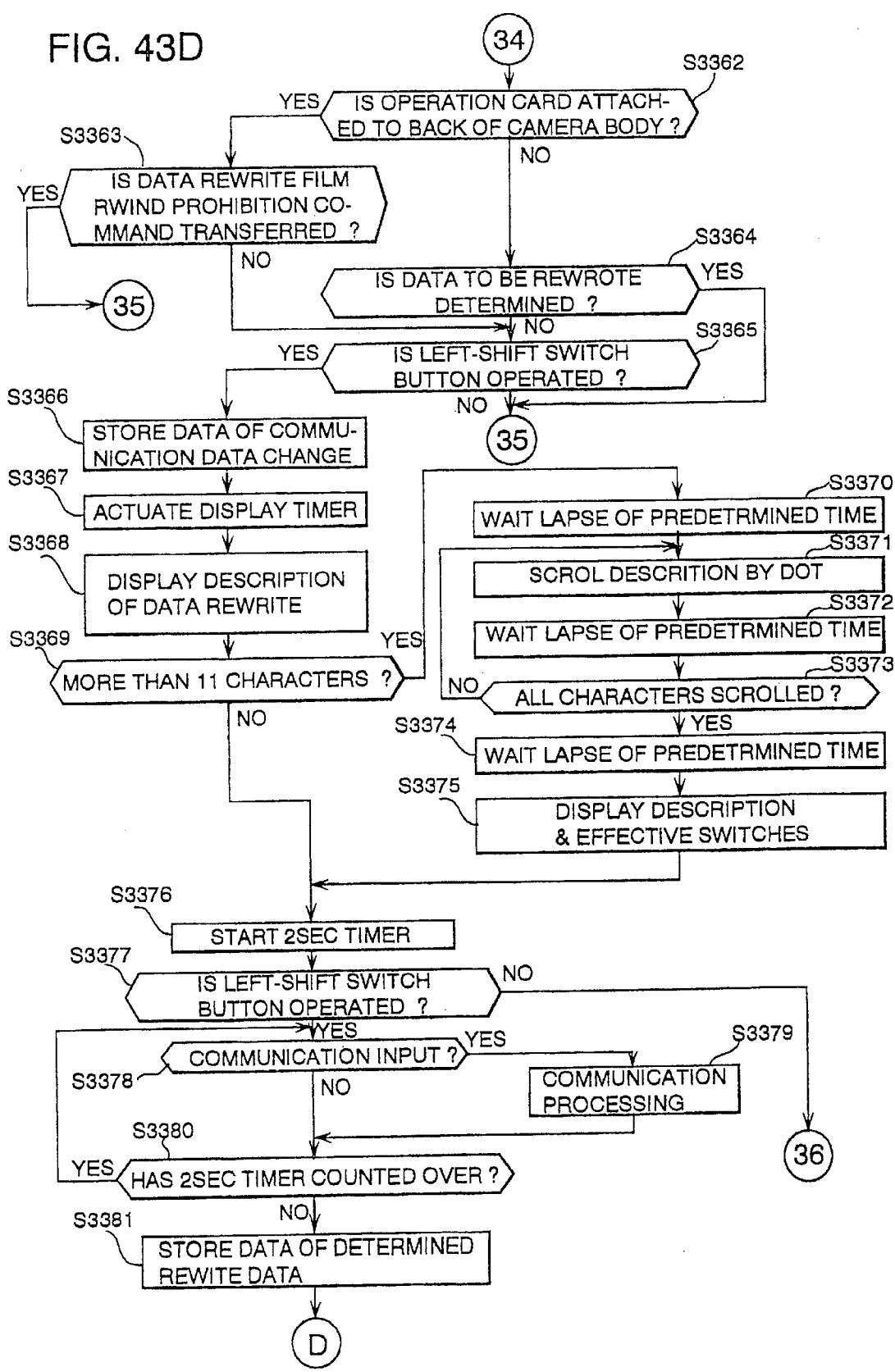
Figure 43E:
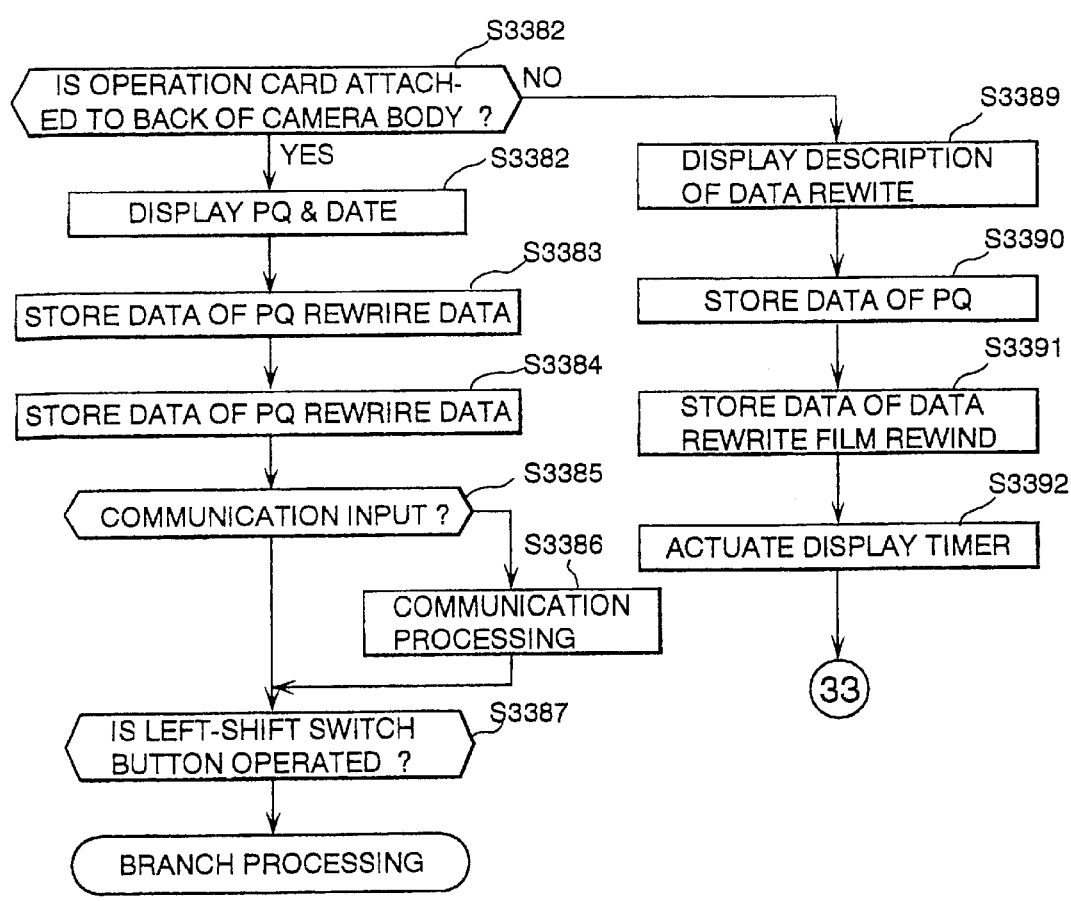
Figure 43F:
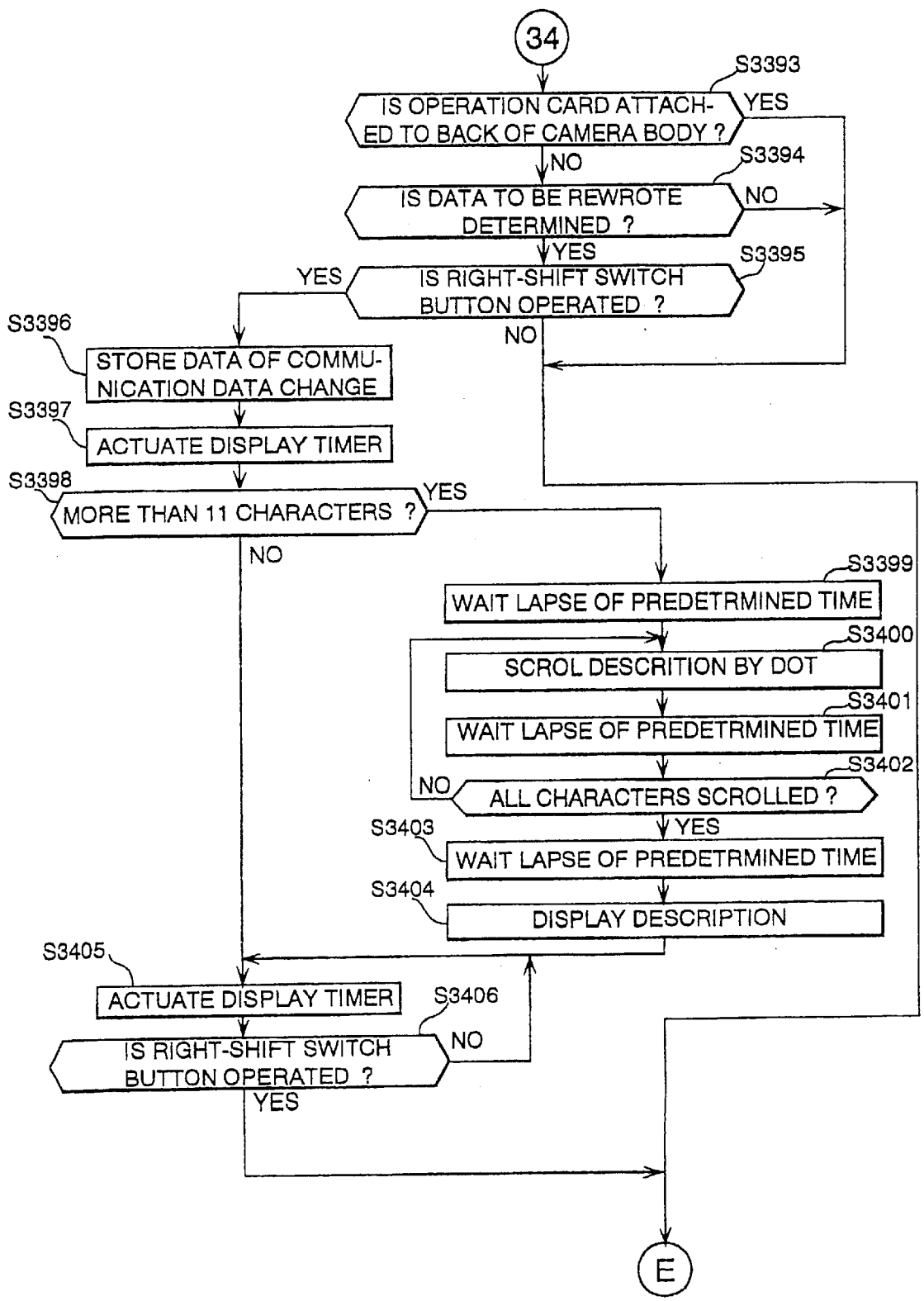
Figure 43G:
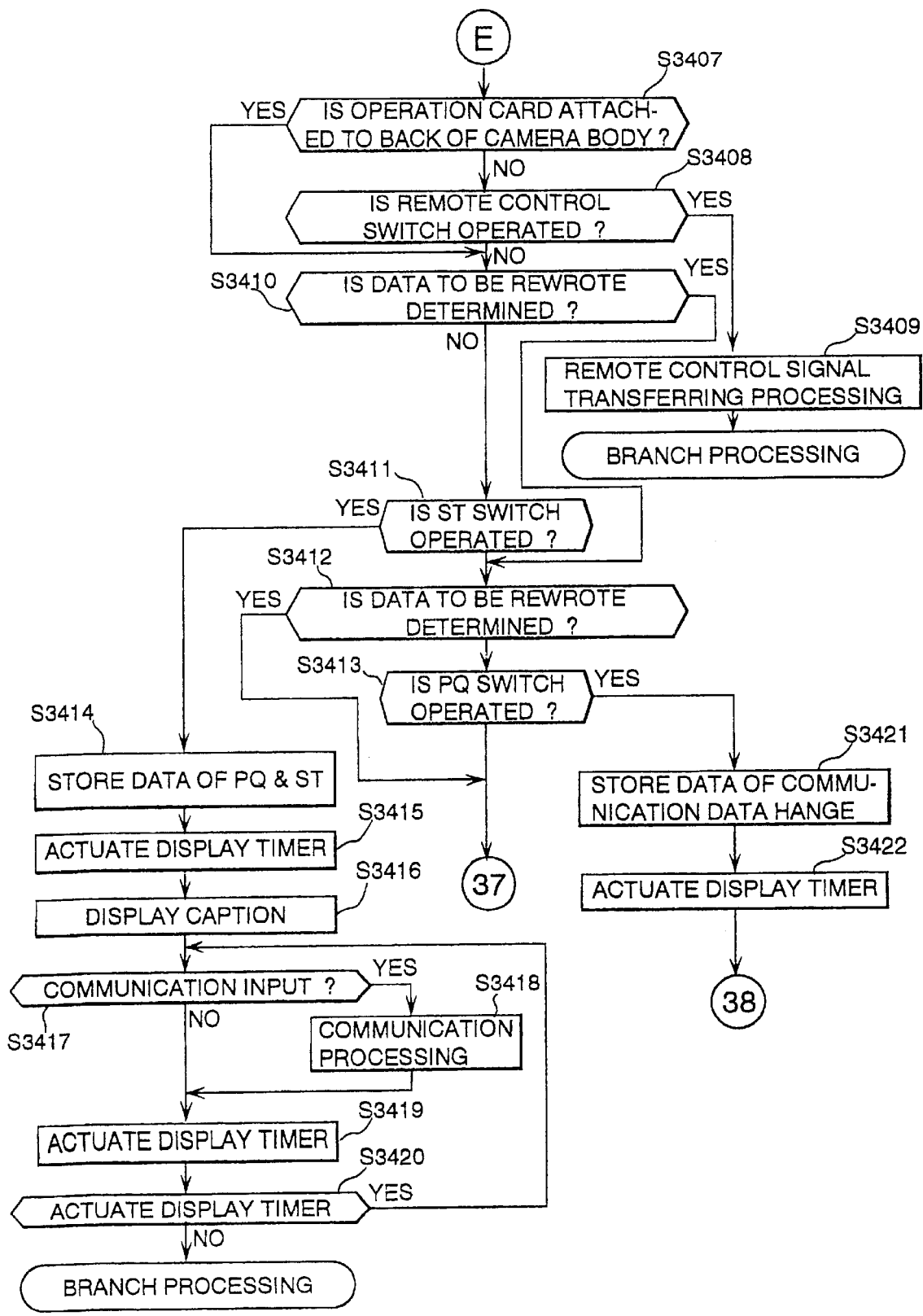
Figure 43H:
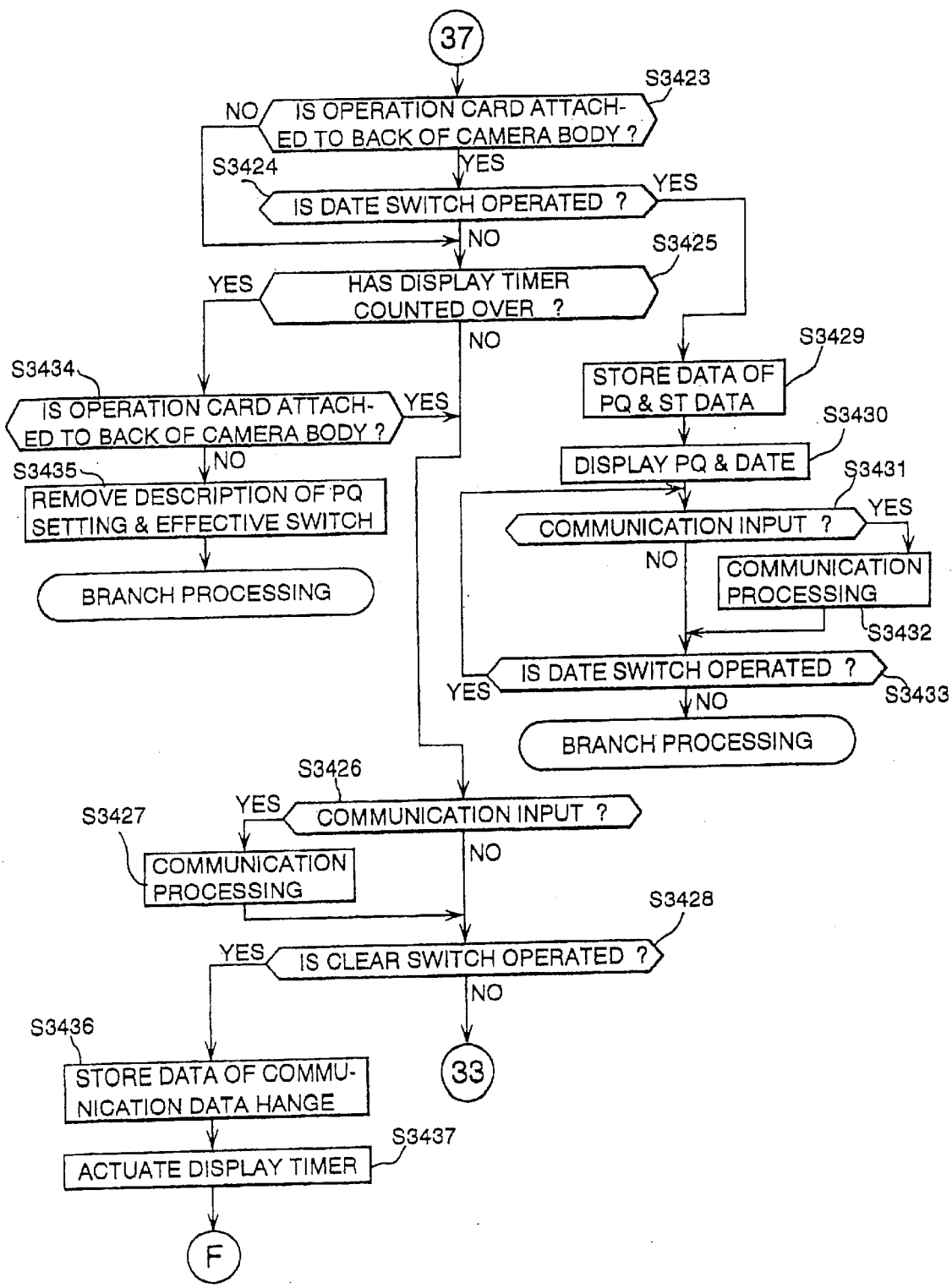
Figure 431:
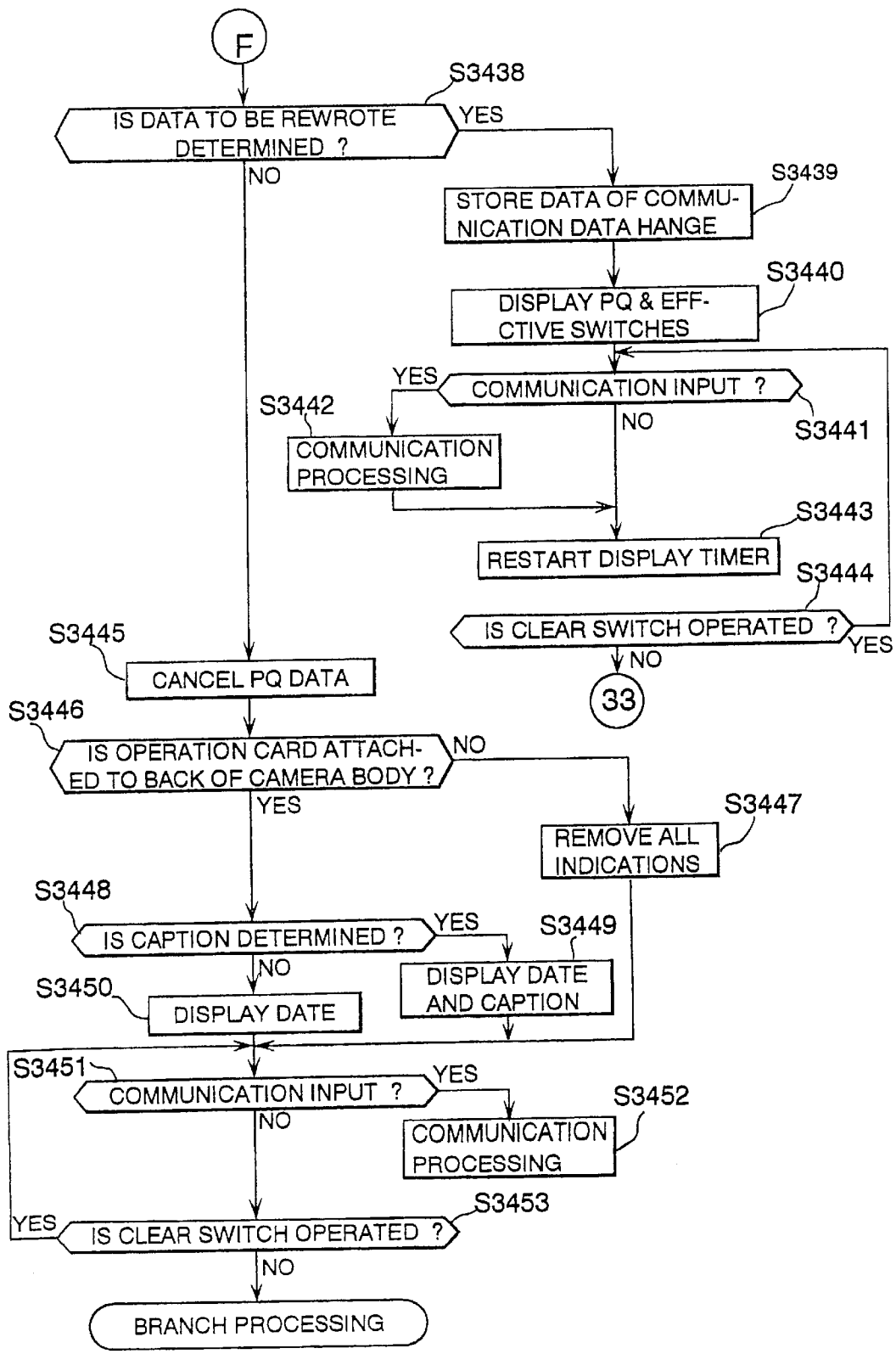

FIG. 40 is a flow chart of the sequence routine of date mode changeling processing which is executed at step S3012 in the date setting processing sequence routine. When the flow chart logic commences, a judgement is made at steps S3101 as to whether the date mode I/N (sign "FB" and a date of year/month/day display mode) is currently selected. When the date mode I/N is currently selected, the date mode II (sign "FB" and time of hour/minute display mode) is set at step S3102. Subsequently, a judgement is made at step S3103 as to whether the date mode II is currently selected. When the date mode II is currently selected, a judgement is made at step S3104 as to whether the date mode III/N (sign "B" and date of year/month/day display mode) is currently selected. When the date mode III/N is currently selected, the date mode III/N is set at step S3105. Otherwise, a judgement is made st step S3106 as to whether the date mode III/R (sign "B" and date of month/day/year display mode) is currently selected. When the date mode III/R is currently selected, the date mode III/R is set at step S3107. Otherwise, a date mode III/M (sign "B" and date of day/month/year display mode) is set at step S3108. When the date mode II is not currently selected at step S3103, then, a judgement is made at step S3108 as to whether the date mode III/N is currently selected. When the date mode III is currently selected, the date mode IV (sign "B" and time of hour/minute display mode) is set at step S3109. When the date mode III/N is not currently selected, a judgement is made at step S3110 as to whether the date mode IV is currently selected. When the date mode IV is currently selected, the date mode VI (mode in which nothing is displayed) is set at step S3111. when the date mode IV is currently selected, a judgement is made at step S3112 as to whether the date mode I/N is currently selected. When the date mode I/N is currently selected, the date mode I/N is set at step S3113. Otherwise, a judgement is made at step S3114 as to whether the date mode I/R is currently selected. When the date mode I/R is currently selected, the date mode I/R is set at step S3115. Otherwise, the date mode I/M (sign "FB" and a date of day/month/year display mode) is set at step S3116. When a date mode is set, after storing data of the date mode in EEPROM 139 and date information prepared according to the date mode in RAM 131b at step S3117, a judgement is made at step S3118 as to whether any one of the date modes I/N, II/N and I/M is set. When one of the date modes I/N, II/N and I/M is set, cartridge identification data (CID) inputting processing is executed when cartridge identification data (CID) has been transferred to the operation card 60 at step S3119, or a judgement is made at step S3120 as to whether there is cartridge identification data (CID) having been registered when there is no cartridge identification data (CID) transferred to the operation card 60. When there is registered cartridge identification data (CID), cartridge identification data (CID) displaying processing is executed. When any one of the date modes I/N, II/N and I/M is not set, or when there is no registered cartridge identification data (CID), the flow chart logic terminates the date mode changeling processing.

The cartridge identification data (CID) displaying processing causes LCD panel 71 to display cartridge identification data (CID) of the film cartridge 200 including a number of unexposed frames registered in EEPROM 139. In the event where there are a plurality of cartridge identification data (CID), these data are displayed on LCD panel 71 in order by operating the switches 136.

The cartridge identification data (CID) inputting processing is performed when a film cartridge in which a film partly exposed and partly unexposed is rewound is removed out of the cartridge chamber 54 of the camera body 10. The processing enables the photographer to enter and store cartridge identification data (CID) of the film cartridge 200 including a number of unexposed frames in EEPROM 139 by operating the switches 136.

FIGS. 41A through 41D are a flow chart of the sequence routine of date correcting or changing processing. When the flow chart logic commences, LCD panel 71 displays the sign "FB" and flashes a date on and off to indicate that date correction is permitted at step S3201. Subsequently, a judgement is made at step S3202 as to wether the up-shift switch button 81 is operated. When the up-shift switch button 81 remains operated, communication data change indication data is stored in RAM 131b at step S3203. This data stored in RAM 131b is transferred to the camera body 10 when the operation card 60 receives a signal including a command of no change from the camera body 10 through the communication units 110 and 137. At step S3204, the order of a date displayed on LCD panel 71 is changed. Subsequently, a judgement is made at step S3205 as to whether there is communication input. Communication processing (which will be described later) is executed at step S3206 when there is communication input. These steps S3205 and S3206 are repeated until operation of the up-shift switch button 81 is discontinued at step S3207.

When the operation of the up-shift switch button 81 is discontinued at step S3202, another judgement is made at step S3208 as to whether the down-shift switch button 82 is operated. When the down-shift switch button 82 remains operated, communication data change indication data is stored in RAM 131b at step S3209. This data stored in RAM 131b is transferred to the camera body 10 when the operation card 60 receives a signal including a command of no change from the camera body 10 through the communication units 110 and 137. At step S3210, the order of a date displayed on LCD panel 71 is changed. Subsequently, a judgement is made at step S3211 as to whether there is communication input. The communication processing is executed at step S3212 when there is communication input. These steps S3211 and S3212 are repeated until operation of the up-shift switch button 81 is discontinued at step S3213. When operation of the up-shift switch button 81 is discontinued at step S3207, or operation of the down-shift switch button 82 is discontinued at step S3208 or at S3213, a judgement is made at step S3214 as to whether there is communication input. The communication processing is executed at step S3215 when there is communication input. While the date selection switch 72 remains operated at step S3216, the steps S3202 through S3216 are repeated. When operation of is discontinued, a judgement is made at step S3217 as to whether the date display is in an order of "year-month-day" (which is referred to as a Y-M-D mode). When in the Y-M-D mode, an year digit of the date is flashed on and off on LCD at step S3218. Otherwise, a judgement is further made at step S3219 as to whether the date display is in an order of "month-day-year" (which is referred to as a M-D-Y mode). When in the M-D-Y mode, a month digit of the date is flashed on and off on LCD at step S3220. Otherwise, a day digit of the date is flashed on and off on LCD at step S3221. After flashing on and off one of year, month and day digits, a judgement is made at step S3222 as to whether the right-shift switch button 83 is operated. When the right-shift switch button 83 is not operated, a judgement is made at step S3223 as to whether the left-shift switch button 84 is operated. When the right-shift switch button 83 is operated, communication data change indication data is stored in RAM 131*b* at step S3224. This data stored in RAM 131*b* is transferred to the camera body 10 when the operation card 60 receives a signal including a command of no change from the camera body 10 through the communication units 110 and 137. Subsequently, one of year, month and day digits to be corrected or changed is displayed and flashed on and off on LCD panel 71 at step S3225, and effective switch buttons for the correction or change are displayed on LCD panel 71 at step S3226. At step S3227, a judgement is made as to whether there is communication input. The communication processing is executed at step S3228 when there is communication input. While the right-shift switch button 83 remains operated at step S3229, the steps S3227 through S3229 are repeated. On the other hand, when the left-shift switch button 84 is operated at step S3223, communication data change indication data is stored in RAM 131*b* at step S3230. This data stored in RAM 131*b* is transferred to the camera body 10 when the operation card 60 receives a signal including a command of no change from the camera body 10 through the communication units 110 and 137. Subsequently, one of year, month and day digits to be corrected or changed is displayed and flashed on and off on LCD panel 71 at step S3231, and effective switch buttons for the correction or change are displayed on LCD panel 71 at step S3232. At step S3233, a judgement is made as to whether there is communication input. The communication processing is executed at step S3234 when there is communication input. While the left-shift switch button 84 remains operated at step S3235, the steps S3233 through S3235 are repeated.

When operation of the right-shift switch button 83 is discontinued at step S3229, or when operation of the left-shift switch button 84 is discontinued at step S3223 or S3235, then, a judgement is made at step S3236 as to whether the up-shift switch button 81 is operated. When the up-shift switch button 81 is not operated, a judgement is further made at step S3237 as to whether the down-shift switch button 82 is operated. When the up-shift switch button 81 is operated, communication data change indication data is stored in RAM 131*b* at step S3238. This data stored in RAM 131*b* is transferred to the camera body 10 when the operation card 60 receives a signal including a command of no change from the camera body 10 through the communication units 110 and 137. Subsequently, a digit at correction place is changed by an increment of 1 (one) at step S3239, and the changed digit is flashed on and off on LCD panel 71 at step S3240. Then, an internal 1-sec count timer is started to count a specified time of, for example, one second at step S3241. When the 1-sec count timer has counted over at step S3242, communication data change indication data is stored in RAM 131*b* at step S3243. This data stored in RAM 131*b* is transferred to the camera body 10 when the operation card 60 receives a signal including a command of no change from the camera body 10 through the communication units 110 and 137. Subsequently, a digit at correction place is changed by an increment of 1 (one) at step S3244, and upper date restraint processing is executed at step S3245. In the upper date restraint processing when the month digit of "12" (December) is changed by an increment, it is automatically resulted in "1" (January). The changed digit is flashed on and off on LCD panel 71 at step S3246. Then, a lapse of a specified waiting time of, for example, 125 milliseconds is waited at step S3247. When the 1-sec count timer has not yet counted over one second at step S3241, or after waiting a lapse of the specified waiting time of 125 milliseconds at step S3247, a judgement is made at step S3248 as to whether there is communication input. The communication processing is executed at step S3249 when there is communication input. While the up-shift switch button 81 remains operated at step S3250, the steps S3242 through S3250 are repeated. On the other hand, when the down-shift switch button 82 is operated at step S3237, communication data change indication data is stored in RAM 131*b* at step S3251. This data stored in RAM 131*b* is transferred to the camera body 10 when the operation card 60 receives a signal including a command of no change from the camera body 10 through the communication units 110 and 137. Subsequently, a digit at correction place is changed by a decrement of 1 (one) at step S3252, and the changed digit is flashed on and off on LCD panel 71 at step S3253. Then, the 1-sec count timer is started to count one second at step S3254. When the timer has counted over the time at step S3255, communication data change indication data is stored in RAM 131*b* at step S3256. This data stored in RAM 131*b* is transferred to the camera body 10 when the operation card 60 receives a signal including a command of no change from the camera body 10 through the communication units 110 and 137. Subsequently, a digit at correction place is changed by a decrement of 1 (one) at step S3257, and lower date restraint processing is executed at step S3258. In the lower date restraint processing when the month digit of "1" (January) is changed by a decrement, it is automatically resulted in "12" (December). The changed digit is flashed on and off on LCD panel 71 at step S3259. Then, a lapse of the specified waiting time of 125 milliseconds is waited at step S3260. When the 1-sec count timer has not yet counted over one second at step S3255, or after waiting a lapse of the specified waiting time of 125 milliseconds at step S3260, a judgement is made at step S3261 as to whether there is communication input. The communication processing is executed at step S3262 when there is communication input. While the down-shift switch button 82 remains operated at step S3263, the steps S3255 through S3263 are repeated.

When operation of the up-shift switch button 81 is discontinued at step S3250, or when operation of the down-shift switch button 82 is discontinued at step S3237 or S3263, then, a judgement is made at step S3264 as to whether there is communication input. The communication processing is executed at step S3265 when there is communication input. When there is no communication input or after execution of the communication processing, a judgement is further made at step S3266 as to whether the date selection switch 72 is operated. When the date selection switch 72 is released, the flow chart logic orders return to the step after the judgement as to operation of the date selection switch 72 at step S3216. On the other hand, when date selection switch 72 is operated, date rounding processing is executed. In the date rounding processing when the date is changed by an increment of 1 (one) from "2-29-1998" (Feb. 29, 1998), it is automatically resulted in "2-1-1998" (Feb. 1, 1998). Subsequently, corrected or changed clock data including a date to be transferred to the camera body 10 is stored in RAM 131b at step S3268. This clock data stored in RAM 131b is transferred to the camera body 10 when the operation card 60 receives a signal including a command of no change from the camera body 10 through the communication units 110 and 137. Subsequently, displaying the corrected date and removing indication of effective switch buttons for date correction at step S3269 and storing the date mode in EEPROM 139 at step S3270, a judgement is made at step S3271 as to whether there is communication input. The communication processing is executed at step S3272 when there is communication input. While the date selection switch 72 remains operated at step S3273, these steps S3271 through S3273 are repeated. When operation of the date selection switch 72 is discontinued, the flow chart logic terminates the date correction processing and orders return to the branch processing sequence routine after the step in the sequence routine calling for the date correcting or changing processing.

According to the date setting processing and the date correcting or changing processing shown in FIGS. 39 through 41, when the date selection switch 72 is repeatedly operated, there occurs rotation of an indication of the date mode I (sign "FB" and year/month/day), the date mode II (sign "FB" and hour/minute), the date mode III (sign "B" and year/month/day) and the date mode IV (sign "B" and hour/minute) in this order on LCD panel 71. The date order is changed in the date correction or changing processing. The date correction or changing processing is executed while the date selection switch 72 remains operated for more than two seconds.

Figures 42A, 42B, 42C, 42D, 42E, 42F:
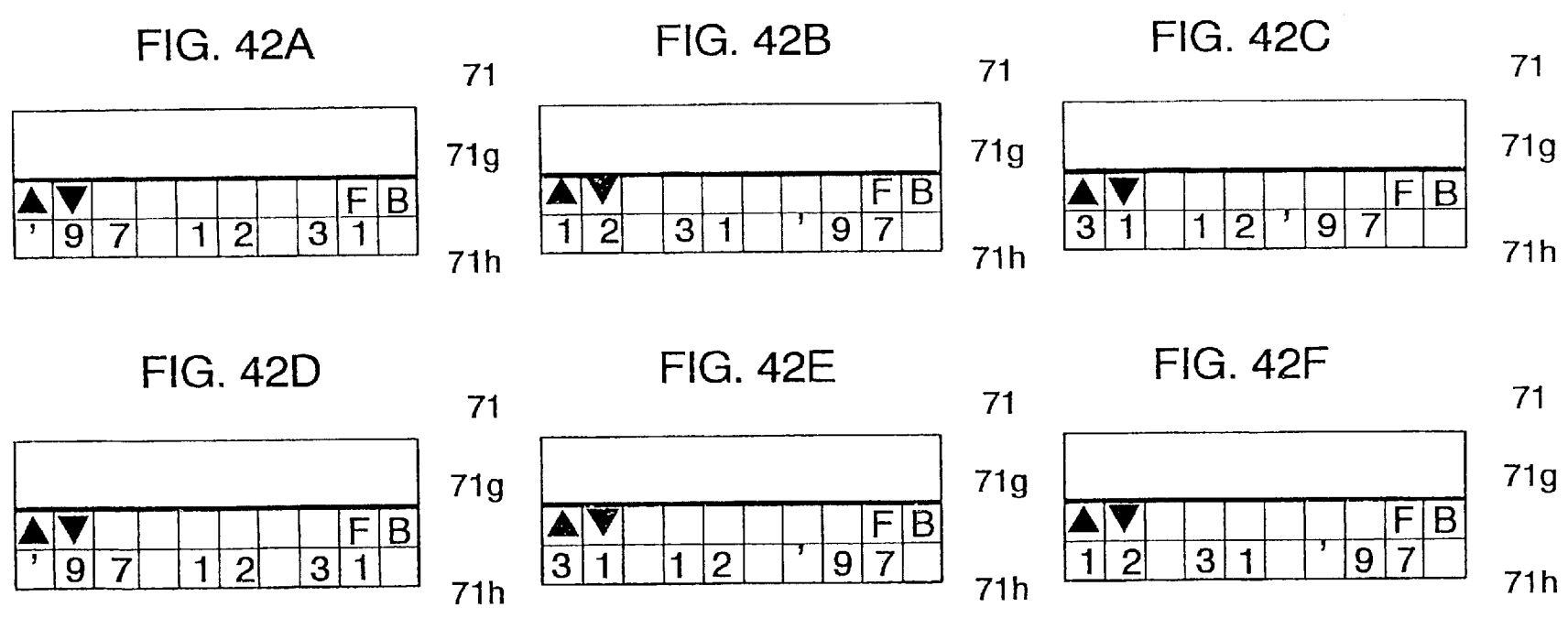

As shown in FIGS. 42A through 42F, the order of date digits is changed every time the up-shift switch button 81 or the down-shift switch button 81 is operated while the date selection switch 72 remains operated. Specifically, repeated operated of the up-shift switch button 81 while the date selection switch 72 remains operated to select the date mode I (sign "FB" and year/month/day) causes rotation of an date indication repeatedly from the order of year/month/day (FIG. 42A) to the order of day/month/year (FIG. 42C) through the order of month/day/year (FIG. 42B). Similarly, repeated operated of the down-shift switch button 82 while the date selection switch 72 remains operated to select the date mode I (sign "FB" and year/month/day) causes rotation of an date indication repeatedly from the order of year/month/day (FIG. 42D) to the order of month/day/year (FIG. 42F) through the order of day/month/year (FIG. 42E). When the date selection switch 72 is released, operation of the right-shift switch button 83 or the left-shift switch button 84 shifts and selects the place of a digit to be changed, and operation of the up-shift switch button 81 or the down-shift switch button 82 increasingly or decreasingly changes a digit in the selected place. Thereafter, the date selection switch 72 is operated again to fix the corrected or changed date.

Data of a date is provided by the internal timer in CPU 101 of the camera body 10, and the date is corrected or changed by the switch buttons 81–84 of the switch group 136 of the operation card 60. In other words, data providing function and data manipulation function are separated between the camera body 10 and the operation card 60. Nevertheless, because communication is made between the camera body 10 and the operation card 60 through the communication units 110 and 137, it is possible to correct or change a date in a similar manner to the conventional integrated cameras.

FIGS. 43A through 43I are a flow chart of the sequence routine of print quantity (PQ) setting processing which is executed when the print quantity (PQ) select switch 74 is operated. When the flow chart logic commences and control proceeds directly to a function block at step S3301 where a judgement is made as to whether a mode change permission command is transferred to the operation card 60 from the camera body 10 through the communication units 110 and 137. When the operation card 60 does not receive any mode change permission command, a judgement is made at step S3302 as to whether there is communication input. The communication processing is executed at step S3303 when there is communication input. While the print quantity (PQ) select switch 74 remains operated at step S3304, these steps S3302 through S3304 are repeated. When the print quantity (PQ) select switch 74 is released at step S3304, the flow chart logic terminates the print quantity (PQ) setting processing and orders return to the branch processing sequence routine after the step in the sequence routine calling for the print quantity (PQ) setting processing. On the other hand, when the operation card 60 receives a mode change permission command at step S3301, communication data change indication data (data indicating that there is a change in communication data which is to be transferred to the camera body 10) is stored in RAM 131b at step S3305. This data stored in RAM 131b is transferred to the camera body 10 when the operation card 60 receives a signal including a command of no change from the camera body 10 through the communication units 110 and 137. At step S3306, a judgement is made as to whether a print quantity (PQ) has been determined and fixed. Subsequently, the print quantity (PQ) is set at step S3307 when it is fixed, or an initial print quantity (PQ) is set one (1) print at step S3308 when it is not yet fixed. After setting the print quantity at step S3307 or S3308, data of the print quantity (PQ) and a description in a selected language is established at step S3309. The description indicates that setting of the print quantity (PQ) is permitted. For example, the description is given by a short term such as "Anzahl Bilder" in German, "Nemero di stammpe" in Italian, "Cantidad de Copeas" in Spanish, "Print Quantity" in English and the like. The print quantity (PQ) and first ten characters of the description are displayed together with effective switches on LCD panel 71 at step S3310. Subsequently, a judgement is made at step S3311 as to whether the description has 11 or more characters. When the description has 11 or more characters, after waiting for a specified time at step S3312, the description is scrolled or shifted by one dot at step S3313, and then, the part of the description appearing on LCD panel 71 remains displayed for a specified time period at step S3314. The description is continuously scrolled until it is scrolled from the top to the last through steps S3313 to S3315. When the description is completely scrolled from the top to the last, after waiting for a specified time period at step S3316, LCD panel 71 continuously displays the first 10 characters of the description thereon at step S3317. When the description has less than 11 characters at step S3311, or LCD panel 71 displaces the first ten characters of the description at step S3317 after completely scrolling the description from the top to the last, a judgement is made at step S3318 as to whether there is communication input. The communication processing is executed at step S3319 when there is communication input. While the print quantity (PQ) select switch 74 remains operated at step S3320, these steps S3318 through S3320 are repeated. When the print quantity (PQ) select switch 74 is released at step S3320, an internal display timer in CPU 131 starts to count a specified time of, for example, 30 seconds at step S3321, a judgement is made at step S3322 as to whether the operation card 60 remains attached to the back 13 of the camera body 10. When the operation card 60 remains detached from the camera body 10, a judgement is made at step S3323 as to whether magnetic data for the previous exposed frame has been definitely determined. When the operation card 60 is attached to the camera body 10 at step S3322, or the magnetic data for the previous exposed frame is not determined at step S3323, a judgement is made at step S3324 as to whether the up-shift switch button 81 is operated, and, when not operated, another judgement is made at step S3325 as to whether the down-shift switch button 82 is operated. When the up-shift switch button 81 is operated, communication data change indication data is stored in RAM 131b at step S3326. This data stored in RAM 131b is transferred to the camera body 10 when the operation card 60 receives a signal including a command of no change from the camera body 10 through the communication units 110 and 137. Then, after restarting the display timer to count 30 seconds at step S3327, a judgement is made at step S3328 as to whether the print quantity (PQ) is 10 prints. When the print quantity (PQ) is 10 prints, the print quantity (PQ) is reset to 0 (zero) at step S3329. Otherwise, the print quantity (PQ) is changed by an increment of 1 (one) at step S3330. Subsequently, LCD panel 71 displaces the new print quantity (PQ) together with effective switches thereon at step S3331. At step S3332 an internal 1-sec count timer in CPU 131 starts to count 1 (one) second. When the internal counter has counted over one second at step S3333, a judgement is made at step S3334 as to whether the print quantity (PQ) is 10 prints. When the print quantity (PQ) is 10 prints, the print quantity (PQ) is reset to 0 (zero) at step S3335. Otherwise, the print quantity (PQ) is changed by an increment of 1 (one) at step S3336. Subsequently, LCD panel 71 displaces the new print quantity (PQ) together with effective switches thereon at step S3337. After waiting a lapse of specified time of, for example, 125 milliseconds at step S3338, communication data change indication data is stored in RAM 131b at step S3339. This data stored in RAM 131b is transferred to the camera body 10 when the operation card 60 receives a signal including a command of no change from the camera body 10 through the communication units 110 and 137. When the internal counter has not yet counted over one second at step S3333, or after storing the communication data change indication data in RAM 131b at step S3339, a judgement is made at step S3340 as to whether there is communication input. The communication processing is executed at step S3341 when there is communication input. When there is no communication input, or after execution of the communication processing, the display timer is restarted to count 30 seconds at step S3342. These steps S3333 through S3342 are repeated to increasingly change the print quantity (PQ) by one at regular time intervals while the up-shift switch button 81 remains operated at step 3343.

When the down-shift switch button 82 is operated at step S3325, communication data change indication data is stored in RAM 131b at step S3344. This data stored in RAM 131b is transferred to the camera body 10 when the operation card 60 receives a signal including a command of no change from the camera body 10 through the communication units 110 and 137. Then, after restarting the display timer to count 30 seconds at step S3345, a judgement is made at step S3346 as to whether the print quantity (PQ) is 0 (zero). When the print quantity (PQ) is 0 (zero), the print quantity (PQ) is reset to 10 prints at step S3347. Otherwise, the print quantity (PQ) is changed by a decrement of 1 (one) at step S3348. Subsequently, LCD panel 71 displaces the new print quantity (PQ) together with effective switches thereon at step S3349. At step S3350 the 1-sec count timer in CPU 131 starts to count one second. When the internal counter has counted over one second at step S3351, a judgement is made at step S3352 as to whether the print quantity (PQ) is 0 (zero). When the print quantity (PQ) is 0 (zero), the print quantity (PQ) is reset to 10 prints at step S3353. Otherwise, the print quantity (PQ) is changed by a decrement of 1 (one) at step S3354. Subsequently, LCD panel 71 displaces the new print quantity (PQ) together with effective switches thereon at step S3355. After waiting a lapse of 125 milliseconds at step S3356, communication data change indication data is stored in RAM 131b at step S3357. This data stored in RAM 131b is transferred to the camera body 10 when the operation card 60 receives a signal including a command of no change from the camera body 10 through the communication units 110 and 137. When the internal counter has not yet counted over one second at step S3351, or after storing the communication data change indication data in RAM 131b at step S3357, a judgement is made at step S3358 as to whether there is communication input. The communication processing is executed at step S3359 when there is communication input. When there is no communication input, or after execution of the communication processing, the display timer is restarted to count 30 seconds at step S3360. These steps S3351 through S3360 are repeated to decreasingly change the print quantity (PQ) by one at regular time intervals while the down-shift switch button 82 remains operated at step 3361.

When magnetic data for the previous exposed frame has been definitely determined at step S3323, when the up-shift switch button 82 is released at step S3343 or when the down-shift switch button 82 is released at step S3325 or S3361, a judgement is made at step S3362 as to whether the operation card 60 remains attached to the back 13 of the camera body 10. While the operation card 60 remains attached to the camera body 10, another judgement is made at step S3363 as to whether data rewrite film rewind is prohibited. When the operation card 60 remains detached from the camera body 10, another judgement is made at step S3364 as to whether magnetic data for the previous exposed frame has been definitely determined. When the data rewrite film rewind is permitted at step S3362, or when data for the previous exposed frame has not been determined at step S3364, a judgement is subsequently made at step S3365 as to whether the left-shift switch button 84 is operated. When the left-shift switch button 84 is operated, then, communication data change indication data is stored in RAM 131b at step S3366. This data stored in RAM 131b is transferred to the camera body 10 when the operation card 60 receives a signal including a command of no change from the camera body 10 through the communication units 110 and 137. After restarting the display timer to count 30 seconds at step S3367, a description indicating that the previous data rewrite is permitted is displayed in the selected language on LCD panel 71 at step S3368. For example, the description is given by a short term such as "Uberschreiben" in German, "Riscrittura" in Italian, "Reescribir" in Spanish, "Data Change" in English and the like. Subsequently, a judgement is made at step S3369 as to whether the description has 11 or more characters. When the description has 11 or more characters, after waiting for a specified time at step S3370, the description is scrolled or shifted by one dot at step S3371, and then, the part of the description appearing on LCD panel 71 remains displayed for a specified time period at step S3372. The description is continuously scrolled until it is completely scrolled from the top to the last through steps S3371 to S3373. When the description is completely scrolled from the top to the last, after waiting for a specified time period at step S3374, LCD panel 71 continuously displays the first 10 characters of the description together effective switches thereon at step S3375. When the description has less than 11 characters at step S3369, or LCD panel 71 displaces the first ten characters of the description and effective switches at step S3375, subsequently to starting the display timer in CPU 131 to count a predetermined time, for example, 2 seconds at step S3376, a judgement is made at step S3377 as to whether the left-shift switch button 84 remain operated. When the left-shift switch button 84 is released, the flow chart logic orders return to the step in the sequence after setting the print quantity at step S3307 or S3308. However, when the left-shift switch button 84 remains operated, a judgement is made at step S3378 as to whether there is communication input. The communication processing is executed at step S3379 when there is communication input. When there is no communication input, or after execution of the communication processing, a judgement is made at step S3380 as to whether the 2-sec count timer has counted over the specified time of 2 seconds. These steps S3377 through S3380 are repeated until the 2-sec count timer has counted over the specified time of 2 seconds. When the left-shift switch button 84 remains operated for more than two seconds, after setting the definitely determined data for the previous exposed frame at step S3381, a judgement is made at step S3382 as to whether the operation card 60 is attached to the back 13 of the camera body 10. When the operation card 60 is attached to the camera body 10, the print quantity (PQ) and the date are displayed on LCD panel 71 at step S3383, and data of the print quantity (PQ) with which the previous print quantity (PQ) is replaced is stored in RAM 131b. This data stored in RAM 131b is transferred to the camera body 10 to rewrite magnetic data for the previously exposed frame when the operation card 60 receives a signal including a command of no change from the camera body 10 through the communication units 110 and 137. Subsequently, a judgement is made at step S3385 as to whether there is communication input. The communication processing is executed at step S3386 when there is communication input. When there is no communication input at step S3385, or after execution of the communication processing at step S3386, a judgement is made at step S3387 as to whether the left-shift switch button 84 remains operated. While the left-shift switch button 84 remains operated, these step S3385 through S3387 are repeated. On the other hand, when the left-shift switch button 84 is released, the flow chart logic terminates the print quantity (PQ) setting processing and orders return to the branch processing sequence routine after the step in the sequence routine calling for the print quantity (PQ) setting processing. When the operation card 60 remains detached from the camera body 10 at step S3382, a description indicating that the previous data rewrite is permitted is displayed in the selected language on LCD panel 71 at step S. Data of the print quantity (PQ) and data of data rewrite film rewind to be transferred to the camera body 10 are stored in RAM 131b of CPU 131 at steps S3390 and S3391, respectively, After restarting the display timer to count 30 seconds at step S3392, the flow chart logic orders return to the step in the sequence before the judgement concerning attaching of the operation card 60 to the camera body 10 at step S3322.

When the data rewrite film rewind is prohibited at step S3363, when data for the previous exposed frame has been definitely determined at step S3364, or the left-shift switch 84 is released at step S3365, a judgement is made at step S3393 as to whether the operation card 60 remains attached to the back 13 of the camera body 10. When the operation card 60 remains detached from the camera body 10, a judgement is further made at step S3394 as to whether magnetic data for the previous exposed frame has been definitely determined. When magnetic data for the previous exposed frame has been definitely determined, a judgement is made at step S3395 as to whether the right-shift switch button 83 is operated. When operated, communication data change indication data is stored in RAM 131b at step S3396. This data stored in RAM 131b is transferred to the camera body 10 when the operation card 60 receives a signal including a command of no change from the camera body 10 through the communication units 110 and 137. After restarting the display timer to count 30 seconds at step S3397, a judgement is made at step S3398 as to whether a description indicating that the previous data rewrite is permitted has 11 or more characters. When the description has 11 or more characters, after waiting for a specified time at step S3399, the description is displayed on LCD panel 71 and scrolled or shifted by one dot at step S3400, and then, the part of the description appearing on LCD panel 71 remains displayed for a specified time period at step S3401. The description is continuously scrolled until it is completely scrolled from the top to the last through steps S3400 to S3402. When the description is completely scrolled from the top to the last, after waiting for a specified time period at step S3403, LCD panel 71 continuously displays the first 10 characters of the description thereon at step S3404. When the description has less than 11 characters at step S3398, or after continuously displaying the first 10 characters of the description on LCD panel 71 at step S3404, the display timer is repeatedly restarted to count 30 seconds at step S3405 while the right-shift switch button 83 remains operated at step S3406. When the right-shift switch button 83 is released at step S3395 or S3406, judgements are consecutively made at steps S3407 and S3408 as to whether the operation card 60 remains attached to the back 13 of the camera body 10 and whether the remote control switch 77 is operated, respectively. When, while the operation card 60 remains detached from the camera body 10, the remote control switch 77 is operated, after execution of remote control signal transferring processing (which will be described later) at step S3409, the flow chart logic terminates the print quantity (PQ) setting processing and orders return to the branch processing sequence routine after the step in the sequence routine calling for the print quantity (PQ) setting processing.

When the operation card 60 remains attached to the camera body 10 at step S3407, or the remote control switch 77 is not operated at step S3408 while the operation card 60 remains detached from the camera body 10, judgements are consecutively made at steps S3410 and S3411 as to whether magnetic data for the previous exposed frame has been definitely determined and whether the caption selection (ST) switch 73 is operated, respectively. When magnetic data for the previous exposed frame has been definitely determined, or when the caption selection (ST) switch 73 is not operated nor magnetic data for the previous exposed frame has been determined, then, judgements are further consecutively made at steps S3412 and S3413 as to whether magnetic data for the previous exposed frame has been definitely determined and whether the print quantity (PQ) selection switch 74 is operated, respectively. When the caption selection (ST) switch 73 is operated at step S3411, data of the print quantity (PQ) and the selected caption (ST) to be transferred to the camera body 10 are stored in RAM 131b at step S3414. These data stored in RAM 131b are transferred to the camera body 10 when the operation card 60 receives a signal including a command of no change from the camera body 10 through the communication units 110 and 137. After restarting the display timer to count 30 seconds at step S3415, an indication of caption selection is displayed on LCD panel 71 at step S3416. Subsequently, a judgement is made at step S3417 as to whether there is communication input. The communication processing is executed at step S3418 when there is communication input. When there is no communication input, or after execution of the communication processing, the display timer is restarted to count 30 seconds at step S3419. These steps S3417 through S3419 are repeated while the caption selection switch 73 remains operated at step S3420. When the caption selection switch 73 is released, the flow chart logic terminates the print quantity (PQ) setting processing and calls for caption selection processing.

When the print quantity (PQ) selection switch 74 is operated at step S3413 while magnetic data for the previous exposed frame has not been determined, communication data change indication data is stored in RAM 131b at step S. This data stored in RAM 131b is transferred to the camera body 10 when the operation card 60 receives a signal including a command of no change from the camera body 10 through the communication units 110 and 137. After restarting the display timer to count 30 seconds at step S3422, the flow chart logic orders return to the step in the sequence routine after storing communication data change indication data in RAM 131b at step S3305.

When magnetic data for the previous exposed frame has been definitely determined at step S3412, or when the print quantity (PQ) selection switch 74 is not operated at step S3413 while magnetic data for the previous exposed frame has not been determined, judgements are consecutively made at step S3423 and S3422 as to whether the operation card 20 remains attached to the back 13 of the camera body 10 and whether the date selection switch 72 is operated, respectively. When the operation card 60 remains detached, or when the date selection switch 72 is not operated while the operation card 60 remains attached, a judgement is made at step S3425 as to whether the display timer has counted over 30 seconds. When counter over 30 seconds, a judgement is made at step S3426 as to whether there is communication input. The communication processing is executed at step S3427 when there is communication input. When there is no communication input, or after execution of the communication processing, a judgement is made at step S3428 as to whether the clear switch 76 is operated. When the clear switch is operated, the flow chart logic orders return to the step in the sequence before the judgement concerning attaching of the operation card 60 to the camera body 10 at step S3324. When the date selection switch 72 is operated at step S3424, data of the print quantity (PQ) and the selected caption (ST) to be transferred to the camera body 10 are stored in RAM 131b at step S3429. These data stored in RAM 131b are transferred to the camera body 10 when the operation card 60 receives a signal including a command of no change from the camera body 10 through the communication units 110 and 137. Subsequently, after displaying the print quantity (PQ) and a data on LCD panel 71 at step S3431, a judgement is made at step S3431 as to whether there is communication input. The communication processing is executed at step S3432 when there is communication input. When there is no communication input, or after execution of the communication processing, a judgement is made at step S3433 as to whether the date selection switch 72 remains operated. These steps S3431 through S3433 are repeated while the date selection switch 72 remains operated. When the date selection switch 72 is released, the flow chart logic terminates the print quantity (PQ) setting processing and orders return to the branch processing sequence routine after the step in the sequence routine calling for the print quantity (PQ) setting processing. When the display timer has counted over 30 seconds at step S3425, another judgement is made at step S3434 as to whether the operation card 60 remains attached to the back 13 of the camera system 10. When the operation card 60 remains attached to the camera system 10, the flow chart logic orders return to the step in the sequence routine after the judgement concerning display time of 30 seconds at step S3425. On the other hand, when the operation card 60 remains detached from the camera system 10, after removing the print quantity, the description and effective switches from LCD panel 71 at step S3435, the flow chart logic terminates the print quantity (PQ) setting processing and orders return to the branch processing sequence routine after the step in the sequence routine calling for the print quantity (PQ) setting processing.

When the clear switch 76 is released at step S3428, communication data change indication data is stored in RAM 131b at step S3436. This data stored in RAM 131b is transferred to the camera body 10 when the operation card 60 receives a signal including a command of no change from the camera body 10 through the communication units 110 and 137. After restarting the display to count 30 seconds at step S3437, a judgement is made at step S3438 as to whether magnetic data for the previous exposed frame has been definitely determined. When magnetic data for the previous exposed frame has been definitely determined, after resetting the definitely determined data for the previous exposed frame at step S3439, the print quantity (PQ) and effective switches are displayed together on LCD panel 71 at step S3440. Subsequently, a judgement is made at step S3441 as to whether there is communication input. The communication processing is executed at step S3442 when there is communication input. When there is no communication input, or after execution of the communication processing, the display timer is restarted to count 30 seconds at step S3443. These steps S3442 and S3443 are repeated while the clear switch 76 remains operated at step S3445. When the clear switch 76 is released, the flow chart logic orders return to the step in the sequence routine after the judgement concerning display time of 30 seconds at step S3425. On the other hand, when magnetic data for the previous exposed frame has not been determined at step S3438, after cancelling the print quantity (PQ) at step S3445, a judgement is made at step S3447 as to whether the operation card 20 remains attached to the camera body 10. When the operation card 20 remains detached from the camera body 10, LCD panel 71 removes all indications therefrom at step S3447. When the operation card 60 remains attached to the camera body 10, another judgement is made at step S3448 as to whether a caption has been definitely determined. When determined, the date and an indication that a caption has been determined are displayed on LCD panel 71 at step S3449. Otherwise, only the date is displayed on LCD panel 71 at step S3450. The indication that a caption has been determined is made by displaying the determined caption together with a sign "ST." After removing all indications from LCD panel 71 at step S3447, or displaying both date and caption or only a caption on LCD panel 71 at step S3449 or S3450, a judgement is made at step S3451 as to whether there is communication input. The communication processing is executed at step S3452 when there is communication input. These steps S3451 and S3452 are repeated while the clear switch 76 remains operated at step S3453. When the clear switch 76 is released, the flow chart logic terminates the print quantity (PQ) setting processing and orders return to the branch processing sequence routine after the step in the sequence routine calling for the print quantity (PQ) setting processing.

Figure 44A:
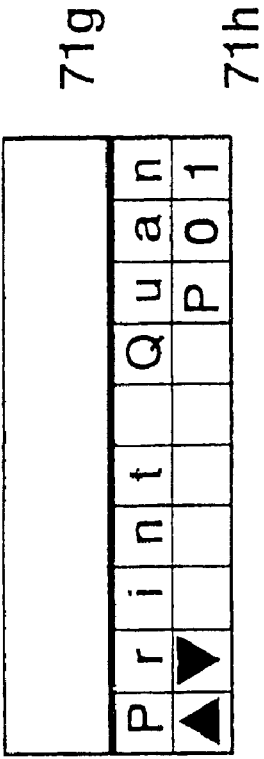
FIGS. 44A and 44B are illustrations showing an indication of print quantity setting on the liquid crystal display (LCD) panel.
Figure 44B:
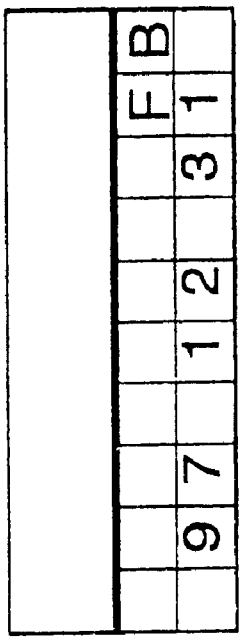
Figure 45A:
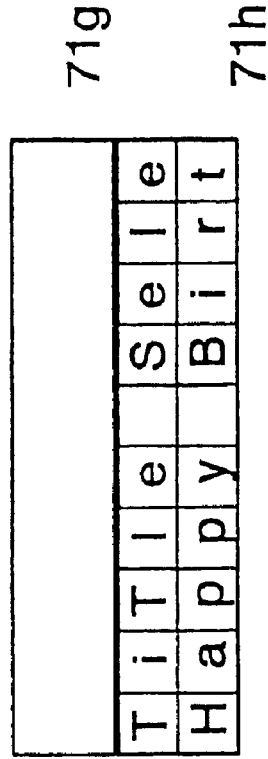
FIGS. 45A and 45B are illustrations showing an indication of print quantity setting on the liquid crystal display (LCD) panel.
Figure 45B:
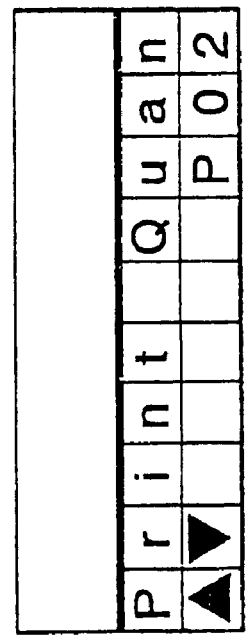
Figure 46A:
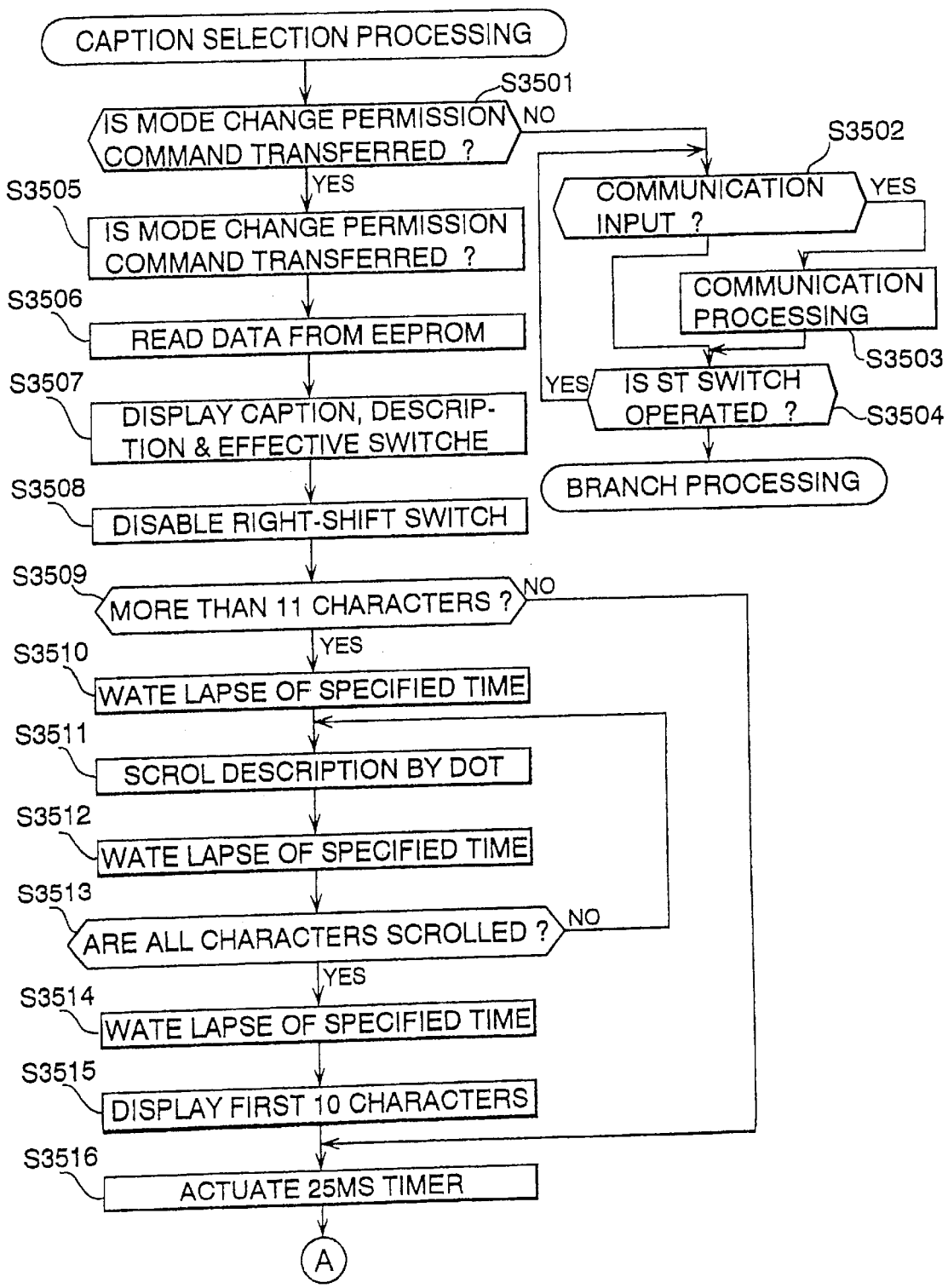
Figure 46B:
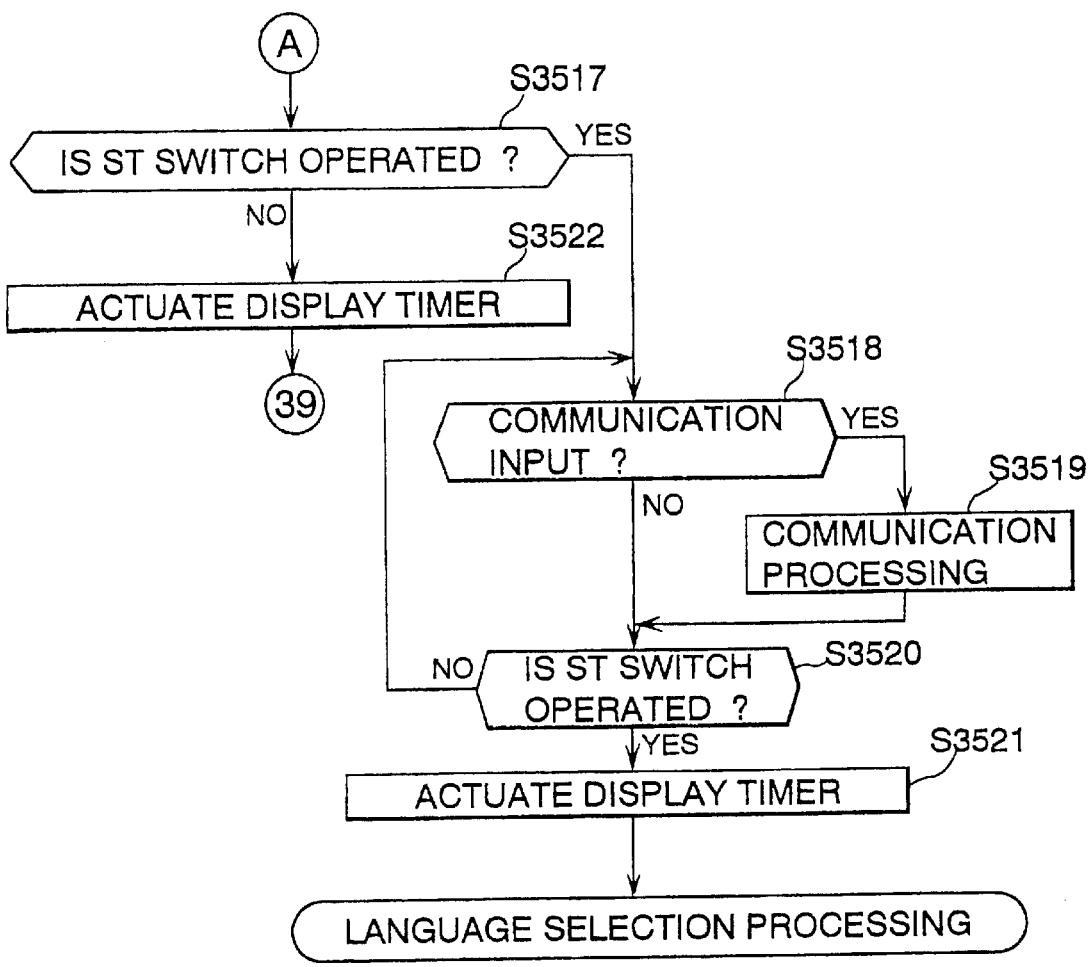
Figure 46C:
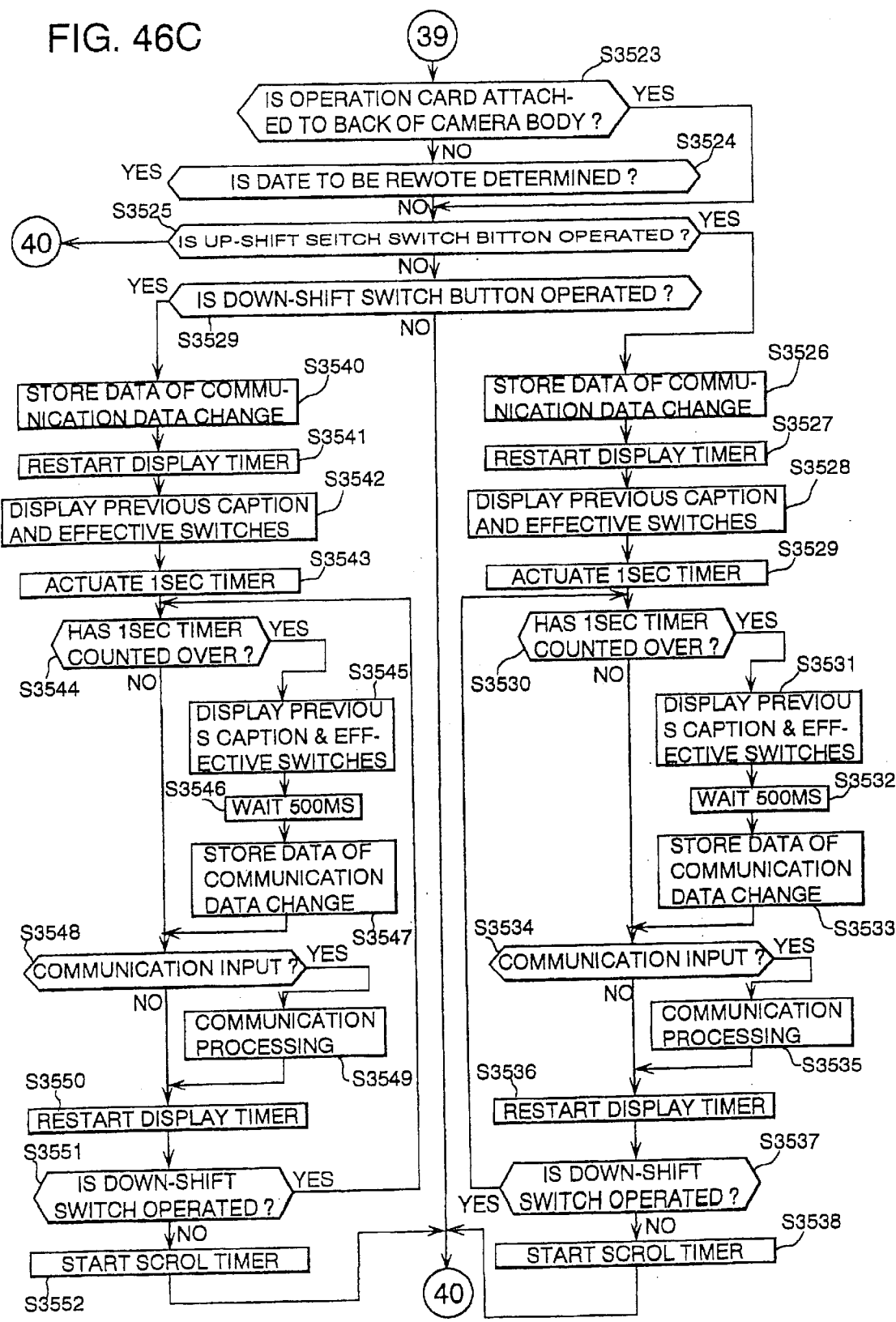
Figure 46F:
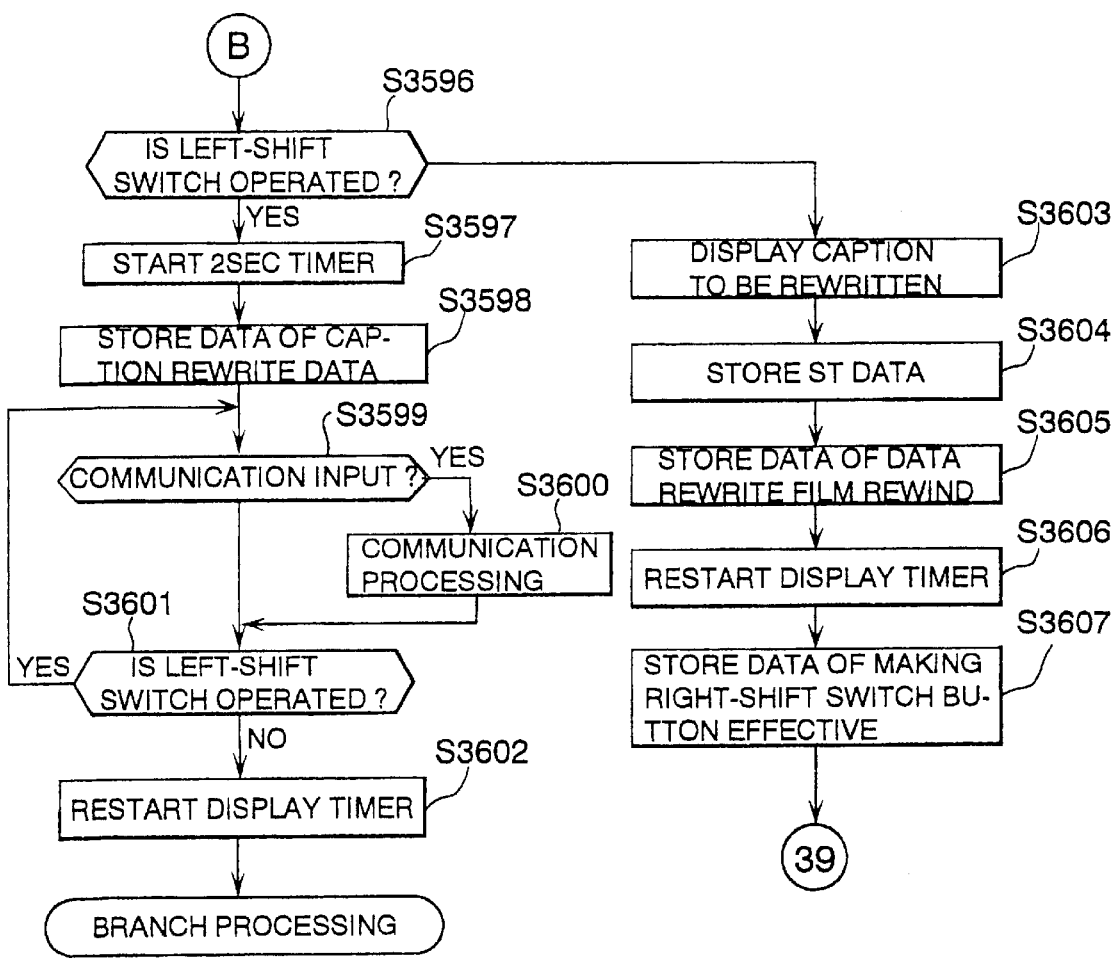
Figure 46G:
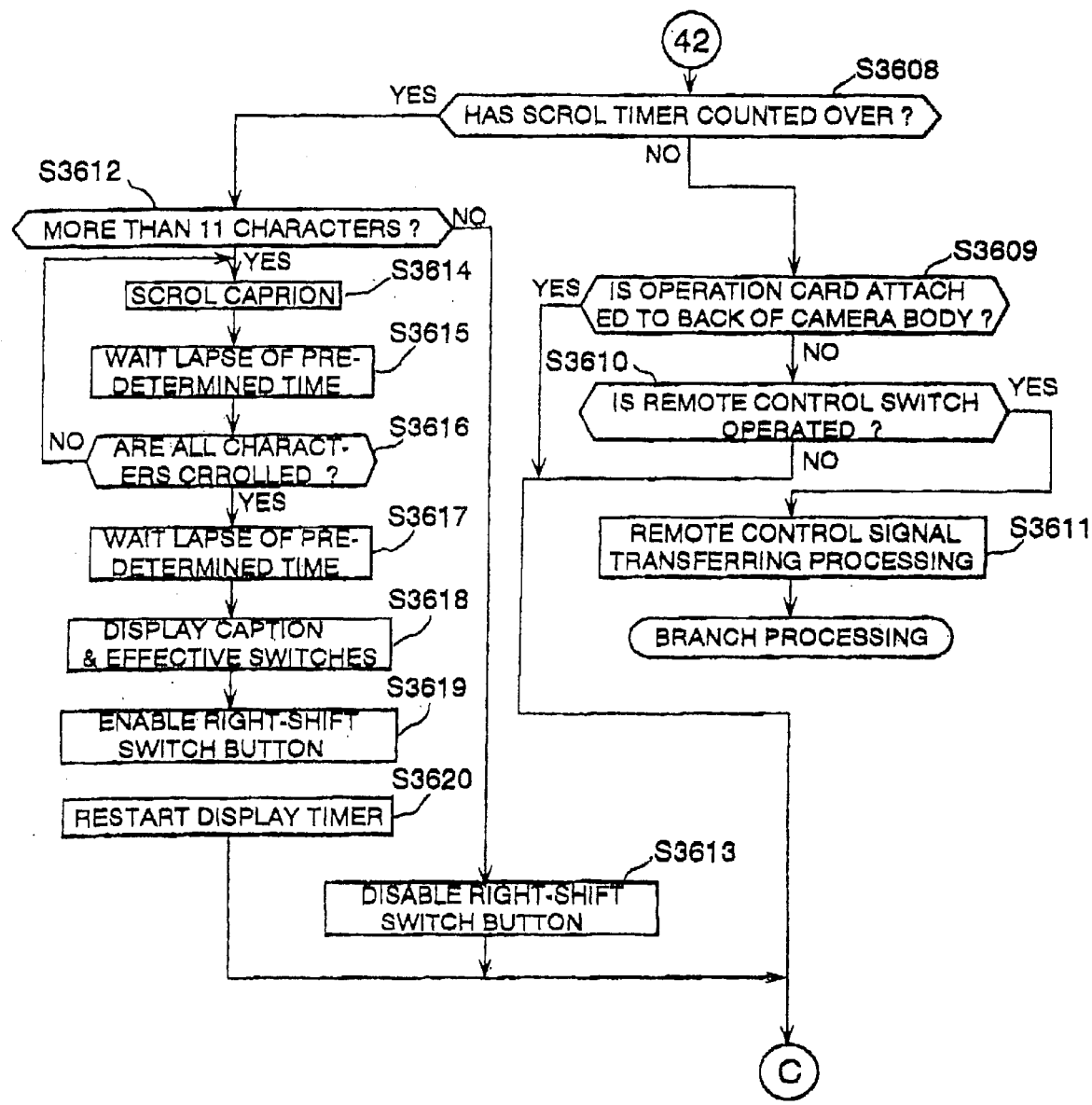
Figure 46H:
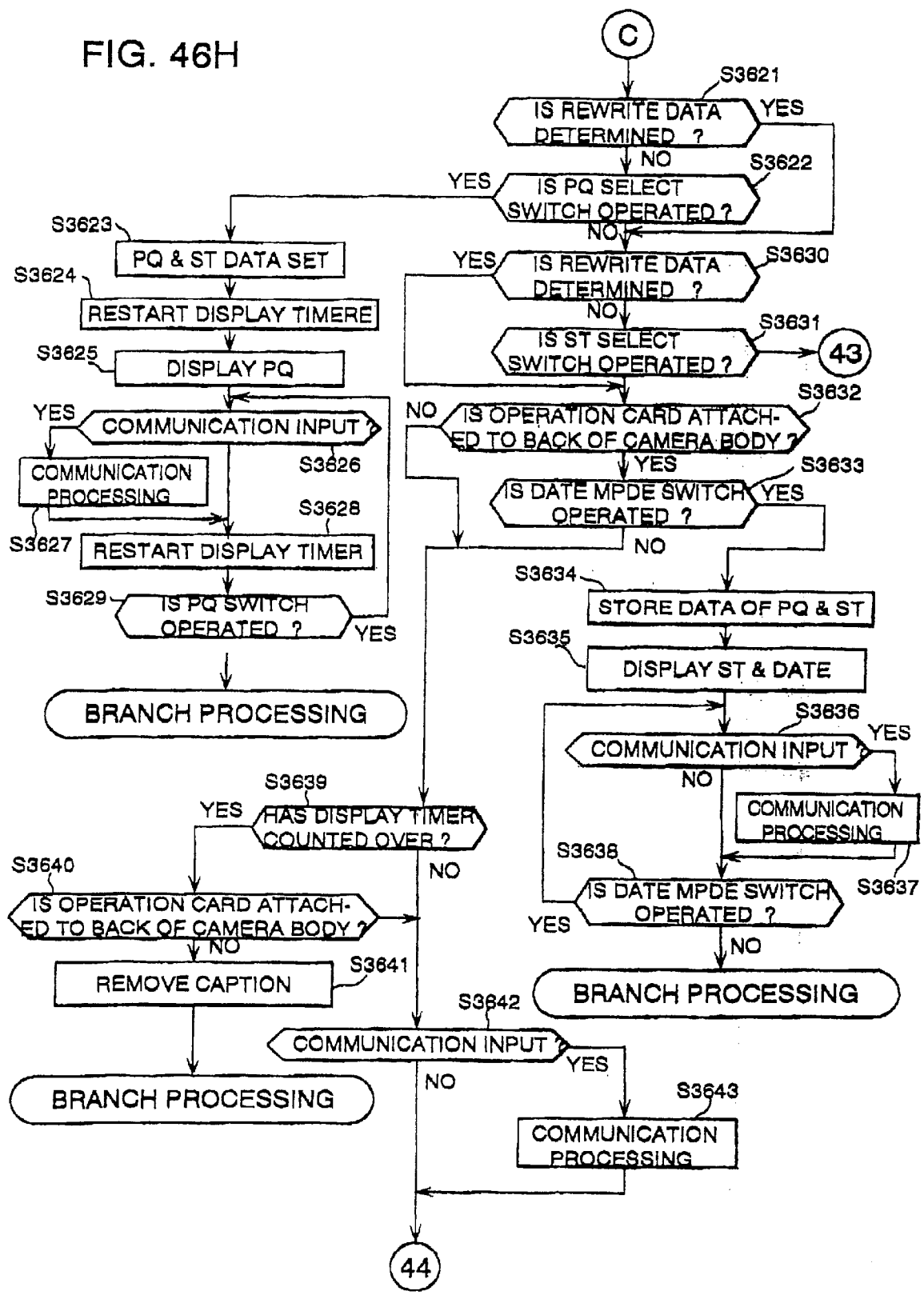
Figure 46I:
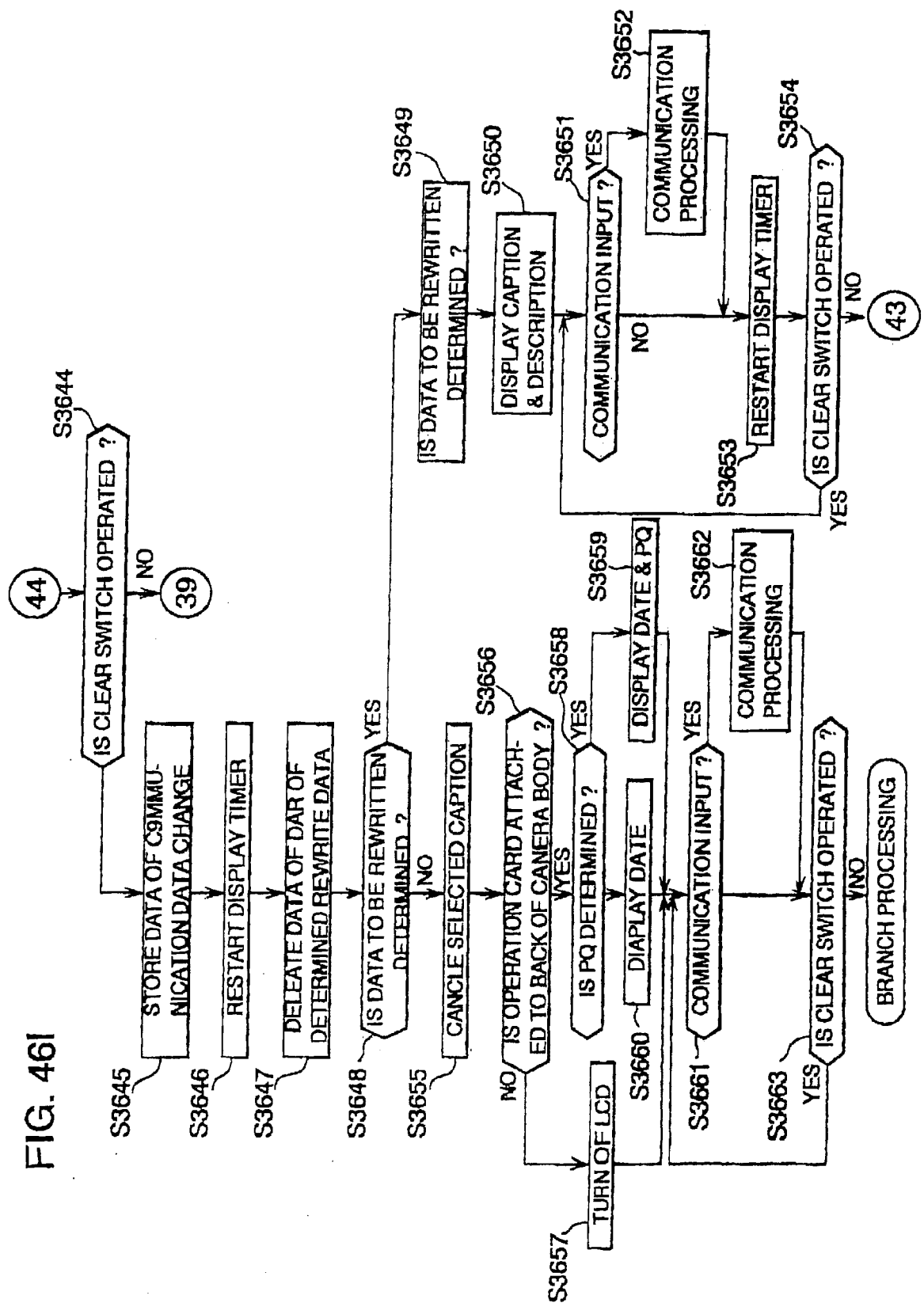

FIGS. 44A and 44B show an example of print quantity (PQ) display on LCD panel 71. Before displaying a print quantity (PQ) and first ten characters of a description of print quantity together with effective switches on LCD panel 71 at step S3310, there are displayed on LCD panel 71 the sign "FB" indicating that a date is printed on both sides of a print in the upper dot matrix display area 71g and a date, for example "'97 12 31," in the lower dot matrix display area 71h as shown in FIG. 44A. When the display step S3310 tales place, there are displayed on LCD panel 71 first ten characters of a description of, for example in this embodiment, "Print Quantity" in a selected language in the upper dot matrix display area 71g and a print quantity (PQ), for example P01 (one copy) in this embodiment, and upward and downward black triangles in the lower dot matrix display area 71h as shown in FIG. 44B. The upward black triangle indicates that the up-shift switch button 81 is effective, and similarly the downward black triangle indicates that the down-shift switch button 82 is effective. Further, before displaying an indication of caption selection on LCD panel 71 at step S3414, there are displayed on LCD panel 71 first ten characters of a description of print quantity in a selected language in the upper dot matrix display area 71g and a print quantity (PQ) together with upward and downward black triangles in the lower dot matrix display area 71h as shown in FIG. 45A. When the display step S3414 tales place, there are displayed on LCD panel 71 first ten characters of a description of caption selection, "Title Selection" for example in this embodiment, in a selected language in the upper dot matrix display area 71g and first ten character of a proposed caption or title, "Happy Birthday," for example in this embodiment, in a selected language in the lower dot matrix display area 71h as shown in FIG. 45B.

According to the print quantity setting processing, after starting the processing by operating the print quantity (PQ) selection switch 74, the print quantity (PQ) is increasingly or decreasingly changed with complete control by operating the up-shift switch button 81 and the down-shift switch button 82, definitely determined by operating the left-shift switch button 84 and the date selection switch 72, cancelled or cleared by operating the clear switch 76, and initialized by operation of the print quantity (PQ) selection switch 74. While function of recording print quantity (PQ) on an magnetic recording area of a film is borne under control by CPR 101 in the camera body 10 through the magnetic data read/write unit 118 and, however, function of setting, changing and clearing print quantity (PQ) is borne under control by CPR 131 in the operation card 60 through the switch group 136, communication between the camera body 10 and the operation card 60 through the communication units 110 and 137 enables the photographer to perform these operation easily in a similar manner to the conventional integrated cameras.

FIGS. 46 are a flow chart of the sequence routine of caption selection processing which is executed to select and display a language and a caption and store data of the selected caption and language in EEPROM 139 when the caption select switch 73 is operated. When the flow chart logic commences and control proceeds directly to a function block at step S3501 where a judgement is made as to whether a mode change permission command is transferred between the camera body 10 and the operation card 60 through the communication units 110 and 137. When there is no mode change permission command transferred between the camera body 10 and the operation card 60, a judgement is made at step S3502 as to whether there is communication input. The communication processing is executed at step S3503 when there is communication input. When there is no communication input, or after execution of the communication processing, a judgement is further made at step S3504 as to whether the caption selection switch 73 remains operated. These steps S3502 through S3504 are repeated until the caption selection switch 73 is released at step S3504. When the caption selection switch 73 is released, the flow chart logic terminates the caption selection (ST) processing and orders return to the branch processing sequence routine after the step in the sequence routine calling for the caption selection (ST) processing. When there is a mode change permission command transferred between the camera body 10 and the operation card 60, communication data change indication data is stored in RAM 131b at step S3505. This data stored in RAM 131b is transferred to the camera body 10 when the operation card 60 receives a signal including a command of no change from the camera body 10 through the communication units 110 and 137. Subsequently, data of a caption and a language written in EEPROM 139 is read out and transferred to ROM 131b at step S3506, and LCD drive unit 138 causes LCD panel to display first ten characters of a description relating caption selection, a proposed caption and effective switch symbols thereon at step S3507.

For example, the description is given by a short term such as "Auswahl" in German, "Selezione" in Italian, "Seleccionar" in Spanish, "Title Selection" in American English and the like and first ten characters of each description are displayed in the upper dot matrix display area 71g of LCD display panel 71. The indication of effective switches are provided by upward and downward black triangles displayed in the lower dot matrix display area 71h of LCD display panel 71, which is always advantageous for visual recognition of the effective switches. Further, first ten characters of a proposed caption or title in a selected language such as "Happy Birthday" are displayed in the lower dot matrix display area 71h of LCD display panel 71. After storing data making switch input from the right-shift switch button 83 invalid in RAM 131b at step S3508, a judgement is made at step S3509 as to whether the description has 11 or more characters. When the description has 11 or more characters, after waiting for a specified time with first ten characters of the description, for example "Title Sele," remaining displayed at step S3510, the description is scrolled or shifted by one dot at step S3511, and then, the ten characters of the description appearing on LCD panel 71 remains displayed for a specified time period at step S3512. The description is continuously scrolled until it is scrolled from the top to the last through steps S3511 to S3513. When the description is completely scrolled from the top to the last, after waiting for a specified time period at step S3514, LCD panel 71 continuously displays the first 10 characters of the description thereon at step S3515.2 When the description has less than 11 characters at step S3509, or LCD panel 71 displaces the first ten characters of the description at step S3515 after completely scrolling the description from the top to the last, after starting an internal 2-sec count timer to count two seconds at step S3516, a judgement is made at step S3517 as to whether the caption select switch 73 remains operated. When it remains operated, a judgement is made at step S3518 as to whether there is communication input. The communication processing is executed at step S3519 when there is communication input. When there is no communication input, or after execution of the communication processing, a judgement is further made at step S3520 as to whether the 2-sec count timer has counted over two seconds. These steps S3518 through S3520 are repeated until a lapse of two seconds. When the 2-sec count timer has counted over two seconds, after restarting the display timer to count 30 seconds at step S3521, the flow chart logic terminates the caption selection processing and calls for language processing. On the other hand, when the caption selection switch 73 is released at step S3517, after restarting the display timer to count 30 seconds at step S3522, a judgement is made at step S3523 as to whether the operation card 60 remains attached to the back 13 of the camera body 10. When the operation card 60 is detached from the camera body 10, a judgement is further made at step S3524 as to whether data for the previous exposed frame has been definitely determined. When the operation card 60 remains attached to the camera body 10 or when data for the previous exposed frame has not yet been determined, a judgement is made at step S3525 as to whether the up-shift switch button 81 is operated. When operated, communication data change indication data is stored in RAM 131b at step S3526. This data stored in RAM 131b is transferred to the camera body 10 when the operation card 60 receives a signal including a command of no change from the camera body 10 through the communication units 110 and 137. After restarting the display timer to count 30 seconds at step S3527, another proposed caption is displayed together effective switch symbols on LCD panel 71 at step S3528. Subsequently, after starting an internal 1-sec count timer to count one second at step S3529, a judgement is made at step S3530 as to whether the 1-sec count timer has counted over one second. When one second is counted over, still another proposed caption is displayed together effective switch symbols on LCD panel 71 at step S3531. Then, after waiting a lapse of 500 milliseconds at step S3532, and communication data change indication data is stored in RAM 131b at step S3533. When the 1-sec count timer has not yet counted over one second at step S3530, or after storing communication data change indication data in RAM 131b at step S3533, a judgement is made at step S3534 as to whether there is communication input. The communication processing is executed at step S3535 when there is communication input. When there is no communication input, or after execution of the communication processing, the display timer is restarted to count 30 seconds at step S3536 and a judgement is subsequently made at step S3537 as to whether the up-shift switch button 81 remains operated. These steps S3530 through S3537 are repeated until the up-shift switch button 81 is released. When the up-shift switch button 81 is released, a scroll wait timer is started at step 4S3538 to wait for a specified timer before scrolling or shifting a description by one dot.

On the other hand, when the up-shift switch button 81 remains released at step S3525, another judgement is made at step S3539 as to whether the down-shift switch button 82 is operated. When operated, communication data change indication data is stored in RAM 131b at step S3540. This data stored in RAM 131b is transferred to the camera body 10 when the operation card 60 receives a signal including a command of no change from the camera body 10 through the communication units 110 and 137. After restarting the display timer to count 30 seconds at step S3541, another proposed caption is displayed together effective switch symbols on LCD panel 71 at step S3542. Subsequently, after starting an internal 1-sec count timer to count one second at step S3543, a judgement is made at step S3544 as to the 1-sec count timer has counted over one second. When one second is counted over, still another proposed caption is displayed together effective switch symbols on LCD panel 71 at step S3545. Then, after waiting a lapse of 500 milliseconds at step S3546, and communication data change indication data is stored in RAM 131b at step S3547. When the 1-sec count timer has not yet counted over one second at step S3544, or after storing communication data change indication data in RAM 131b at step S3547, a judgement is made at step S3548 as to whether there is communication input. The communication processing is executed at step S3549 when there is communication input. When there is no communication input, or after execution of the communication processing, the display timer is restarted to count 30 seconds at step S3550 and a judgement is subsequently made at step S3551 as to whether the down-shift switch button 82 remains operated. These steps S3544 through S3551 are repeated until the up-shift switch button 81 is released. When the down-shift switch button 82 is released, a scroll waite timer is started at step S3552.

When data for the previous exposed frame has been definitely determined at step S3524, or when neither the up-shift switch button 81 nor the down-shift switch button 82 remains released at step S3525 and S3539, or after restarting the scroll wait timer at step S3538 or S3552, a judgement is made at step S3553 as to whether there is stored data making switch input from the right-shift switch button 83 valid in RAM 131b. When there is validating data in RAM 131b, another judgement is made at step S3554 as to whether the right-shift switch button 83 is operated. When operated, communication data change indication data is stored in RAM 131b at step S3555. This data stored in RAM 131b is transferred to the camera body 10 when the operation card 60 receives a signal including a command of no change from the camera body 10 through the communication units 110 and 137. After restarting the display timer to count 30 seconds at step S3556, a judgement is further made at step S3557 as to whether data for the previous exposed frame has been definitely determined. When data for the previous exposed frame has not yet been determined, LCD drive unit 138 causes LCD panel 71 to display nine characters accompanied by a right-directed triangle symbol as a caption in the lower dot matrix display area 71h and change it ten character caption. The right-directed triangle symbol (▶) indicates that the right-shift switch button 83 is effected. For example, when a caption "Happy Bar ▶" displayed on LCD panel 71 is changed to "Happy Bart" by replacing the right-directed triangle symbol (▶) with "t." After waiting for a specified time with first ten characters of the caption remaining displayed at step S3559, the caption is scrolled or shifted by one dot at step S3560, and then, the ten characters of the description appearing on LCD panel 71 remains displayed for a specified time period at step S3561. The description is continuously scrolled until it is scrolled from the top to the last through steps S3560 to S3562. When the description is completely scrolled from the top to the last, after displaying last ten characters of the caption for a specified time at step S3563 on LCD panel 71, LCD drive unit 138 causes LCD panel 71 to display an upward black triangle representing that the up-shift switch button 81 is effective and first nine characters of a description relating to caption selection in the upper dot matrix display area 71g and the first ten characters of the caption and a right-directed black triangle representing that the right-shift switch button 83 is effective in the lower dot matrix display area 71h at step S3564. The right-directed black triangle displayed on LCD panel 71 provides an indication that there are hidden characters of the caption and that the right-shift switch button 83 is effective to scroll or shift the caption by one dot.

When data for the previous exposed frame has been definitely determined at step S3557, a judgement is made at step S3565 as to whether a description relating to rewriting data for the previous exposed frame has 11 or more characters. When it has 11 or more characters, a specified time is waited while first ten characters of a description indicating that the previous data rewrite is permitted is displayed in the selected language on LCD panel 71 at step S3566. For example, when the description is given by a short term such as "Data Change" in English, the first ten characters of the description "Data Change" is displayed on LCD panel 71. Subsequently, LCD driver 138 causes LCD panel 71 to shift or scroll the description by one dot and then a lapse of a specified time in which the ten characters of the description remains displayed on LCD panel 71 is waited at step S3567. The description is continuously scrolled until it is scrolled from the top to the last through steps S3567 to S3569. When the description is completely scrolled from the top to the last at step S3569, after displaying last ten characters of the description for a specified time at step S3570 on LCD panel 71, LCD drive unit 138 causes LCD panel 71 to display the first ten characters of the description thereon at step S3571. After displaying the first nine characters of the description and an effective switch symbol thereon at step S3564 or the first ten characters of the description relating to rewriting data for the previous exposed frame at step S3571, a judgement is made at step S3572 as to whether there is communication input. The communication processing is executed at step S3573 when there is communication input. When there is no communication input, or after execution of the communication processing, the display timer is restarted to count 30 seconds at step S3574 and a judgement is subsequently made at step S3575 as to whether the right-shift switch button 83 remains operated. These steps S3572 through S3575 are repeated until the up-shift switch button 81 is released.

When the right-shift switch button 83 is ineffective at step S3553 or when the right-shift switch button 83 is not operated at step S3554 while the right switch button 83 is effective, or when the right-shift switch button 83 is released at step S3575, a judgement is made at step S3576 as to whether the operation card 60 remains attached to the back 13 of the camera body 10. While the operation card 60 remains attached to the camera body 10, another judgement is made at step S3577 as to whether data rewrite film rewind is prohibited. When the operation card 60 remains detached from the camera body 10 at step S3576, or when the data rewrite film rewind is permitted at step S3577, a judgement is further made at step S3578 as to whether data for the previous exposed frame has been definitely determined. When data for the previous exposed frame has not been determined at step S3578, a judgement is subsequently made at step S3579 as to whether the left-shift switch button 84 is operated. When the left-shift switch button 84 is operated, then, communication data change indication data is stored in RAM 131b at step S3580. This data stored in RAM 131b is transferred to the camera body 10 when the operation card 60 receives a signal including a command of no change from the camera body 10 through the communication units 110 and 137. After restarting the display timer to count 30 seconds at step S3581, a description indicating that the previous data rewrite is permitted and a caption are displayed in the selected language in the upper and lower dot matrix display areas 71g and 71h of LCD panel 71 at step S3582. For example, when the description is given by a short term "Data Change" in English, the first ten character "Data Change" is displayed in the upper dot matrix display area 71g. Similarly, when the caption is given by a short term "happy Birthday" in English, the first ten characters "Happy Bird" is displayed in the lower dot matrix display area 71h. Subsequently, a judgement is made at step S3583 as to whether the description has 11 or more characters. When the description has 11 or more characters, after waiting for a specified time at step S3584, the description is scrolled or shifted by one dot at step S3585, and then, the part of the description on LCD panel 71 remains displayed for a specified time at step S3586. The description is continuously scrolled until it is completely scrolled from the top to the last through steps S3585 to S3587. When the description is completely scrolled or shifted from the top to the last at step S3587, after displaying the last ten characters of the description together for a specified time at step S3588, LCD panel 71 continuously displays the first 10 characters of the description together with an effective switch symbol in the upper dot matrix display area 71g of LCD panel 71 at step S3889.

Subsequently after starting the 2-sec count timer to count two seconds at step S3590, a judgement is made at step S3991 as to whether the left-shift switch button 84 remains operated. When the left-shift switch button 84 is released, the flow chart logic orders return to the step in the sequence after reading out data of a caption and a language written in EEPROM 139 at step S3506. However, when the left-shift switch button 84 remains operated, a judgement is made at step S3592 as to whether there is communication input. The communication processing is executed at step S3593 when there is communication input. When there is no communication input, or after execution of the communication processing, a judgement is made at step S3594 as to whether the 2-sec count timer has counted over 2 seconds. These steps S3591 through S3594 are repeated until the 2-sec count timer has counted over 2 seconds. When the left-shift switch button 84 remains operated for more than two seconds, after setting the definitely determined data for the previous exposed frame at step S3595, a judgement is made at step S3596 as to whether the operation card 60 remains attached to the camera body 10. When the operation card 60 remains attached to the camera body 10, a sign "ST" and an indication of print designation are displayed on LCD panel 71 at step S3597. Display a sign "ST" enables the photographer to understand that a caption for the previous exposed frame has been set. Data of the caption for the previous exposed frame to be transferred to the camera body 10 is stored in RAM 131b at step S3598. This data stored in RAM 131b is transferred to the camera body 10 to rewrite magnetic data for the previously exposed frame when the operation card 60 receives a signal including a command of no change from the camera body 10 through the communication units 110 and 137. Subsequently, a judgement is made at step S3599 as to whether there is communication input. The communication processing is executed at step S3600 when there is communication input. When there is no communication input at step S3599, or after execution of the communication processing at step S3600, the display timer is restarted to count 30 seconds at step S3601, and then, a judgement is made at step S3602 as to whether the left-shift switch button 84 remains operated. Until the left-shift switch button 84 is released, these step S3599 through S3601 are repeated. On the other hand, when the left-shift switch button 84 is released, the flow chart logic terminates the caption selection processing and orders return to the branch processing sequence routine after the step in the sequence routine calling for the caption selection processing. When the operation card 60 remains detached from the camara body 10 at step S3596, a description indicating that the previous frame data rewrite is permitted and a caption are displayed in the selected language on LCD panel 71 at step S3603. First ten characters "Happy Bird" of a caption "Happy Birthday," for example, are displayed in the upper dot matrix display area 71g of LCD panel 71, and a description is given by a short term such as "Data Change, for example, of which first ten characters "Data Change" are displayed in the lower dot matrix display area 71h of LCD display 71.

Data of the previous exposed frame data rewrite and the caption to be transferred in the form of a remote control signal to the camera body 10 are stored in RAM 131b of CPU 131 at steps S3604 and S3605, respectively. Subsequently, after restarting the display timer to count 30 seconds at step S3606, data making switch input from the right-shift switch button 83 valid is stored in RAM 131b at step S3607, the flow chart logic orders return to the step S3523 where a judgement concerning the operation card 60 attached to or detached from the camera body 10 is made.

When the data rewrite film rewind permission command is transferred at step S3577, or the left-shift switch button 84 is released at step S3579 while data for the previous exposed frame has been definitely determined, a judgement is made at step S3608 as to whether a scroll timer has counted over a scroll time. Before having counted over the scroll time, judgements are made as to whether the operation card 60 is attached to the back 13 of the camera body 10 and whether the remote control switch 77 is operated at step S3609 and S3610, respectively. When, while the operation card 60 remains detached, the remote control switch 77 is operated, the remote control switch 77 is operated, after executing the remote control signal transferring processing at step S3611, the flow chart logic terminates the caption selection processing and orders return to the branch processing sequence routine after the step in the sequence routine calling for the caption selection processing. When the scroll timer has counted over the scroll time, another judgement is made at step S3612 as to whether the caption has 11 or more characters. When the description has less than 11 characters, data making switch input from the right-shift switch button 83 invalid is stored in RAM 131b at step S3613. On the other hand, when the description has 11 or more characters, the caption is scrolled or shifted by one dot at step S3614. After waiting for a specified time with ten characters of the caption remaining displayed at step S3615, a judgement is made st step S3616 as to whether the caption has been completely scrolled from the top to the last. Until the caption is completely scrolled from the top to the last dot by dot, these steps S3614 through S3616 are repeated. When the caption is completely scrolled, after waiting for a specified time with the last ten characters remaining displayed on LCD panel 71 at step S3617, LCD drive unit 138 causes LCD panel 71 to continuously display the first one characters of the caption and a right-directed black triangle which indicates that the right shift switch button 82 is effective thereon at step S3618. Subsequently, data making switch input from the right-shift switch button 83 valid is stored in RAM 131b at step S3619, and the display timer is restarted at step S3620.

Thereafter, judgements are consecutively made at steps S3621 and S3622 as to whether data for the previous exposed frame has been definitely determined and whether the print quantity (PQ) selection switch 74 is operated, respectively. When, while the data of previous exposed frame is not determined, the print quantity (PQ) selection switch 74 is operated, data of the print quantity (PQ) and the selected caption (ST) to be transferred to the camera body 10 are stored in RAM 131b at step S3623. After restarting the display timer to count 30 seconds at step S3624, and displaying first ten characters of a description relating to setting of the print quantity such as "Print Quantity" in the upper dot matrix display area 71g of LCD panel 71 and the print quantity (PQ) or the number of prints such as "P01" (one copy) in the lower dot matrix display area 71h of LCD panel 71 at step S3625, a judgement is made at step S3626 as to whether there is communication input. The communication processing is executed at step S3627 when there is communication input. When there is no communication input, or after execution of the communication processing, the display timer is restarted to count 30 seconds at step S3628. These steps S3626 through S3628 are repeated until the print quantity (PQ) selection switch 74 is released at step S3629. When the print quantity (PQ) selection switch 74 is released, the flow chart logic terminates the print caption selection processing and orders return to the branch processing sequence routine after the step in the sequence routine calling for the caption selection processing. On the other hand, when the data of previous exposed frame ha been definitely determined at step S3621, or the print quantity (PQ) selection switch 74 is not operated at step S3622 while the data of previous exposed frame is not determined, then, judgements are further consecutively made at steps S3630 and S3631 as to whether data for the previous exposed frame has been definitely determined and whether the caption selection switch 73 is operated, respectively. When, while the data of previous exposed frame is not determined, the print quantity (PQ) selection switch 74 is operated, the flow chart logic orders return to the step in the sequence after reading out data of a caption and a language written in EEPROM 139 at step S3506. When data of previous exposed frame has been definitely determined at step S3630, or neither when the data of previous exposed frame is not determined at step S3630 nor when the caption selection switch 73 is operated at step S36301 judgements are consecutively made at steps S3632 and S3632 as to whether the operation card 60 remains attached to the back 13 of the camera body 10 and whether the date selection switch 72 is operated, respectively. When, while the operation card 60 remains attached, the date selection switch 72 is operated, data of the print quantity (PQ) and the selected caption (ST) to be transferred to the camera body 10 are stored in RAM 131b at step S3634, and a sign "ST" and an indication of print designation are displayed in the upper and lower dot matrix display areas 71g and 71h of LCD panel 71, respectively, at step S3635. Display a sign "ST" enables the photographer to understand that a caption for the previous exposed frame has been set. Subsequently, a judgement is made at step S3636 as to whether there is communication input. The communication processing is executed at step S3637 when there is communication input. When there is no communication input, or after execution of the communication processing, a judgement is made at step S3638 as to whether the date selection switch 72 is released. These steps S3636 through S3638 are repeated until the date selection switch 72 is released. When the date selection switch 72 is released, the flow chart logic terminates the print caption selection processing and orders return to the branch processing sequence routine after the step in the sequence routine calling for the caption selection processing. On the other hand, while the operation card 60 remains detached at step S3632, or when, while the operation card 60 remains attached at step S3632, the date selection switch 72 is not operated at step S3633, a further judgement is made at step S3639 as to whether the display timer has counted over 30 seconds. When having counted over, a judgement is further made at step S3640 as to whether the operation card 60 remains attached to the back 13 of the camera body 10. When the operation card 60 remains detached from the back 13 of the camera body 10, after removing all indications displayed on LCD panel 71 at step S3641, the flow chart logic terminates the print caption selection processing and orders return to the branch processing sequence routine after the step in the sequence routine calling for the caption selection processing. When the display timer has not yet counted over 30 seconds at step S3639 or when, while the display timer has counted over 30 seconds, the operation card 60 remains attached to the camera body 10, then, a judgement is made at step S3642 as to whether there is communication input. The communication processing is executed at step S3643 when there is communication input.

When there is no communication input, or after execution of the communication processing, a judgement is made at step S3644 as to whether the clear switch 76 is operated. When not operated, the flow chart logic orders return to the step S3523 where a judgement concerning the operation card 60 attached to or detached from the camera body 10 is made. On the other hand, when operated, communication data change indication data is stored in RAM 131b at step S3645. This data stored in RAM 131b is transferred to the camera body 10 when the operation card 60 receives a signal including a command of no change from the camera body 10 through the communication units 110 and 137. After restarting the display to count 30 seconds at step S3646, and resetting the definitely determined data for the previous exposed frame at step S3647, a judgement is made at step S3648 as to whether data for the previous exposed frame has been definitely determined. When data for the previous exposed frame has been definitely determined, after resetting the definitely determined data for the previous exposed frame at step S3649, a description relating to caption selection and a proposed caption are displayed in the upper and lower dot matrix display areas 71g and 71h of LCD panel 71, respectively to indicate that caption selection is ready, at step S3650. Subsequently, a judgement is made at step S3651 as to whether there is communication input. The communication processing is executed at step S3652 when there is communication input. When there is no communication input, or after execution of the communication processing, the display timer is restarted to count 30 seconds at step S3653. These steps S3651 through S3653 are repeated while the clear switch 76 remains operated at step S3654. When the clear switch 76 is released, the flow chart logic orders return to the step in the sequence after reading out data of a caption and a language written in EEPROM 139 at step S3506. On the other hand, when data for the previous exposed frame has not yet been definitely determined at step S3648, after cancelling the selected caption at step S3655, a judgement is made at step S3656 as to whether the operation card 60 remains attached to the camera body 10. When the operation card 60 remains detached from the camera body 10, LCD drive unit 138 causes LCD panel 71 to remove all indications therefrom at step S3657. When the operation card 60 remains attached to the camera body 10, another judgement is made at step S3658 as to whether a print quantity (PQ) has been definitely determined. When determined, the print quantity (PQ) together with the print side sign "FB" and a date are displayed in the upper dot lower dot matrix display areas 71g and 71h of LCD panel 71, respectively, at step S3659. Otherwise, only the print side sign "FB" and the date are displayed in the upper dot lower dot matrix display areas 71g and 71h of LCD panel 71, respectively, at step S3660. After removing all indications from LCD panel 71 at step S3657, or displaying a date and/or print quantity on LCD panel 71 at step S3659 or S3660, a judgement is made at step S3661 as to whether there is communication input. The communication processing is executed at step S34662 when there is communication input. These steps S3661 through S3663 are repeated while the clear switch 76 remains operated at step S3664. When the clear switch 76 is released, the flow chart logic terminates the print caption selection processing and orders return to the branch processing sequence routine after the step in the sequence routine calling for the caption selection processing.

Figure 47A:
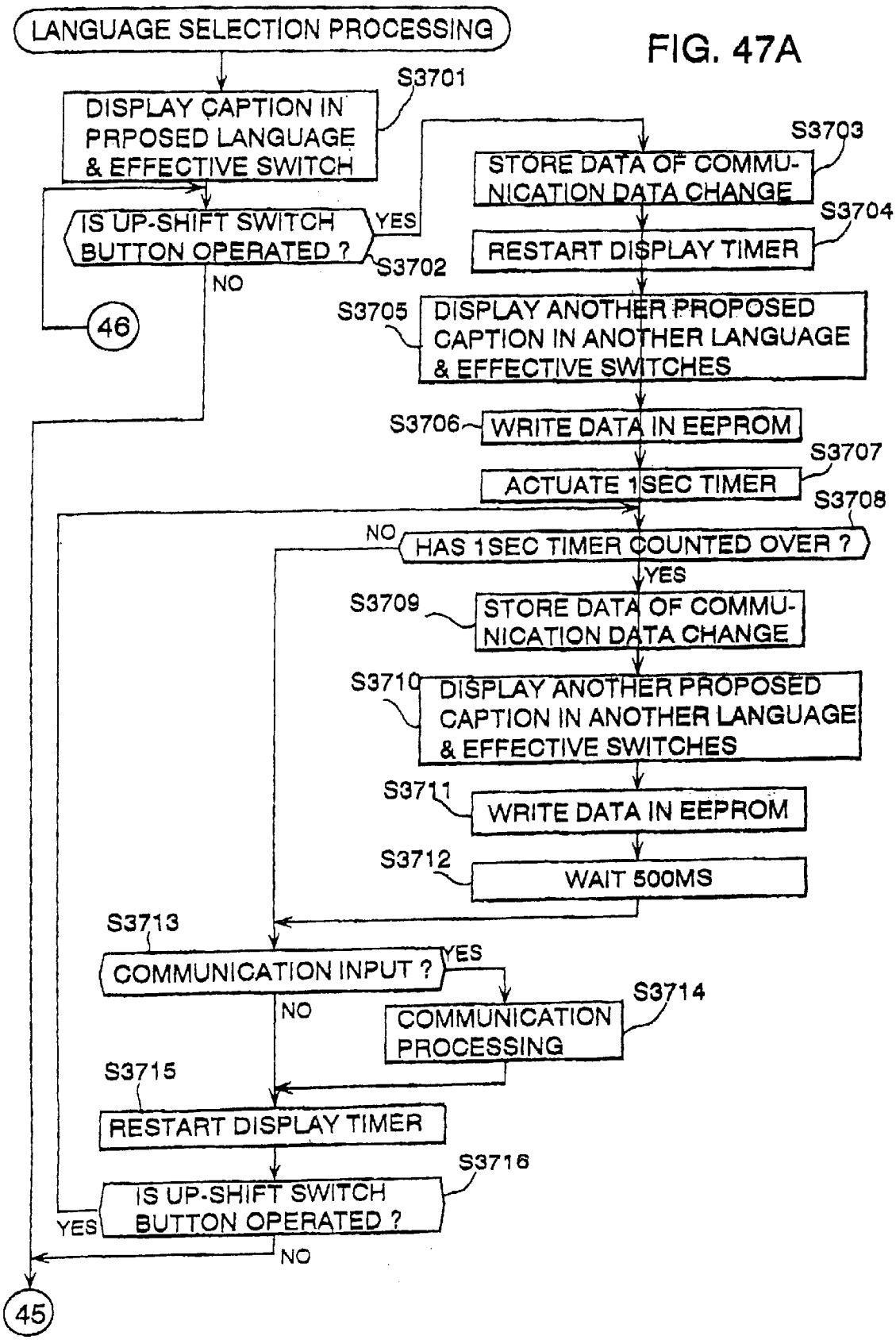
FIGS. 47A through 47C are a flow chart illustrating a language selection processing sequence routine.
Figure 47B:
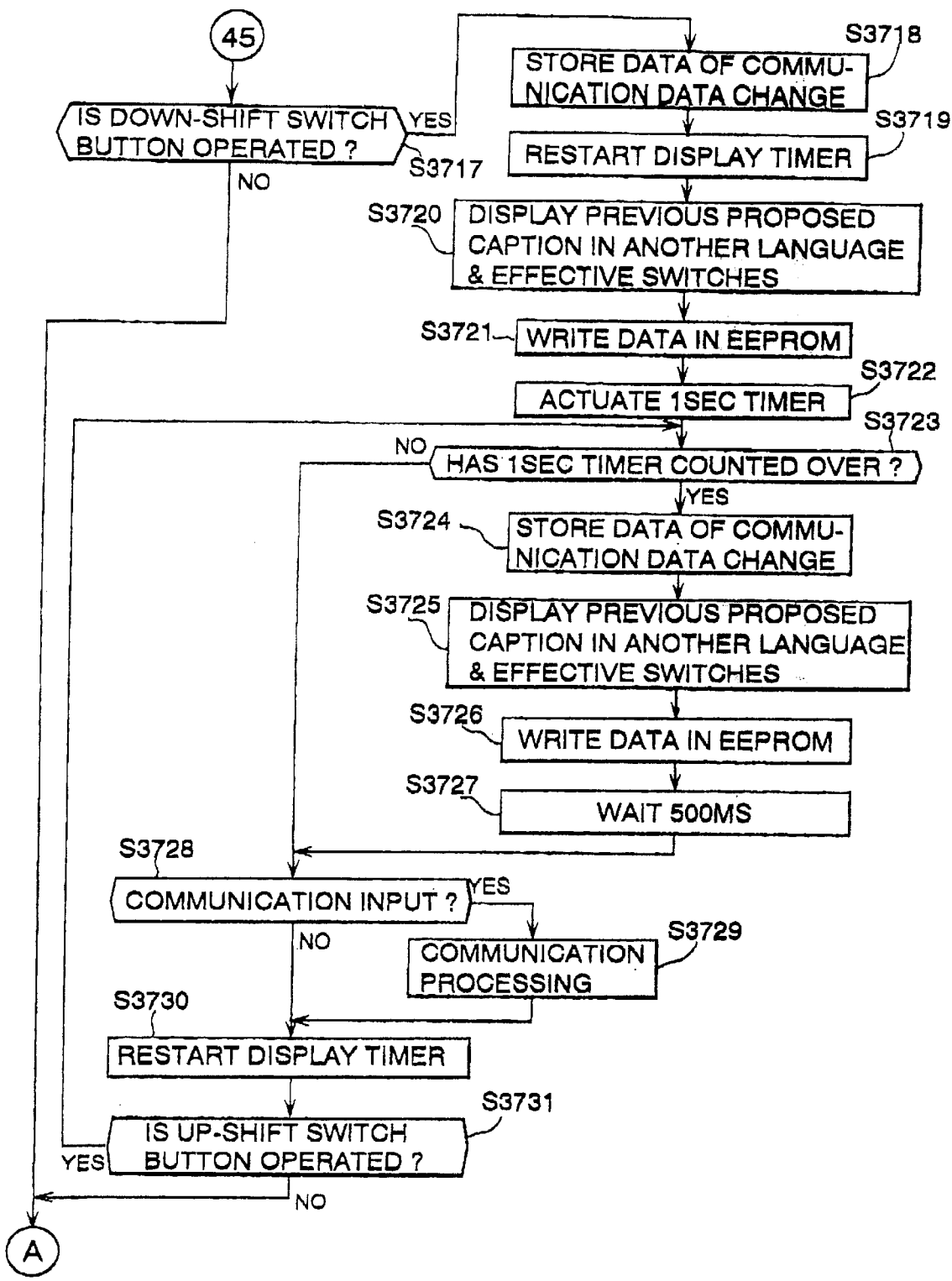
Figure 47C:
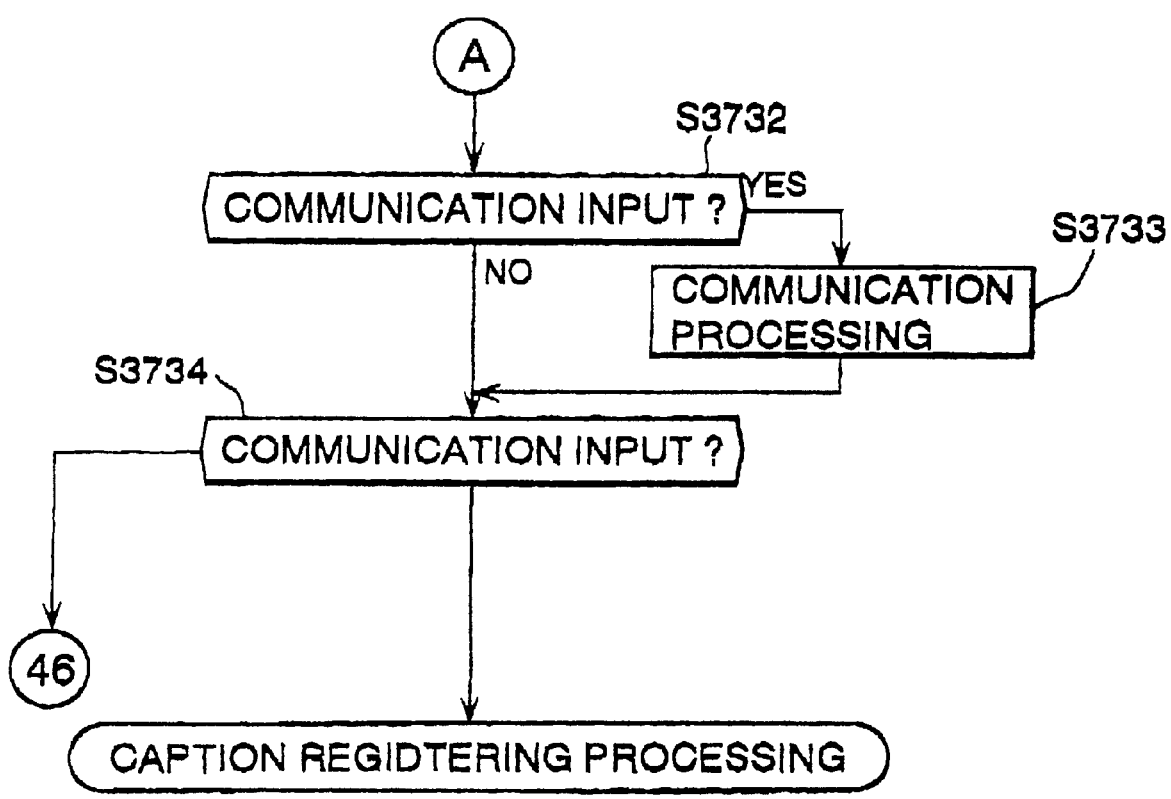

FIGS. 47 are a flow chart of the sequence routine of language selection processing. When the flow chart logic commences and control proceeds directly to a function block at step S3701 where LCD drive unit 138 causes LCD panel 71 to display and flash on and off a name of language previously selected and to display upward and downward back triangles indicating effective switches in the upper dot matrix display area 71g and a caption in the lower dot matrix display area 71h. Subsequently, a judgement is made at step S3702 as to whether the up-shift switch button 81 is operated. When operated, then, communication data change indication data is stored in RAM 131b at step S3703. This data stored in RAM 131b is transferred to the camera body 10 when the operation card 60 receives a signal including a command of no change from the camera body 10 through the communication units 110 and 137. After restarting the display timer to count 30 seconds at step S3704, a proposed language accompanied by effective switch symbols and a proposed caption in the proposed language are displayed in the upper and lower dot matrix display areas 71g and 71h of LCD panel 71 at step S3705. After writing data relating to the language and caption in EEPROM 139 at step S3706 and subsequently starting the 1-sec count timer to count one second at step S3707, a judgement is made at step S3708 as to whether the 1-sec count timer has counted over one second. When one second is counted over, communication data change indication data is stored in RAM 131b at step S3709. This data stored in RAM 131b is transferred to the camera body 10 when the operation card 60 receives a signal including a command of no change from the camera body 10 through the communication units 110 and 137. At step S3710, another proposed language accompanied by effective switch symbols and another proposed caption in the proposed language are displayed in the upper and lower dot matrix display areas 71g and 71h of LCD panel 71. Then, data relating to the language and caption is written in EEPROM 139 at step S3711 and a lapse of 500 milliseconds is subsequently waited for at step S3712. When the counter has not yet count over one second at step S3708, or after waiting a lapse of 500 milliseconds at step S3712, a judgement is made at step S3713 as to whether there is communication input. The communication processing is executed at step S3714 when there is communication input. When there is no communication input, or after execution of the communication processing, the display timer is restarted to count 30 seconds at step S3715 and a judgement is subsequently made at step S3716 as to whether the up-shift switch button 81 remains operated. These steps S3708 through S3716 are repeated until the up-shift switch button 81 is released.

When the up-shift switch button 81 is released at step S3702 or S3716, a judgement is made at step S3717 as to whether the down-shift switch button 82 is operated. When operated, then, communication data change indication data is stored in RAM 131b at step S3718. This data stored in RAM 131b is transferred to the camera body 10 when the operation card 60 receives a signal including a command of no change from the camera body 10 through the communication units 110 and 137. After restarting the display timer to count 30 seconds at step S3719, a previous language accompanied by effective switch symbols and a previous caption in the previous language are displayed in the upper and lower dot matrix display areas 71g and 71h of LCD panel 71 at step S3720. After writing data relating to the language and caption in EEPROM 139 at step S3721 and subsequently starting the 1-sec count timer to count one second at step S3722, a judgement is made at step S3723 as to whether the internal 1-sec count timer has counted over one second. When one second is counted over, communication data change indication data is stored in RAM 131b at step S3724. This data stored in RAM 131b is transferred to the camera body 10 when the operation card 60 receives a signal including a command of no change from the camera body 10 through the communication units 110 and 137. At step S3725, another proposed language accompanied by effective switch symbols and another proposed caption in the proposed language are displayed in the upper and lower dot matrix display areas 71g and 71h of LCD panel 71. Then, data relating to the language and caption is written in EEPROM 139 at step S3726, and a lapse of 500 milliseconds is waited for at step S3727. When the counter has not yet count over one second at step S3723, or after waiting a lapse of 500 milliseconds at step S3727, a judgement is made at step S3728 as to whether there is communication input. The communication processing is executed at step S3729 when there is communication input. When there is no communication input, or after execution of the communication processing, the display timer is restarted to count 30 seconds at step S3730, and a judgement is subsequently made at step S3731 as to whether the down-shift switch button 82 remains operated. These steps S3723 through S3731 are repeated until the down-shift switch button 82 is released.

When the down-shift switch button 82 is released at step S3717 or S3731, a judgement is made at step S3732 as to whether there is communication input. The communication processing is executed at step S3733 when there is communication input. When there is no communication input, or after execution of the communication processing, a judgement is subsequently made at step S3734 as to whether the caption selection (ST) switch 73 remains operated. When operated, the flow chart logic orders return to the step in the sequence before the judgement concerning operation of the up-shift switch button 81 made at step S3701. Otherwise, caption registration processing is implemented. The caption registration processing is executed to write one of the captions stored in RAM 131a which is frequently used in EEPROM 139 and runs when the caption selection (ST) switch 73 is released after it has remained operated for more two seconds. In this instance, the up-shift switch button 81 or the down-shift switch button 82 is operated to display unregistered captions one after another in the lower dot matrix display area 71h of LCD panel 71. When operating the caption selection (ST) switch 723 while an intended caption appears in the lower dot matrix display area 71h of LCD panel 71, the caption is registered in EEEPROM 139. About ten captions can be registered, which is always desirable to select a caption quickly. When the caption registration is completed, the flow chart logic orders return to the step in the caption selection sequence routine after reading out data of a caption and a language written in EEPROM 139 at step S3506.

According to the caption selection processing, even if a caption and a description of caption selection have large numbers of characters, they are displayed and scrolled dot by dot from the top to the last on LCD panel 71, so that caption selection is quite easy and accurate. Because data of a caption and language selected is transferred from the operation card 60 to the camera body 10 through communication units 110 and 137 by operating switches on the operation card 60, it is ensured to record data of the caption and language.

Figure 48:
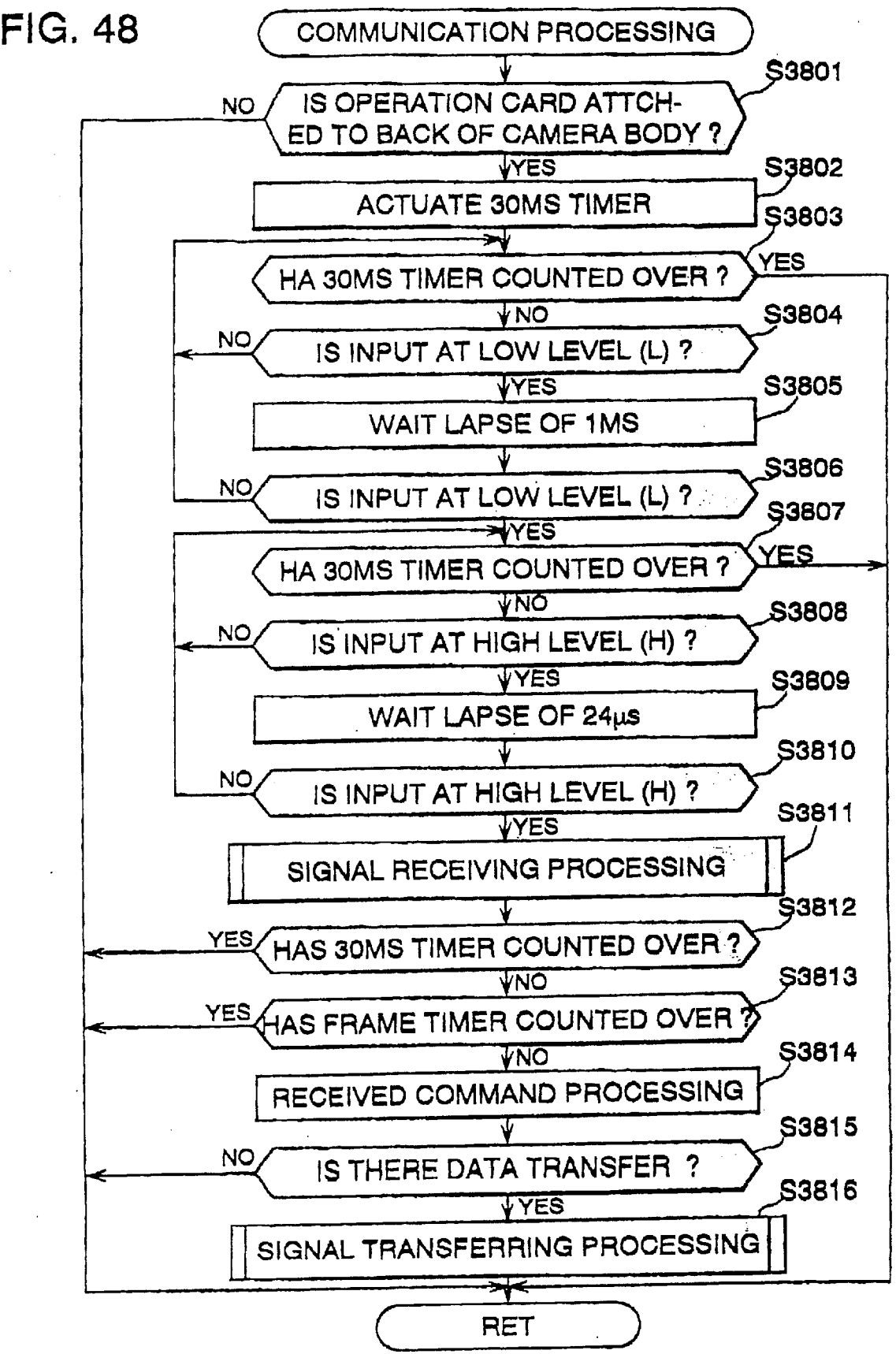
FIG. 48 is a flow chart illustrating a communication processing sequence routine.

FIG. 48 is a flow chart of the sequence routine of communication processing for intercommunication of various data and commands between the camera body 10 and the operation card 60 through communication units 110 and 137. When the flow chart logic commences and control proceeds directly to a function block at step S3801 where a judgement is made as to whether the operation card 60 remains attached to the back 13 of the camera body 10. When the operation card 60 has been detached from the back 13 of the camera body 10, the flow chart logic terminates the communication processing. Otherwise, after starting an internal 30-ms count timer to count 30 milliseconds at step S3802, a judgement is made at step S3803 as to whether the 30-ms count timer has counted over 30 milliseconds. The flow chart logic terminates the communication processing when the 30-ms timer has counted over 30 milliseconds. On the other hand, when the 30-ms timer has not yet counted 30 milliseconds, a judgement is made at step S3804 as to whether an input signal such as shown in FIG. 50 to the communication unit 137 is at a low potential level (L). When the low potential level (L) of input signal is detected, after wating for one millisecond at step S3805, another judgement concerning the low potential level (L) of input signal is made again at step S3806. Unless the input signal continues to be at the low potential level (L) for more than one millisecond, the judgements concerning the low potential level (L) of input signal are repeated. Repeating the judgement concerning the low potential level (L) of input signal eliminates a wrong detection of a header of the input signal. When the input signal continues to be at the low potential level (L) for more than one millisecond, a judgement is made at step S3807 as to whether the 30-ms count timer has counted 30 milliseconds. The flow chart logic terminates the communication processing when the 30-ms count timer has counted 30 milliseconds. On the other hand, when the 30-ms count timer has not yet counted 30 milliseconds, a judgement is made at step S3808 as to whether the input signal is at a high potential level (H). When the high potential level of input signal is detected, after wating a lapse of 24 microseconds at step S3809, another judgement concerning the high potential level of input signal is made again at step S3810. Unless the input signal continues to be at the high potential level (H) for more than 30 milliseconds, the judgements concerning the high potential level (H) of input signal are repeated. When the input signal continues to be at the high potential level (H), then, signal receiving processing is executed at step S3811 as will be described in detail later. Subsequently, judgements are consecutively made as to whether the 30-ms count timer has counted over 30 milliseconds and whether the frame timer has counted over 20 millisecond at step S3812 and S3813, respectively. When both timer have not yet counted over, command reception processing is executed to store, write and read data or reset a mode according to the command at step S3814. Subsequently, when a data transfer request command is transferred to the optical card 60 from the camera body 10 at step S3815, then, signal transferring processing is executed at step S3816 as will be described in detail later. When either one of the timers has counted over 30 millisecond or 20 milliseconds, or when there is no data transfer request command transferred to the optical card 60, the flow chart logic terminates the communication processing.

Figure 49A:
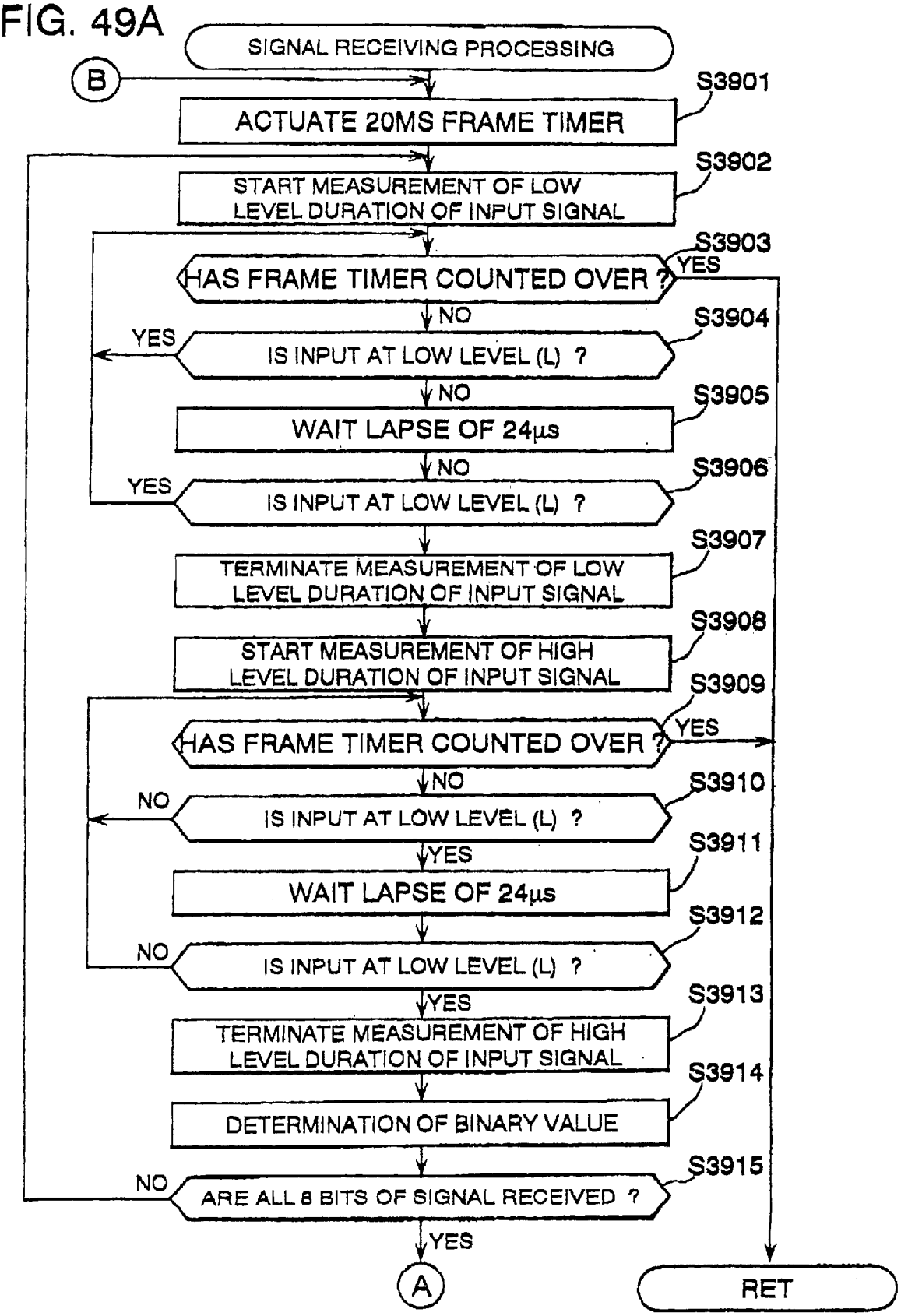
FIGS. 49A and 49B are a flow chart illustrating a signal receiving processing sequence routine.
Figure 49B:
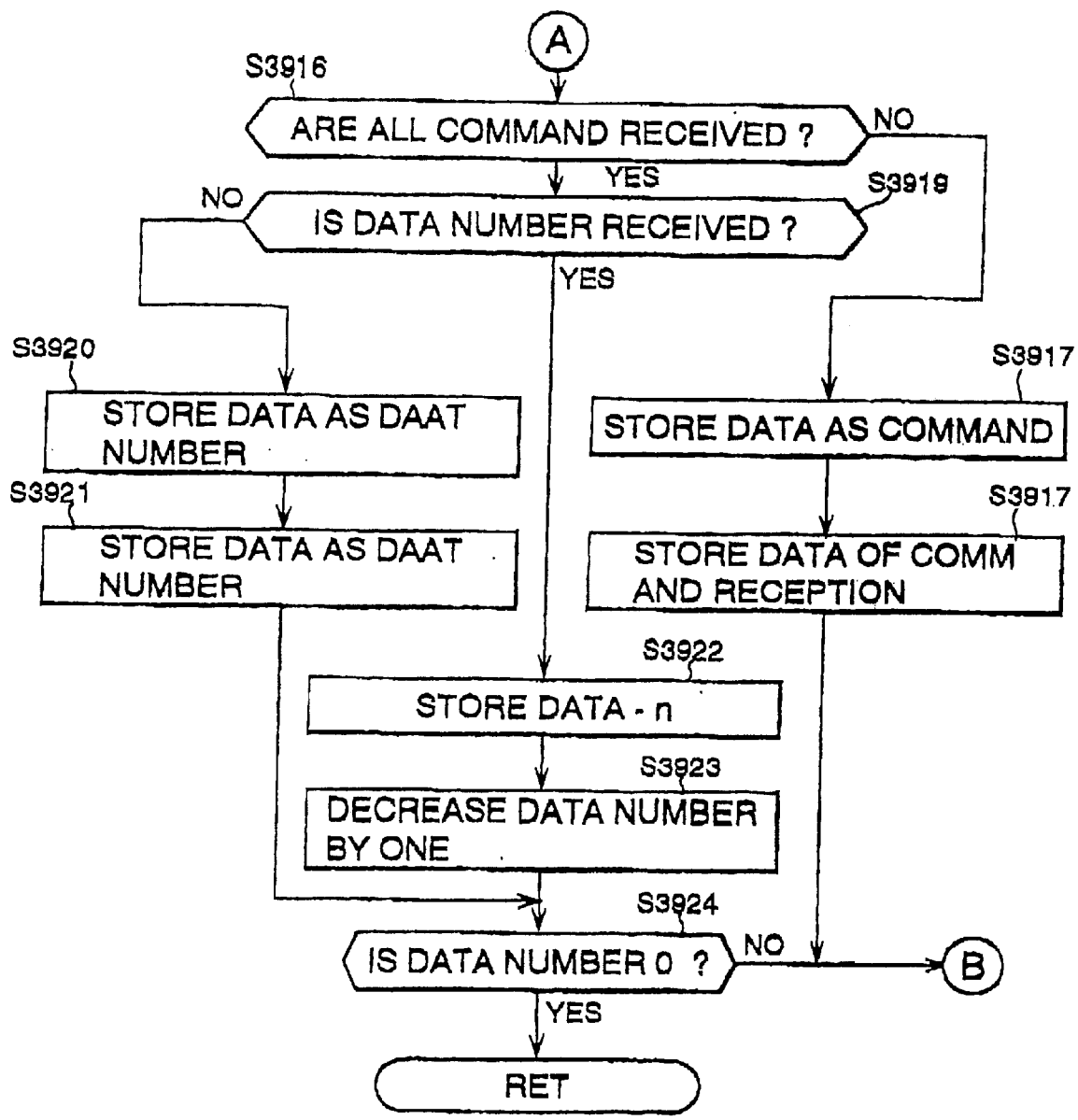

FIGS. 49A and 49B are a flow chart of the sequence routine of signal receiving processing When the flow chart logic commences and control preceeds to a function block at step S3901 where a frame timer is reset and actuated to count a specified time, for example 20 milliseconds. Subsequently, measurement of a duration for which an input signal remains low (L) in level is started at step S3902, and a judgement is made at step S3903 as to whether the frame timer has counted over 20 milliseconds. The flow chart logic terminates the signal receiving processing when the frame timer has counted over 20 milliseconds. On the other hand, when the frame timer has not yet counted 20 milliseconds, a judgement is made at step S3904 as to whether an input signal to the communication unit 110 of CPU 101 is at a low potential level (L). When a high potential level (H) of input signal is detected, after wating a lapse of 24 micro-seconds at step S3905, another judgement concerning the low potential level (L) of input signal is made again at step S3906. Whenever the input signal turns from the high level (H) to the low level (L) within 24 micro-seconds, the judgements concerning the low potential level of input signal are repeated. When the input signal continues to be at the high potential level (H) for more than 24 micro-seconds, then, the measurement of the duration of low level input signal is ended at step S3907, and, subsequently, measurement of a duration for which the input signal remains high (H) in potential level is started at step S3908. Subsequently, a judgement is made at step S3909 as to whether the frame timer has counted over 20 milliseconds. The flow chart logic terminates the signal receiving processing when the frame timer has counted over 20 milliseconds. Otherwise, a judgement is made at step S3910 as to whether the input signal to the communication unit 110 of CPU 101 is at the low potential level (L). When the low potential level (L) of input signal is detected, after wating a lapse of 24 micro-seconds at step S3911, another judgement concerning the low potential level (L) of input signal is made again at step S3912. Whenever the input signal turns from the low potential level (H) to the high potential level (H), the judgements concerning the low potential level of input signal are repeated. When the input signal continues to be at the low potential level (L) for more than 24 micro-seconds, then, the measurement of the duration of high level input signal is ended at step S3913, and it is determined whether the input signal represents a binary digit of "0" or "1" according to the time for which the input signal remains low (L) or high (H) in potential level at step S3914. Subsequently, a judgement is made at step S3915 as to whether the eight bit data signal has completely been transferred bit by bit. When the eight bit data signal has not yet completely been transferred, the flow chart logic orders return to the step after a start of frame timer at step S3901. When the eight bit data signal has completely been transferred, a judgement is made at step S3916 as to whether reception of data of a command of the input signal has been completed. When the command data of the input signal has not yet been received, after receiving and storing the command data in RAM 101b of CPU 101 at step S3917, and storing data of command reception completion in RAM 101b of CPU 101 at step S3918, the flow chart logic orders return to the first step of the signal receiving processing sequence routine. When the command data of the input signal has completely been received at step S3916, a judgement is made at step S3919 as to whether reception of data of the data of the number of the input signal has been completed. When the data of the data of the number of has not yet been received, the data of the data of the number of is received and stored in RAM 101b of CPU 101 at step S3920, and, subsequently, data of completion of reception of the data of the number of data is stored in RAM 101b of CPU 101 at step S3921. When the data of the number of data has been completely received at step S3919, the received data is stored as one of n-data in RAM 101b of CPU 101 at step S3922. After storing the data of completion of reception of the data of the number of data in RAM 101b of CPU 101 at step S3921 or after changing the number of data by a decrement of one at step S3923, a judgement is made at step S3924 as to whether the number of data is "0" (zero). When the number of data to be stored is not "0," the flow chart logic orders return to the first step of the signal receiving processing sequence routine. Otherwise, when the number of data to be stored is "0," the flow chart logic orders terminates the signal receiving processing.

With the signal receiving processing, an input signal from the operation card 60 are recognized by a command, the number of data and respective data on the side of the camera body 10.

Figure 50B:
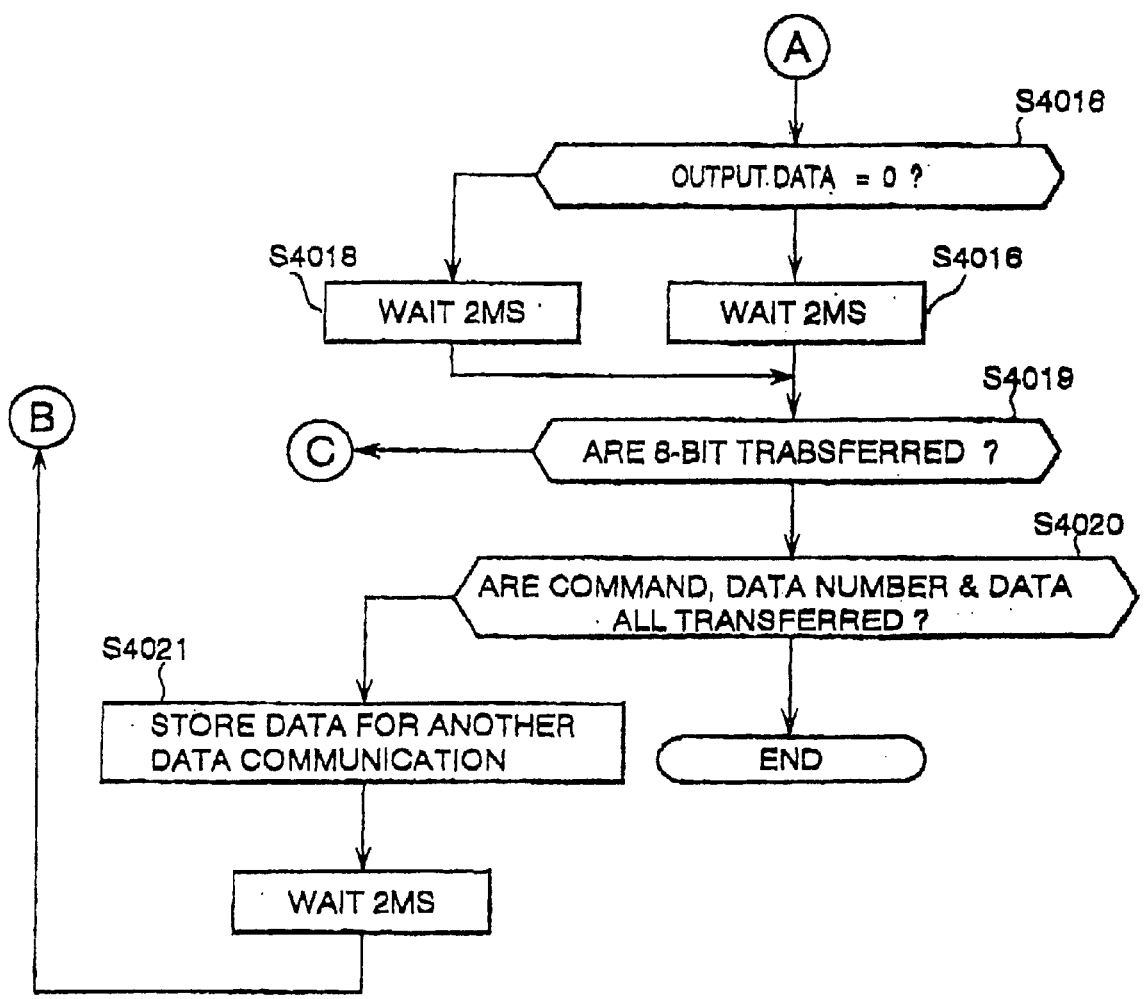
Figure 51:
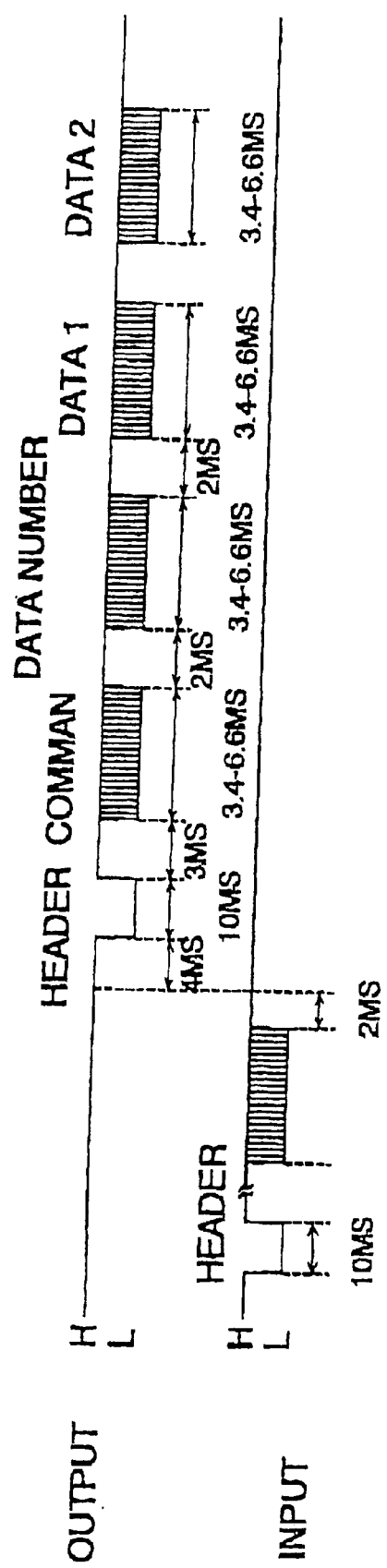
FIG. 51 is an illustration showing a signal structure.

FIGS. 50A and 50B are a flow chart of the sequence routine of signal transferring processing. When the flow chart logic commences and control preceeds to function blocks where a command, a data of the number of and various data of a signal to be transferred to the operation card 60 are stored in RAM 101b of CPU 101 of the camera body 10 at steps S4001 to S4003, respectively. After putting an output signal to the communication unit 110 at a low potential level (L) at step S4004, an internal 10-ms count timer is actuated to count time at step S4005. When the 10-ms count timer counts over 10 milliseconds at step S4006, the output signal is inverted to a high potential level (H) at step S4007, and an internal 3-ms count timer is actuated to count 3 milliseconds at step S4008. When the 3-ms count timer counts over 3 milliseconds at step S4009, the output signal is inverted to the low potential level (L) at step S4010. After waiting a lapse of 200 micro-seconds at step S4011, the output signal is inverted to the high potential level (H) at step S4012. Subsequently, the output signal is inverted to the low potential level (L) at step S4013, and, after waiting a lapse of 200 micro-seconds at step S4014, the output signal is inverted again to the high potential level (H) at step S4015.

Thereafter, a judgement is made at step S4016 as to whether the output signal has data of a binary digit of "0". After waiting a lapse of 200 micro-seconds at step S4017 when the output data represents the binary digit of "0" or after waiting a lapse of 600 micro-seconds at step S4018 when the output data represents a binary digit of "1", a judgement is made at step S4019 as to whether the eight bit data signal has completely been transferred bit by bit. When the eight bit data signal has not yet completely been transferred, the flow chart logic orders return to the step after the inversion of an input signal to the high potential level (H) at step S4012. Otherwise, a judgement is made at step S4020 as to whether a data signal containing a command, a data of the number of and data has been transferred. When the signal has not yet completely been transferred, after setting another data of a command, a data of the number of and various data at step S4021 and waiting a lapse of 2 milliseconds at step S4022, the flow chart logic the flow chart logic orders return to the step after the judgement concerning a lapse of 3 millisecond at step S4009. Otherwise, the flow chart logic terminates the communication processing sequence routine.

With the signal transferring processing, there is provided a signal which comprises a header remaining high in level for a specified time period, a command consisting of eight bits which are at high or low level and have different durations of time, and various data and is transferable to the operation card 60.

It is to be understood that the present invention may be embodied with various changes, modifications and improvements, which may occur to those skilled in the art, without departing from the spirit and scope of the invention defined in the following claims.

What is claimed is:

1. A camera system comprising:
   a camera body having at least a taking lens and exposure means for performing exposure;
   a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
   operation card detection means for detecting whether said operation card is attached to said one exterior of said camera body;
   remote control setting means incorporated in said operation card for putting said camera body in a remotely controllable operation mode in which said camera system is controlled through said operation card detached from said camera body; and
   control means for detecting whether said camera body is put in said remotely controllable operation mode when said operation card detection means detects said operation card detached from said one exterior of said camera body, holding said camera body effective in making exposure while determining said camera body put in said remotely controllable operation mode and disabling said camera body from making exposure while determining said camera body put out of said remotely controllable operation mode.

2. The camera system as defined in claim 1, wherein said camera body has a taking lens which is retractable into said camera body when said camera system is put to no-use and said control means forces said taking lens to retract said taking lens into said camera body so as thereby to disable said camera body from making exposure.

3. The camera system as defined in claim 2, wherein said camera body is selectively put in predetermined exposure control modes, records printing information relating to producing prints from a film exposed by said camera system on said film and holds one of said exposure control modes selected and said printing information to be recorded on said film while said control means determines said camera body to be in said remotely controllable operation mode.

4. The camera system as defined in claim 3, wherein said print information includes at least one of a date, a number of print copies, a caption describing a picture and language in which said caption is described.

5. A camera system comprising:
   a camera body having at least a taking lens and exposure means for performing exposure;
   a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
   operation card detection means for detecting attaching of said operation card from one exterior of said camera body; and
   control means for detecting functional operation of said operation card remaining attached to said one exterior of said camera body, counting a time until detecting said functional operation of said operation card, disabling said camera body from making exposure when said timer exceeds a predetermined time, and enabling said operation card and said camera body to intercommunicate with each other at regular time intervals so as thereby to recognize whether said operation card is operated while said operation card remains attached to said one exterior of said camera body.

6. The camera system as defined in claim 5, wherein said control means restarts to count said time when recognizing operation of said operation card.

7. A camera system comprising:
   a camera body having at least a taking lens and exposure means for performing exposure;
   a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
   operation card detection means for detecting whether said operation card is attached to said one exterior of said camera body; and
   electric batteries incorporated in said operation card and said camera body respectively;
   wherein said operation card operates with electric power supplied from said battery installed in said camera body, only while said operation card detecting means detects said operation card attached to said one exterior of said camera body.

8. The camera system as defined in claim 7, and further comprising control means for detecting functional operation of said operation card attached to said one exterior of said camera body, disabling said camera body from operating as well as suspending supply of electric power to said operation card from said battery installed in said camera body after a lapse of a predetermined time before detecting said functional operation.

9. The camera system as defined in claim 7, and further comprising optical communication means for enabling said operation card and said camera body to intercommunicate with each other while said control means disables said camera body from operating.

10. The camera system as defined in claim 7, and further comprising
operation card detection means for detecting whether said operation card is attached to said one exterior of said camera body;
control means for transferring a signal transfer request command to said operation card when said operation card detecting means detects said operation card attached to said one exterior of said camera body, detecting whether an answer command is transferred from said operation card in a specified time after reception of said signal transfer request command by said operation card, controlling said camera body according to an operation mode set through said operation card when detects said answer command, and controlling said camera body according to an operation mode set in said camera body when detects no said answer command.

11. A camera system comprising:
a camera body having at least a taking lens and exposure means for performing exposure; and
a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
wherein said camera body is equipped with a memory for storing initial data relating to exposure, and said operation card is equipped with a memory for storing initial data, at least one of said camera body and said operation card being provided with an input terminal through which initial data is entered into said memory associated with said one of said camera body and said operation card from an external data entry apparatus when said camera system is manufactured and communication means for transferring therethrough said initial data entered into said memory associated said one of said camera body and said operation card to said memory associated with the other said camera body and said operation card.

12. The camera system as defined in claim 11, wherein said communication means data intercommunication between said operation card and said camera body while said operation card remains attached to said one exterior of said camera body.

13. A camera system comprising:
a camera body having at least a taking lens and exposure means for performing exposure; and
a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
operation card detection means for detecting whether said operation card is attached to said one exterior of said camera body;
data transfer means for transferring data to said operation card;
display means installed to said operation card for displaying a visual image; and
control means for clocking a current time and causing said data transfer means to transfer data of said current time when said operation card detection means detects said operation card attached to said one exterior of said camera body to said operation card;
wherein said control means detects whether said display means displays a visual image representing old time data, and causing said display means to replace said visual image of said old time data with said visual image of said current time data when detecting that said display means displays said visual image representing said old time data.

14. A camera system comprising:
a camera body having at least a taking lens and exposure means for performing exposure; and
a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
wherein said operation card is equipped with a print quantity setting switch operative to set a number of print copies, data of which is recorded on a film loaded in said camera body whenever said operation card remains detached from said front of said camera body to protect said taking lens.

15. The camera system as defined in claim 14, and further comprising display means for displaying characters and numerals thereon and control mean for detecting operation of said print quantity setting switch, detecting whether a print quantity is definitely determined when detecting operation of said print quantity setting switch, causing said display means to display and flash on and off said print quantity definitely determined when detecting that said print quantity is definitely determined, and causing said display means to display and flash on and off an initial print quantity when detecting that said print quantity is not definitely determined.

16. A camera system comprising:
a camera body having at least a taking lens and exposure means for performing exposure; and
a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;

wherein said camera body is formed with a recess in said one exterior and an electrical terminal disposed at a bottom of said recess and said operation card is provided with an electrical terminal supported on an insulation guide which is received in said recess, said electrical terminals being brought into contact with each other while said insulation guide is received in said recess by attaching said operation card to said one exterior of said camera body to electrically couple said operation card and said camera body for supply electric power so as thereby to supply electric power to said operation card from said camera body.

17. The camera system as defined in claim 16, wherein electrically coupling means comprises a recess formed in said one exterior of said camera body, an electrical terminal disposed at a bottom of said recess, an insulation guide receivable in said recess, and an electrical terminal supported on insulation guide, said electrical terminals being brought into contact with each other while said insulation guide is received in said recess by attaching said operation card to said one exterior of said camera body.

18. The camera system as defined in claim 17, wherein said recess and said insulation support work to position said operation card relatively to said camera body.

19. The camera system as defined in claim 18, wherein camera body is formed with said recess at least two and said operation card is provided with said insulation support at least two.

20. A camera system comprising:
a camera body having at least a taking lens and exposure means for performing exposure; and
a lens cover type of operation card incorporating a function of operating said camera system for covering said taking lens when attached as an operation card to a front of said camera body and remotely operating said camera system while remaining detached from said camera body, said operation card being attachable to one of exteriors of said camera body other than said front and enabling said camera system to be operated through said operation card when attached to said one exterior of said camera body;
wherein said one exterior is a back of said camera body and said operation card is formed with a view window overlapping a finder eye piece of said camera body while said operation card remains attached to said back of said camera body.

21. A camera system comprising:
a camera body having at least a taking lens and exposure means for performing exposure;
display means installed to said camera body for displaying data relating to operation of said camera system as a visual image;
a lens cover type of operation card incorporating a function of operating said camera system for covering said taking lens when attached as an operation card to a front of said camera body to protect said taking lens; and
control means for detecting functional operation of said operation card remaining attached to said front of said camera body, causing said display means to remove data displayed as a visual image thereon after a lapse of a predetermined time before detection said functional operation, detecting operation of a specified operation switch of said operation card after said display means removes said data, and causing said display means to display information relating to said specified operation switch while detecting said operation of said specified operation switch.

22. A camera system comprising;
a camera body having at least a retractable taking lens and exposure means for performing exposure;
lens drive means incorporated in said camera body for protruding said taking lens while said camera system is in use and retracting said lens into said camera body after use of said camera system;
a lens cover type of operation card incorporating a function of operating said camera system for covering said taking lens when attached as an operation card to a front of said camera body to protect said tacking lens; and
display means installed to said operation card for displaying an indication relating to operation of said camera system;
control means for transferring a command to said operation card to cause said display means to remove said indication and cause said lens drive means to retract said taking lens into said camera body when said camera body is put ineffective in making exposure, detecting said taking lens retracted into said camera body, detecting a specific exposure mode in which said camera body is set through said operation card, and transferring a display command to said operation card to cause said display means to display an indication relating to said specific exposure mode unless detecting said taking lens retracted into said camera body while detecting said specific exposure mode.

23. The camera system as defined in claim 22, wherein said specific exposure mode is a flash-exposure mode.

24. The camera system as defined in claim 22, wherein said specific exposure mode is an red-eye effect reduction flash-exposure mode.

25. A camera system comprising;
a camera body having at least a taking lens and exposure means for performing exposure;
an operation card detachably attached to said camera body, said operation card incorporating a function of operating said camera system;
display means installed to said operation card for displaying an indication relating to operation of said camera body; and
control means for detecting whether said operation card is attached to said camera body, putting said camera system in a remotely controllable mode in which said camera system is remotely controlled through said operation card when detecting that said operation card remains attached to said camera body, and causing said display means to display a remote control mode indication that said camera system is in said remotely controllable mode when detecting that said operation card is detached from said camera body while said camera system is in said remotely controllable mode.

26. The camera system as defined in claim 25, wherein said display means continuously display said remote control mode indication for a specified time after said detection that said operation card is detached from said camera body while said camera system is in said remotely controllable mode.

27. The camera system as defined in claim 25, wherein control means disables said display means from displaying any indication other than said remote control mode indication when detecting that said operation card is detached from said camera body while said camera system is in said remotely controllable mode.

28. A camera system comprising:

a camera body having film rewinding means for rewinding a film partly exposed and partly unexposed into a film cartridge loaded in a film cartridge chamber, said film cartridge having cartridge identification data;

an operation card detachably attached to said camera body, said operation card incorporating a function of operating said camera system and being provided with display means for displaying data as an visual image thereon;

lid detection means for detecting closing and opening of a lid of said film cartridge chamber;

data entry means for entering said cartridge identification therethrough; and data entry control means for putting said operation card in a data entry mode for entry of said cartridge identification data when said lid detection means detects said opening of said lid after a conclusion of rewinding a full length of said film into said film cartridge by means of said film rewind means, enabling said data entry means to be effective in entering said cartridge identification data, and memory means for storing said cartridge identification data entered through said data entry means and data a number of unexposed frames.

29. The camera system as defined in claim 28, further comprising cartridge detection means for detecting a film cartridge loaded in said film cartridge chamber of said camera body, wherein said data entry control means cancels said data entry mode when said rid detection means detects said closing of said rid while said cartridge detection means detects a film cartridge loaded in said film cartridge chamber.

30. A camera system comprising;

a camera body for use with a film with a magnetic recording track and magnetic recording means for magnetically recording data on said magnetic recording track;

an operation card detachably attached to said camera body, said operation card incorporating a function of operating said camera system and being provided with display means for displaying data as an visual image thereon;

film rewind means for rewinding said film one frame back after exposure; and control means for detecting whether said film rewind means rewinds correctly said film one frame, permitting said magnetic recording means to record data on said magnetic track for an exposed frame rewound back when detecting that said film rewind means rewinds correctly said film one frame, prohibiting said magnetic recording means from recording data on said magnetic track for said exposed frame rewound back when detecting that said film rewind means rewinds incorrectly said film one frame, enabling said operation card to enter, correct and select data to be magnetically recorded on said magnetic recording area for said exposed frame rewound back therethrough while said magnetic recording means is permitted to record data on said magnetic track for an exposed frame rewound back, and causing said magnetic recording means to record said data entered, corrected and selected on said magnetic track for said exposed frame rewound back.

31. The camera system as defined in claim 30, wherein said data is a number of prints.

32. The camera system as defined in claim 30, wherein said data is a caption.

33. A camera system comprising;

a camera body for use with a film with a magnetic recording track and magnetic recording means for magnetically recording data on said magnetic recording track;

an operation card detachably attached to said camera body, said operation card incorporating a function of operating said camera system and being provided with display means for displaying data as an visual image thereon;

a plurality of switches installed to said operation card through which data and operation commands are entered; and control means for enabling at least one of said switches to be effective in entering, correcting and selecting data with which recorded data on said magnetic recording track for an exposed frame, causing said display means to display an indication of said switch enabled to be effective.

34. The camera system as defined in claim 33, wherein said data is a number of prints.

35. A camera system comprising:

a camera;

an operation card detachably attached to said camera body, said operation card incorporating a function of operating said camera system and being provided with display means for displaying data as an visual image thereon;

a plurality of switches installed to said operation card through which data to be displayed as an visual image on said display means are entered, corrected and selected; and display control means for displaying an indication of said switches effective in entering, correcting and selecting said data together with said visual image on said display means;

wherein said data is cartridge identification information of a film cartridge loaded in said camera.

36. The camera system as defined in claim 35, wherein said data is a date.

* * * * *